US008478677B2

(12) United States Patent
Solomon

(10) Patent No.: US 8,478,677 B2
(45) Date of Patent: Jul. 2, 2013

(54) SYSTEM FOR INTELLIGENT SEARCH AGENT TO ACCESS DATA IN A DISTRIBUTED NETWORK

(76) Inventor: Neal Solomon, Oakland, CA (US)

( * ) Notice: Subject to any disclaimer, the term of this patent is extended or adjusted under 35 U.S.C. 154(b) by 446 days.

(21) Appl. No.: 12/283,596

(22) Filed: Sep. 12, 2008

(65) Prior Publication Data

US 2009/0106165 A1   Apr. 23, 2009

(51) Int. Cl.
 *G06Q 40/00* (2012.01)
(52) U.S. Cl.
 USPC ............................................................ 705/37
(58) Field of Classification Search
 USPC .................................................... 705/35–40
 See application file for complete search history.

(56) References Cited

U.S. PATENT DOCUMENTS

| | | | | |
|---|---|---|---|---|
| 5,694,556 A * | 12/1997 | Neal et al. | ...................... | 710/310 |
| 6,021,397 A * | 2/2000 | Jones et al. | ................. | 705/36 R |
| 6,331,977 B1 * | 12/2001 | Spaderna et al. | ............. | 370/360 |
| 6,952,682 B1 * | 10/2005 | Wellman | .......................... | 705/37 |
| 2001/0042785 A1 * | 11/2001 | Walker et al. | ................. | 235/379 |
| 2001/0043611 A1 * | 11/2001 | Kadambi et al. | ............... | 370/429 |
| 2003/0004859 A1 * | 1/2003 | Shaw et al. | ...................... | 705/37 |
| 2004/0117302 A1 * | 6/2004 | Weichert et al. | ................ | 705/40 |

* cited by examiner

*Primary Examiner* — Olabode Akintola

(57) ABSTRACT

A commercial search agent (CSA) is used to access data in a distributed communications system. An initial search request constitutes a buyer's first search query at sellers' commercial database network. Analytical agents and seller promotions are used to inform the CSA, while negotiation commences after the initial RFQ. CSA's may be informed by analytical agents.

19 Claims, 109 Drawing Sheets

CCN Architecture

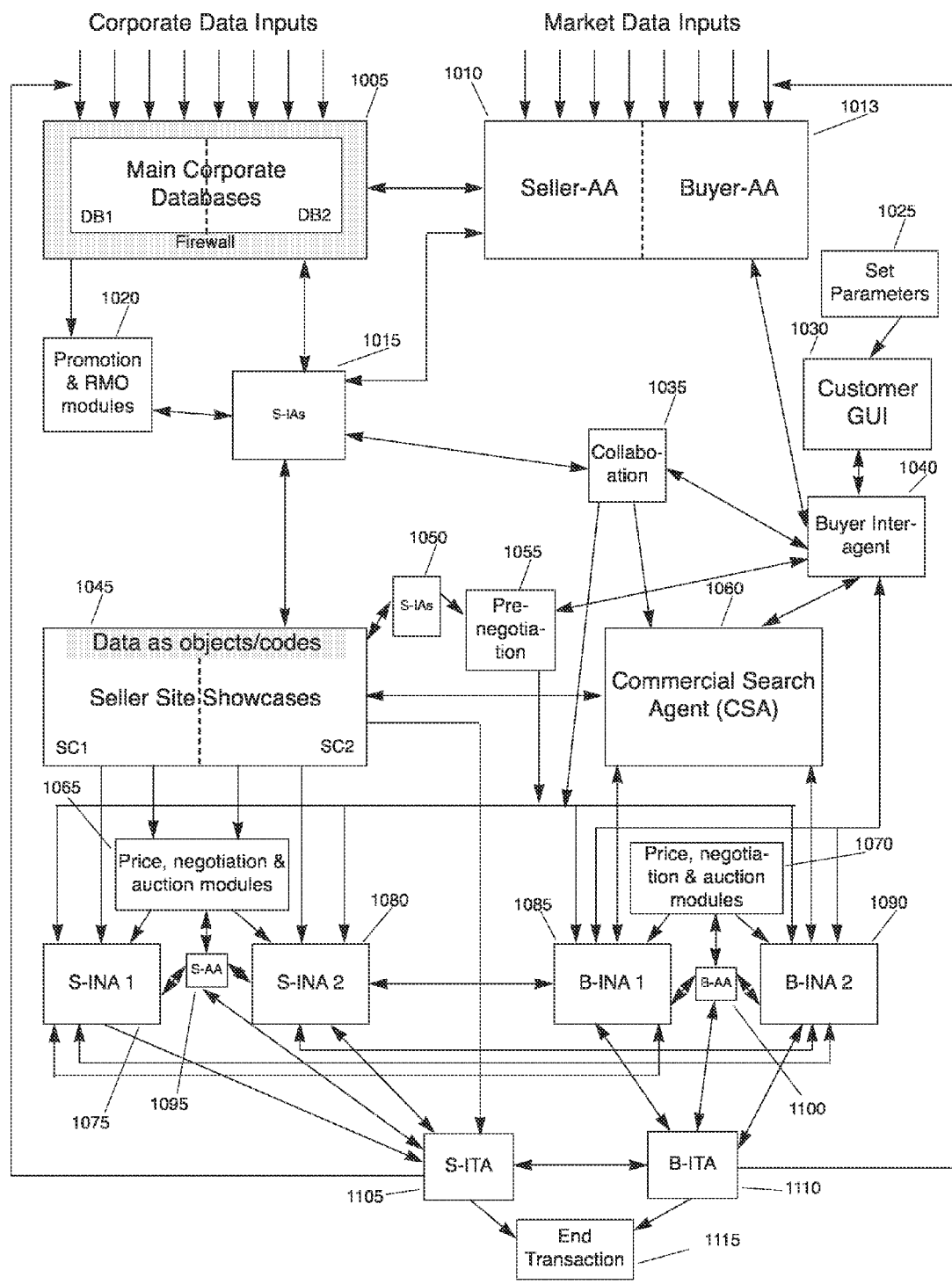

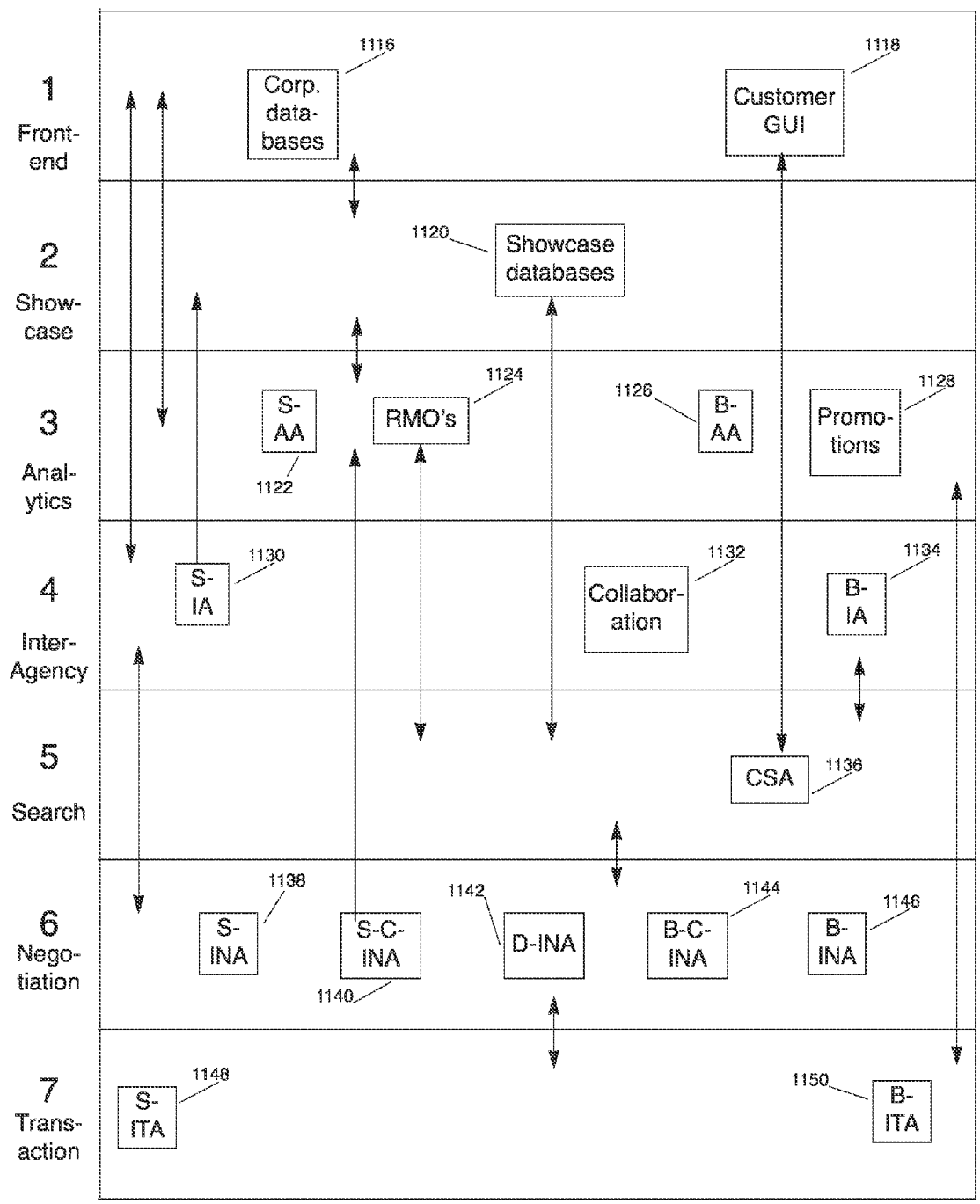

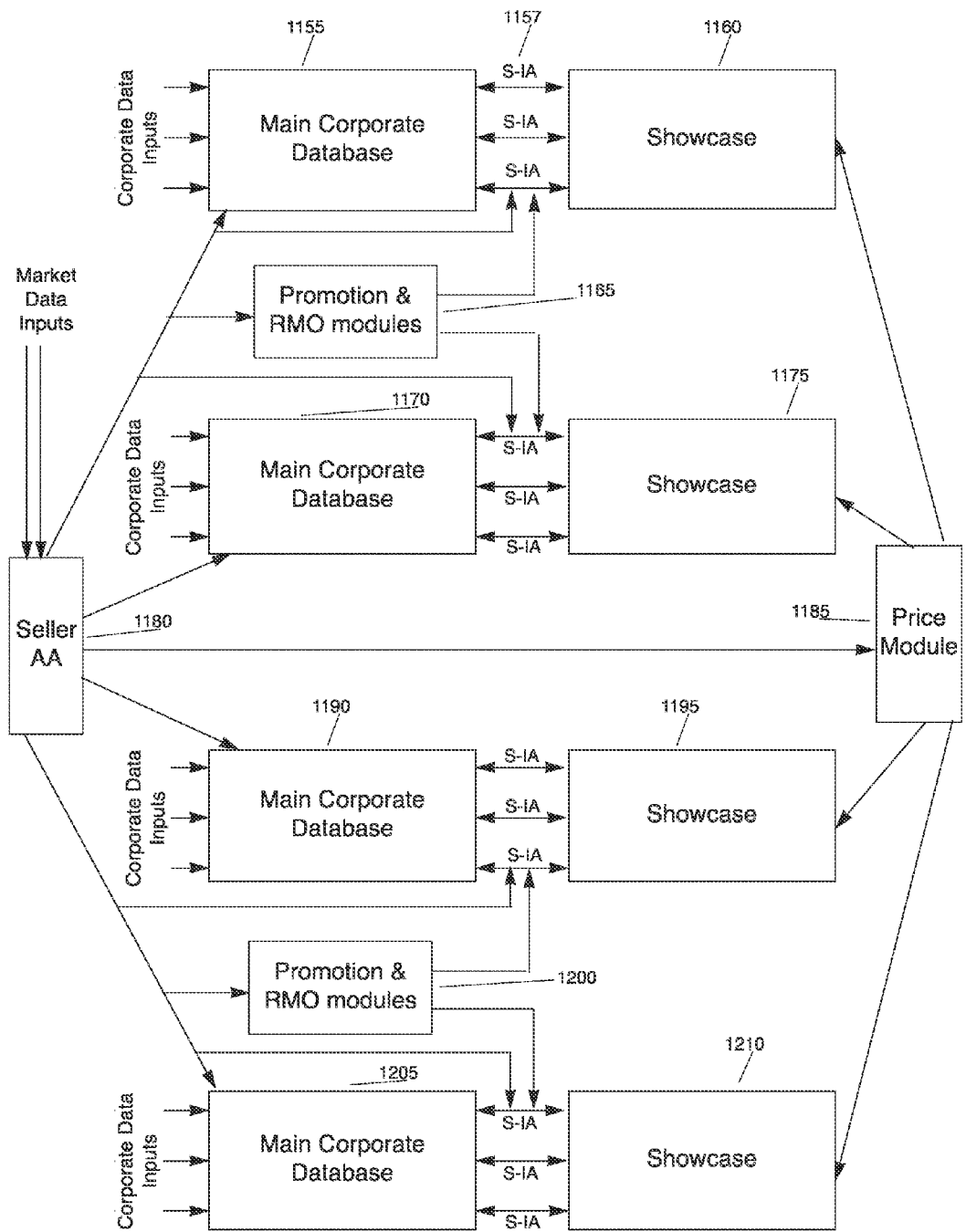
Fig. 3: Showcase Database System

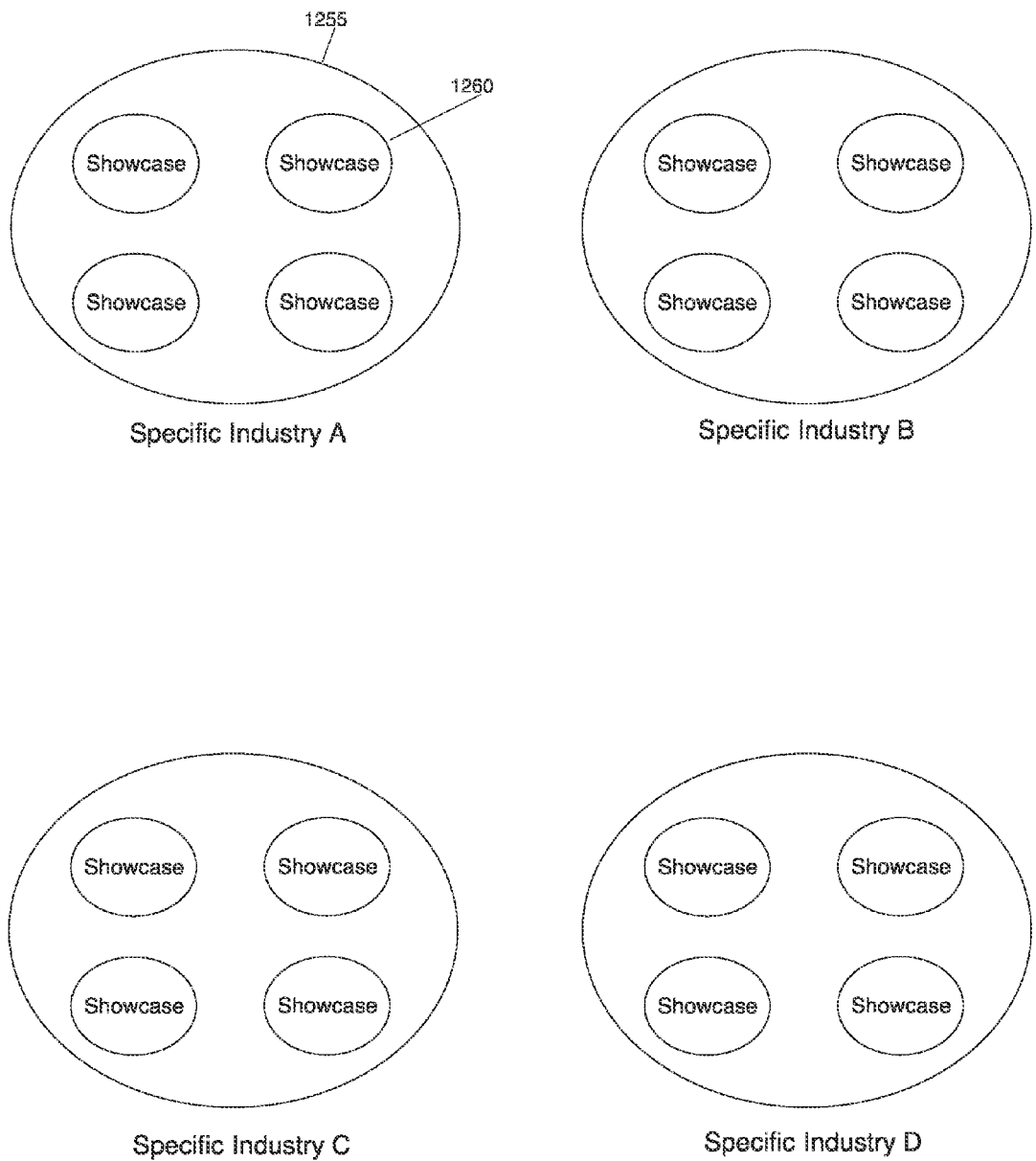
Fig. 4: Multiple Vertical Databases

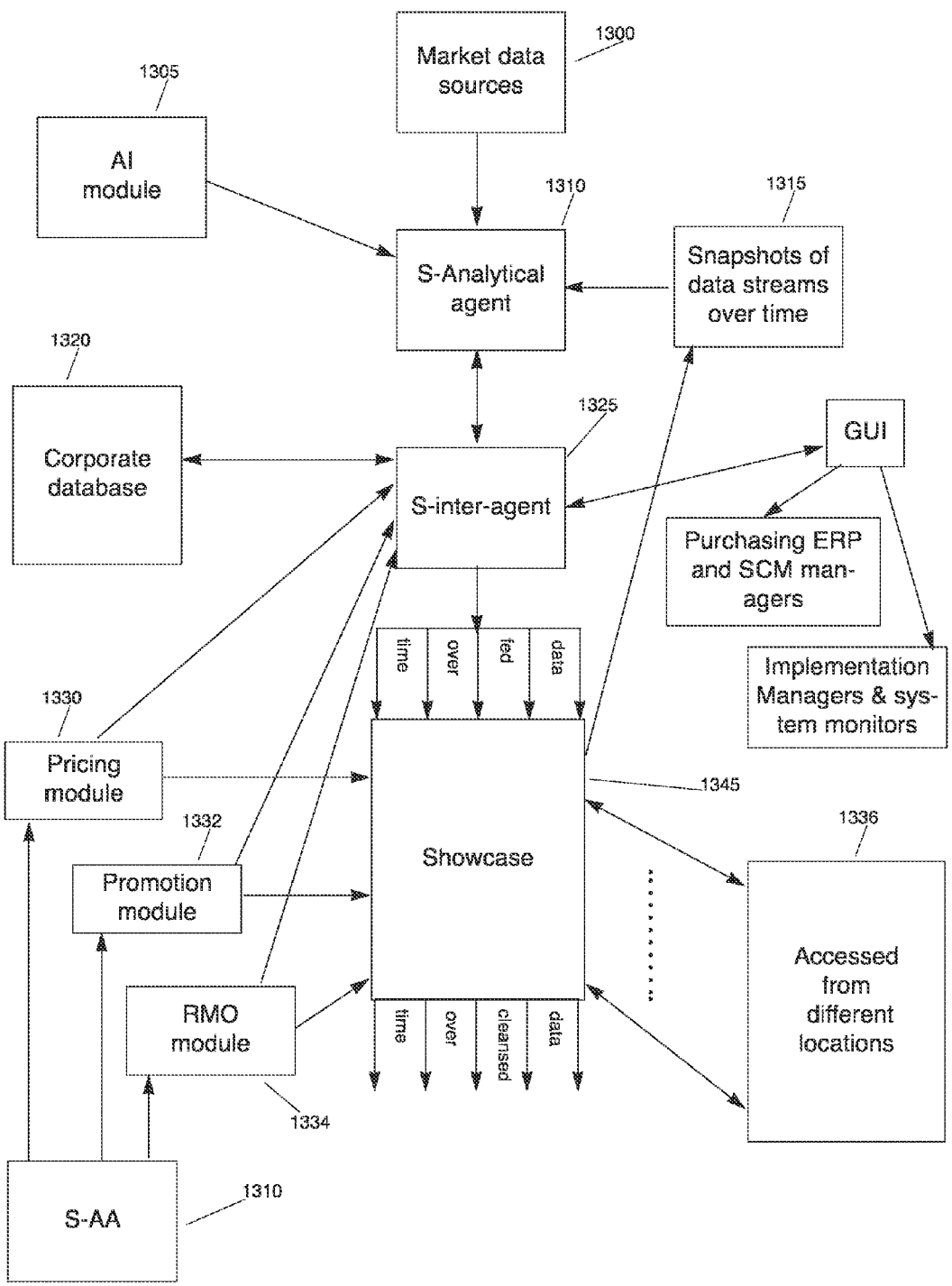
Fig. 5: Showcase Database View

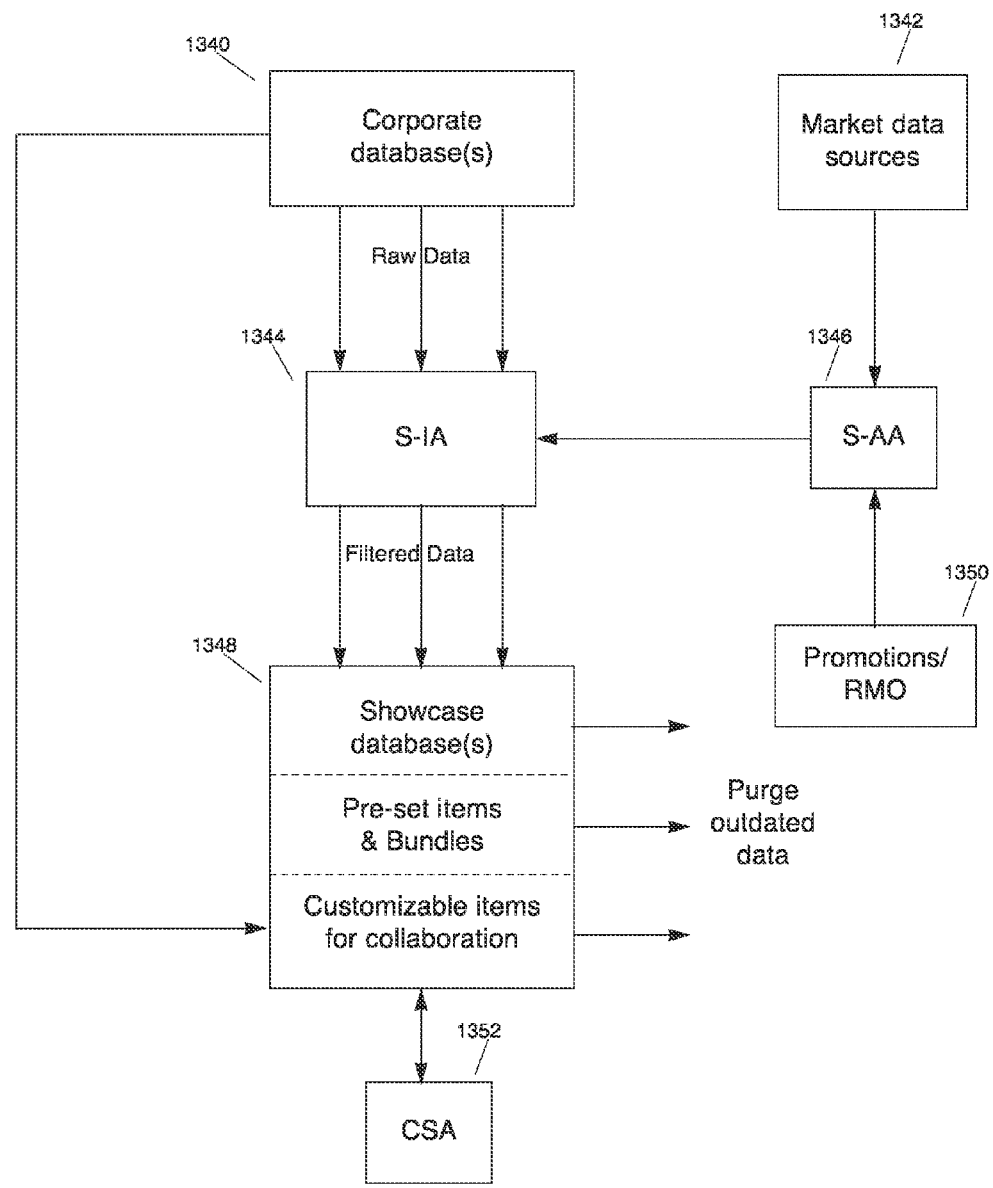
Fig. 6: Showcase Database Operation

Fig. 7: Showcase Data Flow
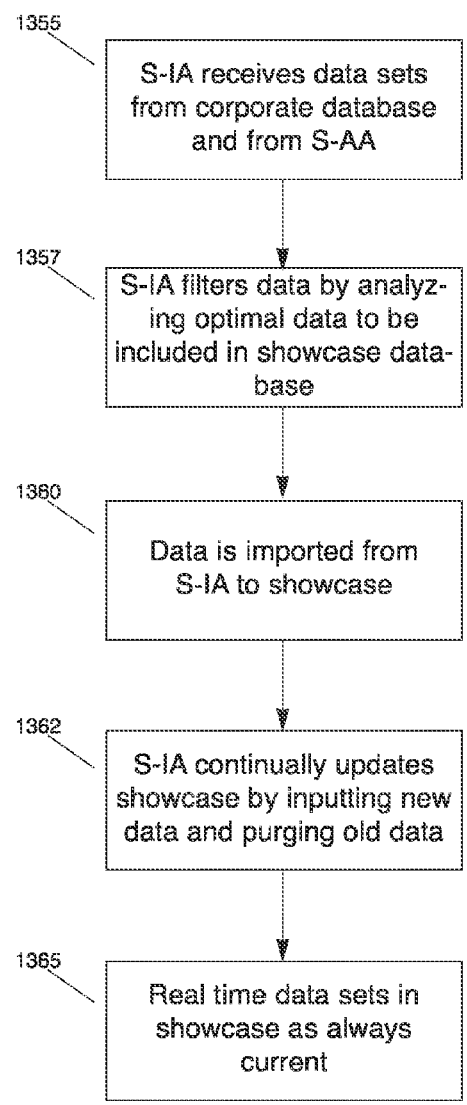

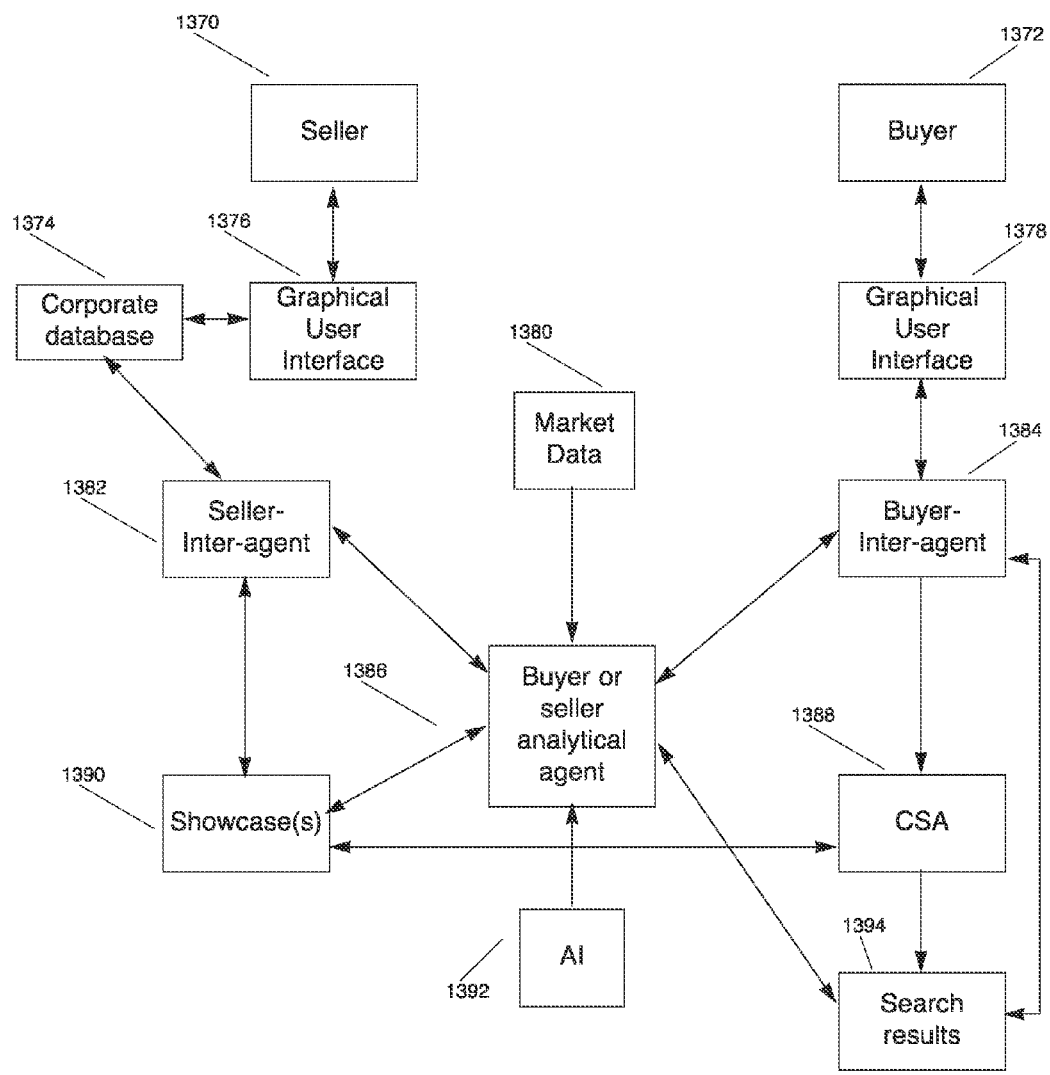
Fig. 8: Inter-agent System Architecture

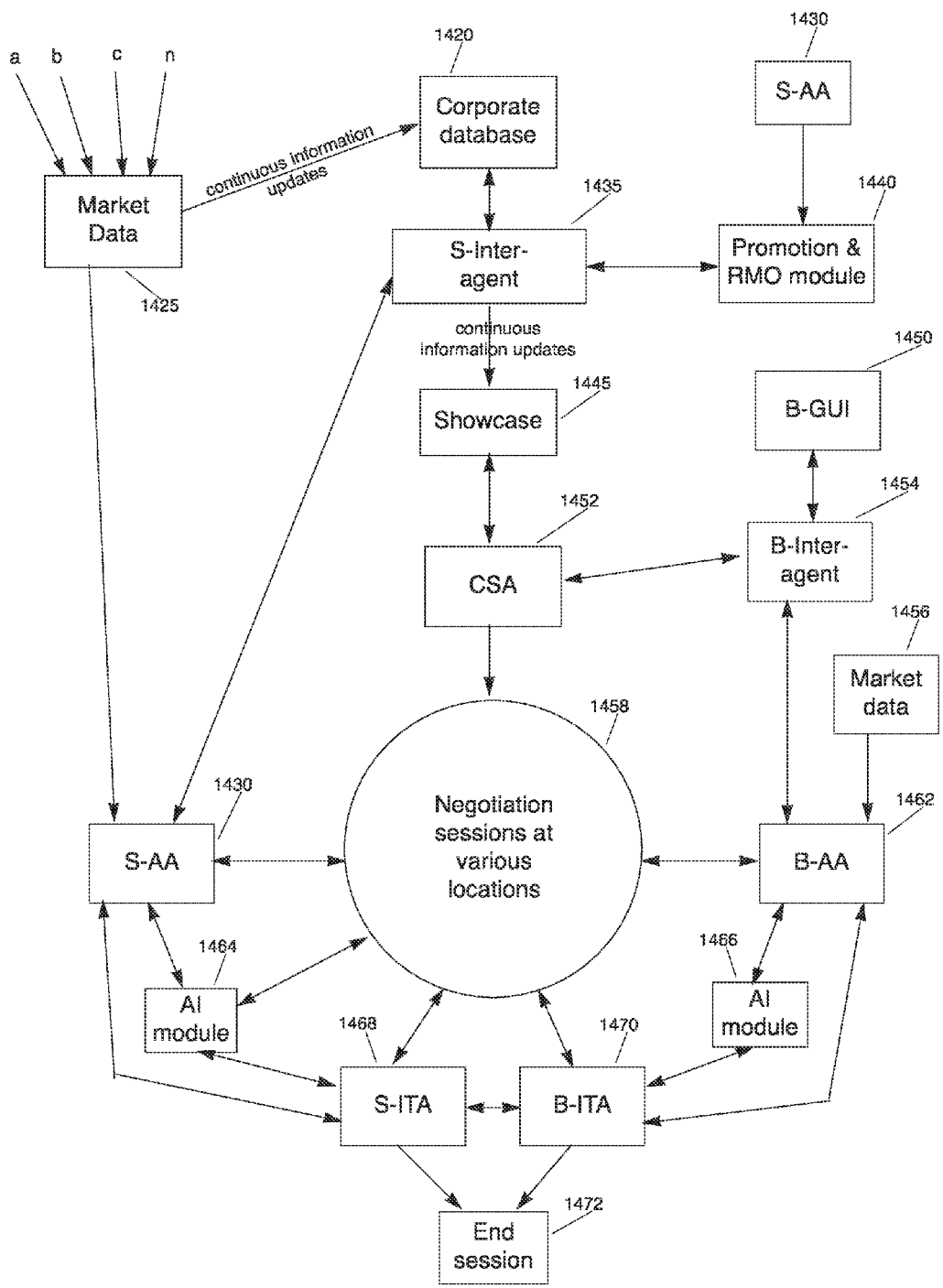
Fig. 9: Rivers of Data Flows

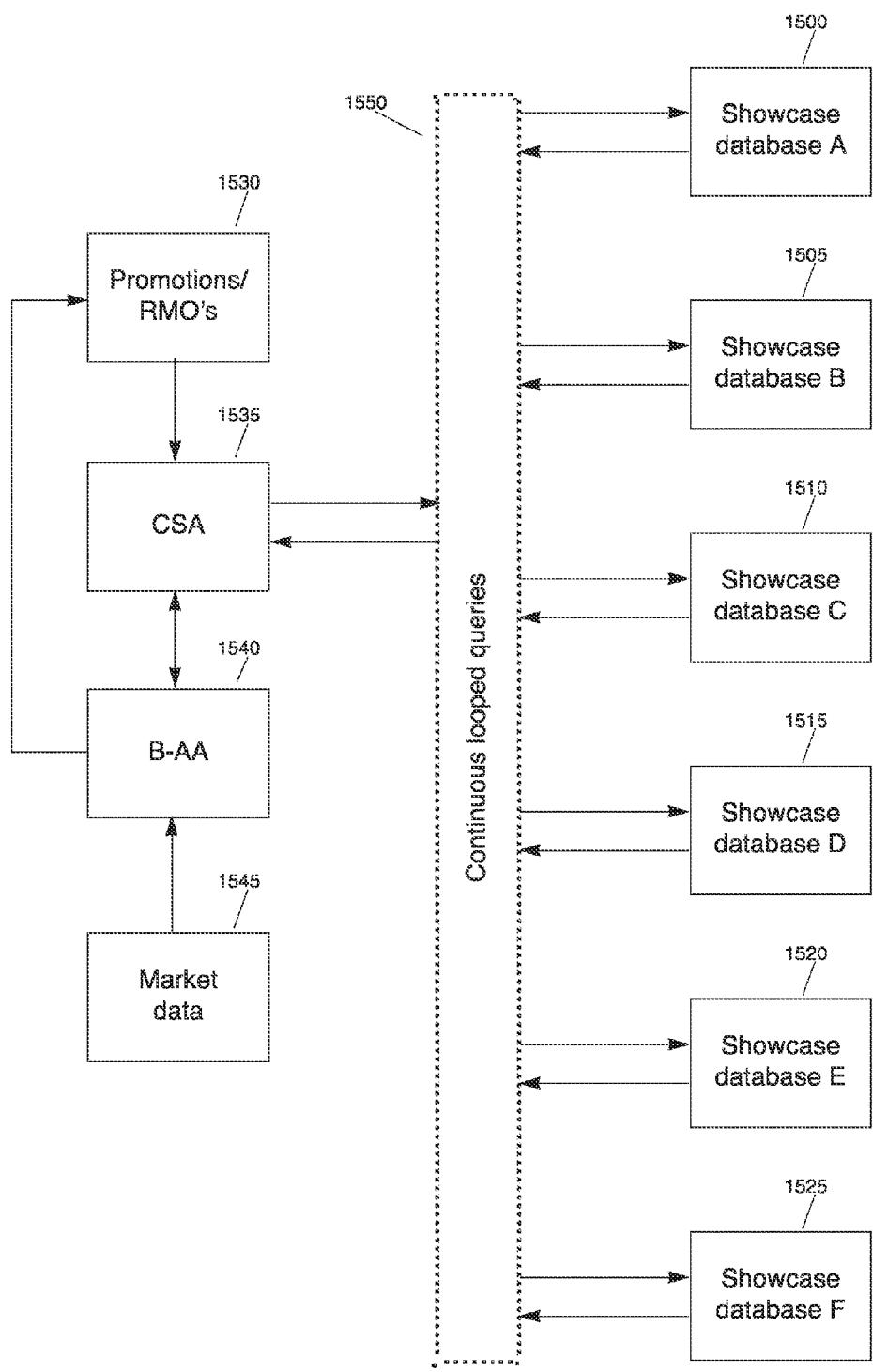
Fig. 10: CSA System Architecture

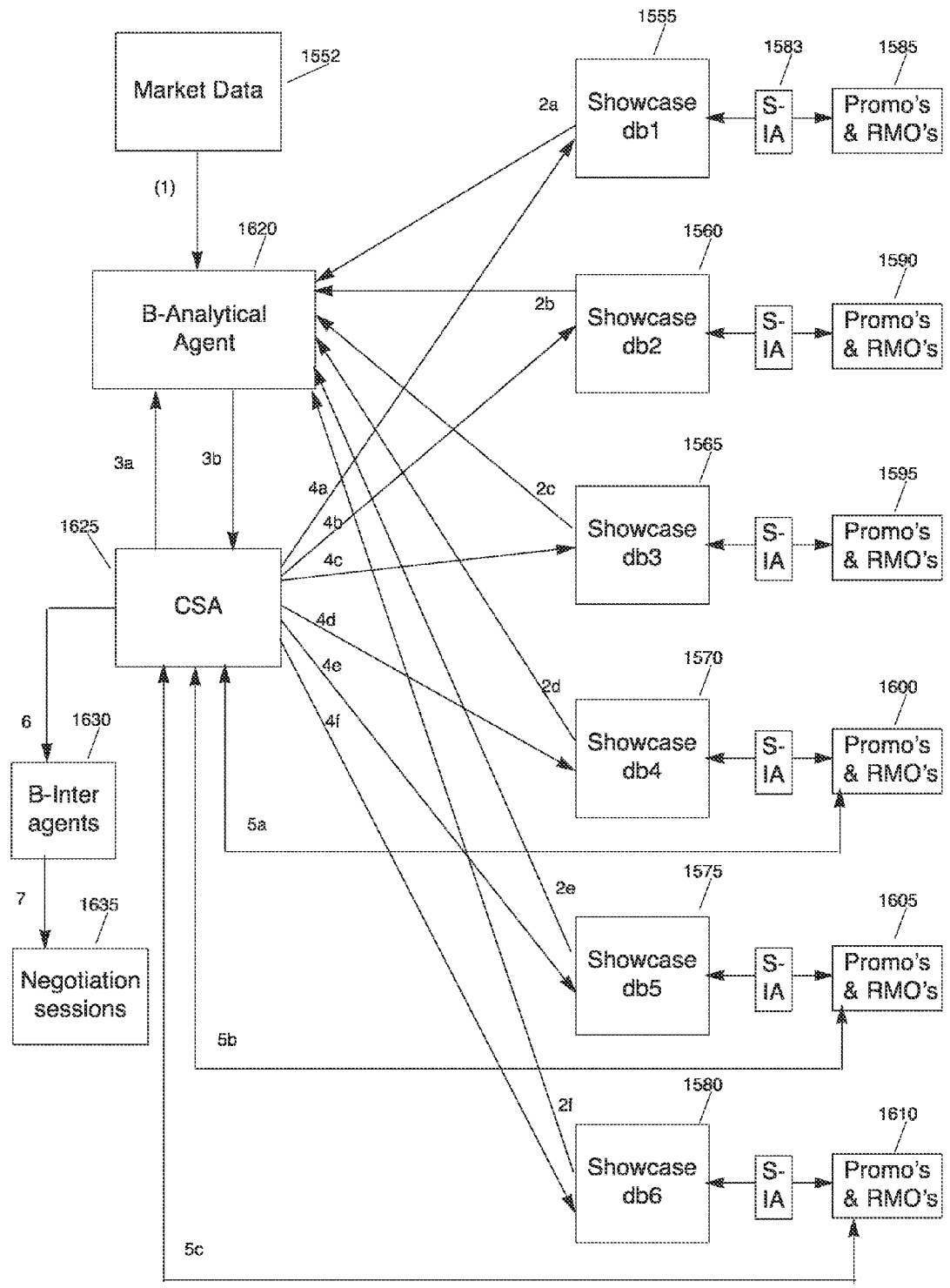

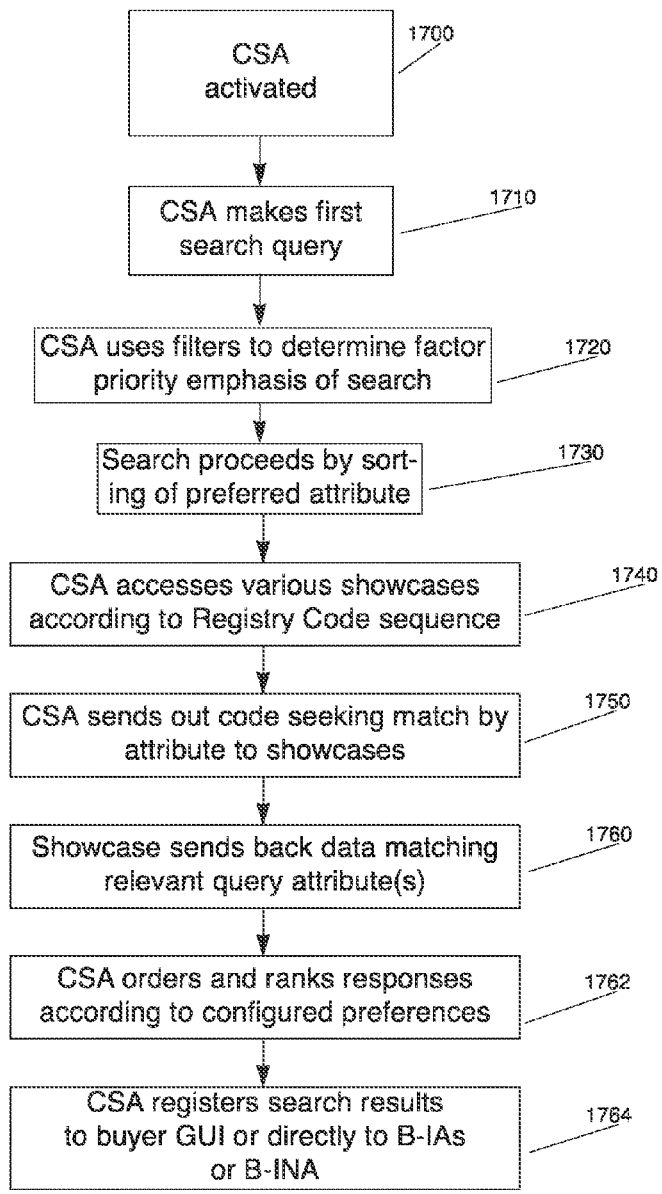
Fig. 12: Programmability of CSAs for Priorities of Search

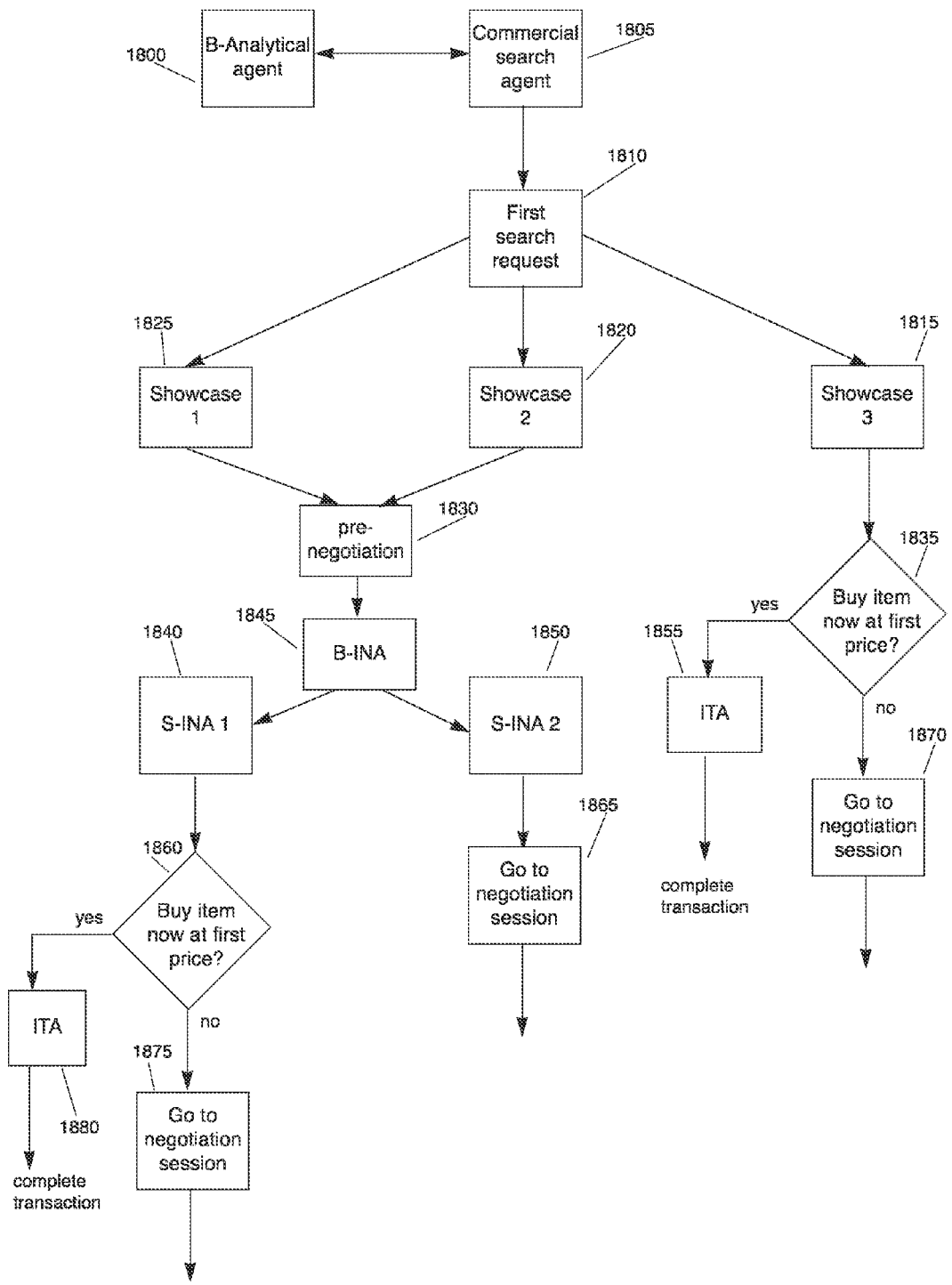
Fig. 13: CSA As Initial Search Query

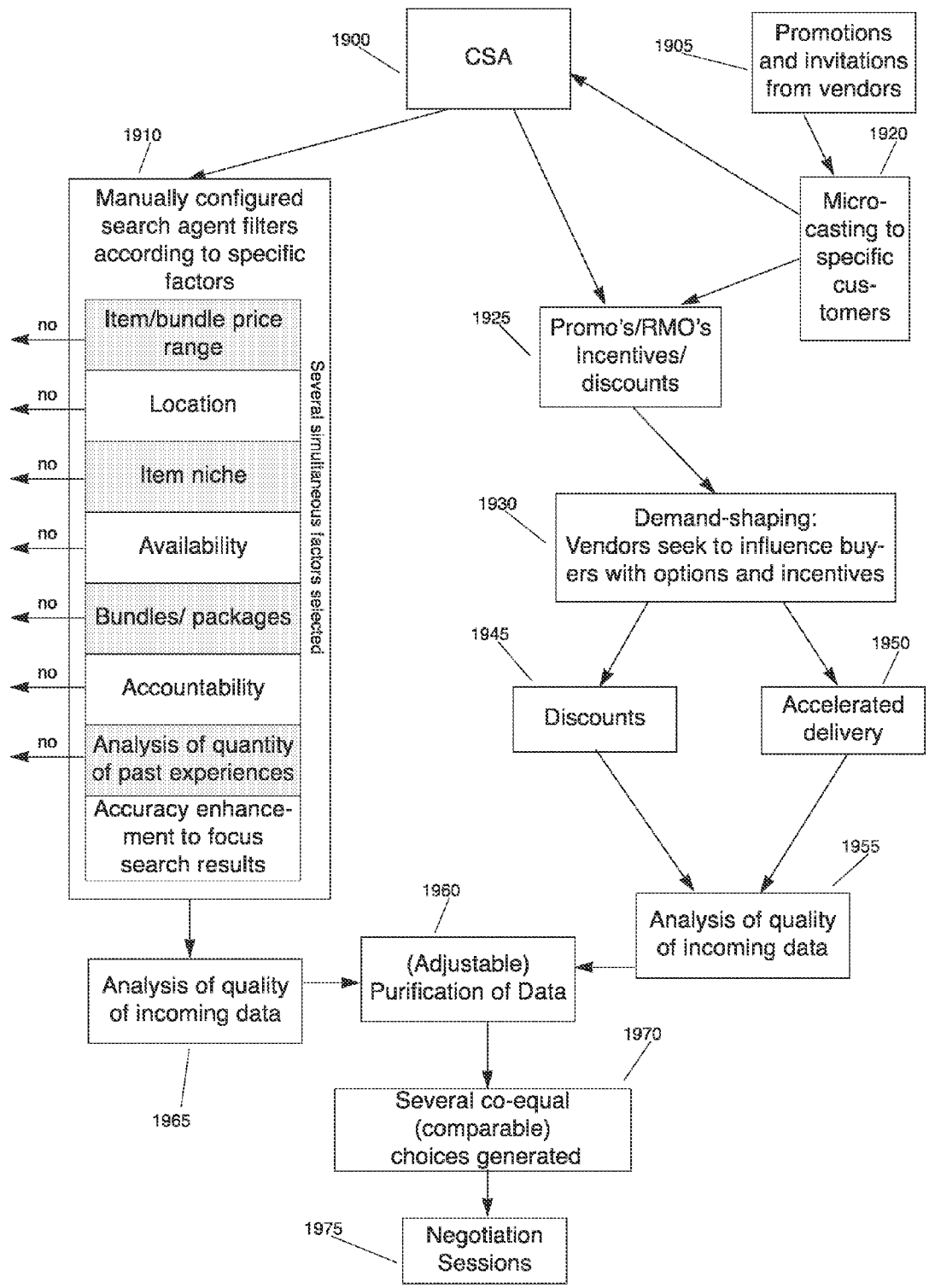
Fig. 14: CSA Filters

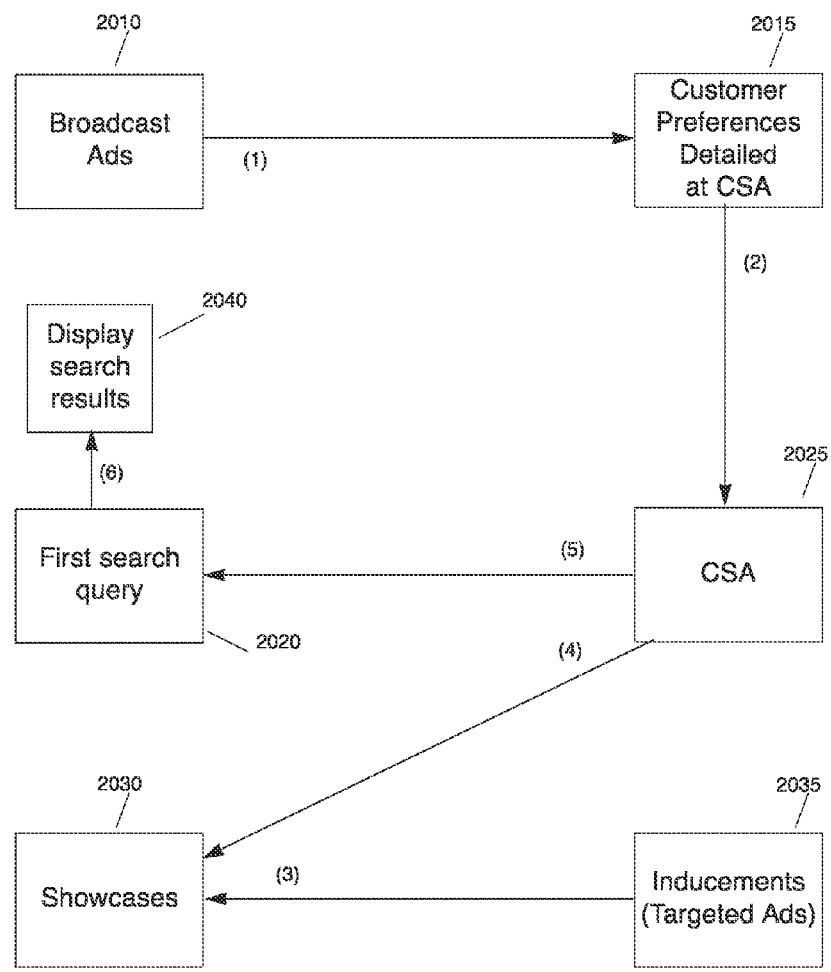
Fig. 15: Promotions

Fig. 16: Proximity Marketing For Mobile INAs
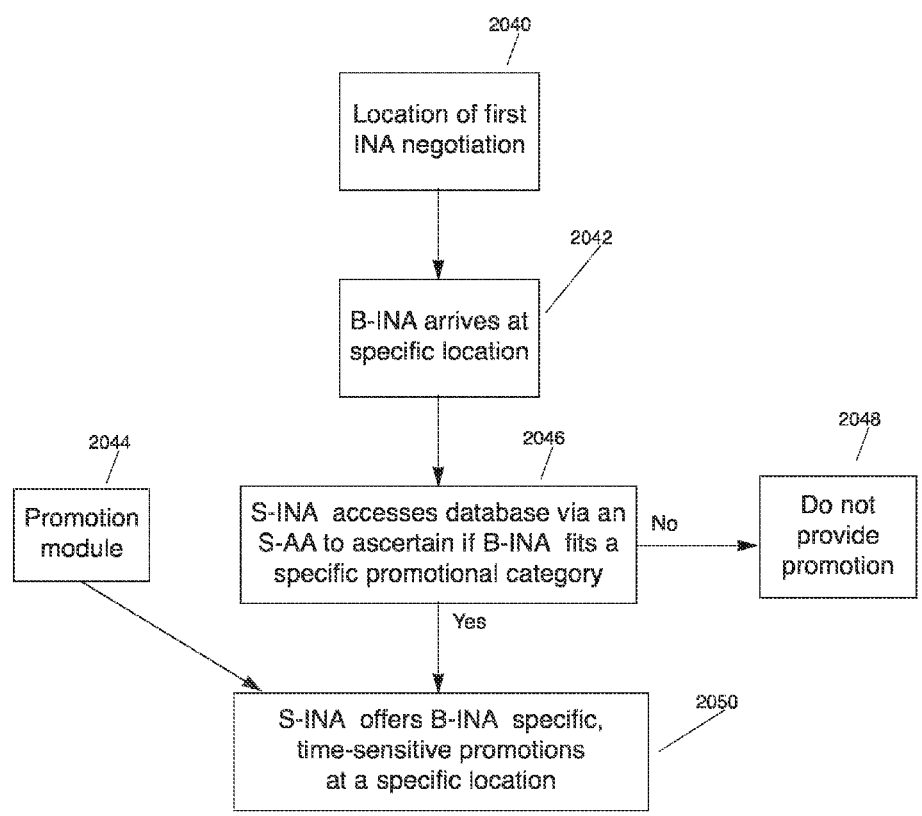

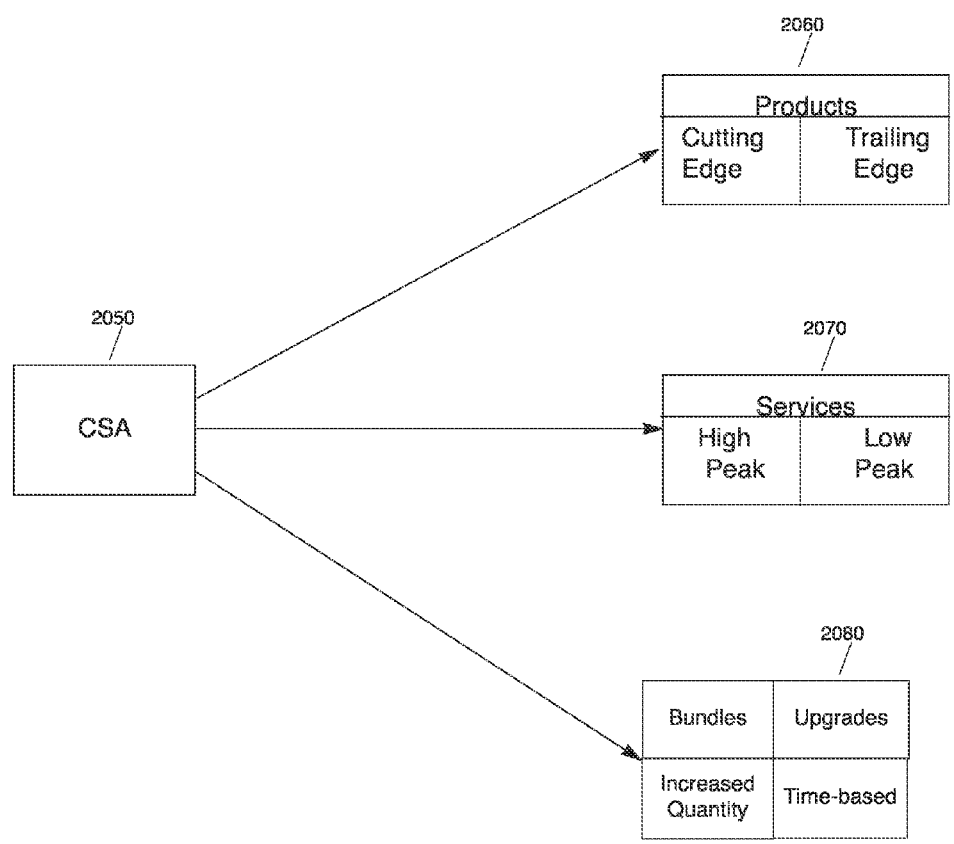
Fig. 17: Promotional Discounting

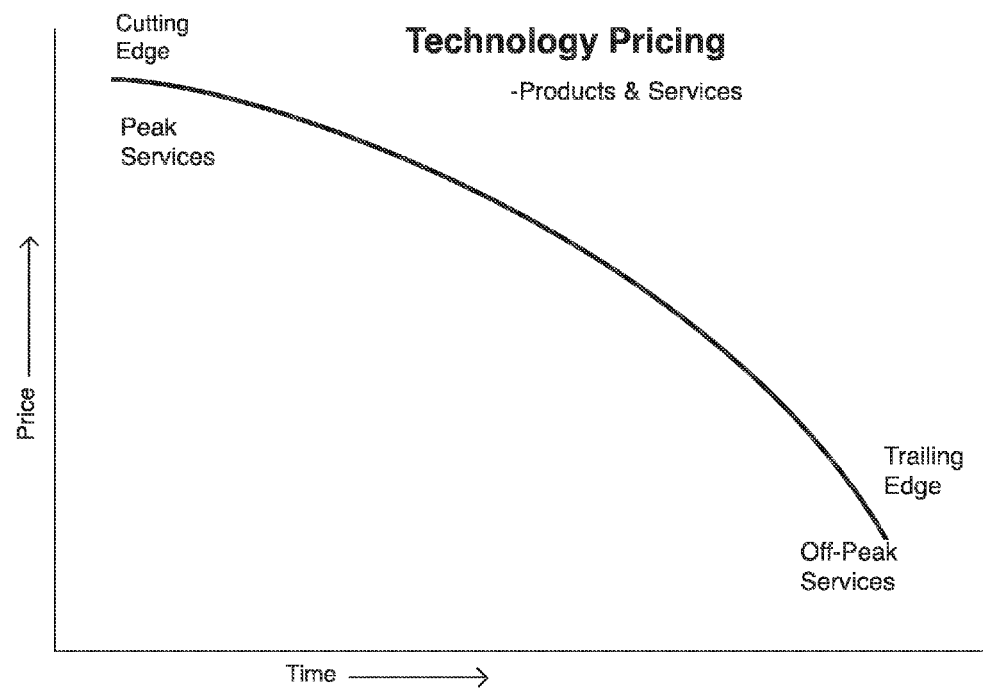
Fig. 18: Dynamic Pricing Model

Fig. 19: Pricing Discount Promotions

Dropping Prices Tendency

1. Trailing edge technology
2. Off-peak service
3. Bundled packages (aggregation-discounts)
4. Surplus items
5. Decreasing quality
6. Quantity discount (multiple identical items)
8. Un-time-sensitive
9. Decreased features
10. Exploding (Time-sensitive) offers

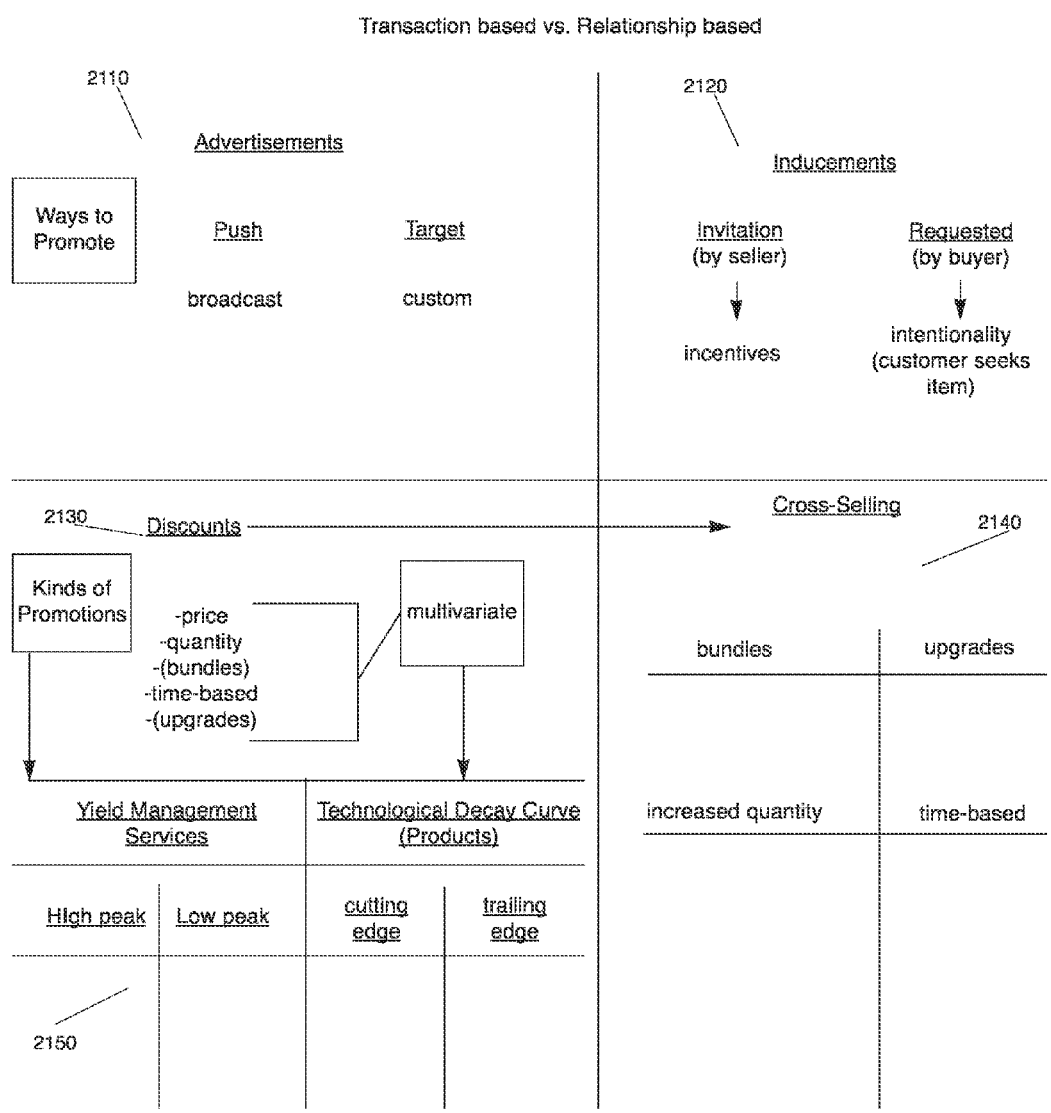
Fig. 20: Promotions Integrated with CSA & Showcase

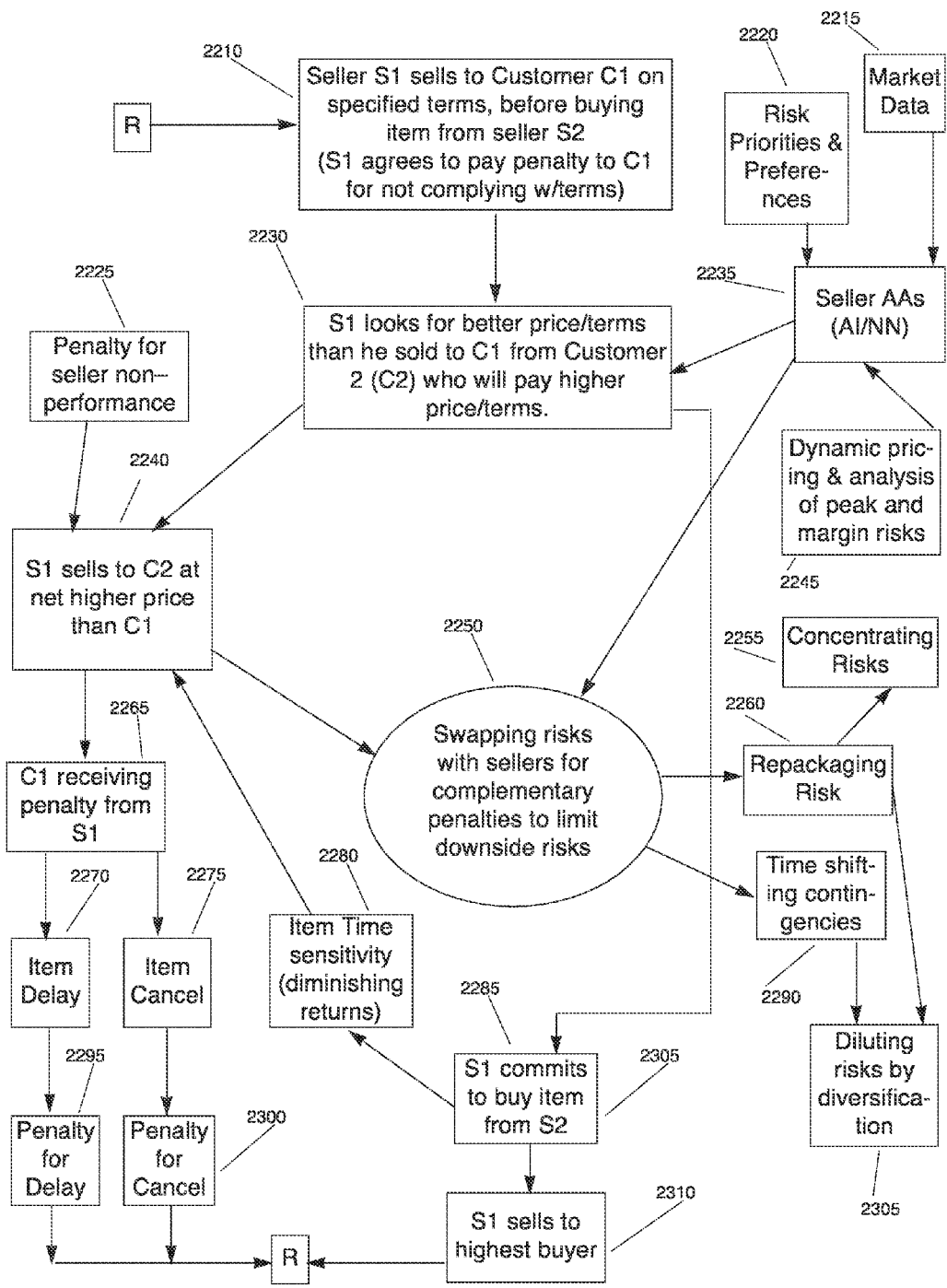

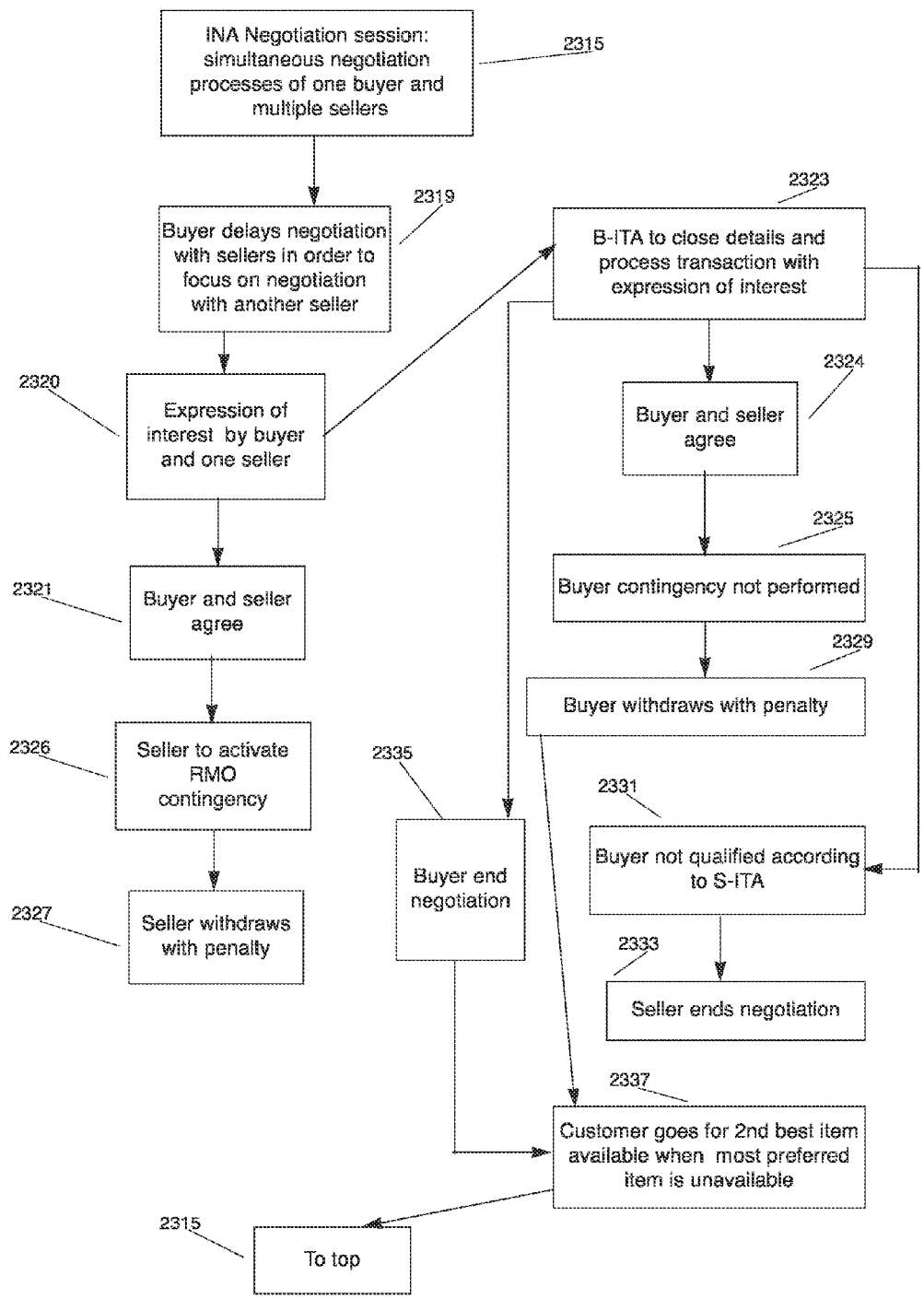
Fig. 22: Transaction Contingencies

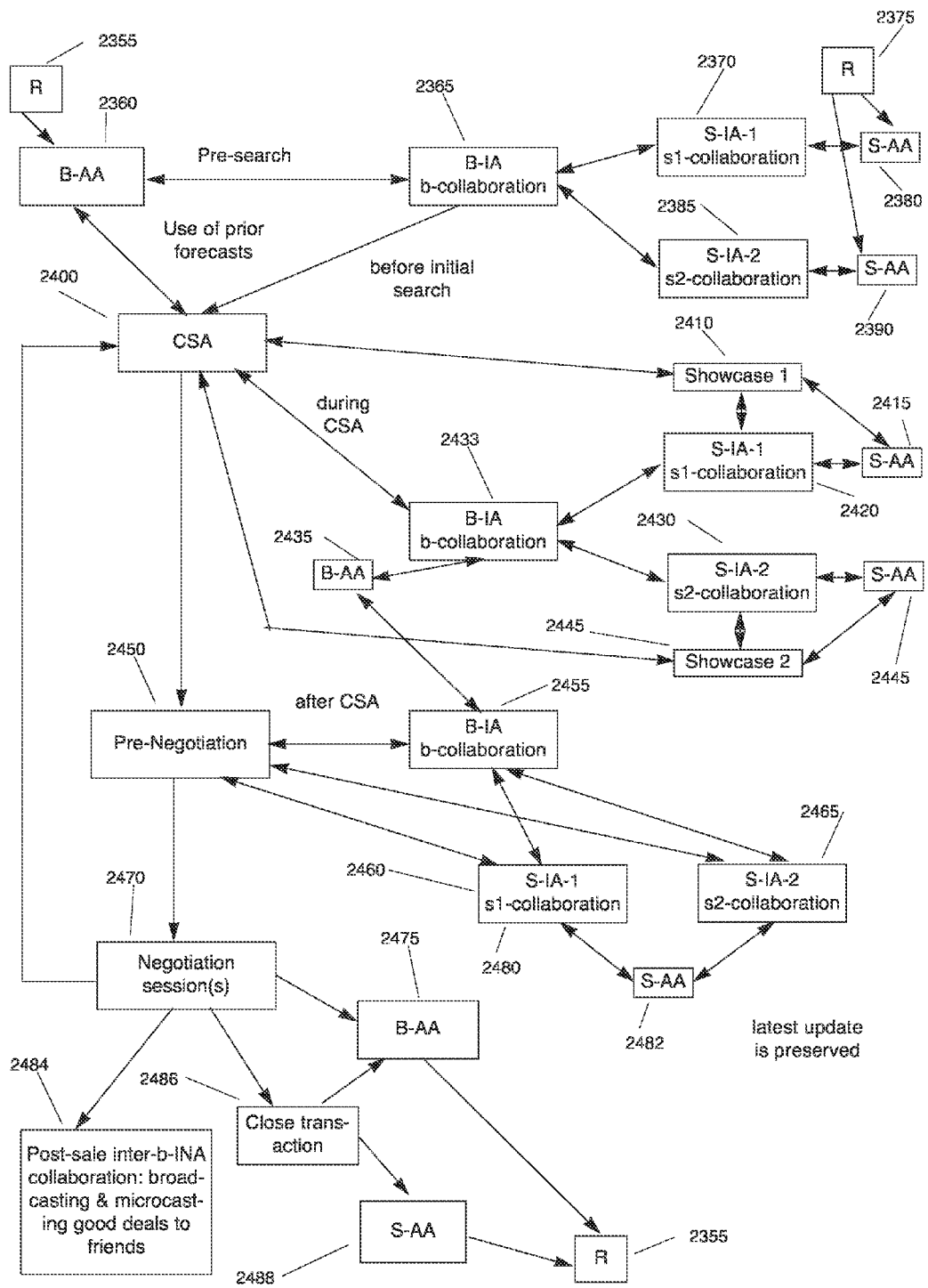
Fig. 23: Information Collaboration for MTO

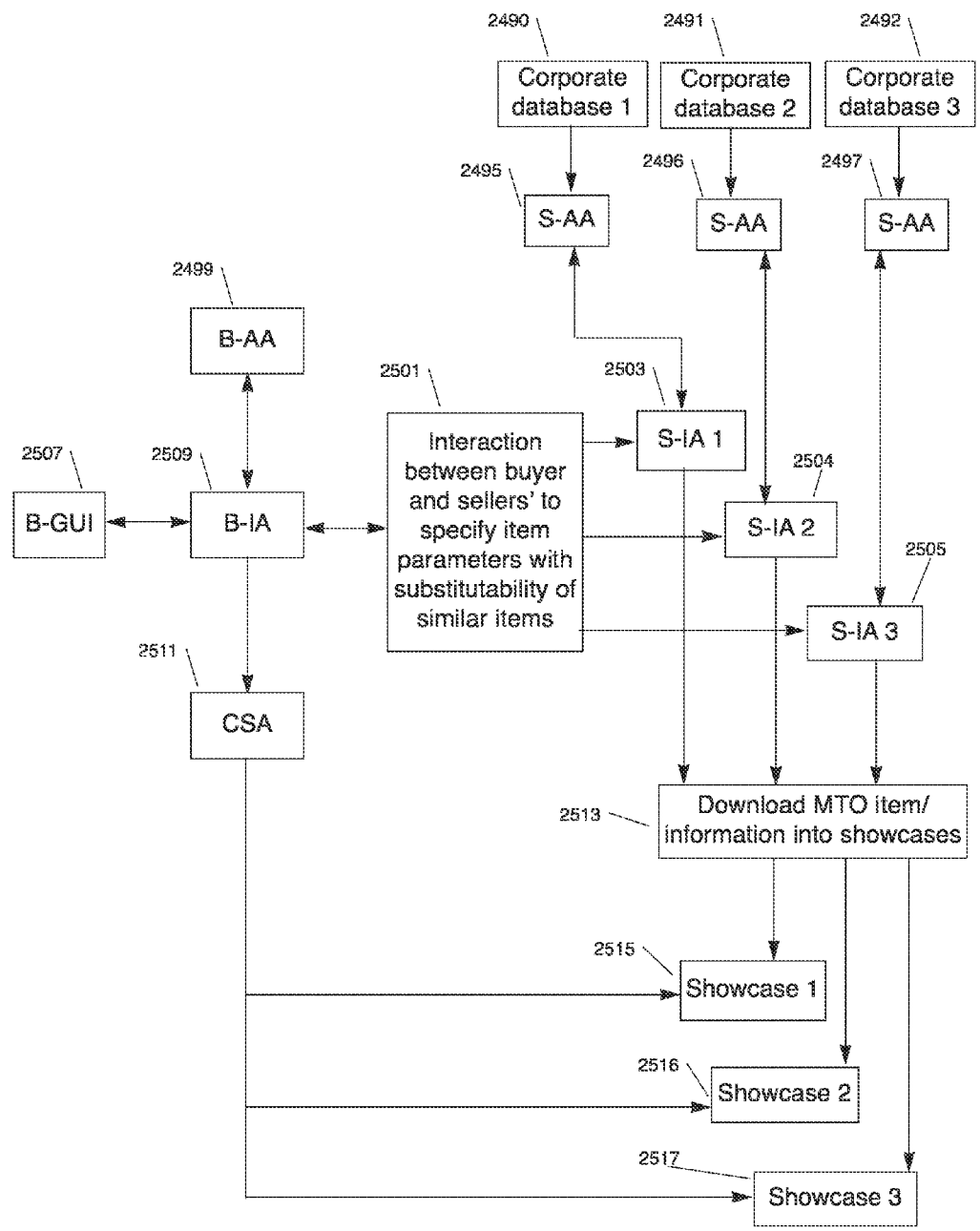
Fig. 24: Collaboration Process For MTO Customization

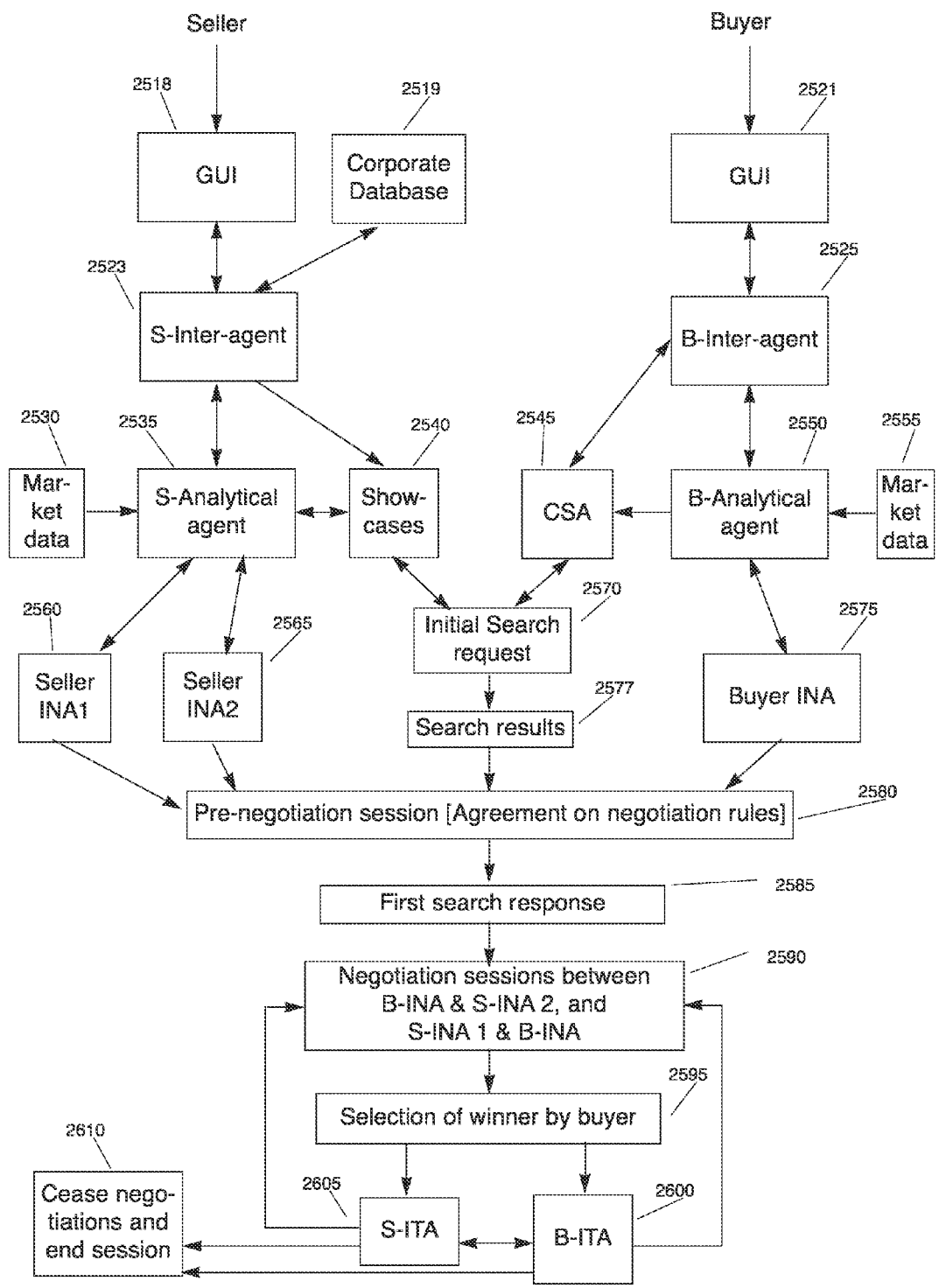
Fig. 25: INA Interaction (B-INA & S-INA Interactions)

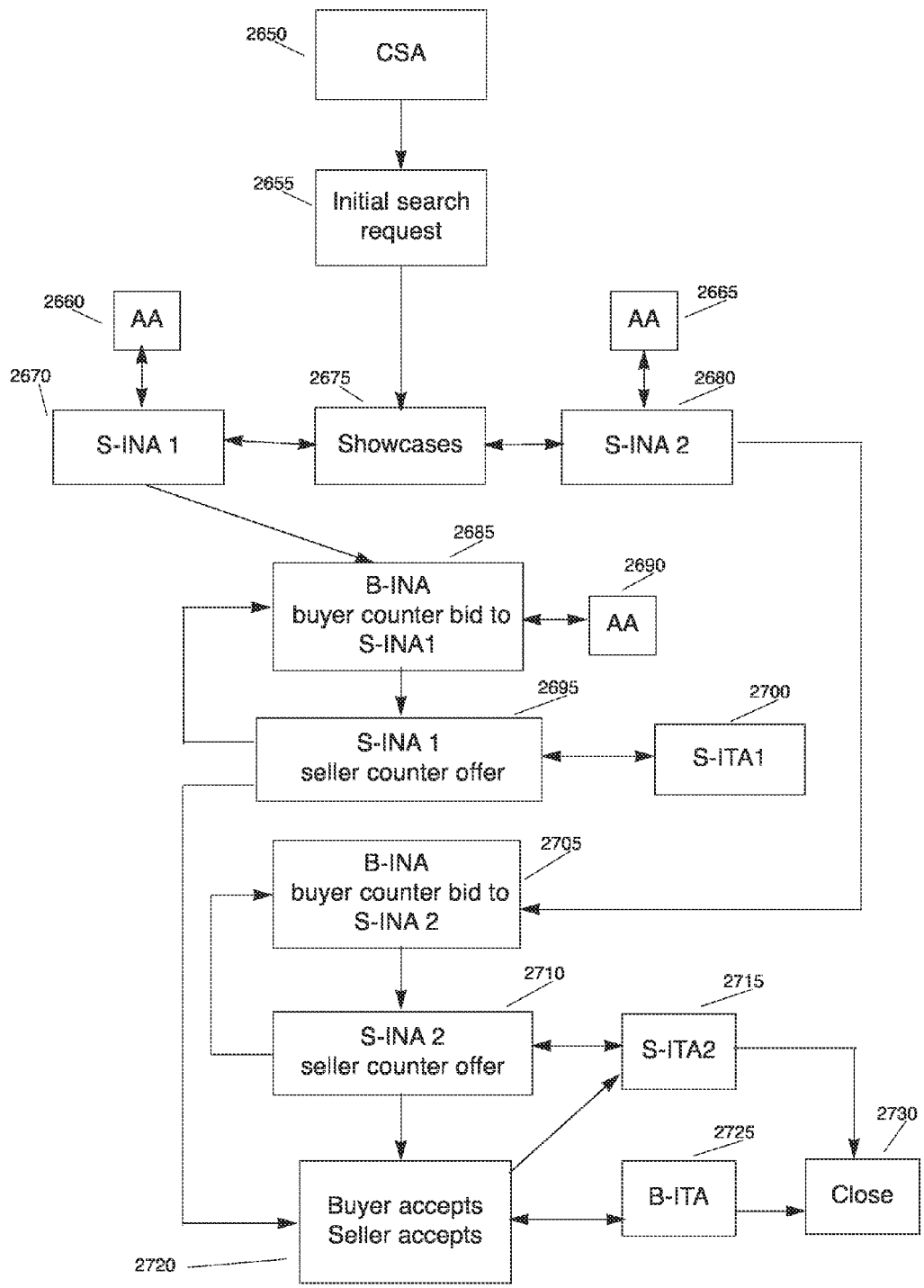
Fig. 26: INA Interactions - Ricochet Model

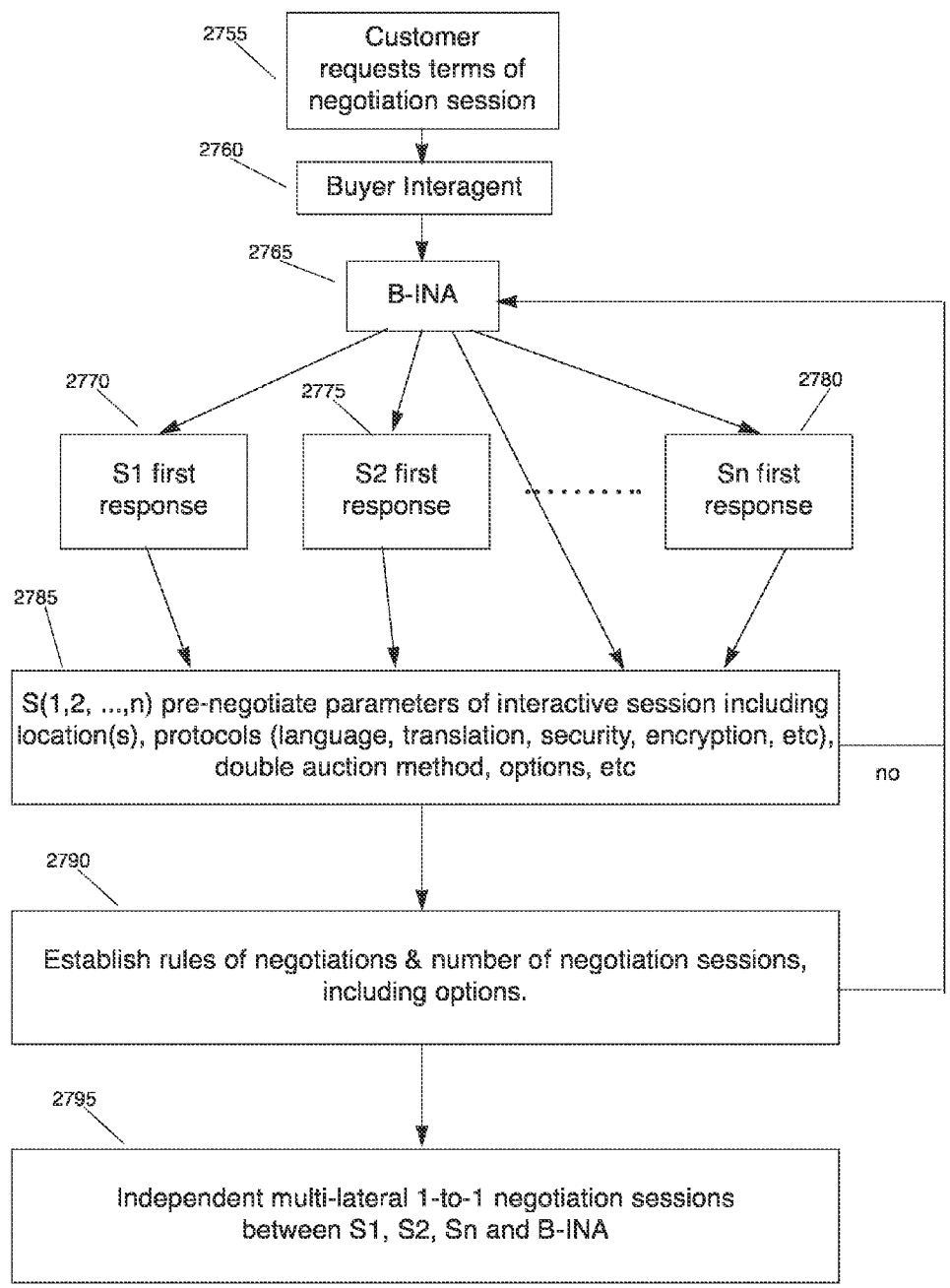

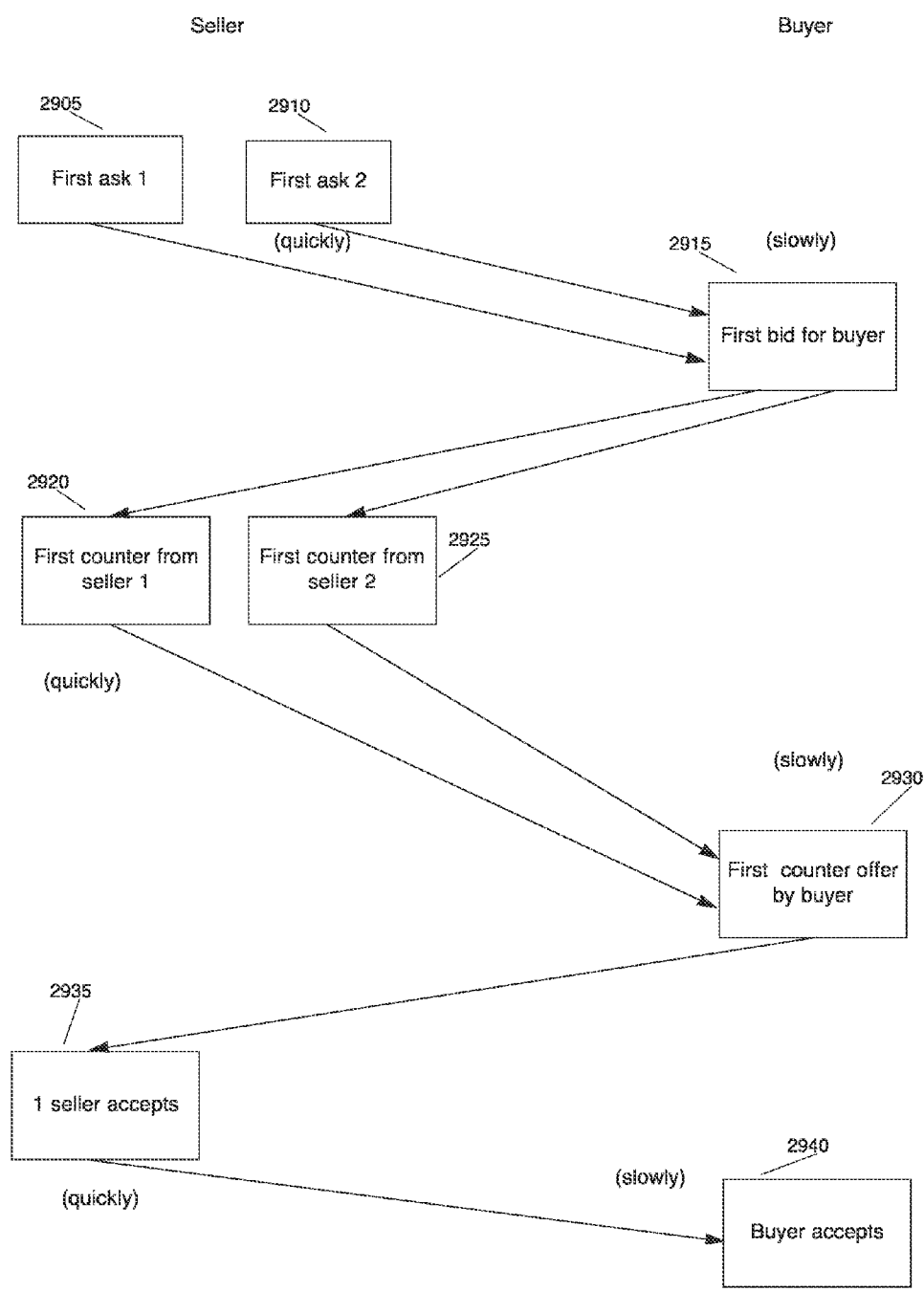
Fig. 28: Time-Based Negotiation Strategy Concealment

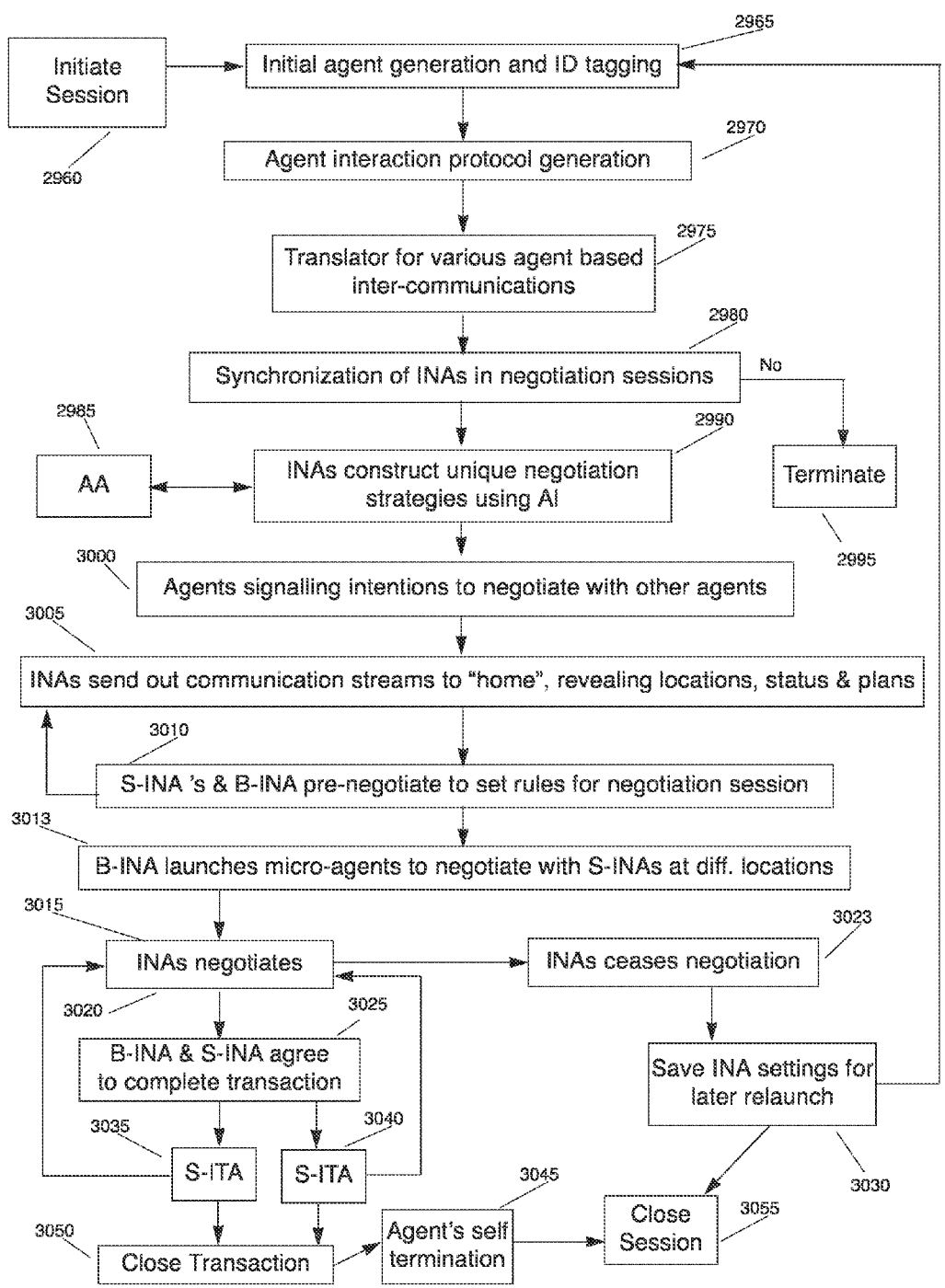
Fig. 29: INA Logistics

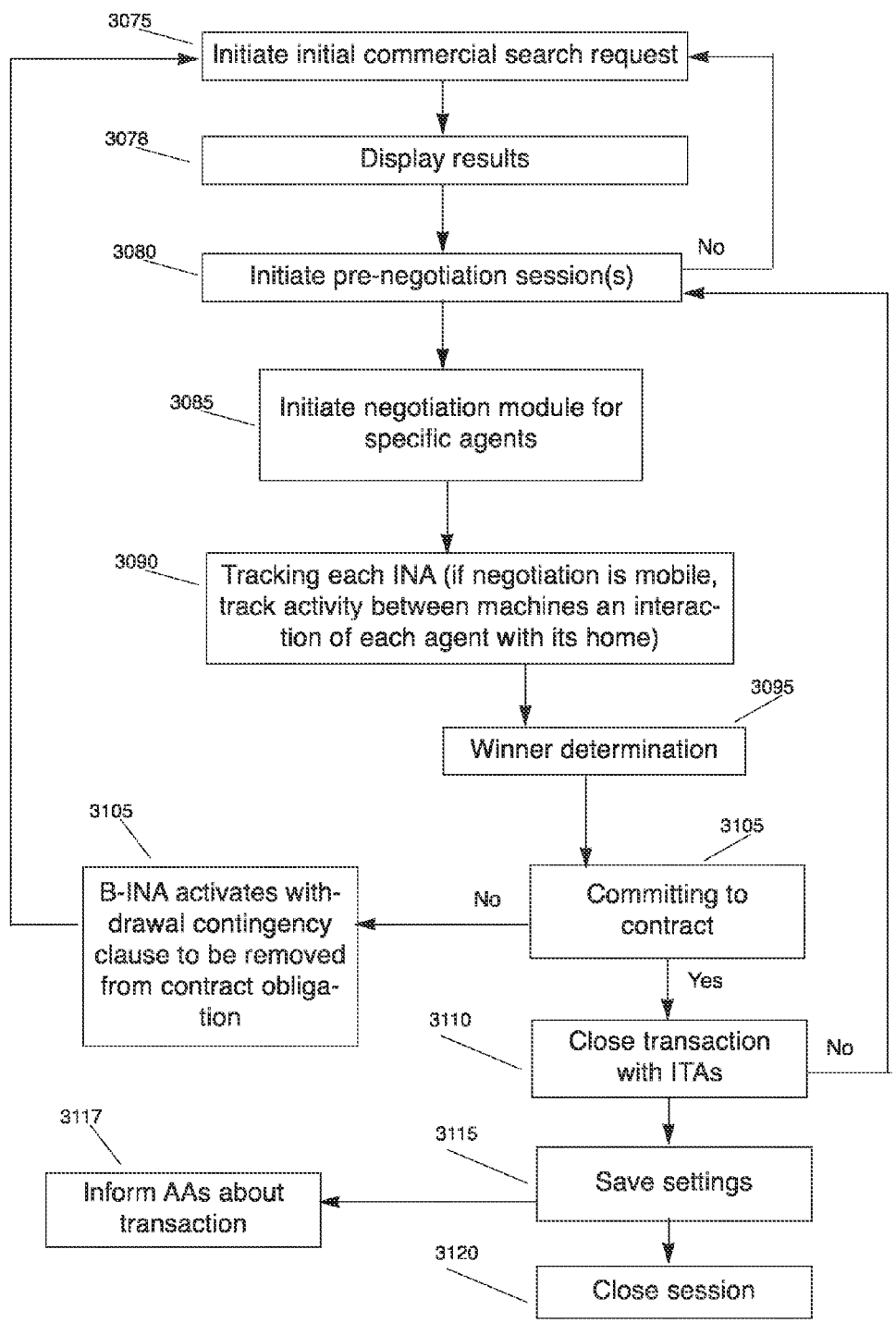

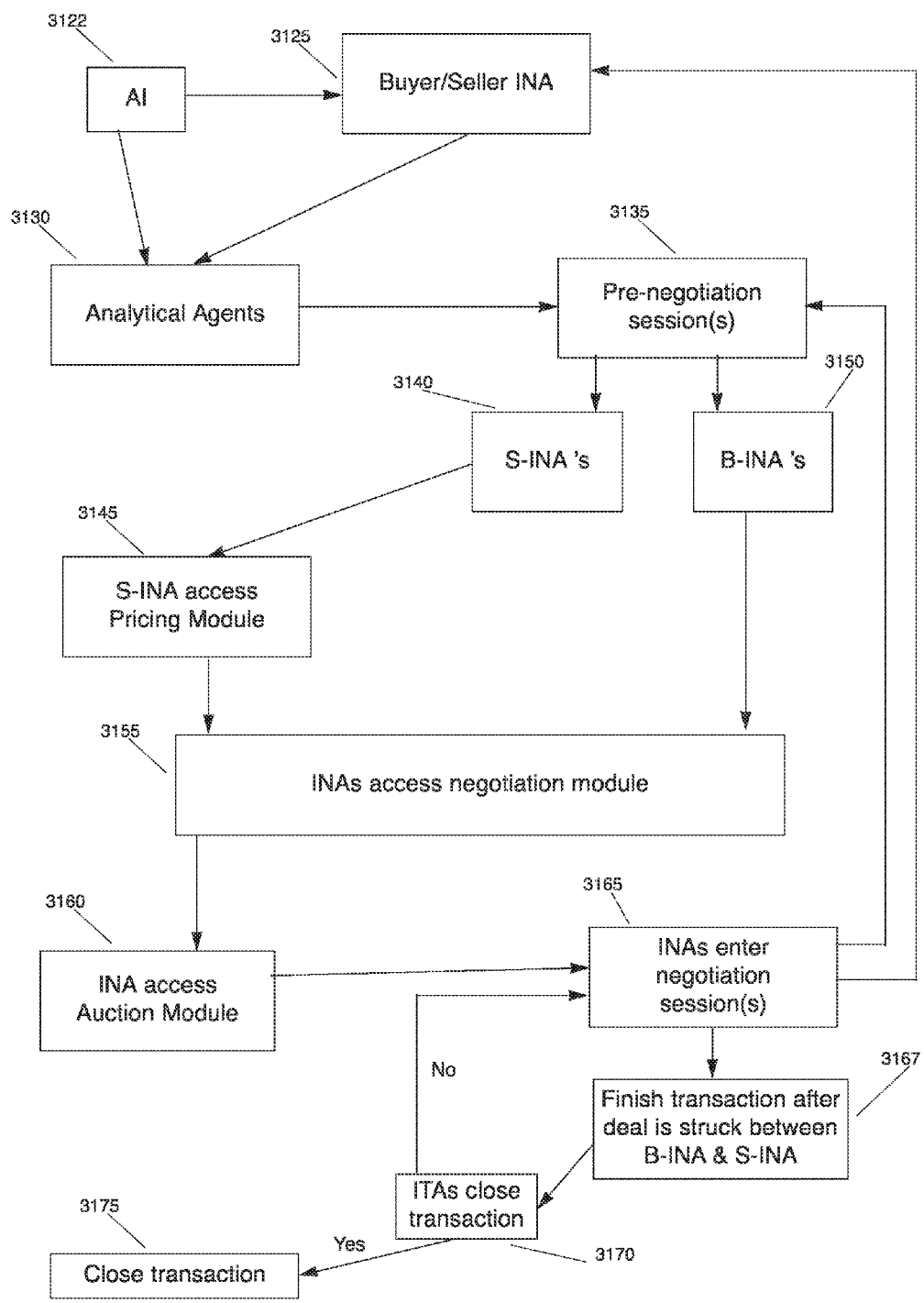
Fig. 31: INA Interaction Sequence #2

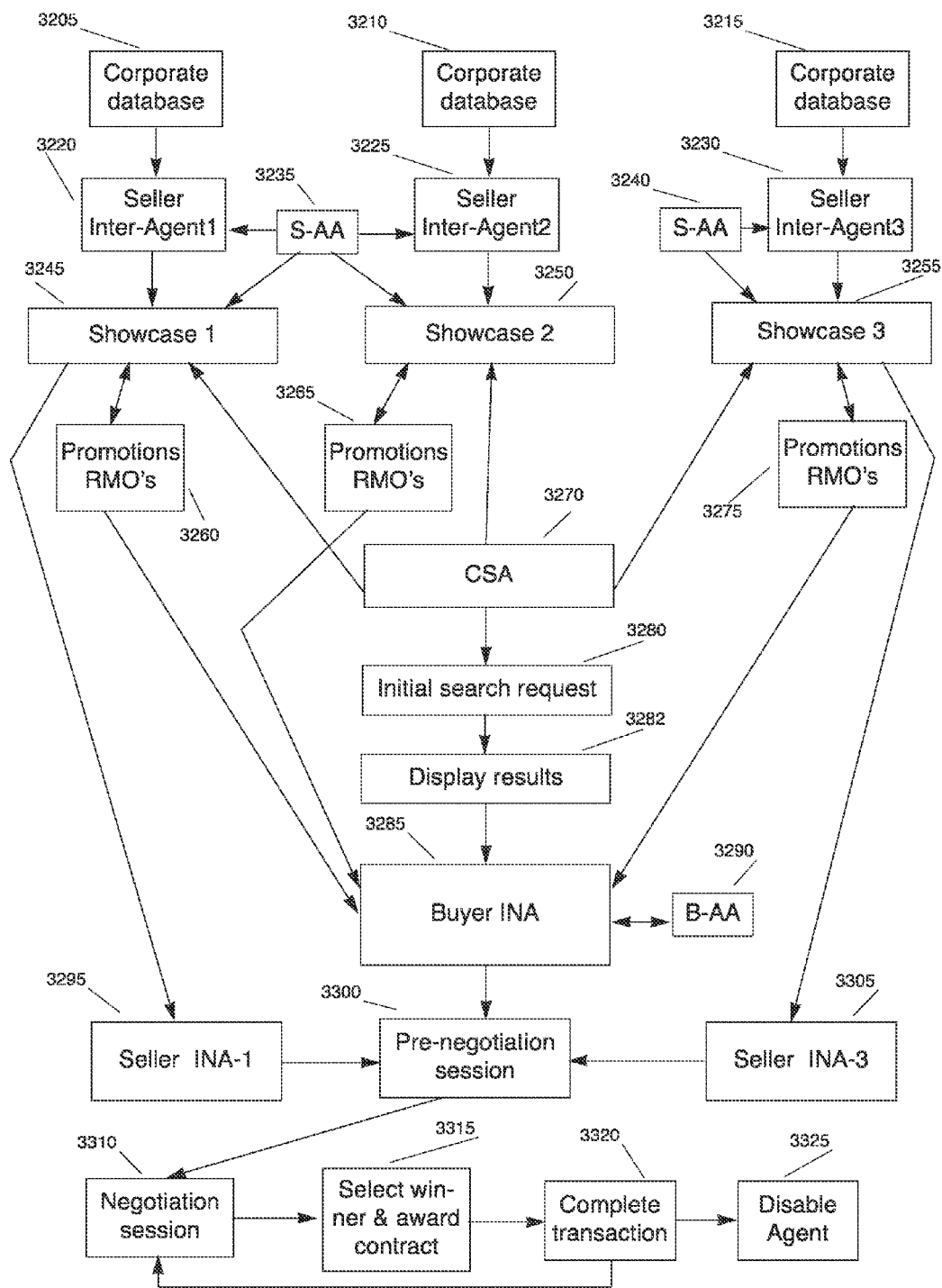
Fig. 32: INA Architecture 1 (First part interactions)

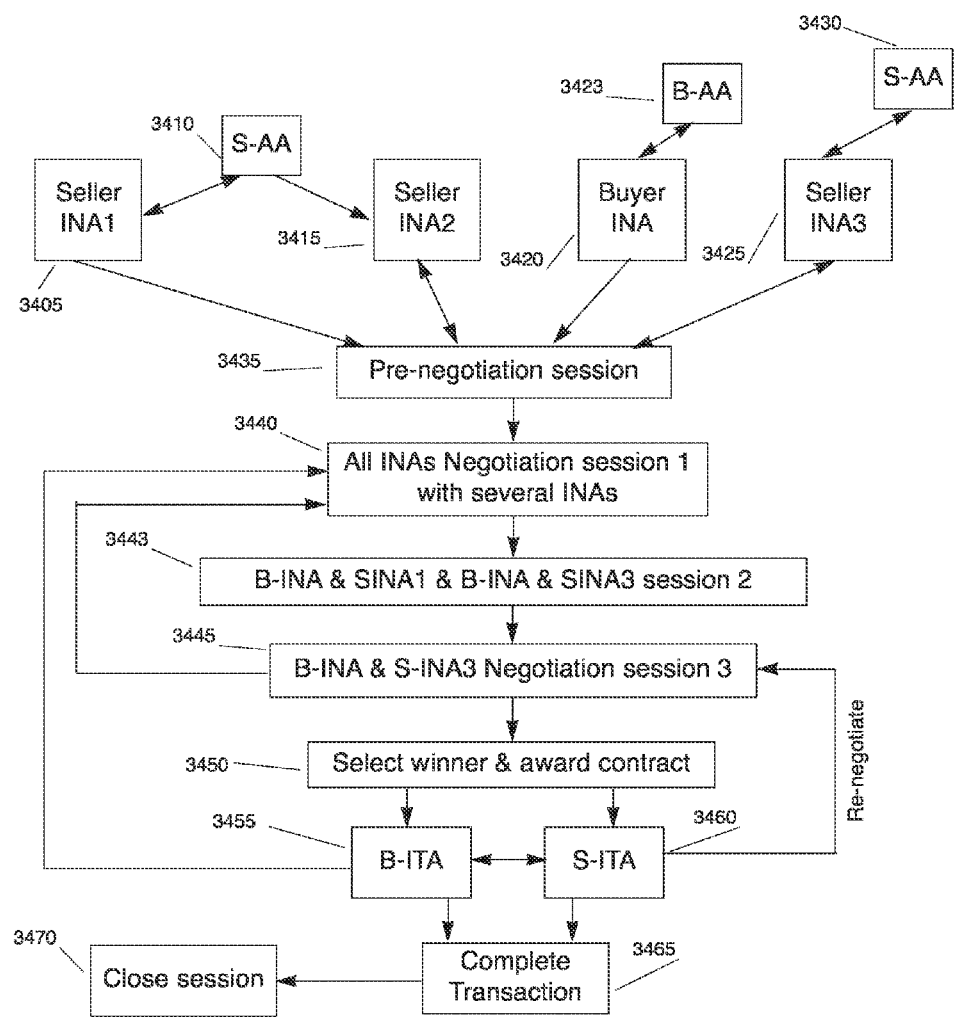
Fig. 33: INA Architecture 2 (Negotiation interactions)

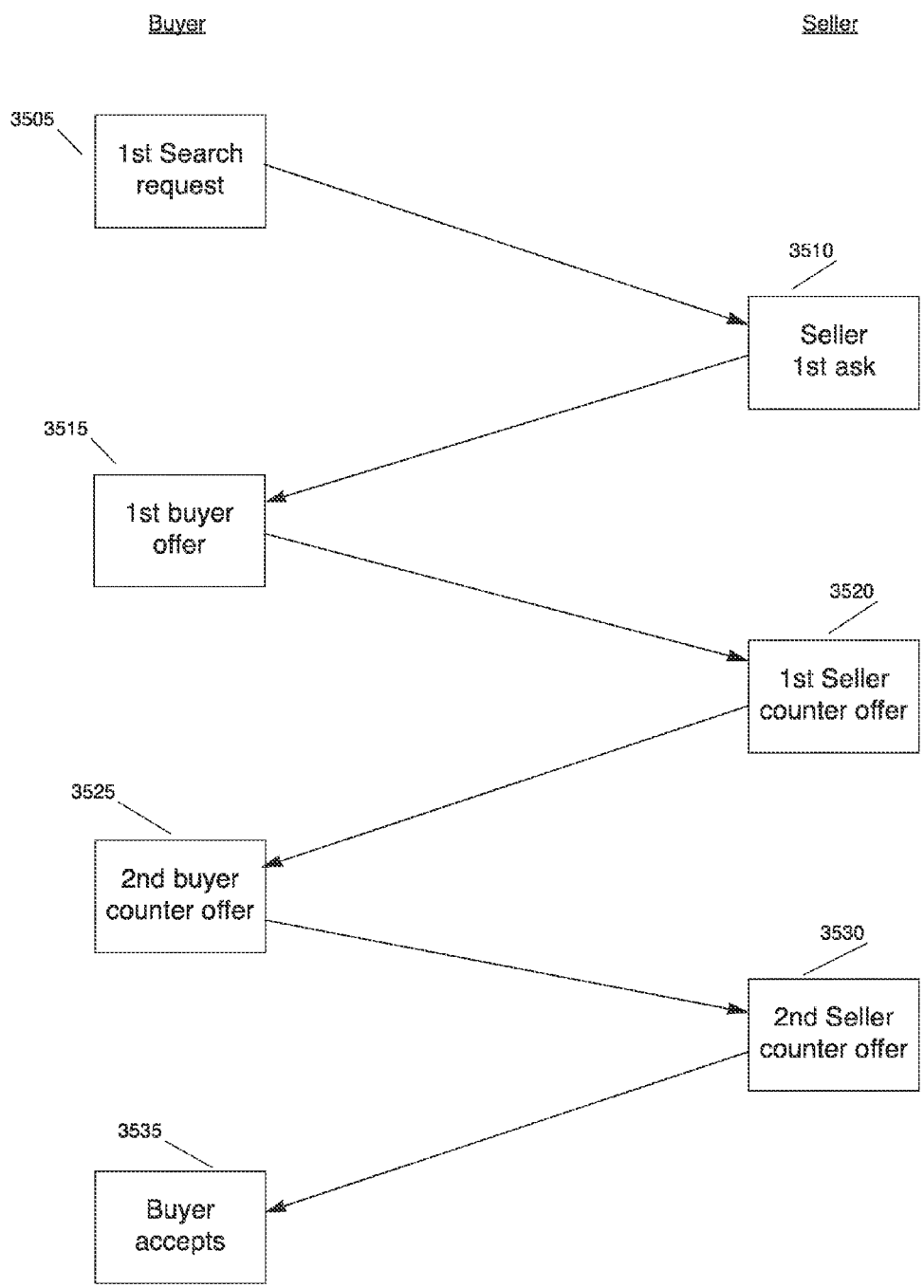
Fig. 34: INANegotiation Time Based Sequences

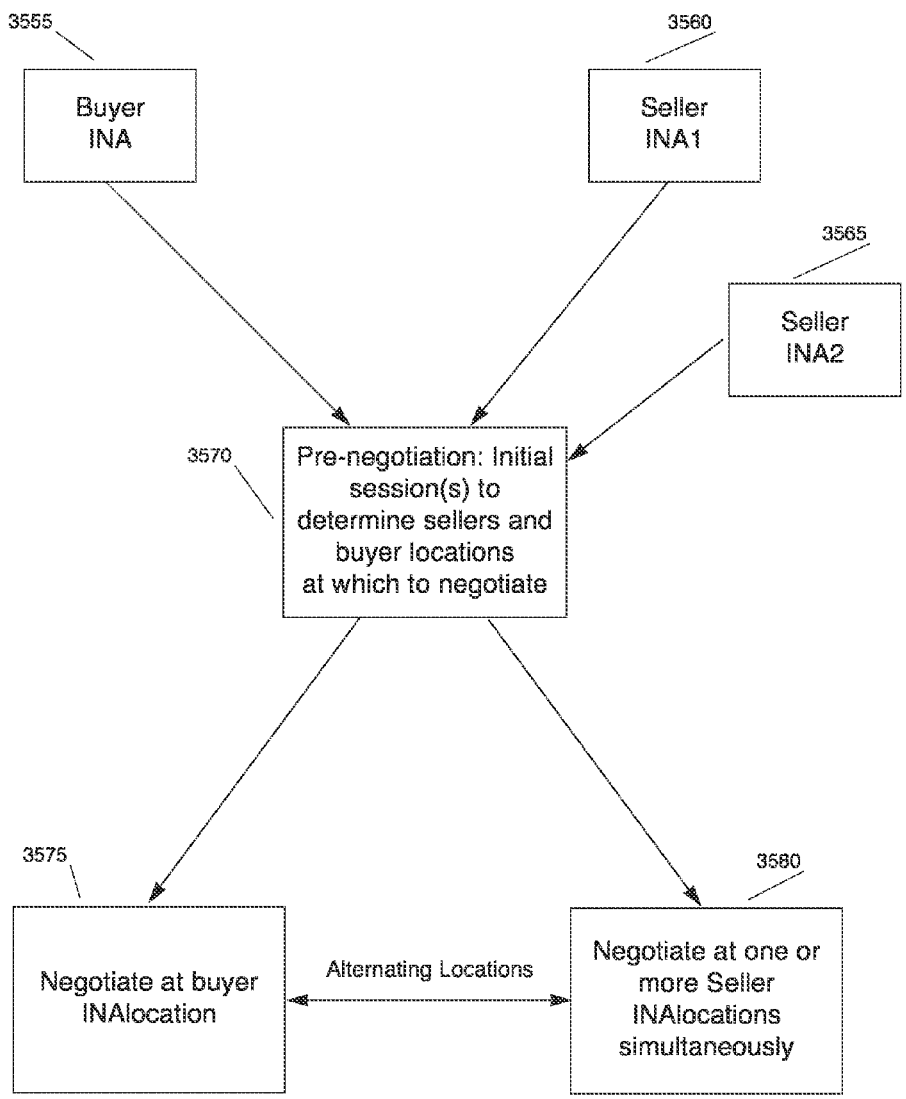
Fig. 35: Initial INA Mobile Location Protocol Settlement

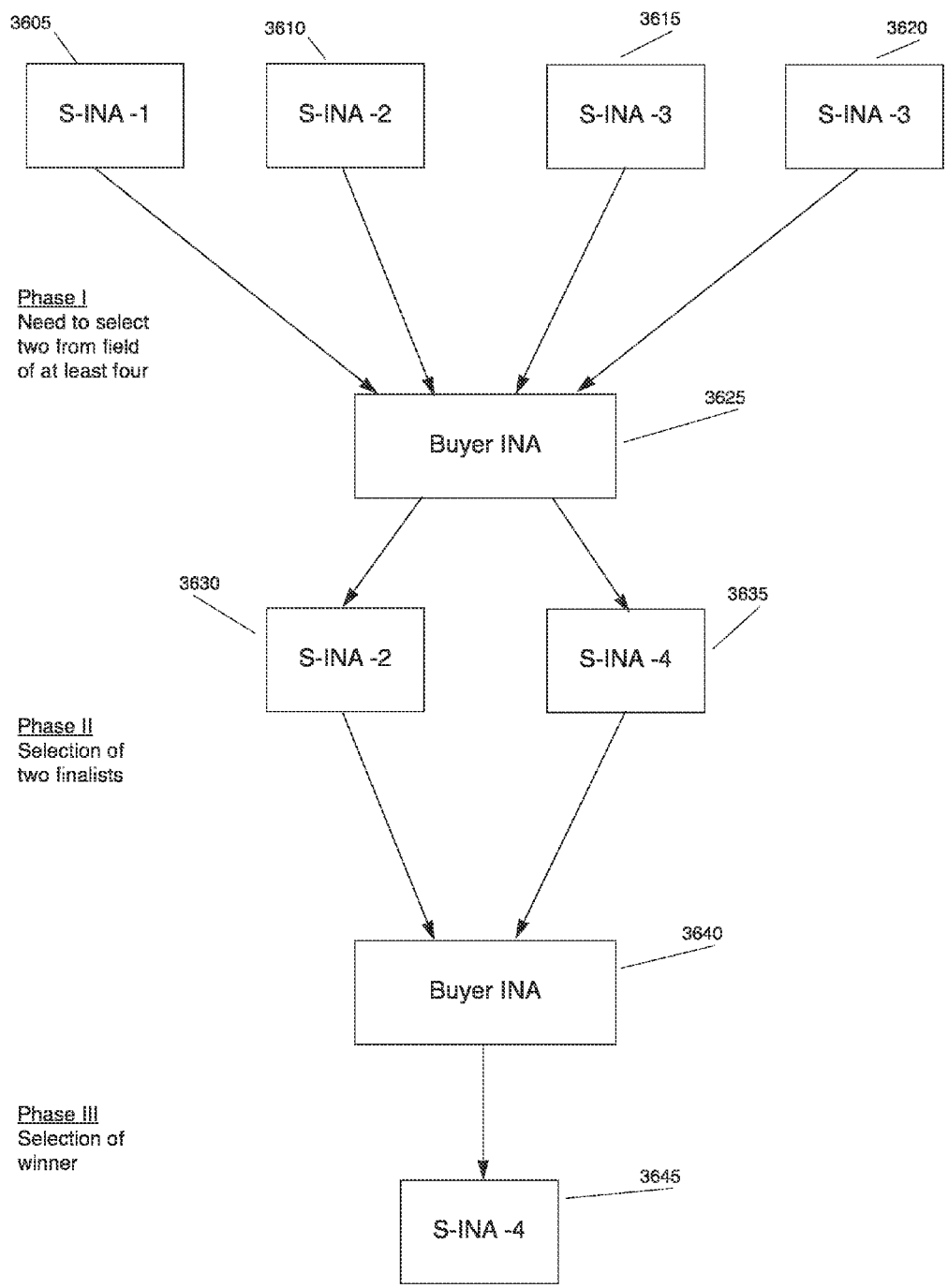

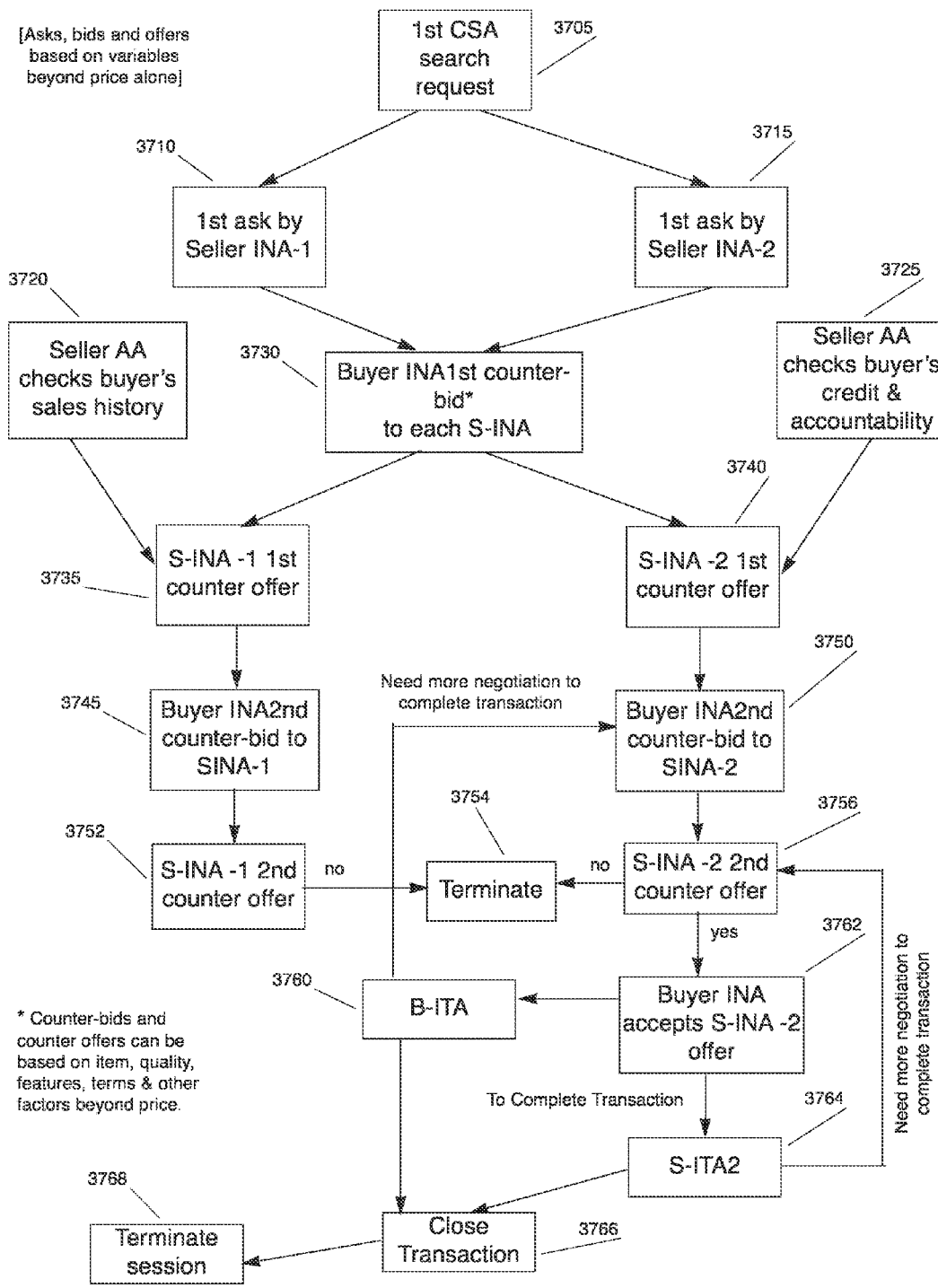

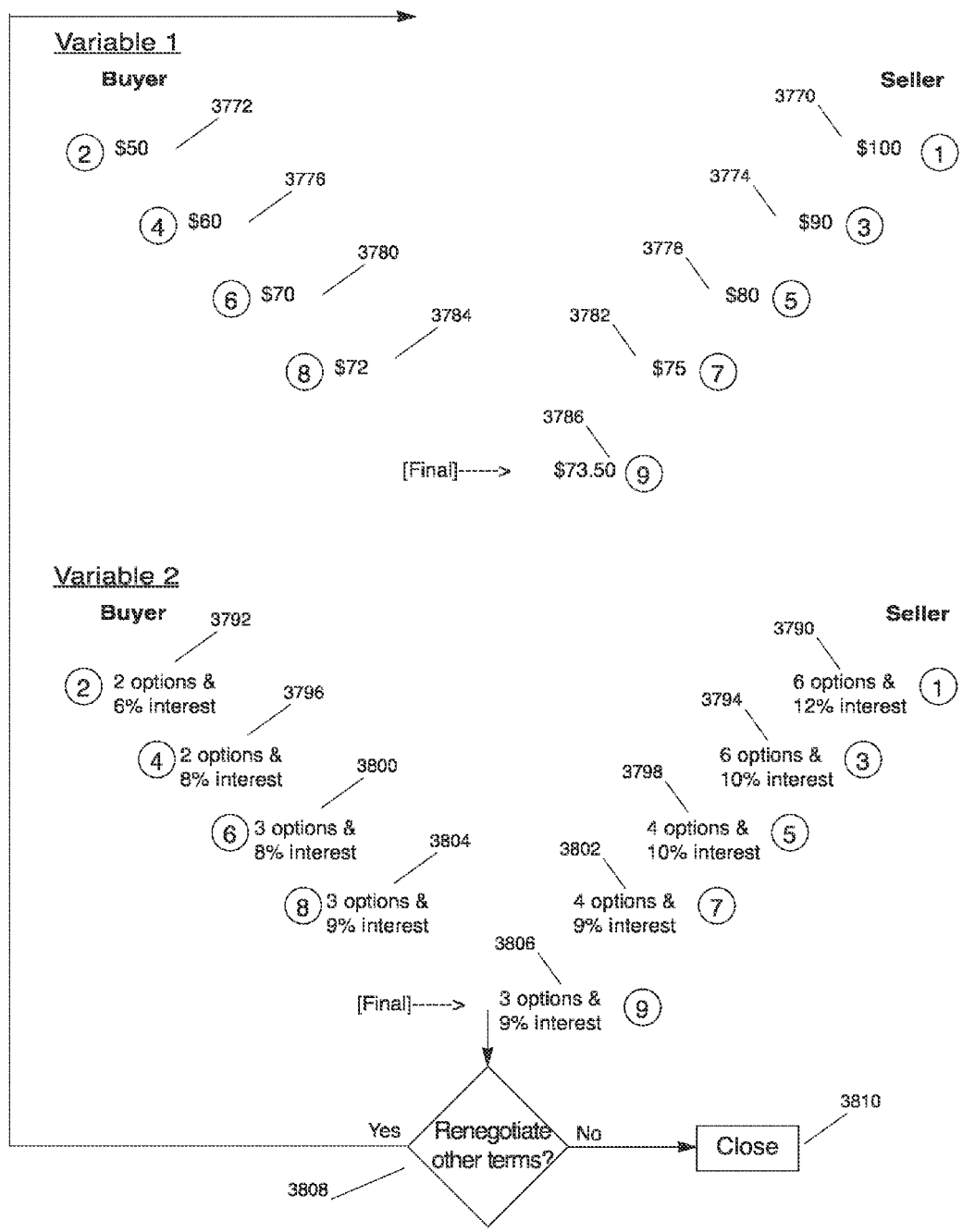
Fig. 38: Demand-Initiated Automated Negotiation Sequence Compromise Process Within Pre-established Parameters between One Buyer & One Seller

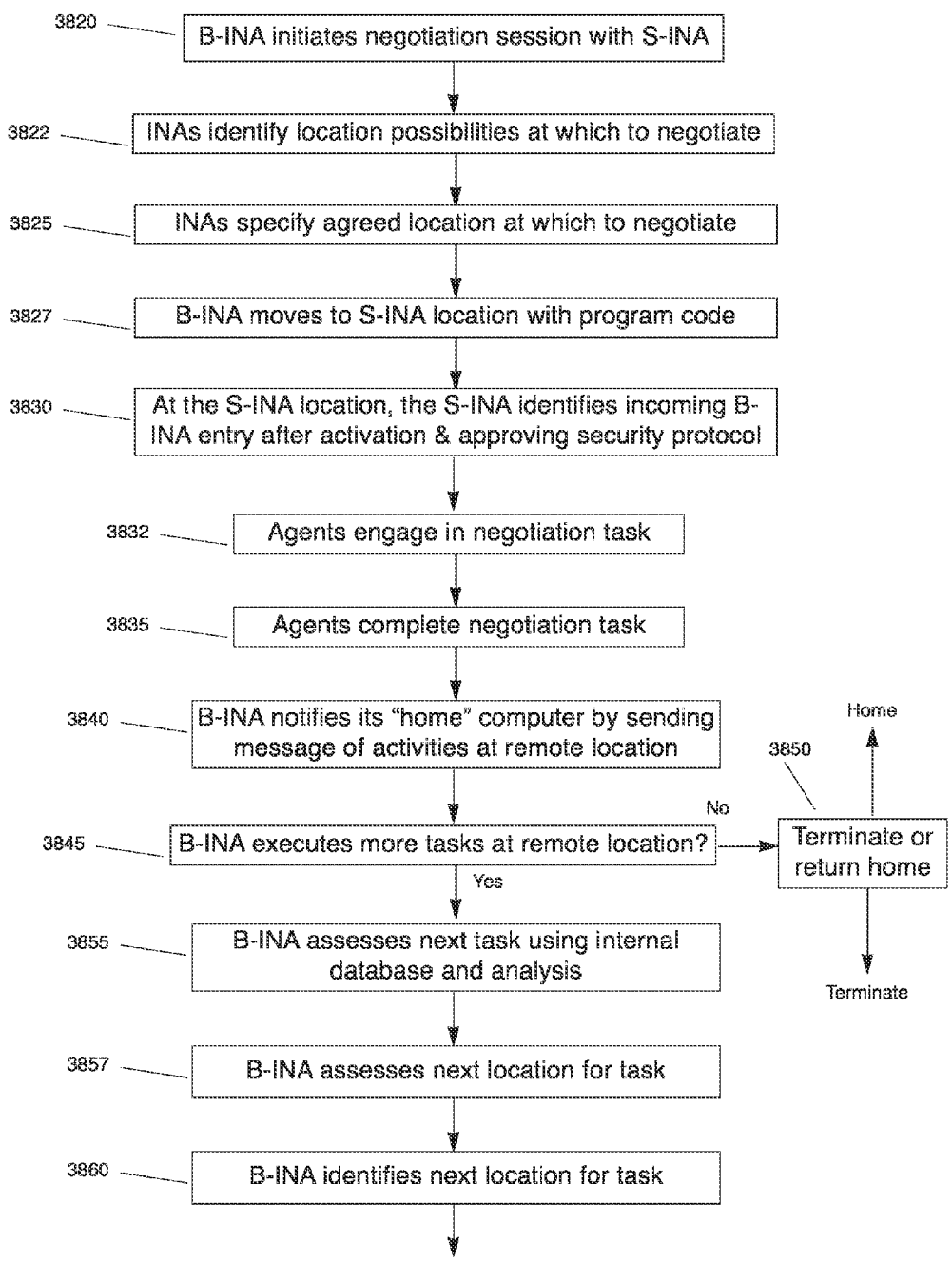
Fig. 39A: Negotiation in a Distributed System with Mobility

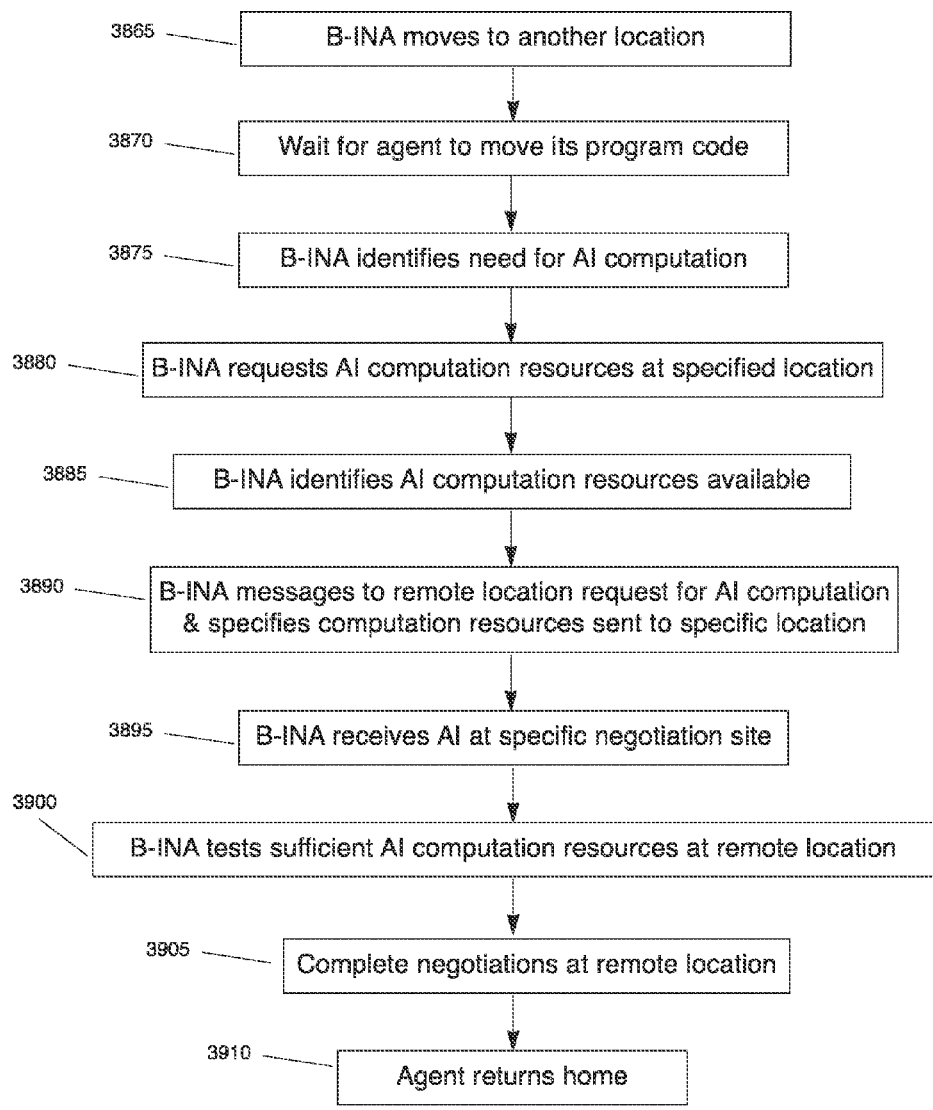
Fig. 39B: Negotiation in a Distributed System with Mobility (Continued)

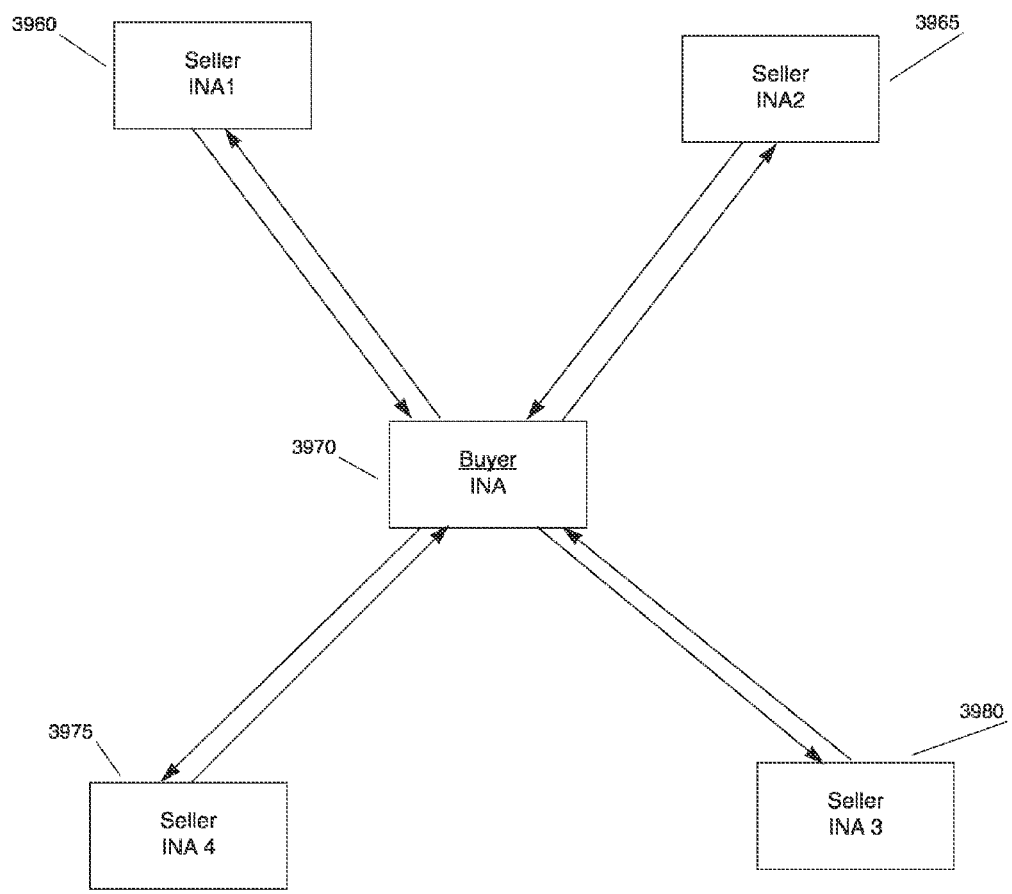
Fig. 40: Multi-lateral Distributed Competition (Competitive Double Shout Negotiation)

Fig. 41: Negotiation Module: Negotiation Method Schema

1 to 1 Interactive Negotiations

| Kinds Of Goals | Cooperative Goals (Zero-Sum Game) | Competitive Goals (Zero-Sum Game) |
|---|---|---|
| Short Term goal (price - maximization) -vs- Long-term goal (relationship management) | 1) Exchange-based approach: Trade-off of terms/variables between parties<br>a) matching of interests: ascertain mutual interest with overlapping sets...<br>b) prioirtizations of preferences: hierarchy of similar priorities | 1) dialectical approach: give & take of opponents until resolution<br>a) [position description & justification] explanation based: each position advances and develops<br>b) [Interrogation] argumentation: critique of opponent's position*<br>c) [Ascertain mutual self-interest] Assessing overlapping interests<br>d) Selecting common sets |
| Constraining Factors | 2) Problem-solving approach: parties seek a common solution<br>a) assessing common interests among different positions<br>b) compromise of positions to a common set shared by parties | *Anticipate opponent's strategy |
| 1) Time constrained: multi-sessions as instrumental changes | | Non-Zero-Sum Game |
| 2) Information constrained: less than optimum information | | 1) deterrence approach: behaving so that competitors do not get without higher cost<br>a) bidding aggressively and/or deceptively and then withdrawing |
| 3) Choice Constrained: Limiting of options | Buyer-Initiated | Seller initiated |
| Terms | [Negotiation as adjustment of seller parameters]<br>a) buyer query as initiation<br>b) priority of best and then second best, and then third best, etc... | [Negotiation as disagreement with initial seller promotions]<br>a) promotions or 1st seller bid (result of search query) as 1st point of departure |
| 1) Item terms<br>2) Transaction terms | | |

Multiple Parallel Interactive Negotiations

| One to several | Several to several |
|---|---|
| a) Stopping negotiation when one winner is selected | Single Item: Stopping negotiation when one buyer & 1 seller is selected<br>Multiple items: a) Stopping negotiation when mutual agreement of multiple parties |

Fig. 42: INA Auction Module-Auction Types

| Auction Types | |
|---|---|
| English (Increasing) | Dutch (Decreasing) |
| Vickrey (second highest bid) | "combinatorial" multiple-item auctions (package deals) |
| Combinations of auction types | Double-shout |

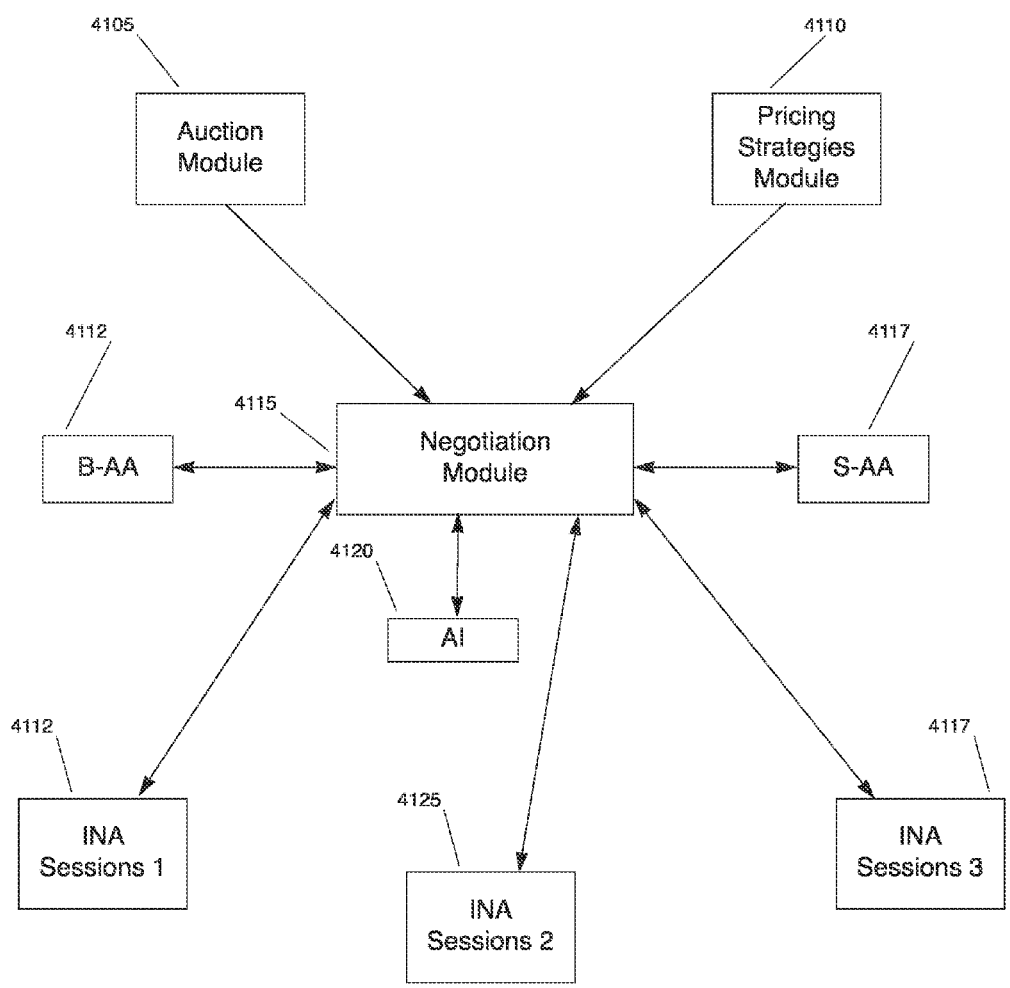
Fig. 43: Negotiation, Pricing & Auction Module Interactions

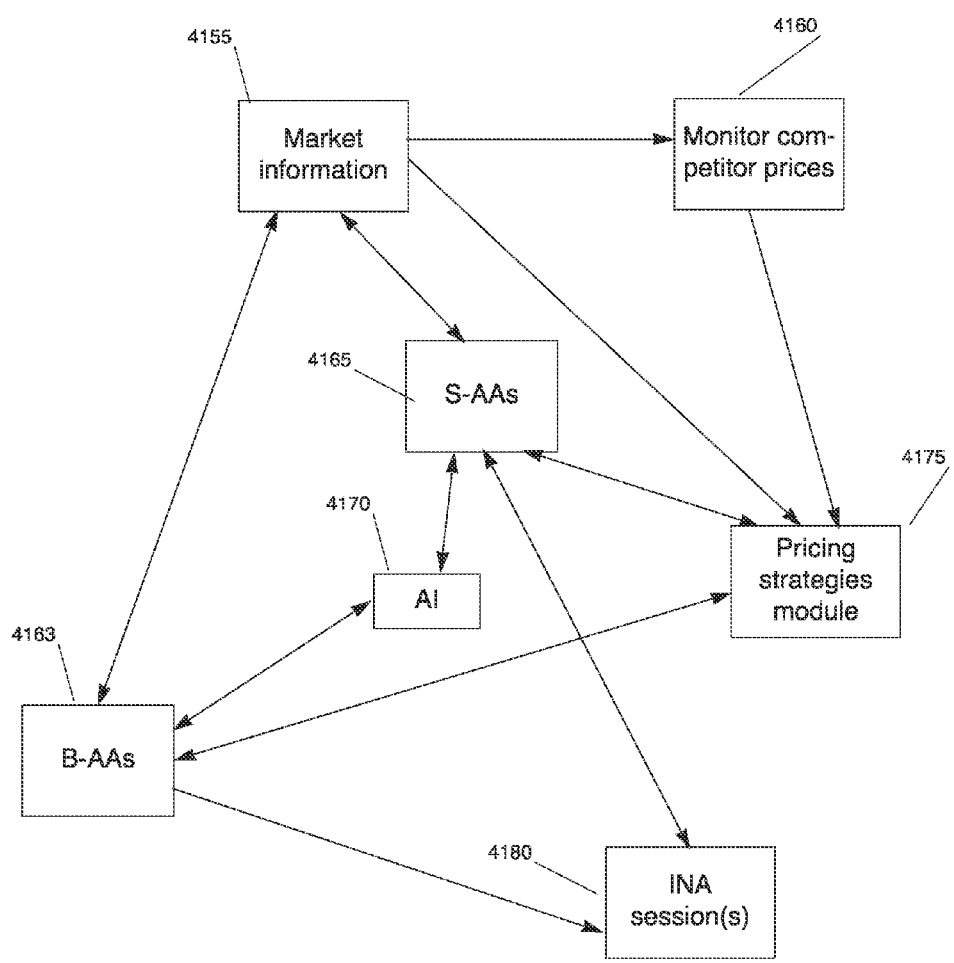
Fig. 44: Pricing Strategies Module and AA Interactions

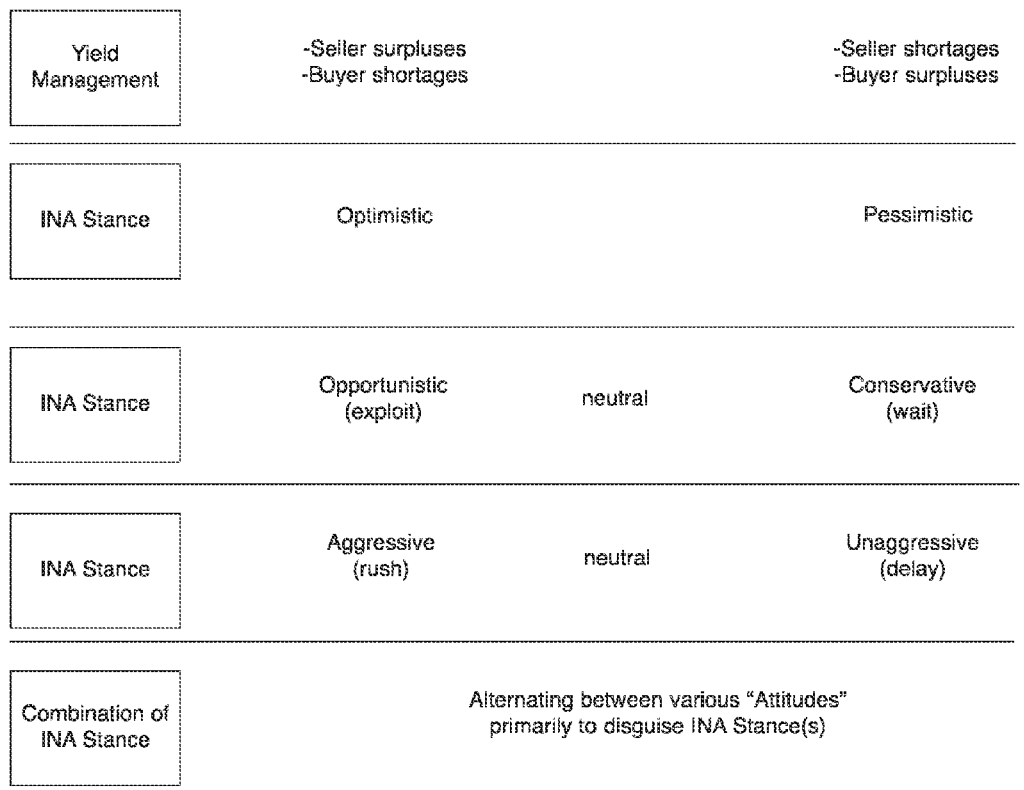
Fig. 45: Interaction Dynamics of INA "Personalities"

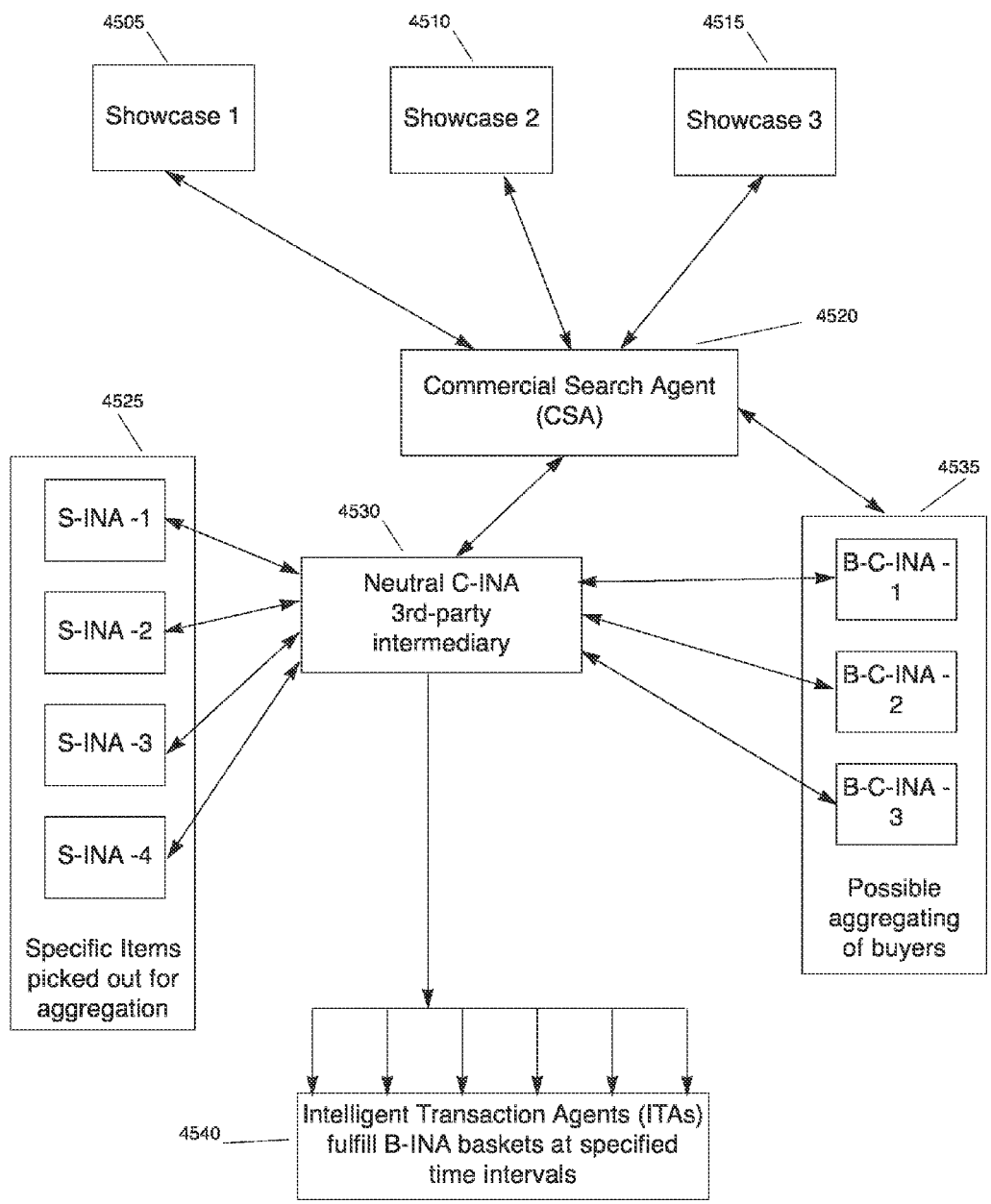

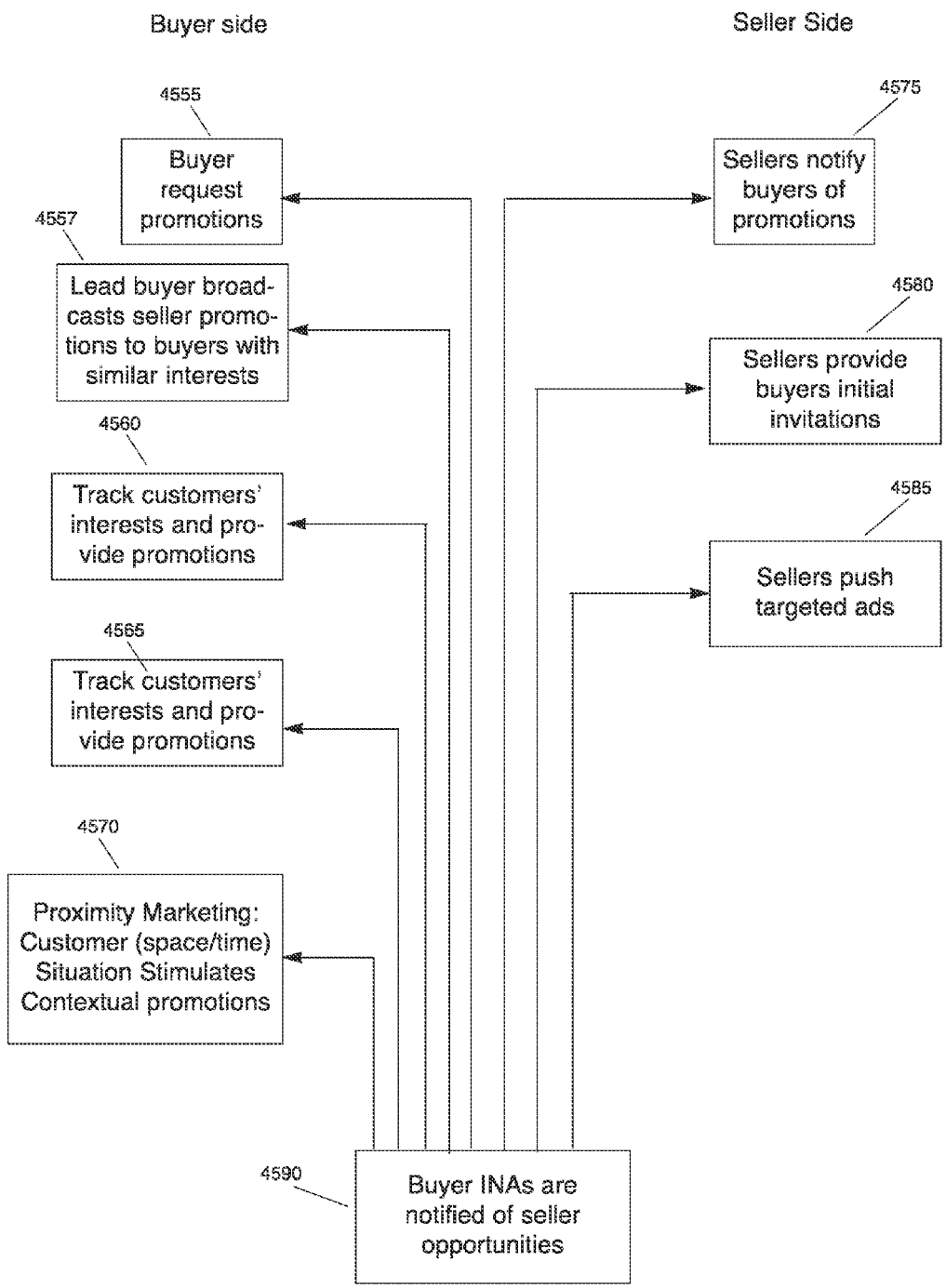

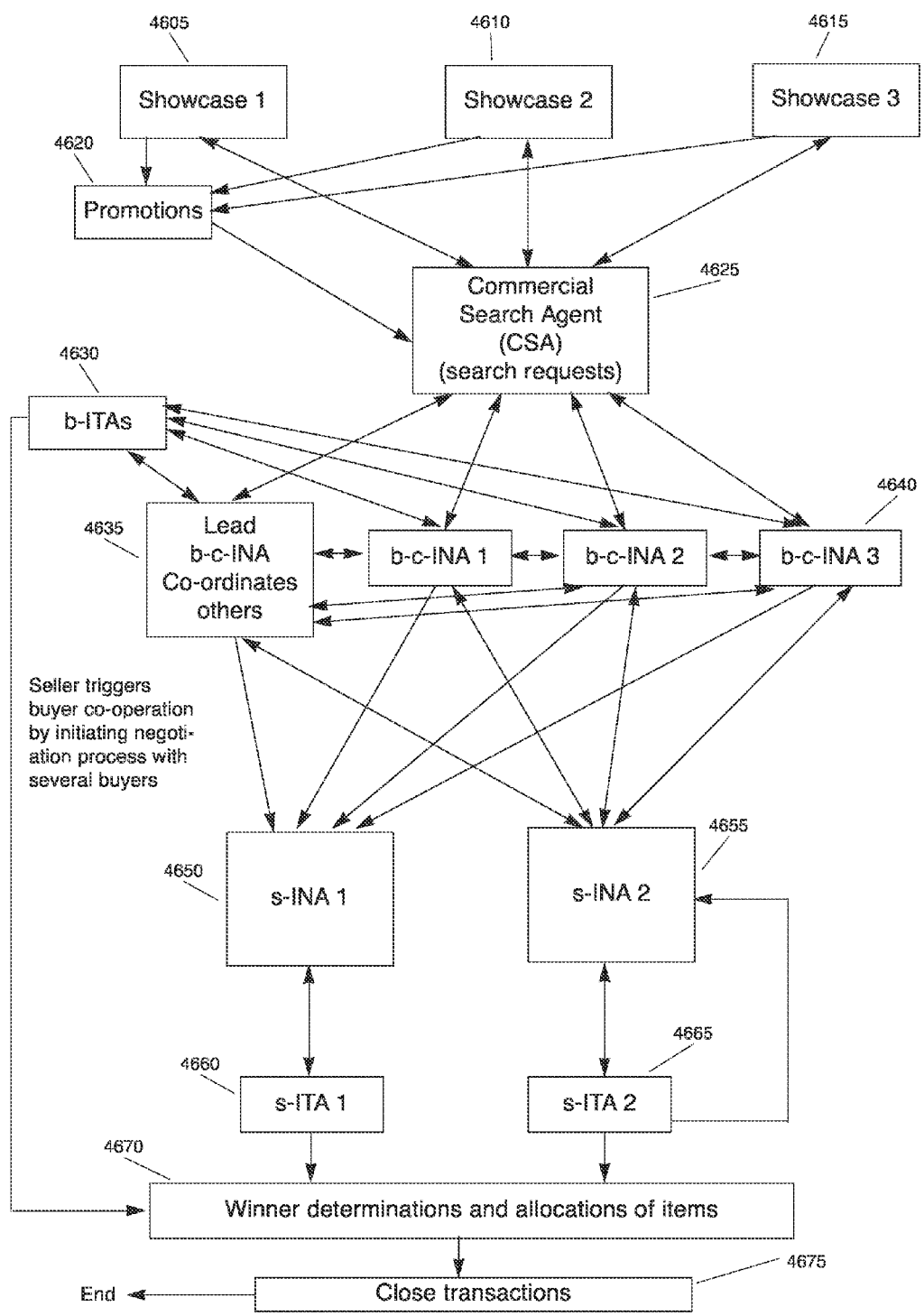

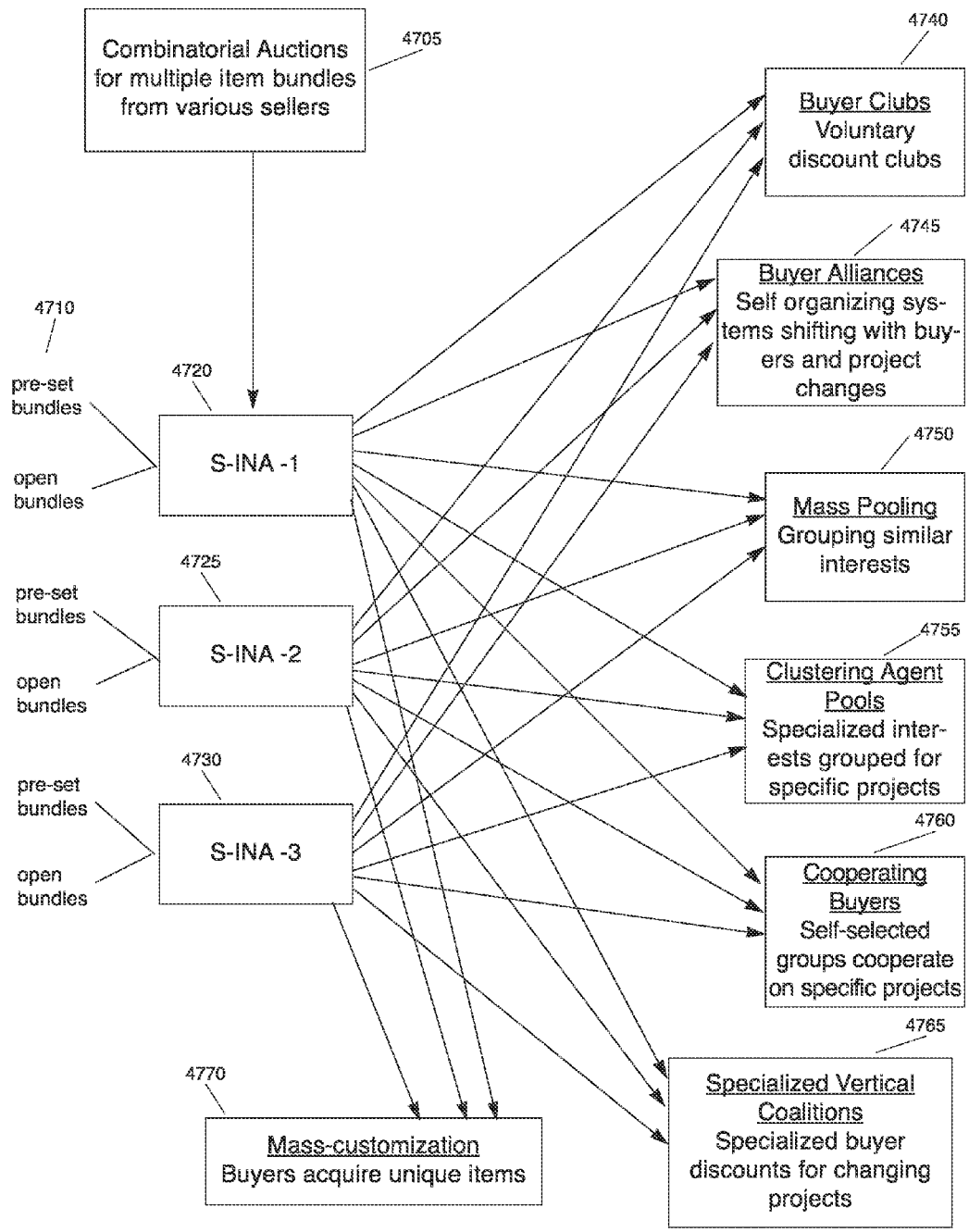
Fig. 49: Automated Aggregation Category Structures

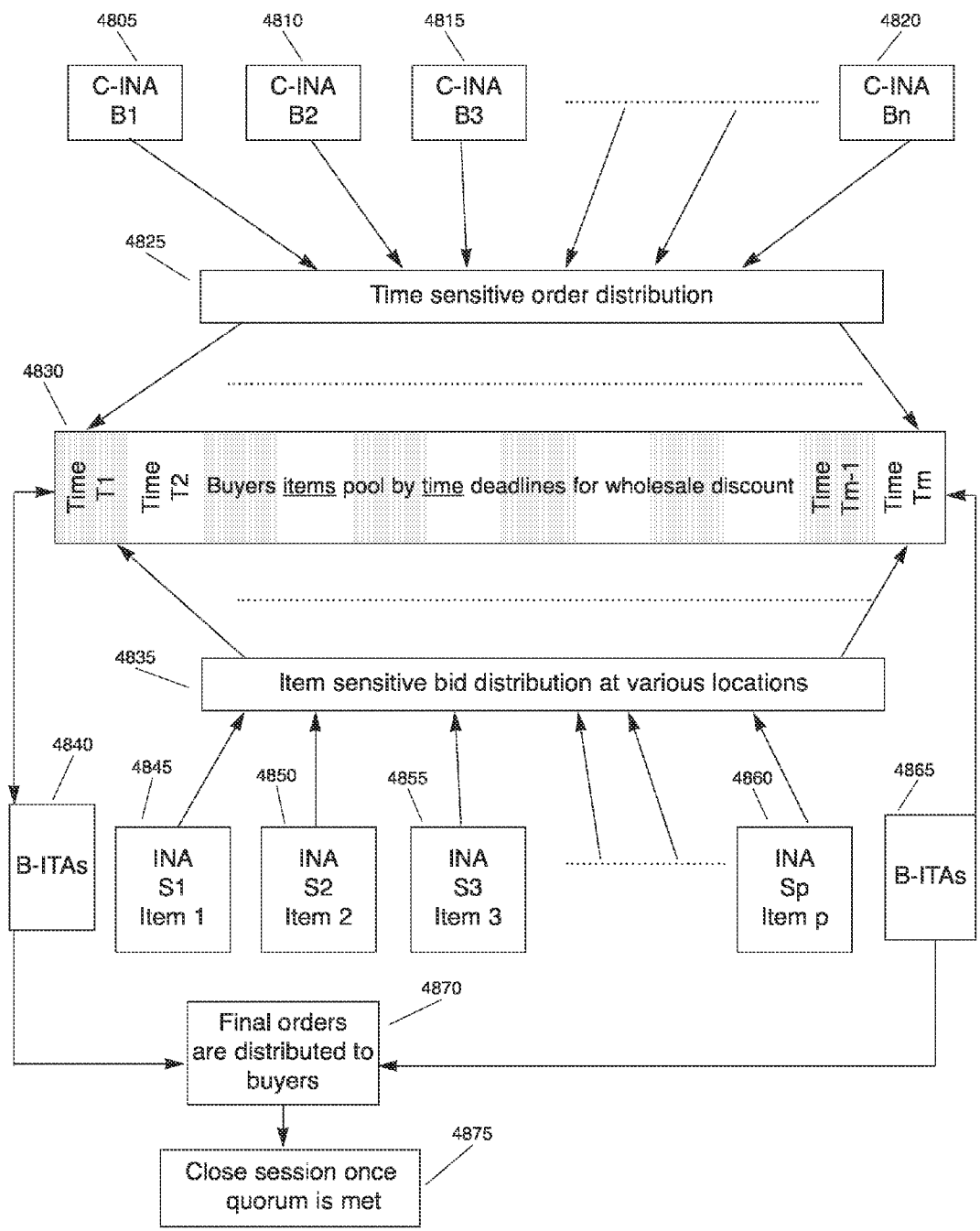

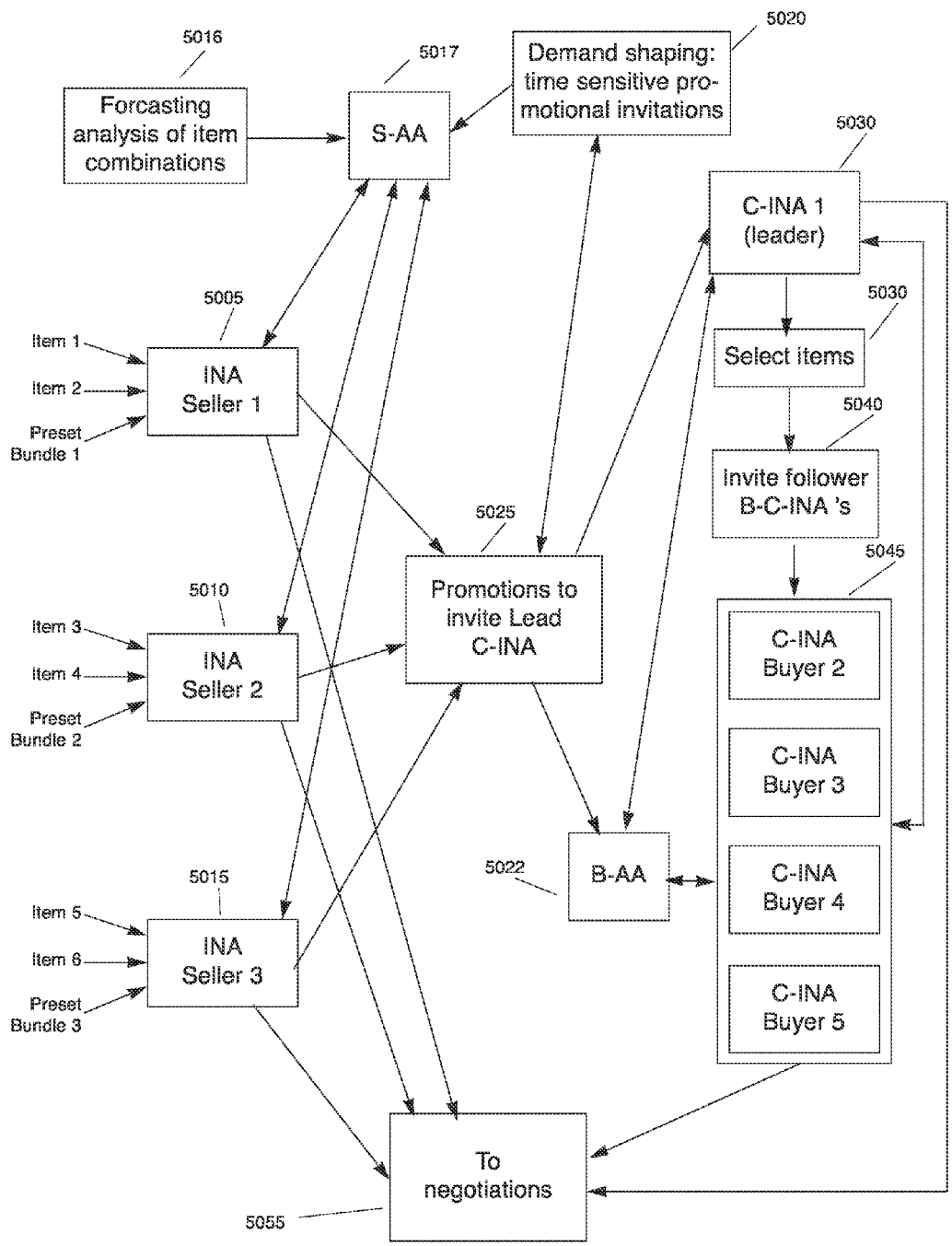
Fig. 51: Aggregation II–Disintermediated Aggregation Method Prior To Negotiation

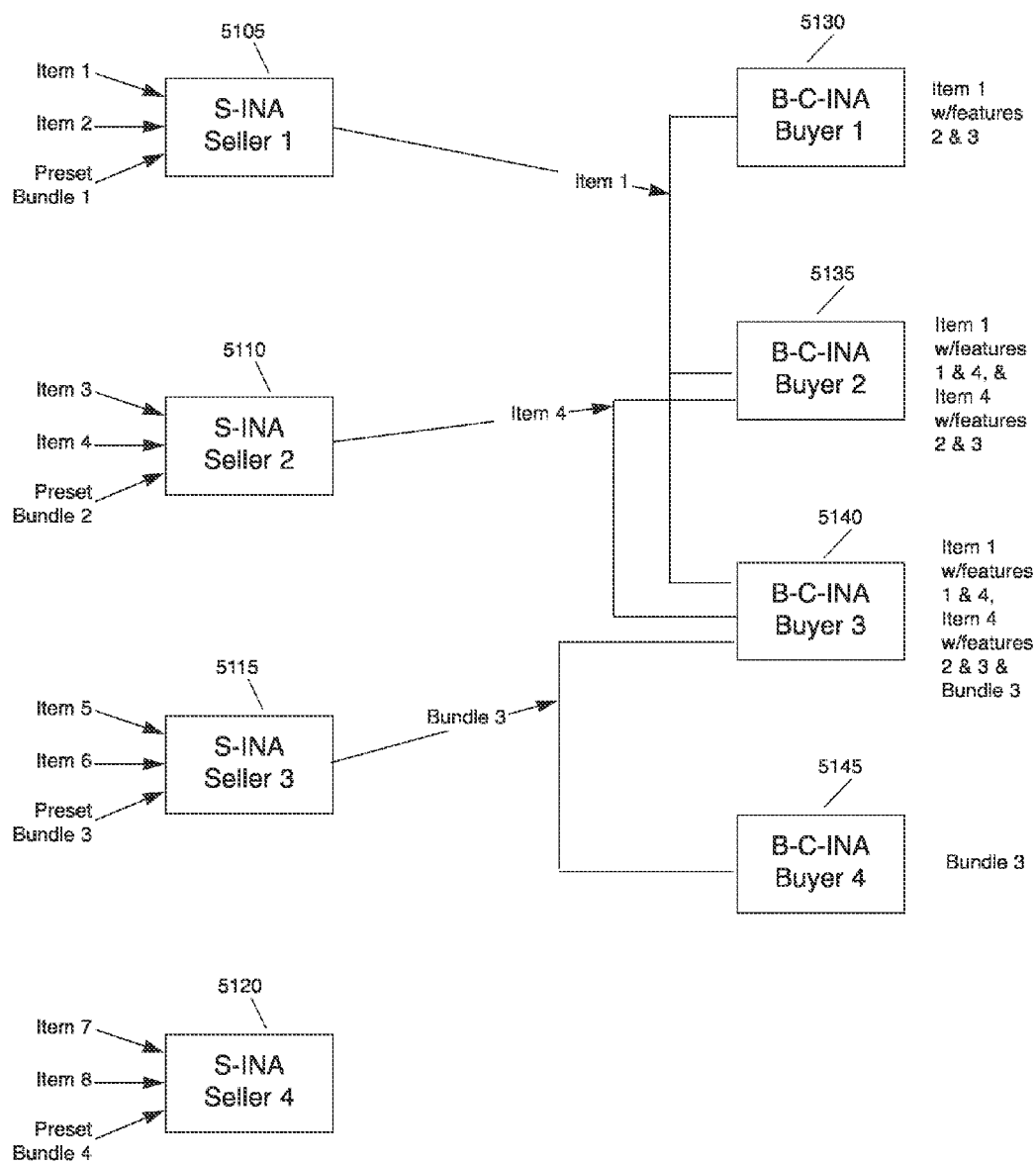
Fig. 52: Aggregation III – Disintermediated Mass Customization

Fig. 53: Dynamic D-INA's Double-agents: Arbitrage Applications
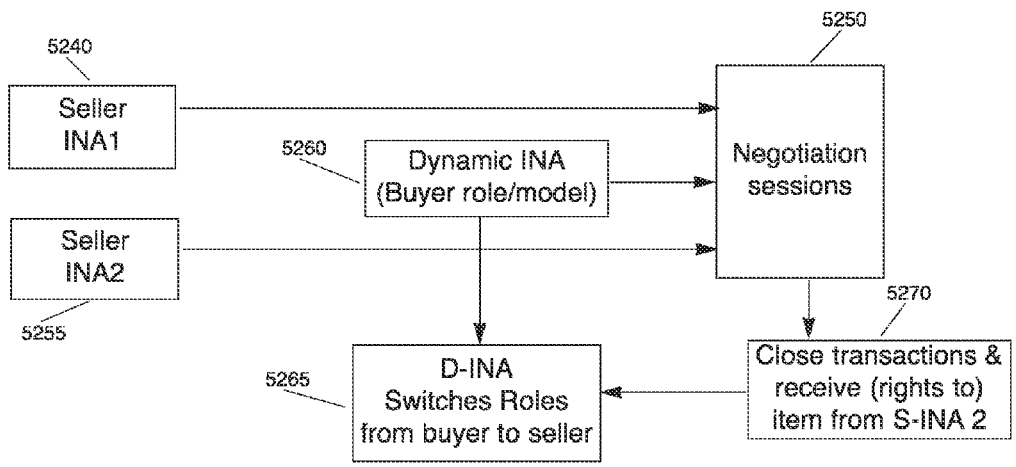
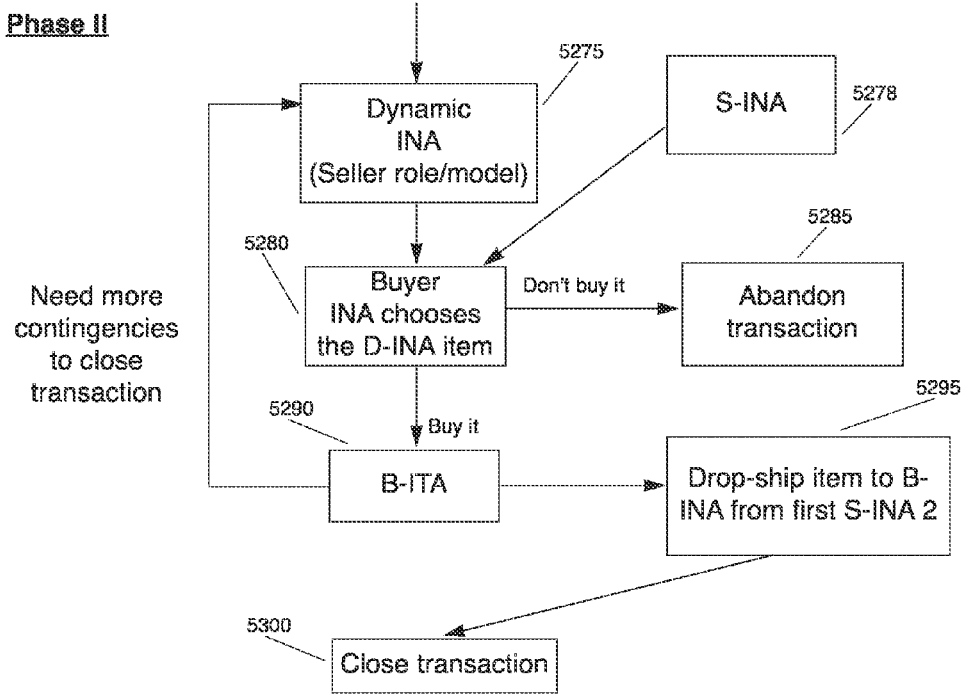

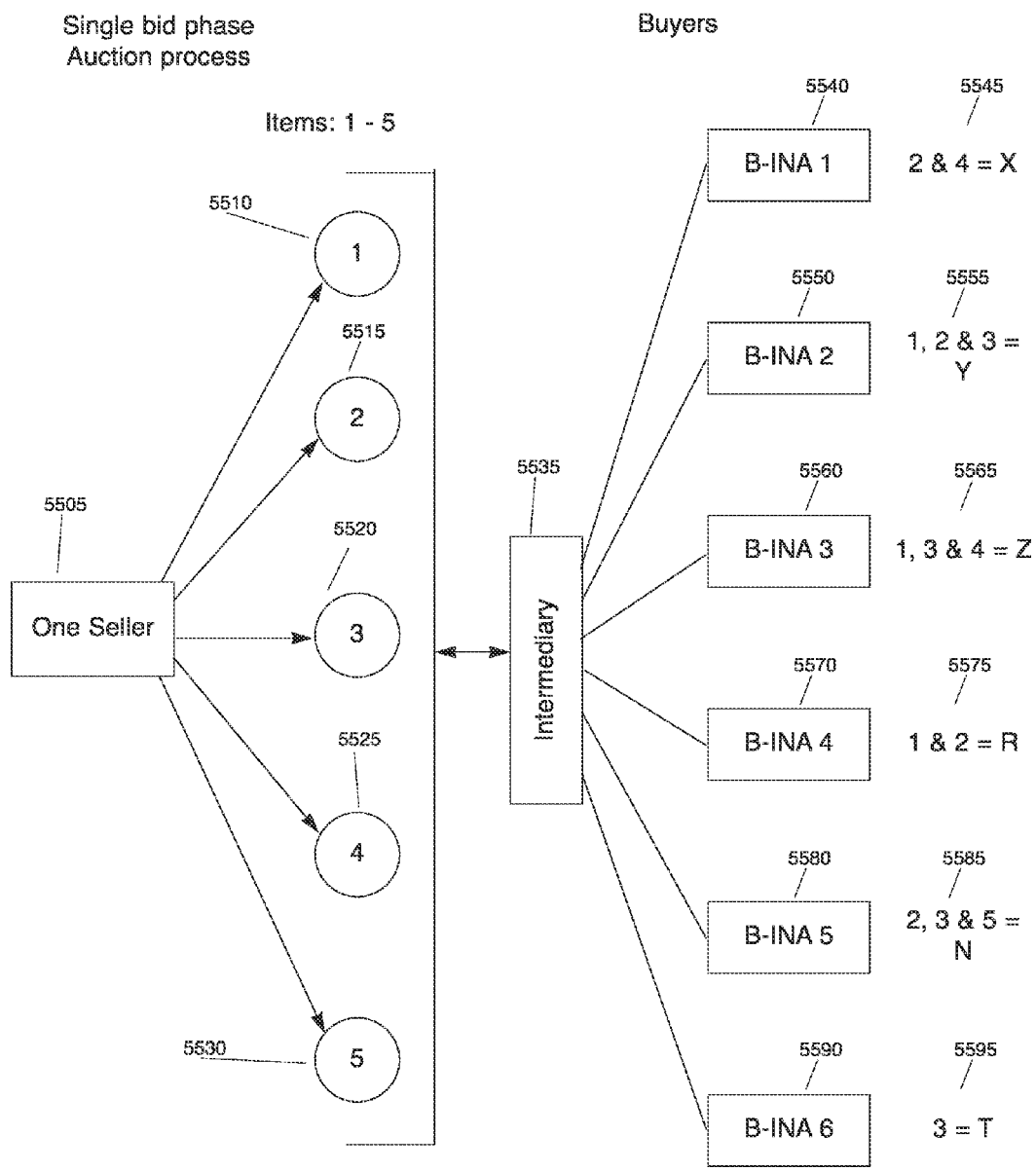
Fig. 54: Traditional Combinatorial Auction with Intermediary: Between Single Seller and Multiple Buyers

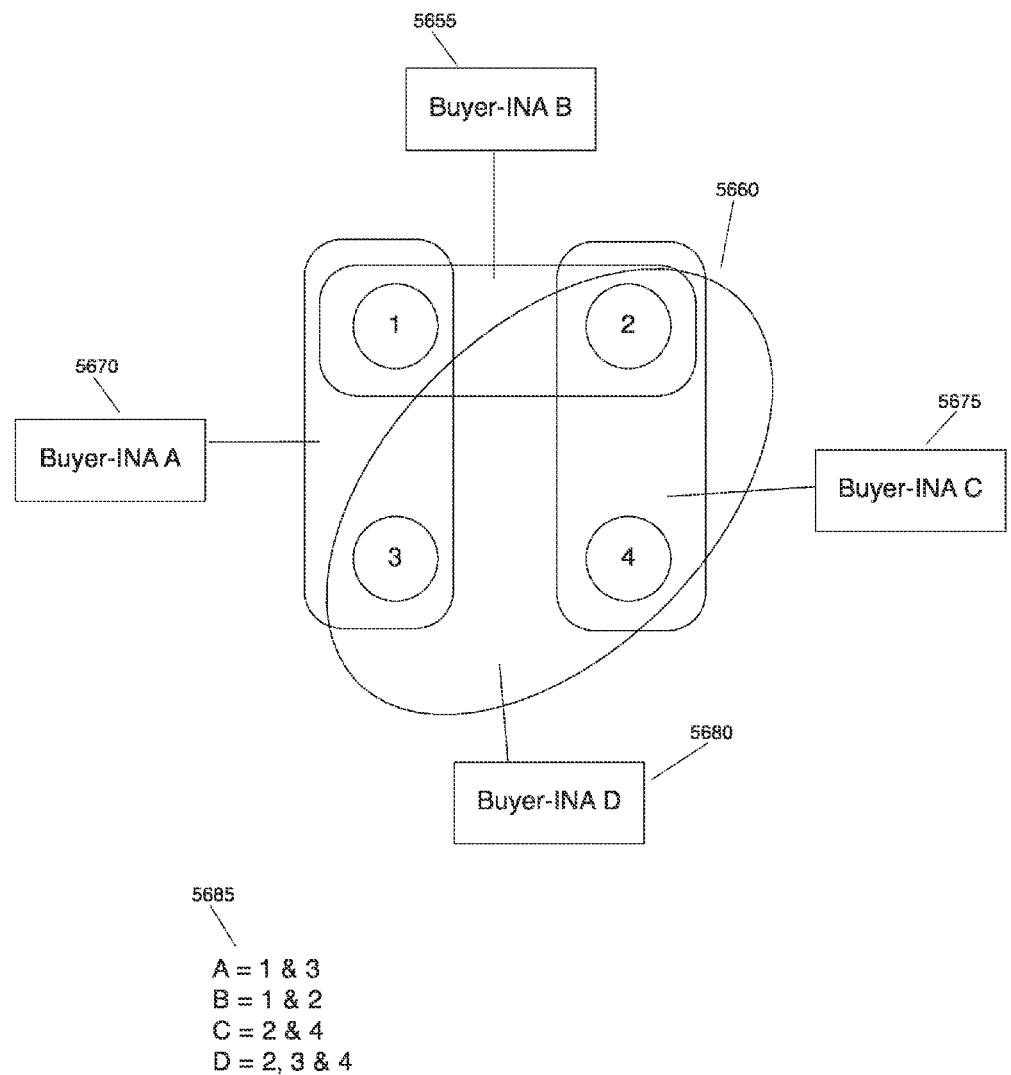
Fig. 55: INA Combinatorial [Double] Auction between Single Seller with Multiple Items and Multiple Buyers

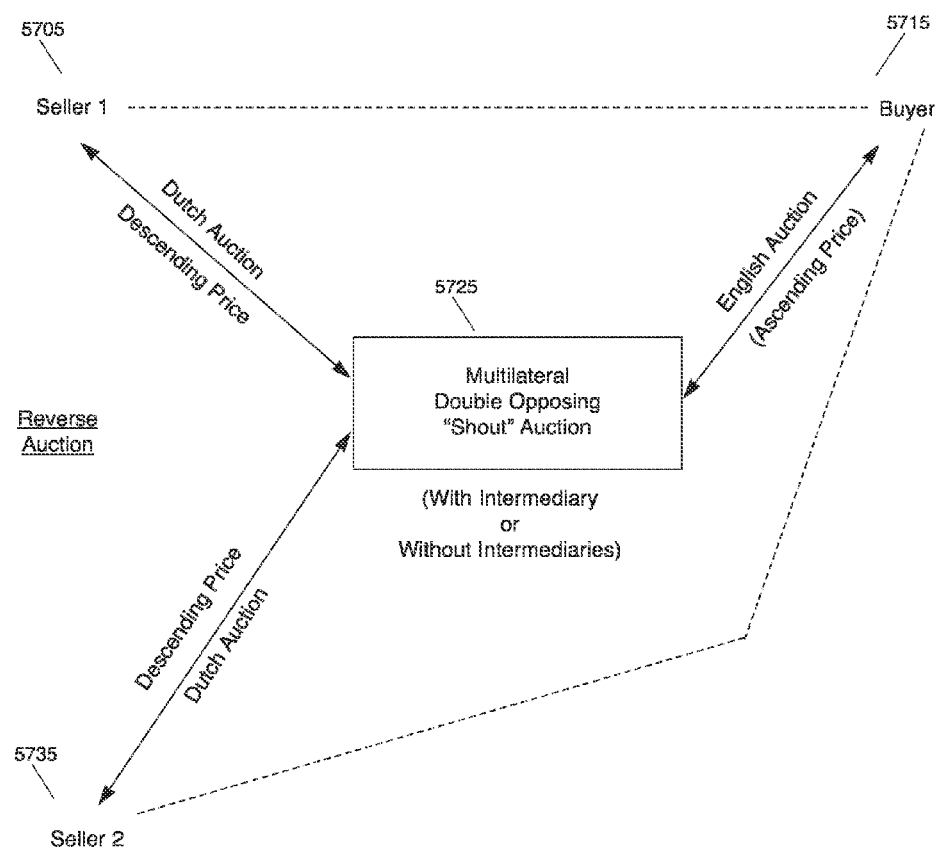
Fig. 56: Final Session – Winner Determination of Interactive Multi-lateral Auction

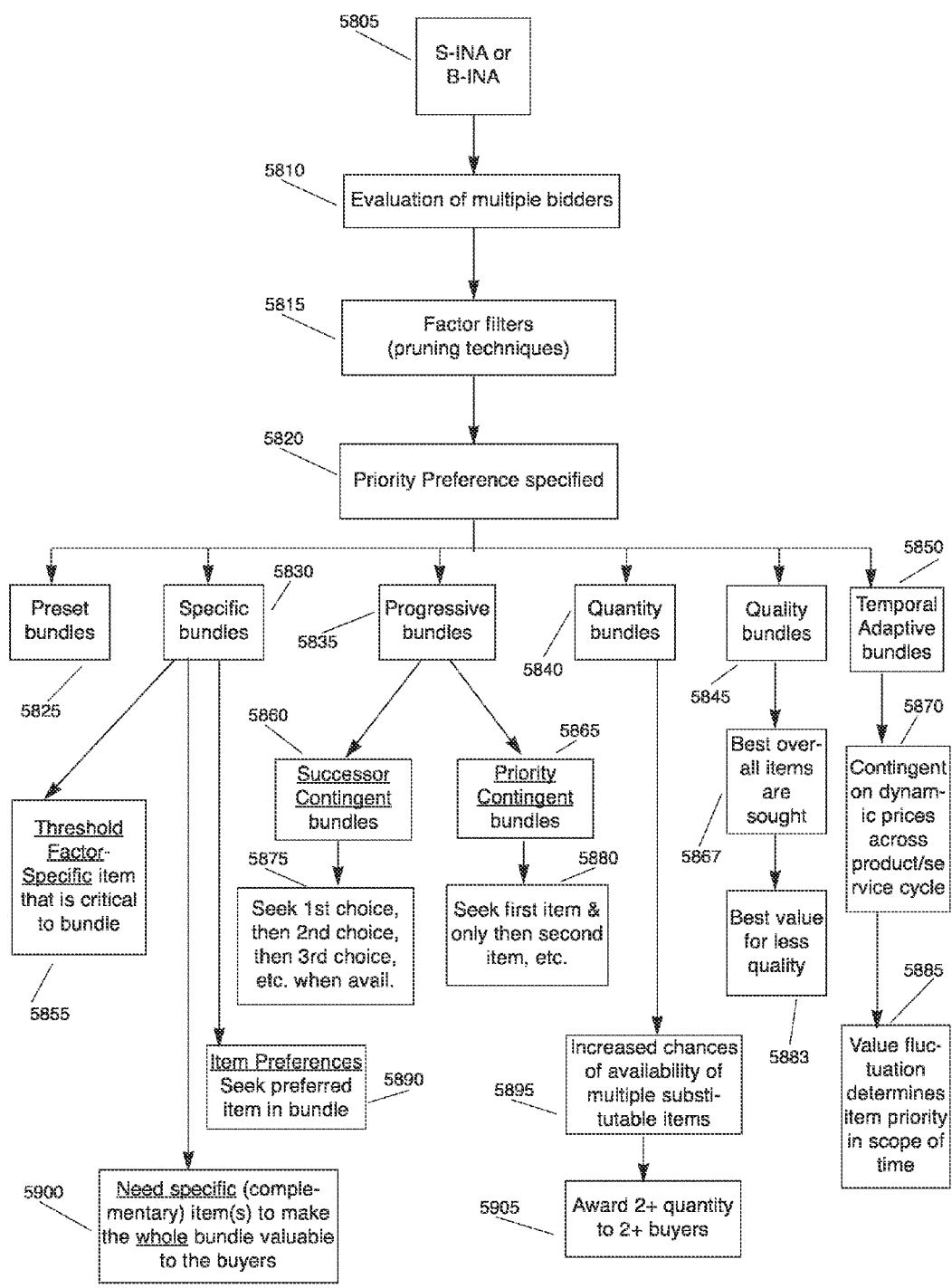
Fig. 57: Factor Filters

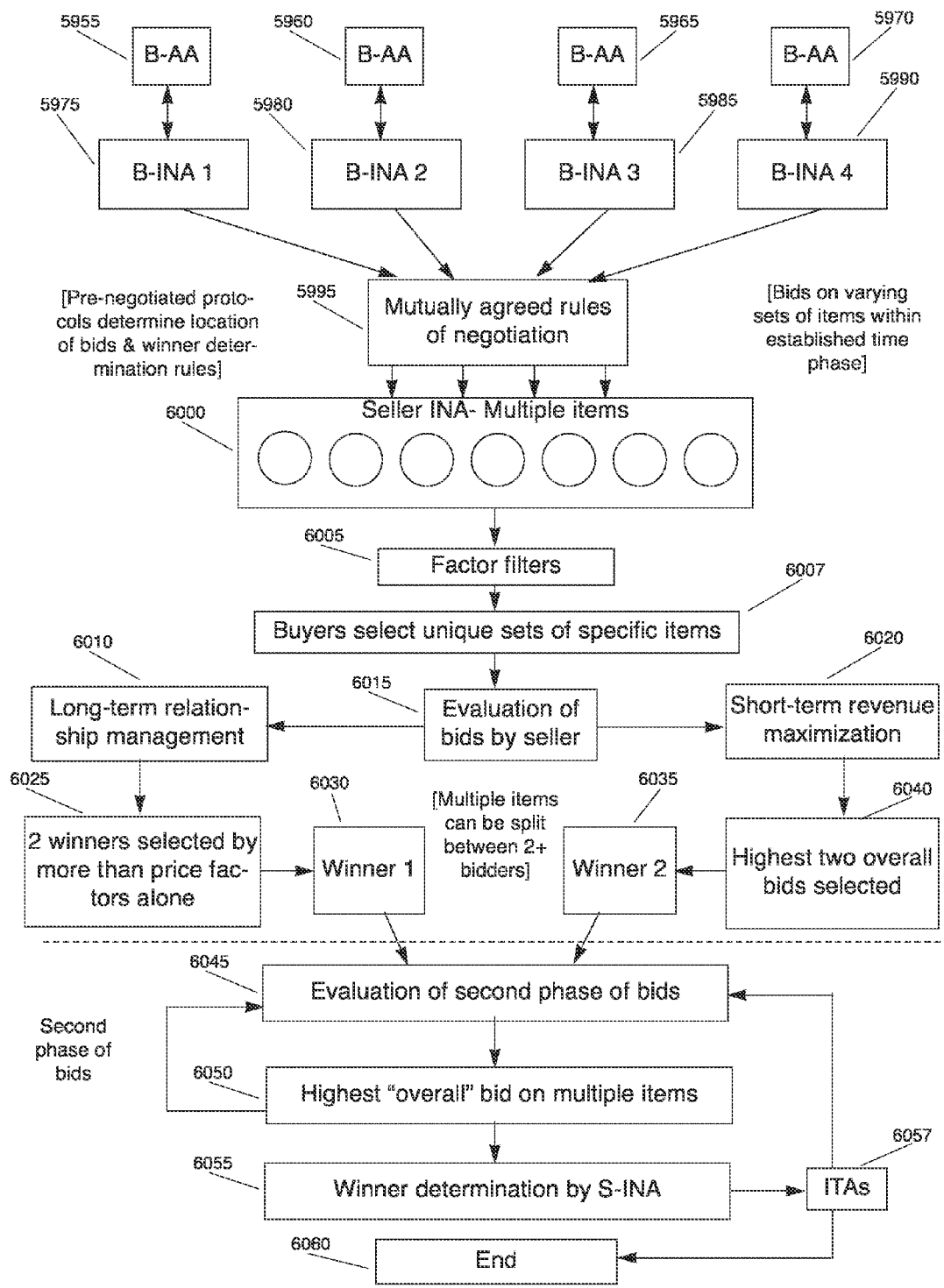
Fig. 58: Disintermediated Multi-item Bidding From One Seller To Multiple Buyers

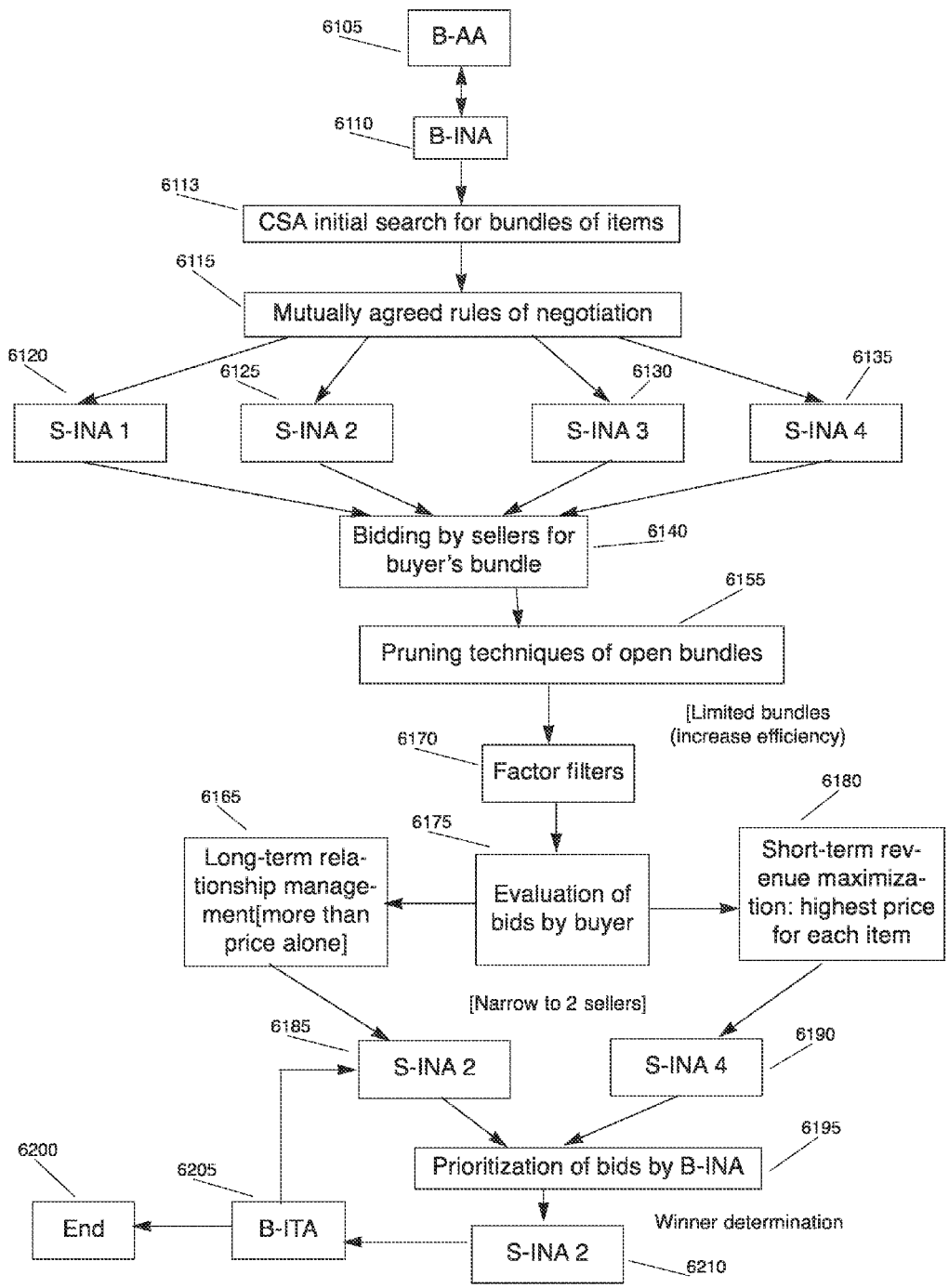

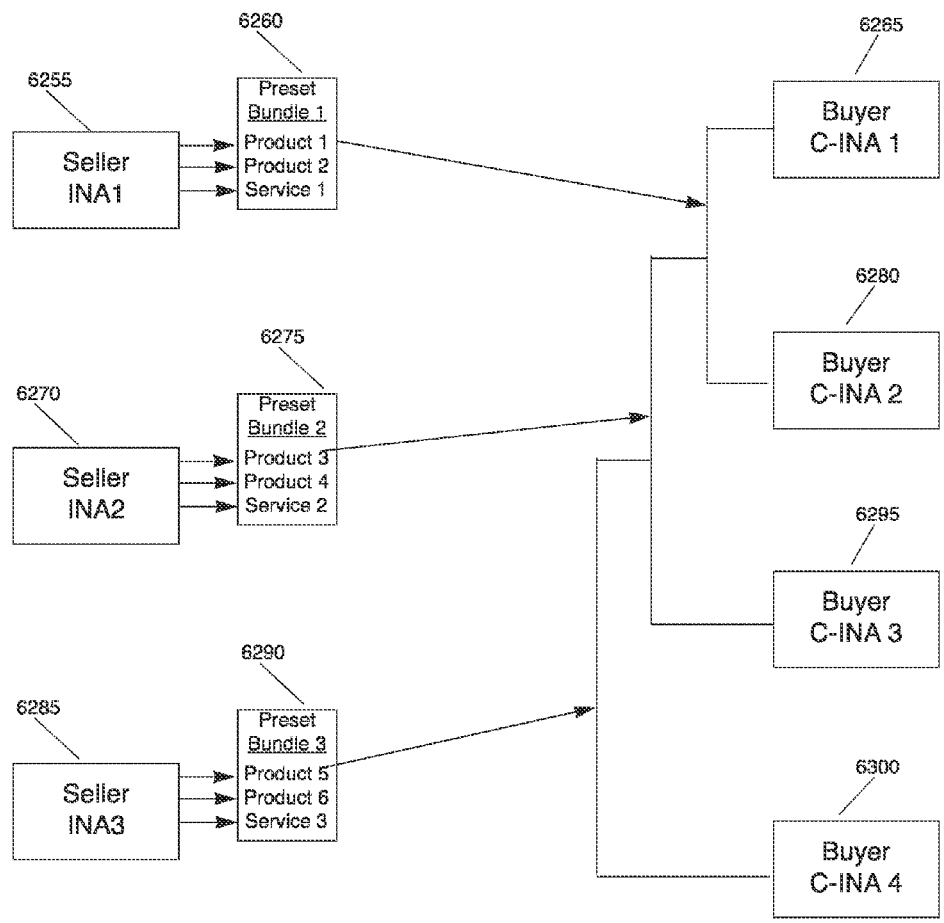
Fig. 60: Disintermediated Aggregation of Pre-Set Bundles between Multiple Sellers & Multiple Buyers

Fig. 61: Disintermediated Multi-item Bidding Between Multiple Sellers & Multiple Buyers
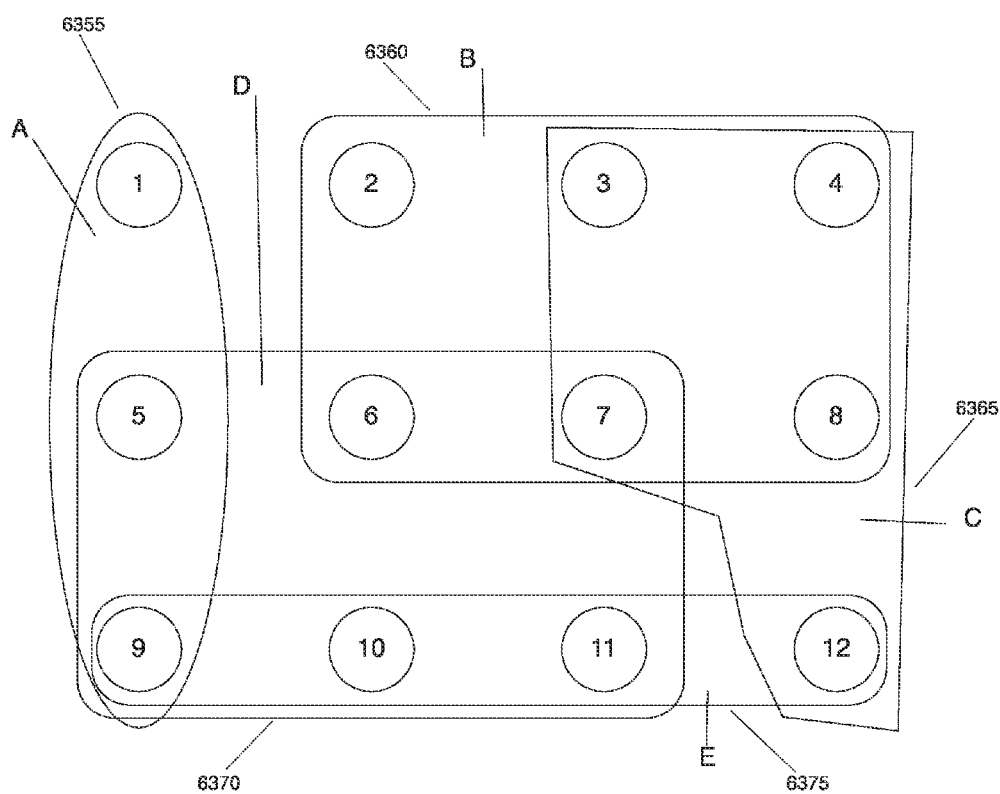
| | | |
|---|---|---|
| 1 – 4: Seller I | Buyer Bidder A: | 1, 5, 9 |
| 5 – 8: Seller II | Buyer Bidder B: | 2, 3, 4, 6, 7, 8 |
| 9 – 12: Seller III | Buyer Bidder C: | 3, 4, 7, 8, 12 |
| | Buyer Bidder D: | 5, 6, 7, 9, 10, 11 |
| | Buyer Bidder E: | 9, 10, 11, 12 |

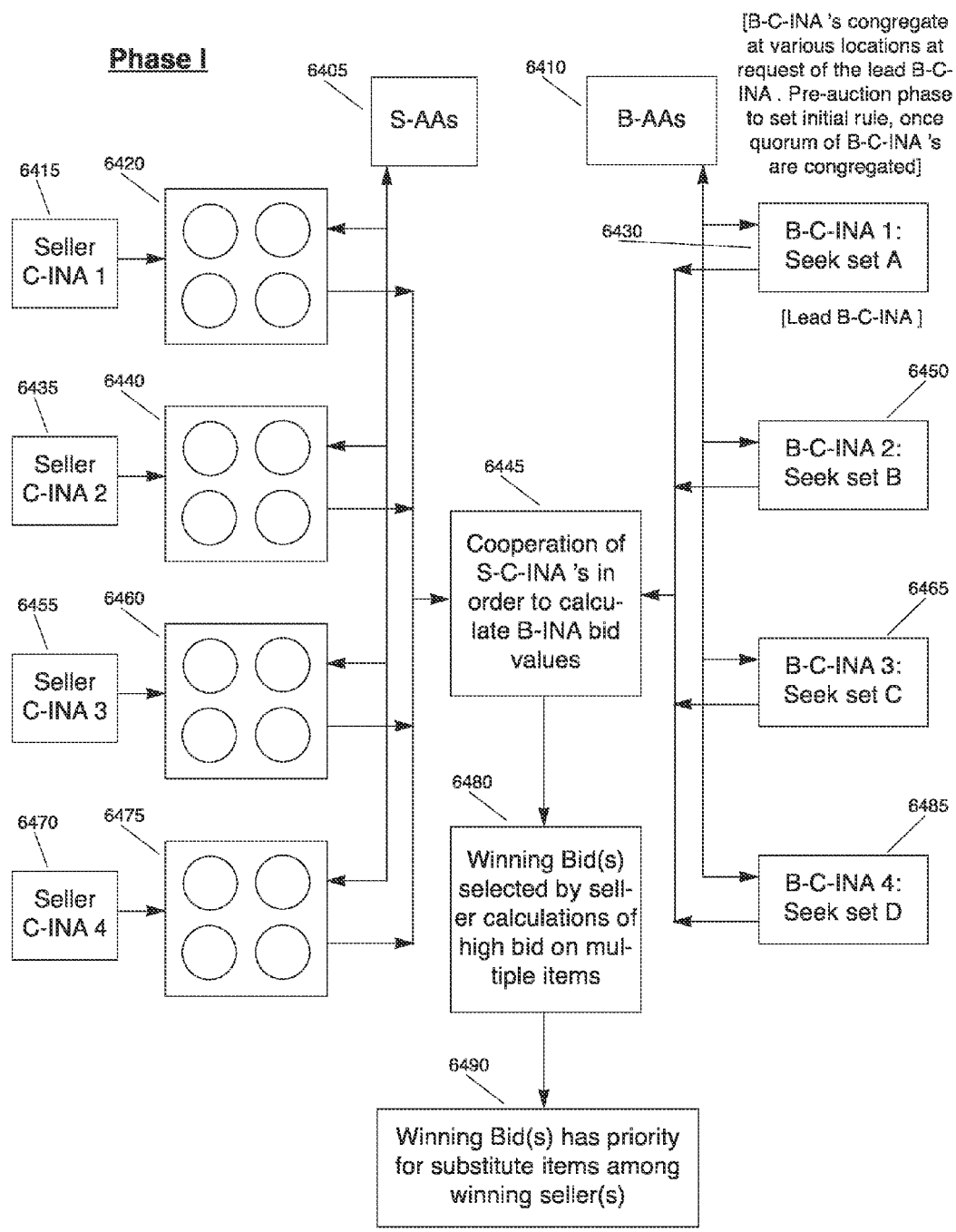

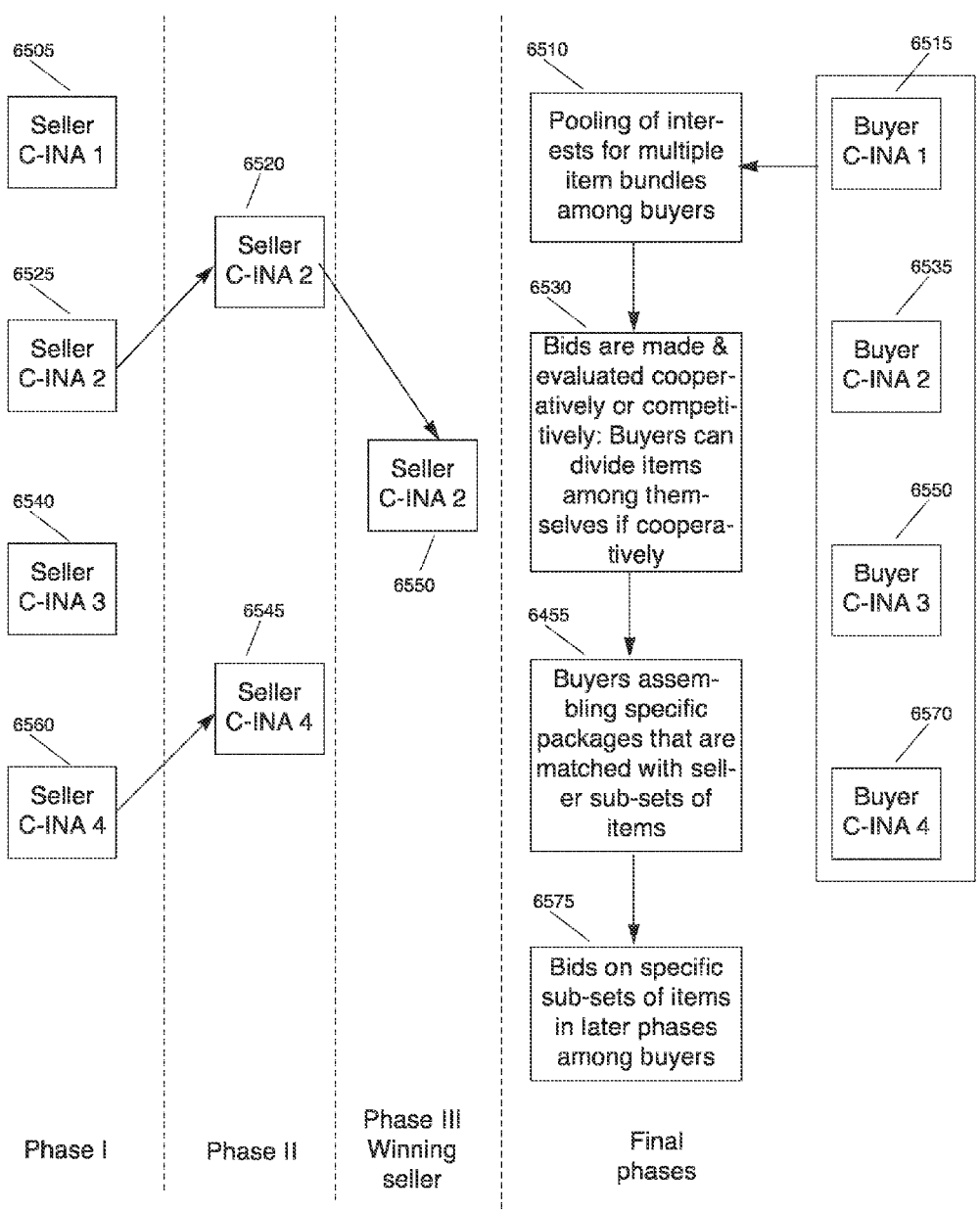

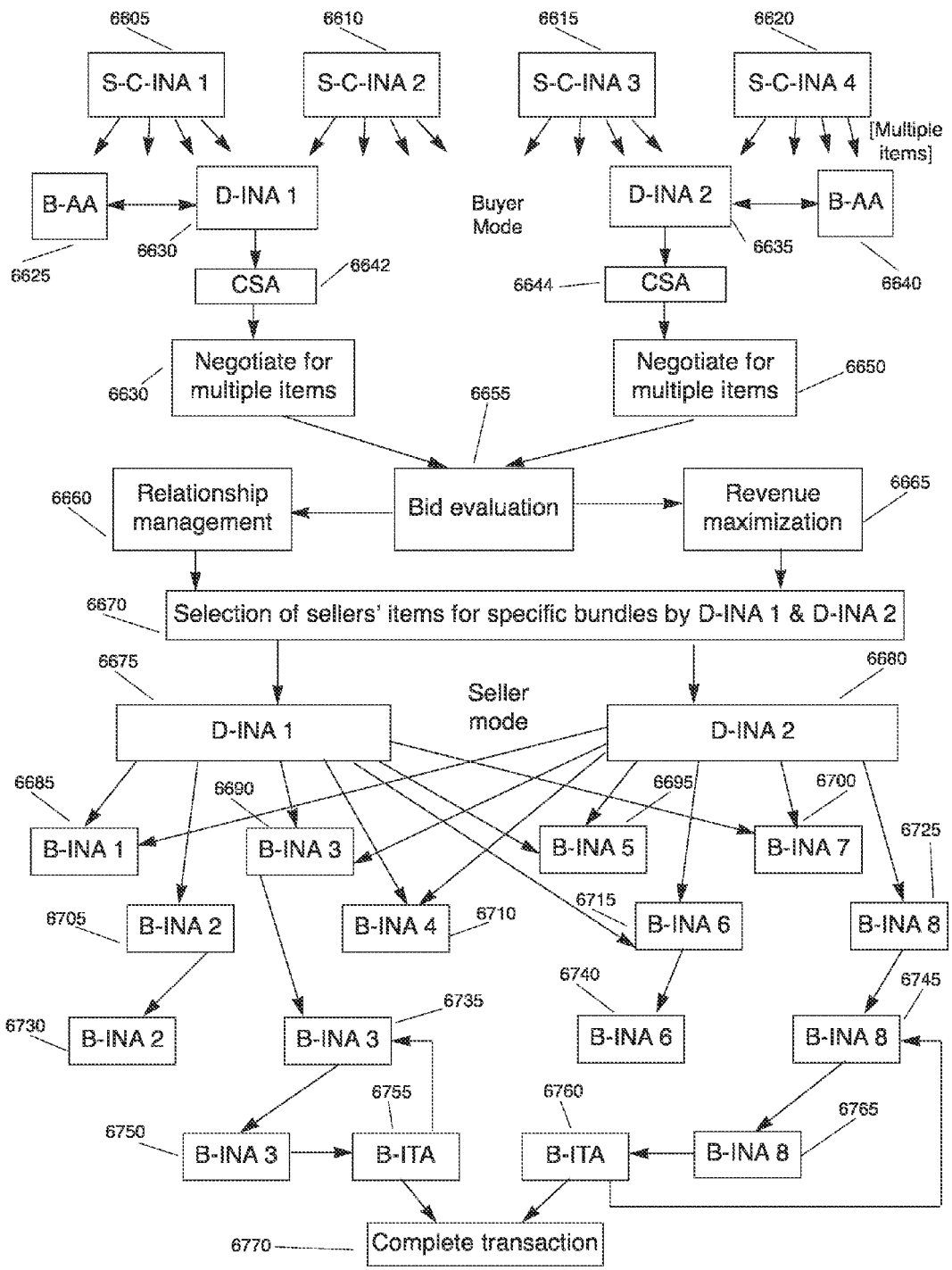
Fig. 63: Disintermediated Arbitrage Of Multi-item Bundles Between Multiple Sellers & Multiple Buyers using D-INA's

Fig. 64: Multifactorial Bidding Approaches
Sorting By Item Variables

Quality

Attribute – color, style, etc.

Quantity

Availability (now or later)

Delivery Time & Terms

Size

Dynamic Pricing Across product/service cycle

Brand/manufacturer

Configuration

Features

Additional options

Combinations of various features

Price

Payment Method

Payment Terms

Location

Fig. 65: Example of Multiple Feature Factors: Personal Computer Configurations

| Manu. | CPU/ Motherboard | Brand | OS | RAM | HDD | Modem & ISP contract. | DVD | Monitor | Price |
|---|---|---|---|---|---|---|---|---|---|
| Intel | 500-ABC | IBM | MS | 64 | 10 | 56 kbs | DVD | 15 in | |
| Intel | 500-ABC | Dell | MS | 128 | 10 | 56 kbs | DVD | 17 in | |
| AMD | 500-XYZ | Gateway | MS | 128 | 20 | 56/ISP | DVD | 19 in | |
| AMD | 800-XYZ | HP | MS | 128 | 0 | 56/ISP | DVD | 17 in | |
| AMD | 800-ABC | IBM | MS | 256 | 20 | 56/ISP | DVD | 17 in | |
| AMD | 800-ABC | Dell | Linux | 256 | 20 | 128 | DVD-RAM | 17 in | |
| Intel | 800-ABC | Gateway | Linux | 256 | 30 | 128 | DVD-RAM | 17 in | |
| Intel | 800-ABC | HP | Linux | 256 | 30 | 128 | DVD-RAM | 17 in | |
| Intel | 1.2-XYZ | IMB | Linux | 256 | 30 | 128/ISP | DVD-RAM | 17 in | |
| Intel | 1.2XYZ | Dell | Linux | 256 | 40 | 128/ISP | DVD-RAM | 17 in | |
| Intel | 1.2-ABC | Gateway | MS | 256 | 40 | 128/ISP | DVD-RAM | 19 in | |
| Intel | 1.2-ABC | HP | MS | 256 | 40 | 256 | DVD-RAM | 19 in | |
| AMD | 1.2-ABC | IBM | MS | 256 | 40 | 256 | DVD-RAM | 19 in | |
| AMD | 1.2-ABC | Dell | MS | 512 | 60 | 256 | DVD | 19 in | |
| AMD | 1.2-XYZ | Gateway | MS | 512 | 60 | 256/ISP | DVD | 19 in | |
| AMD | 1.8-XYZ | HP | MS | 256 | 60 | 256/ISP | DVD | 19 in | |
| AMD | 1.8-XYZ | IBM | Linux | 256 | 60 | 1.2mbs | DVD-RAM | 21 in | |
| Intel | 1.8-XYZ | Dell | Linux | 256 | 80 | 1.2mbs | DVD-RAM | 21 in | |
| Intel | 1.8-XYZ | Gateway | Linux | 512 | 80 | 1.2mbs | DVD-RAM | 21 in | |
| Intel | 2.4-ABC | HP | Linux | 512 | 80 | 1.2/ISP | DVD-RAM | 21 in | |
| Intel | 2.4-ABC | Sony | MS | 512 | 120 | 1.2/ISP | DVD | 21 in | |
| AMD | 2.4-ABC | Sony | MS | 1.2 | 120 | 1.2/ISP | DVD | 21 in | |

Quantity – Discounts – 2-5, 5-9, 11-19, 21-29, 30-99, 100-499, 500-1999, etc.

Fig. 66: Examples of Categories of Multi-item Bundles

1. Computer Hardware configurations – RAM, HDD, CPU, monitor
2. Computer Hardware & Software
3. Computer Hardware & Services
4. Office equipment computer, printer, copier, fax, phone
5. Telephone equipment & services – local and long distance
6. Telecom capacity – rev. maximization across demand cycle
7. Electronic equipment – A/V combinations & software accessories
8. Photo equipment – camera, lenses, accessories, film, digital media
9. Airline tickets – time constraints to sell multiple seats to maximize revenue
10. Machines, machine parts, machine accessories
11. Cars/trucks & accessories
12. Wardrobe combinations, pants, shirts, coats
13. Real Estate – contiguous properties
14. Communications spectrum – contiguous properties
15. Gems
16. Railroad & trucking scheduling
17. Art, antiques, rugs, etc.
18. Housing combinations
19. Intellectual Property combinations
20. Pharmaceuticals
21. Chemicals

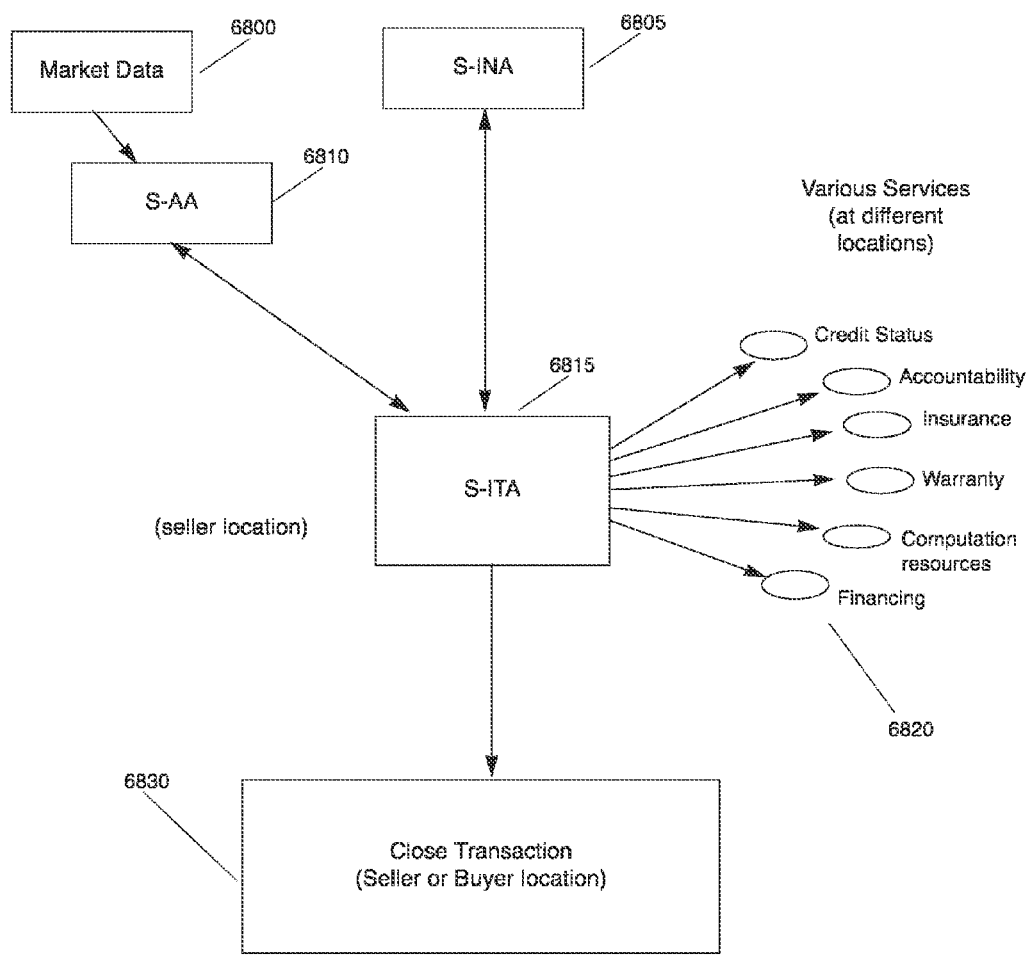
Fig. 67: S-ITA System Architecture

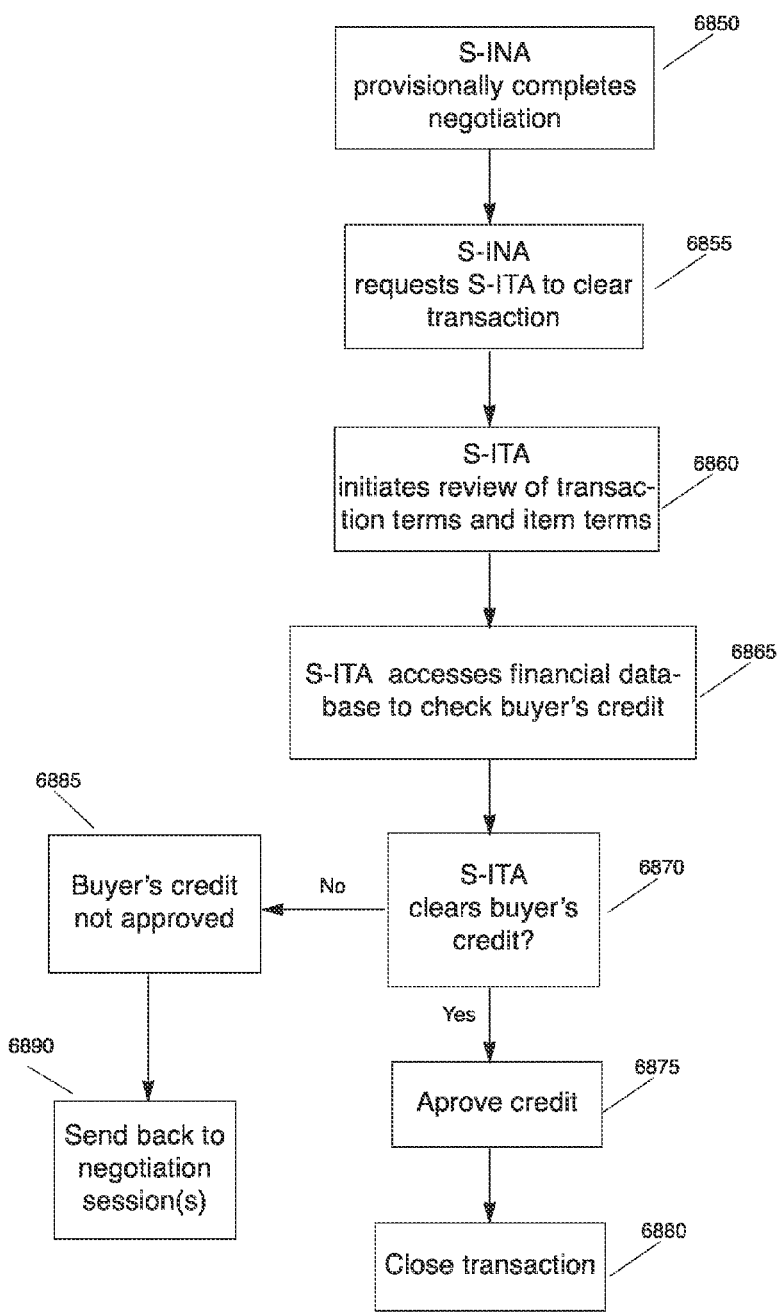
Fig. 68: S-ITA Operation

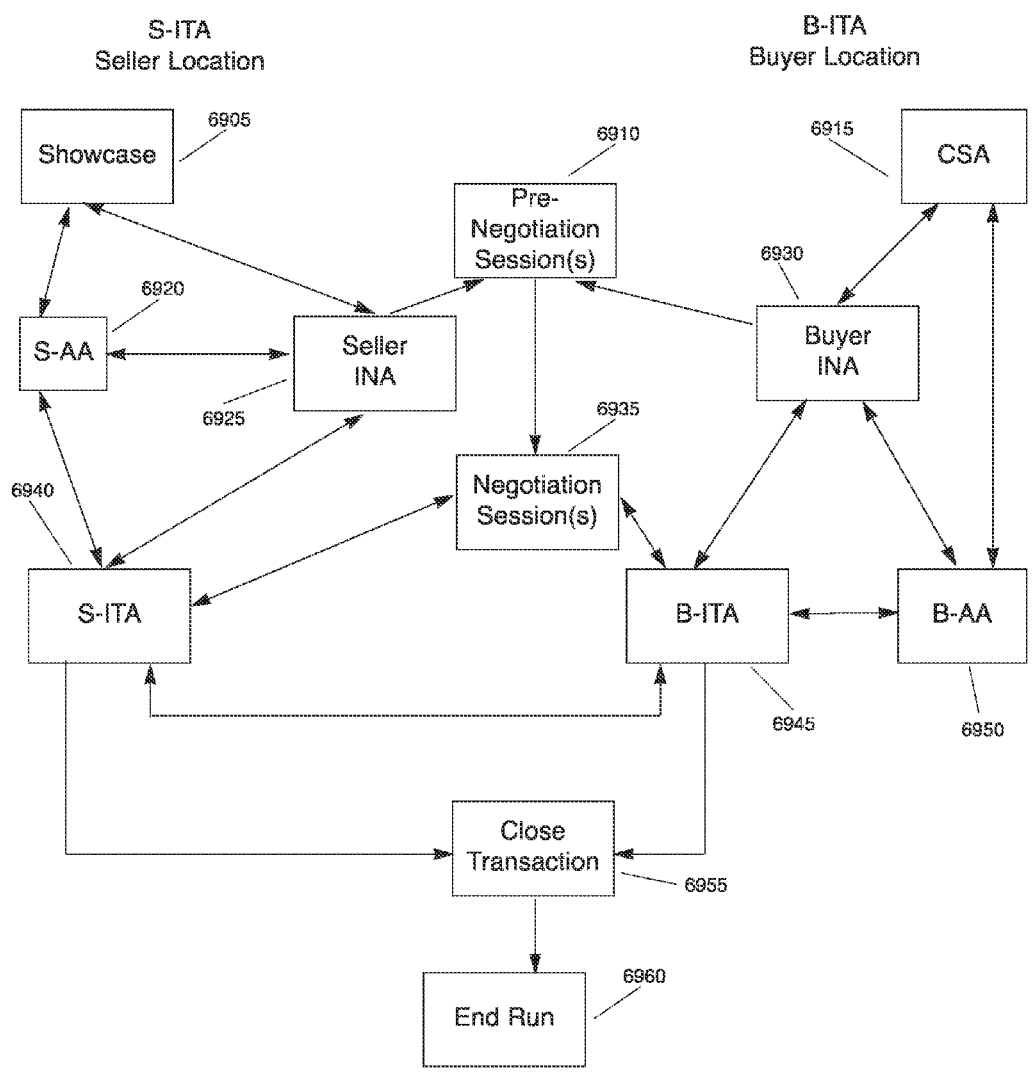
Fig. 69: S-ITA and B-ITA System Process in Final Negotiation with One Seller

Fig. 70: ITA Service Categories: Buyer & Seller Roles

| s – ITA Services | b – ITA Services | dual – ITA Services |
|---|---|---|
| Info. | Info. | Info. |
| AA functions | AA functions | |
| Superscore | Info about market, companies., | |
| Accountability | economy, industry, | |
| Credit info. | products, etc. | |
| | | Services<br>Compliance – legal |
| Services<br>Compliance – legal | Services | Compliance – tax |
| Compliance – tax | Promotion discounts | RMO's |
| RMO's | Warranty | finance/credit |
| finance/credit | Insurance | payment processing |
| payment processing | | Fulfillment –<br>shipping/tracking |
| Fulfillment –<br>shipping/tracking | | due diligence |
| due diligence | | escrow |
| escrow | | report generator |
| report generator | | post-sale feedback |
| post-sale feedback | | |

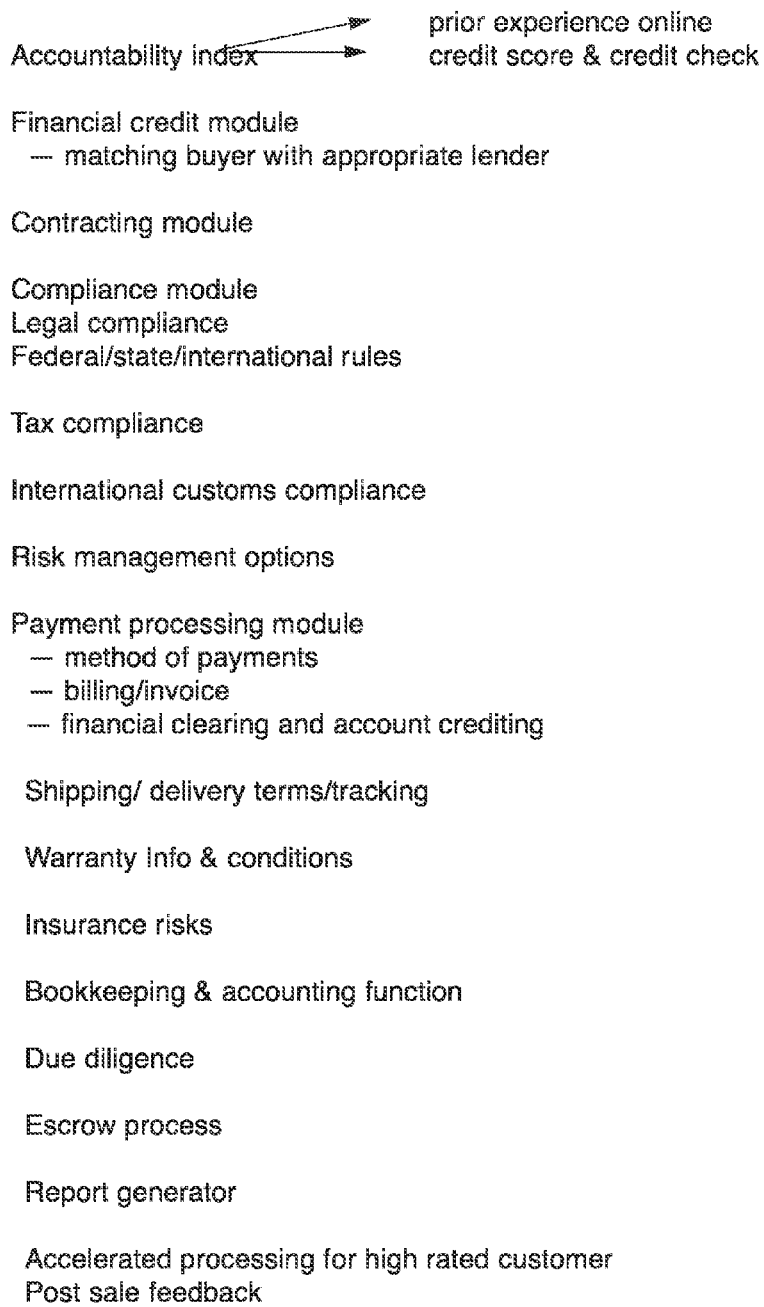
Fig. 71: ITA Services

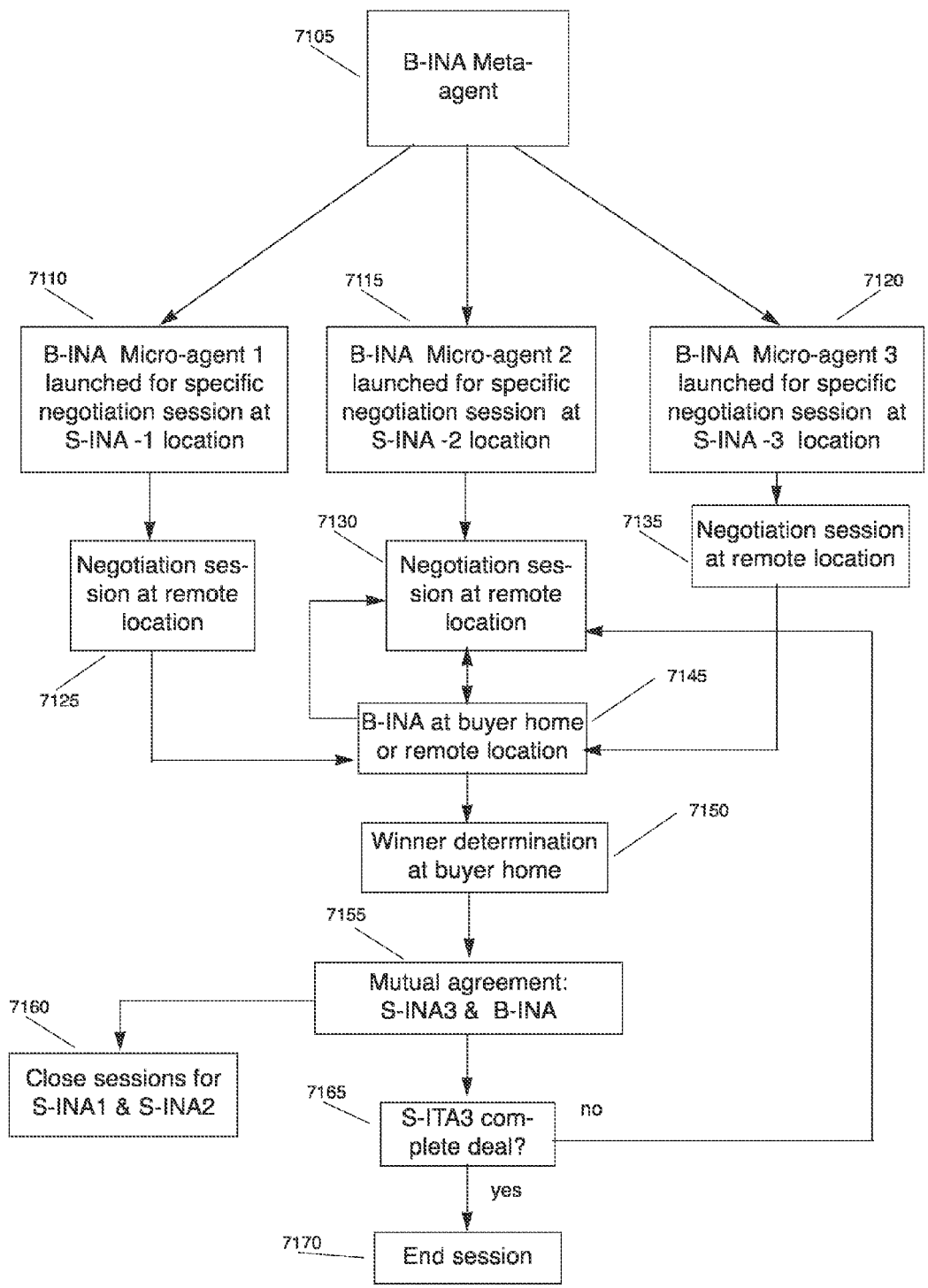
Fig. 72: B-INA Micro-agents with Mobility

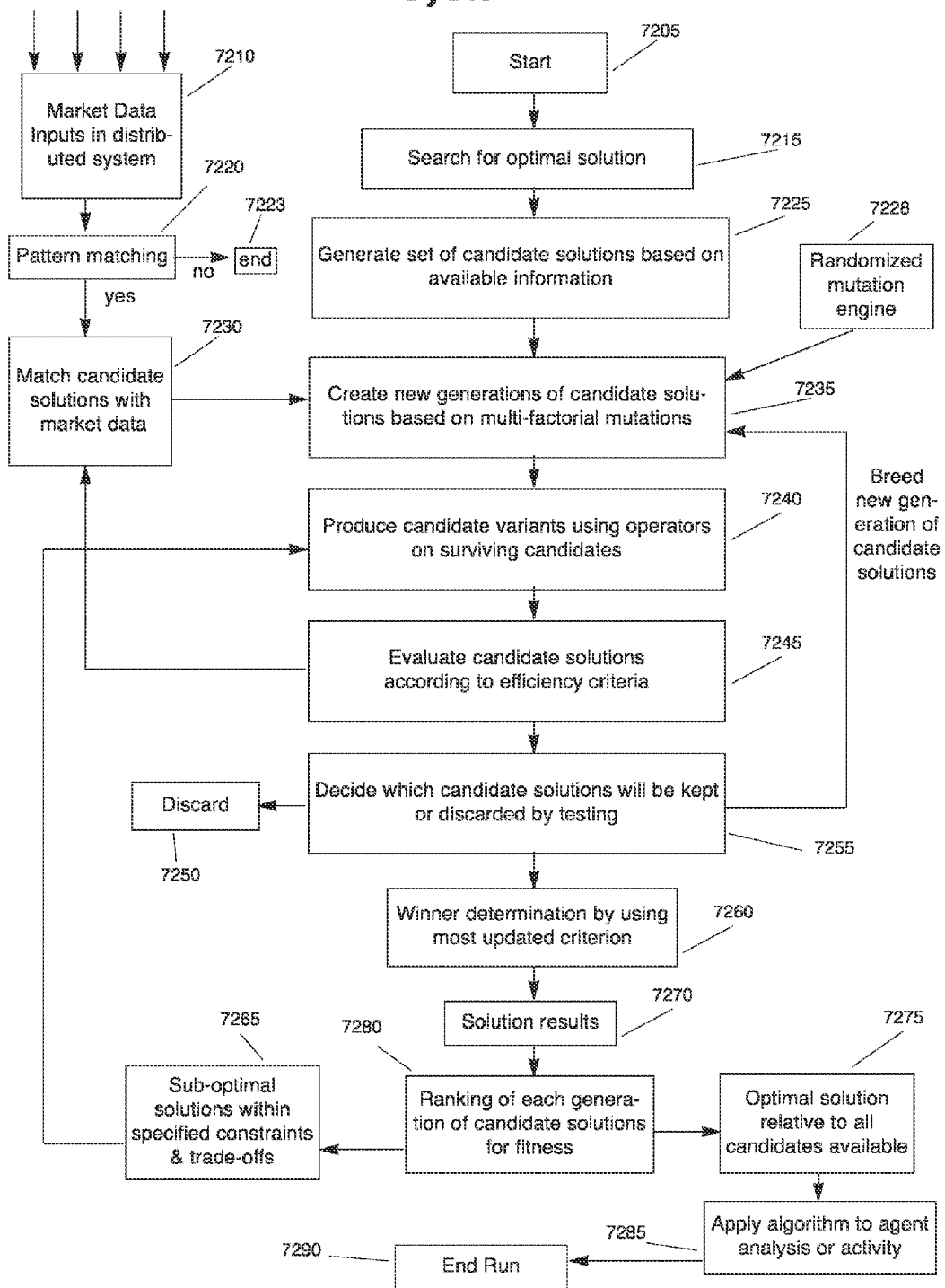
Fig. 73: Genetic Algorithms Applied to Multi-Agent System

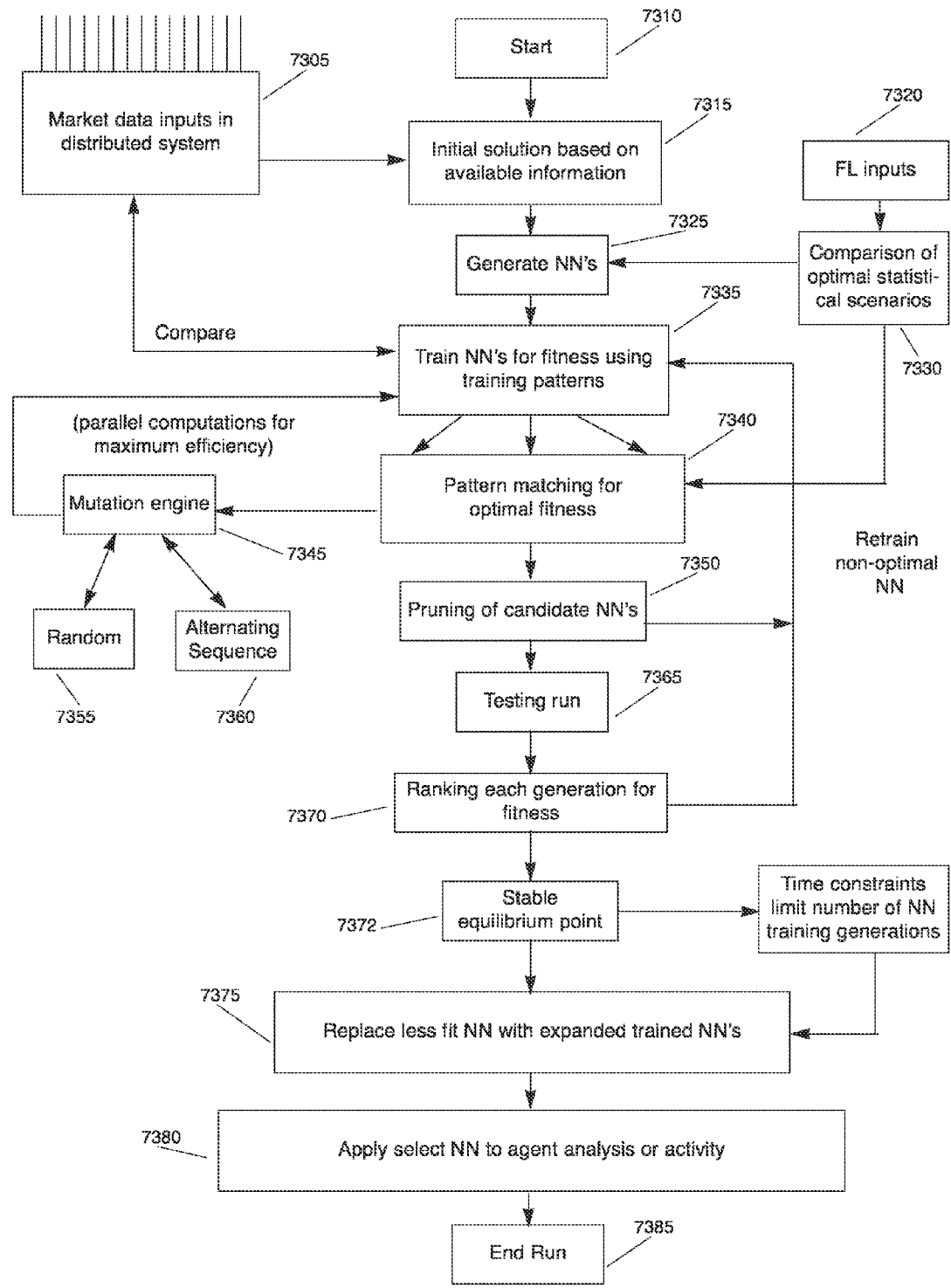
Fig. 74: Neural Networks Applied to Multi-Agent System

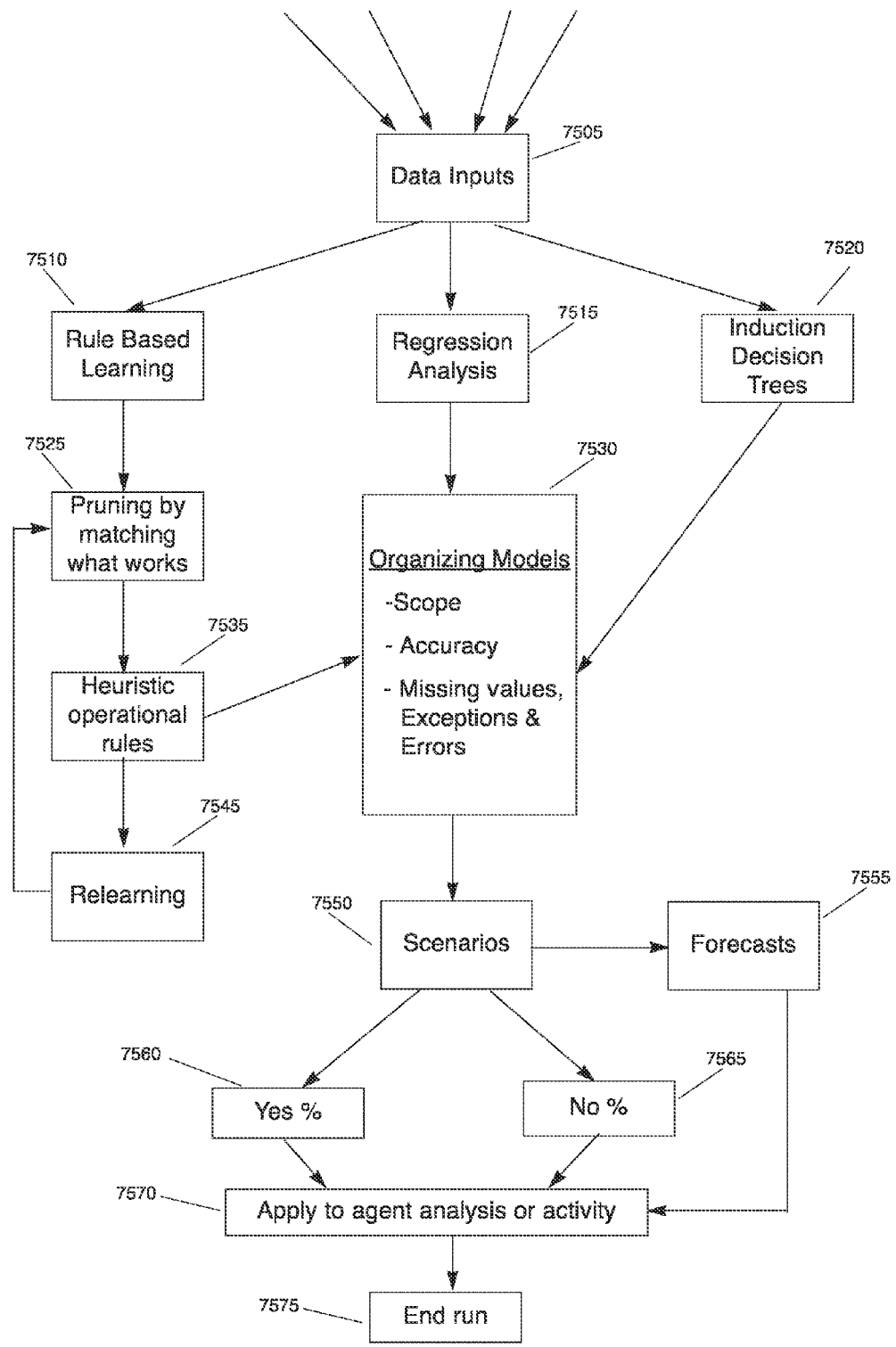
Fig. 75: Genetic Programming System Process

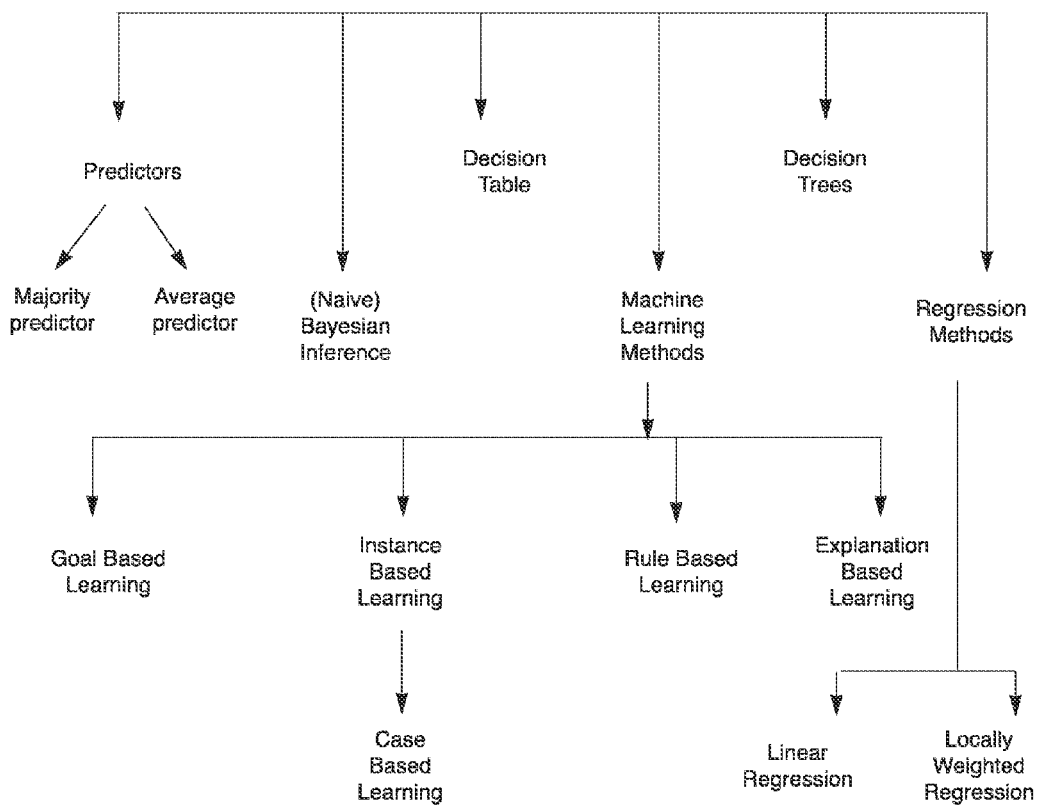
Fig. 76: Genetic Programming Learning Schemas

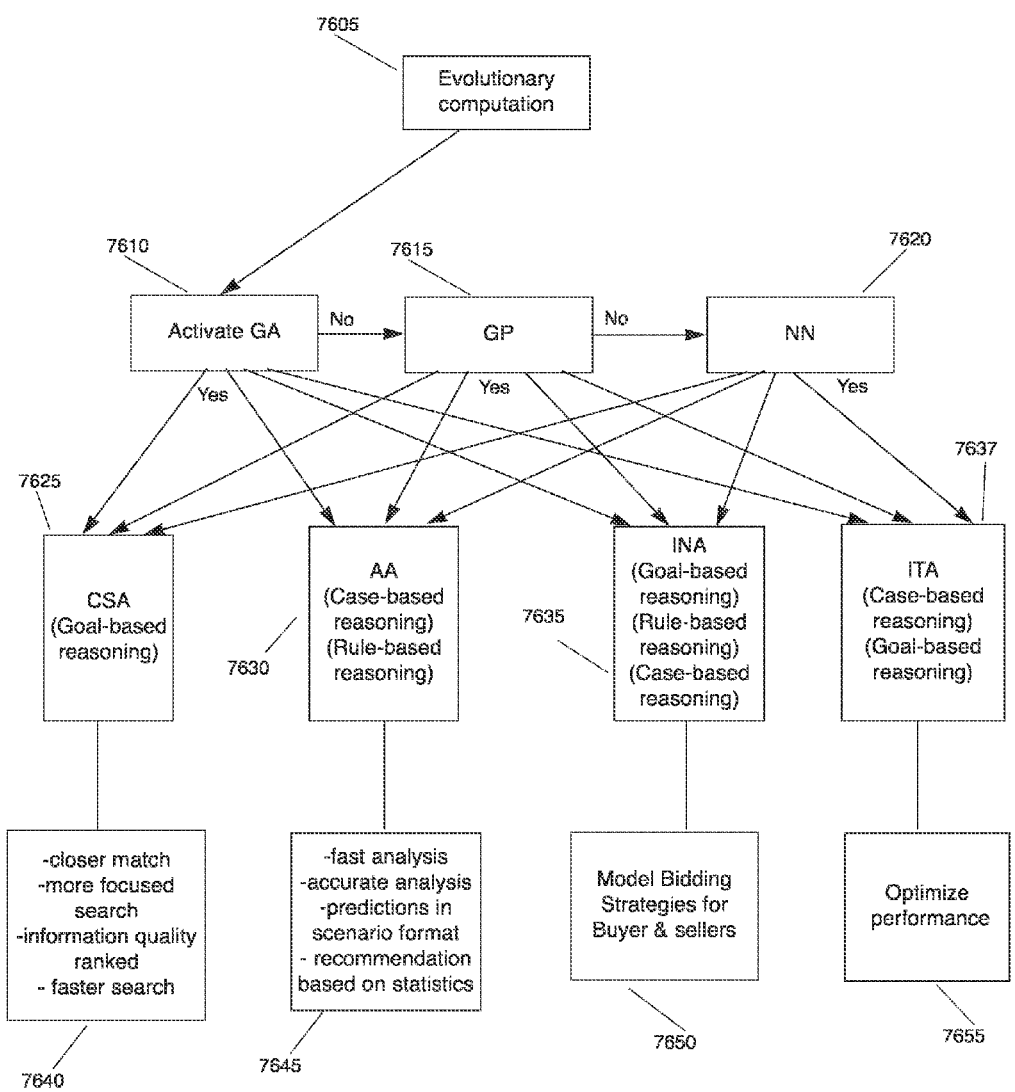
Fig. 77: Evolutionary Computation Applications to Agents

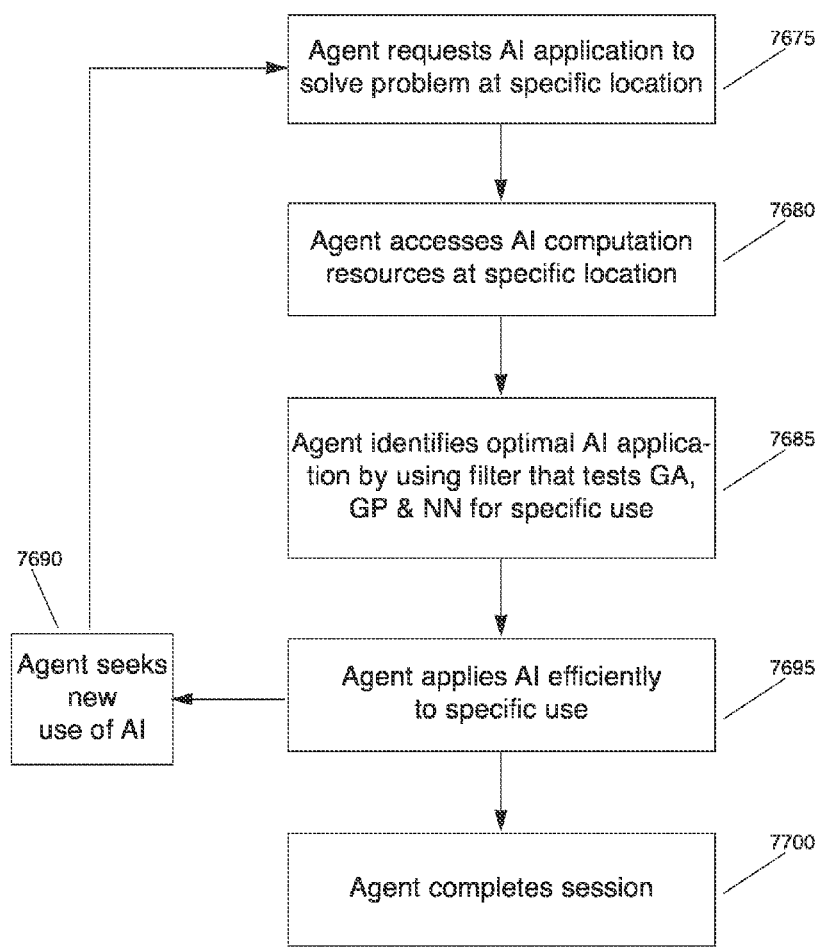
Fig. 78: AI Applied to Agency in a Distributed System

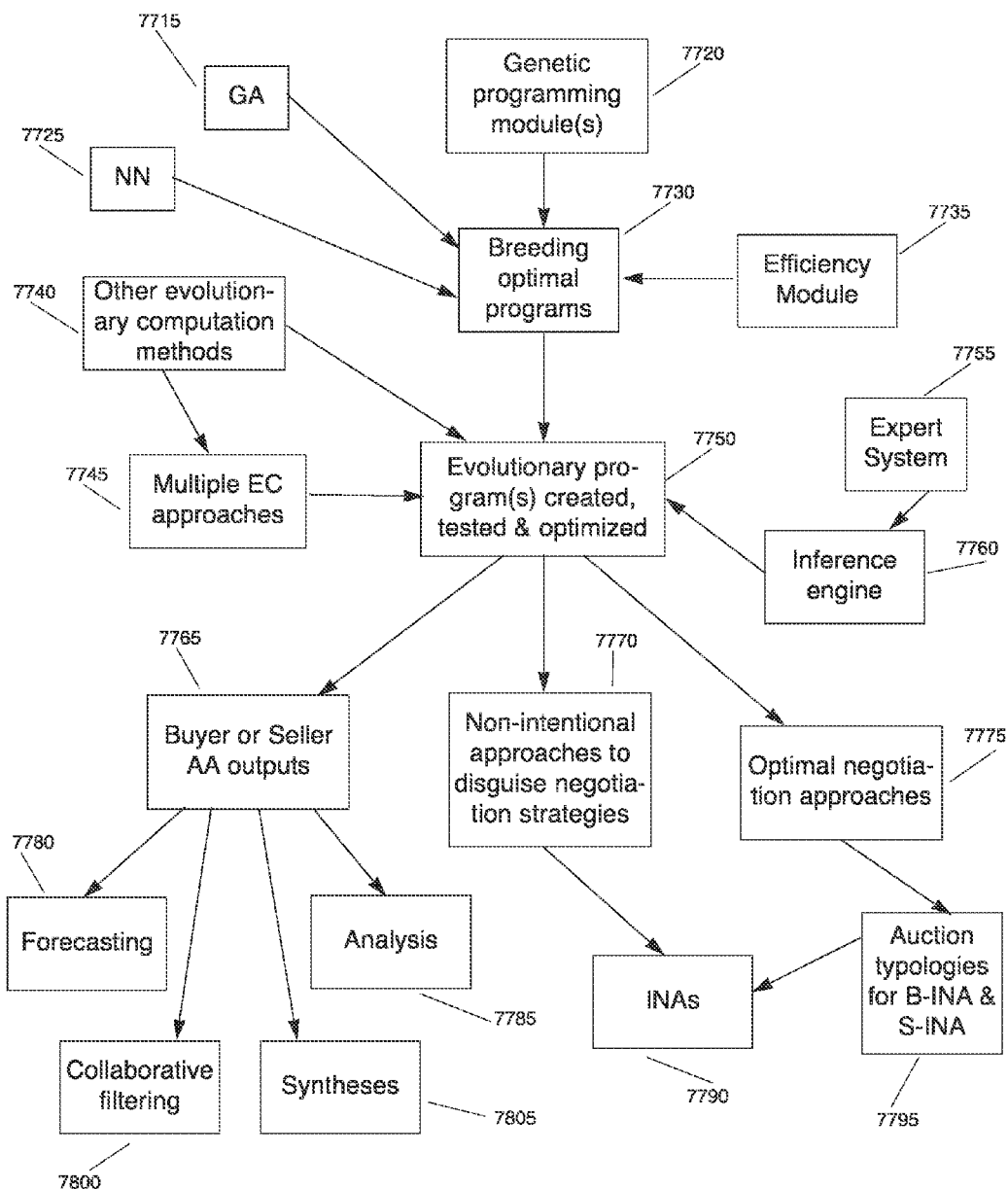
Fig. 79: Evolutionary Computation Architecture and AA/INA Applications

Fig. 80: Layered AI For Optimum Agent Mobility
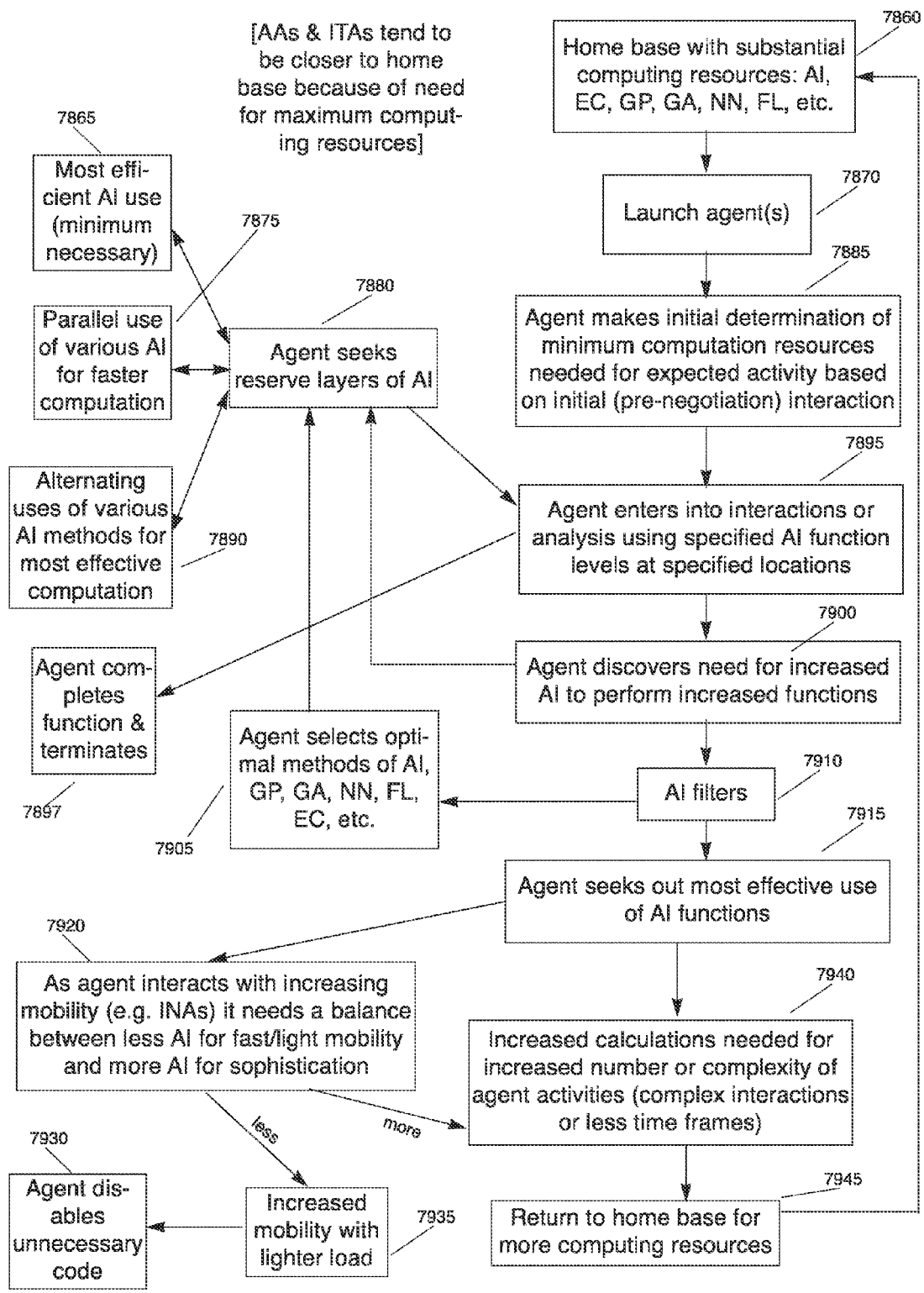

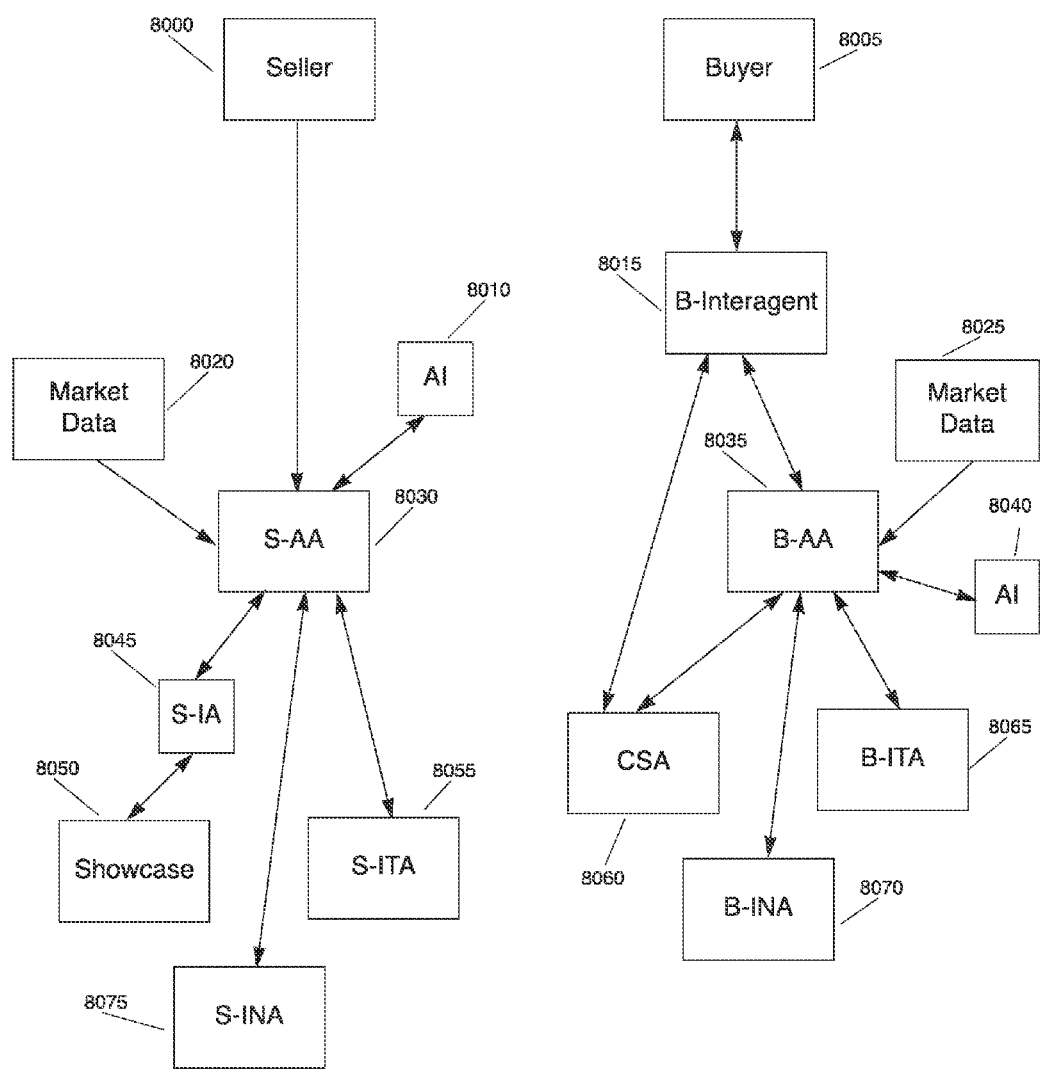
Fig. 81: Analytical Agent System Architecture
Buyer vs. seller viewpoints

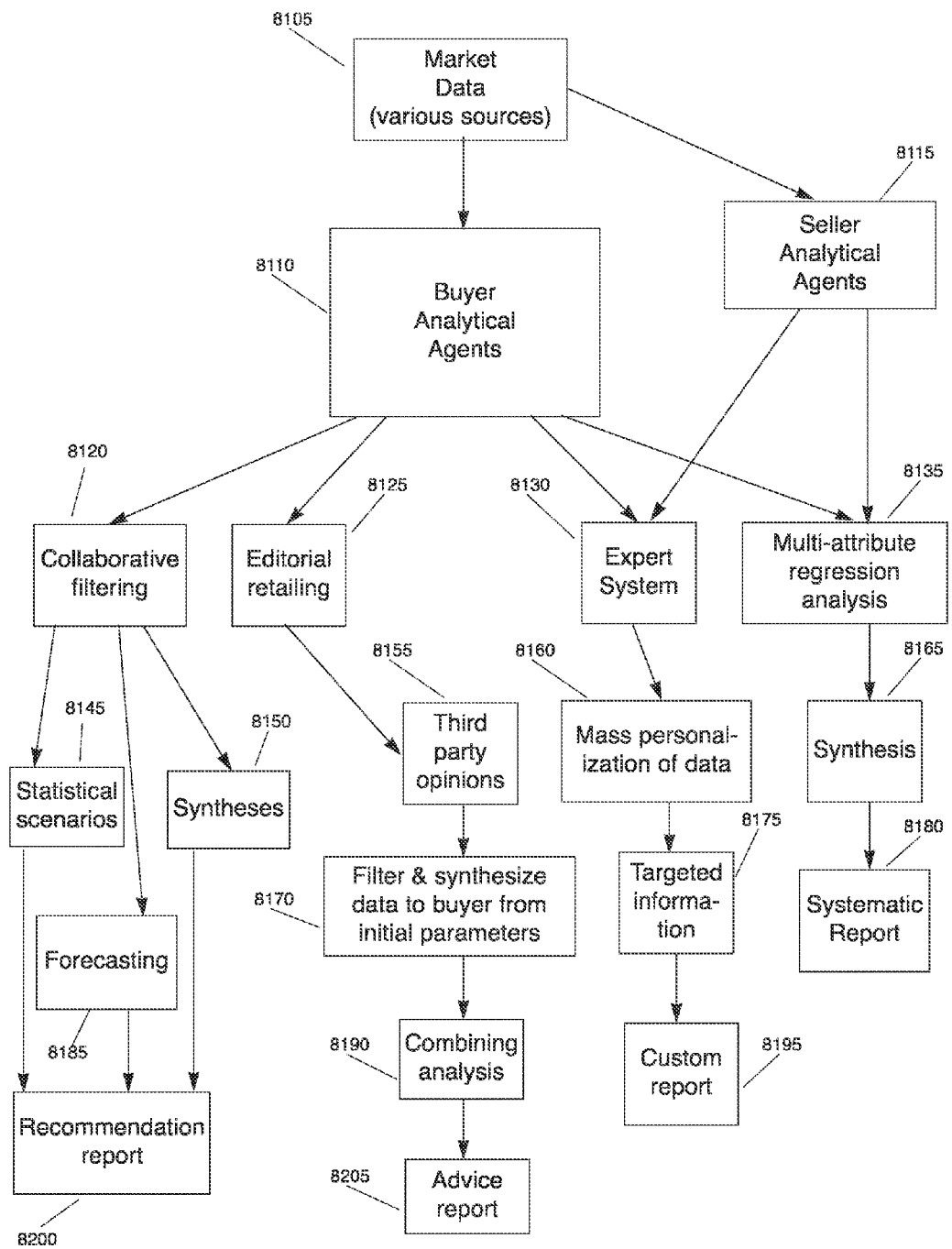
Fig. 82: Kinds Of Data Analysis & Syntheses

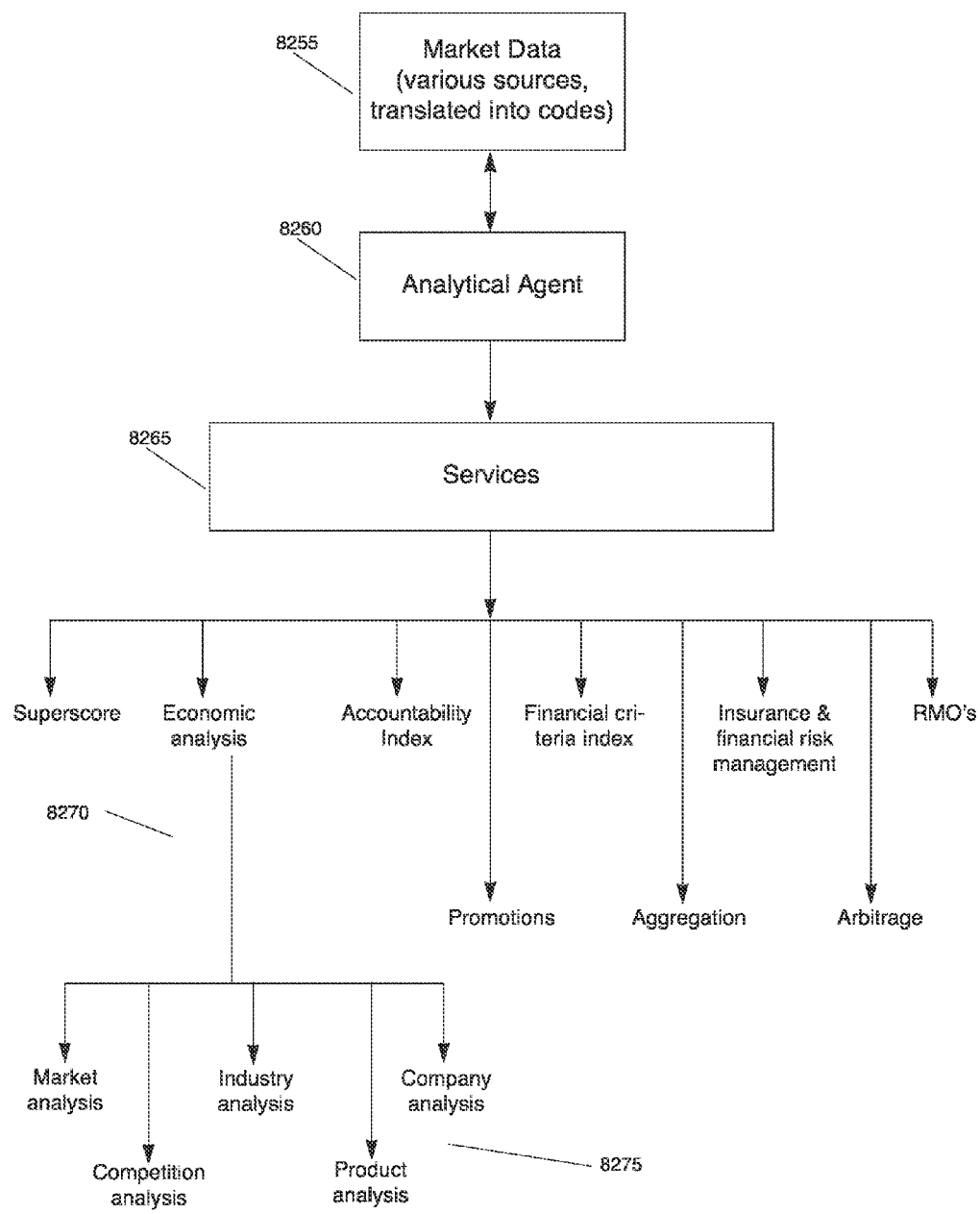
Fig. 83: Analytical Agent Data Flow Process

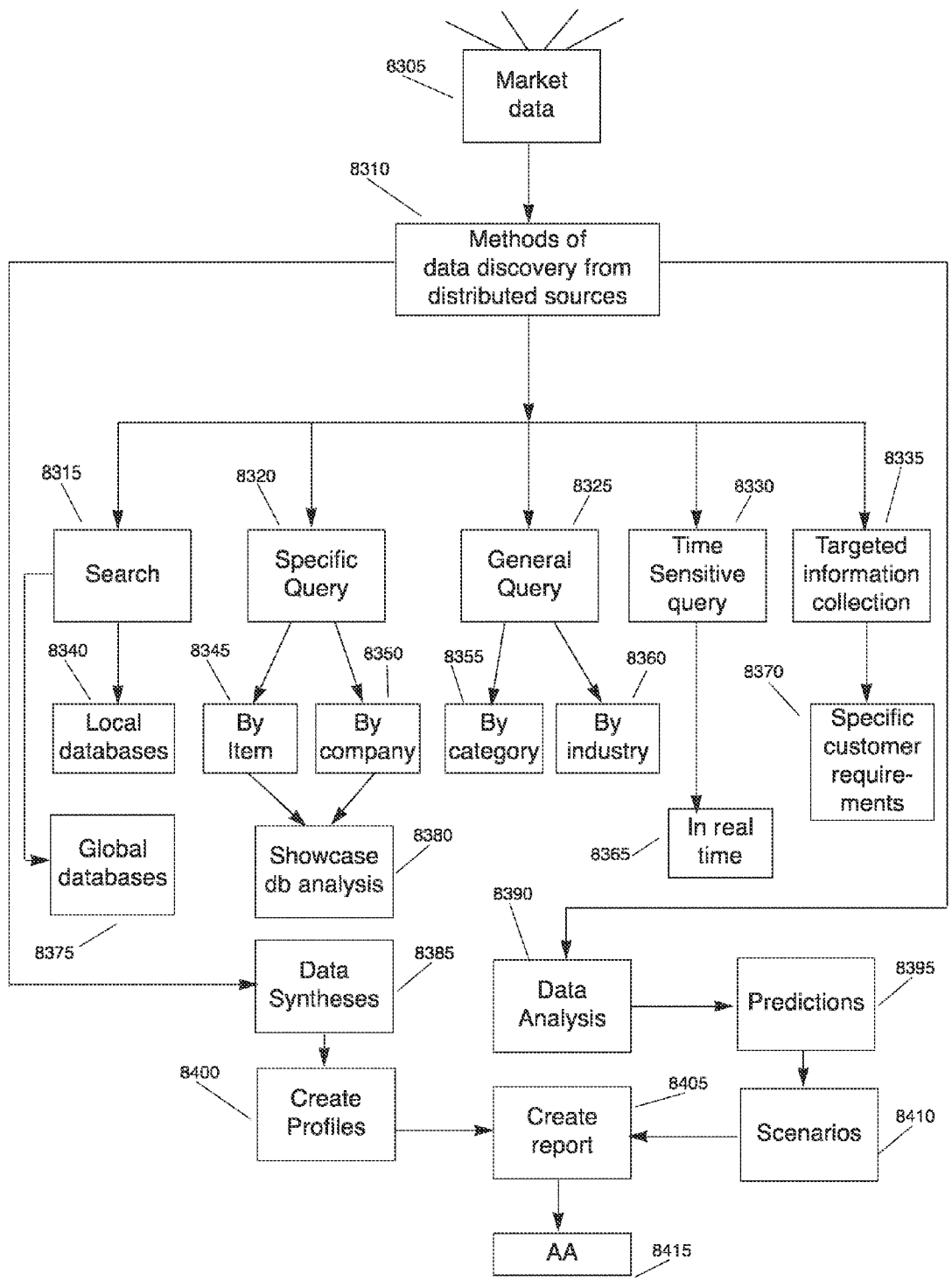
Fig. 84: Data Mining Approaches
CSA & AA interactions

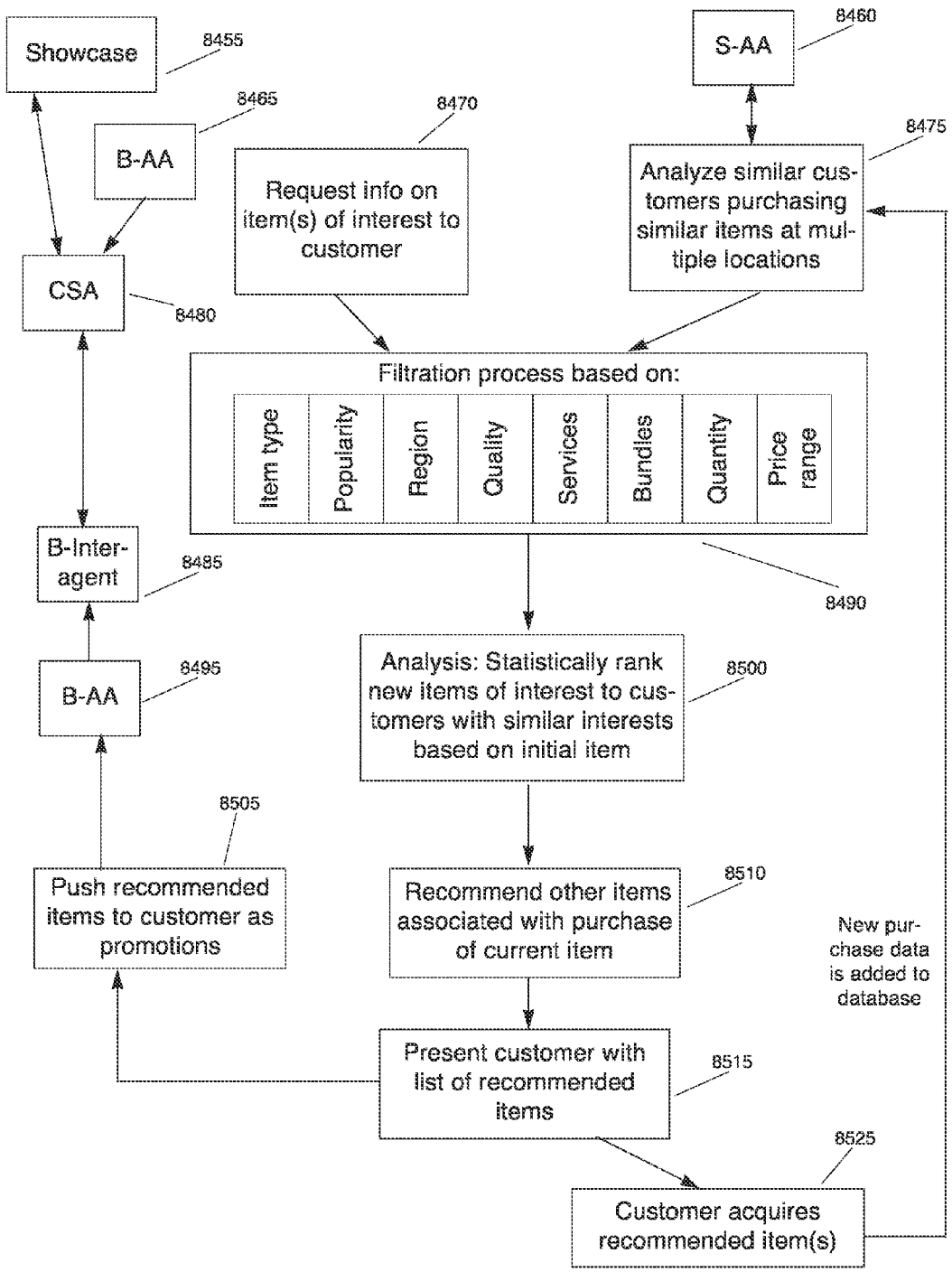
Fig. 85: Advanced Collaborative Filtering for Cross Marketing Recommendations

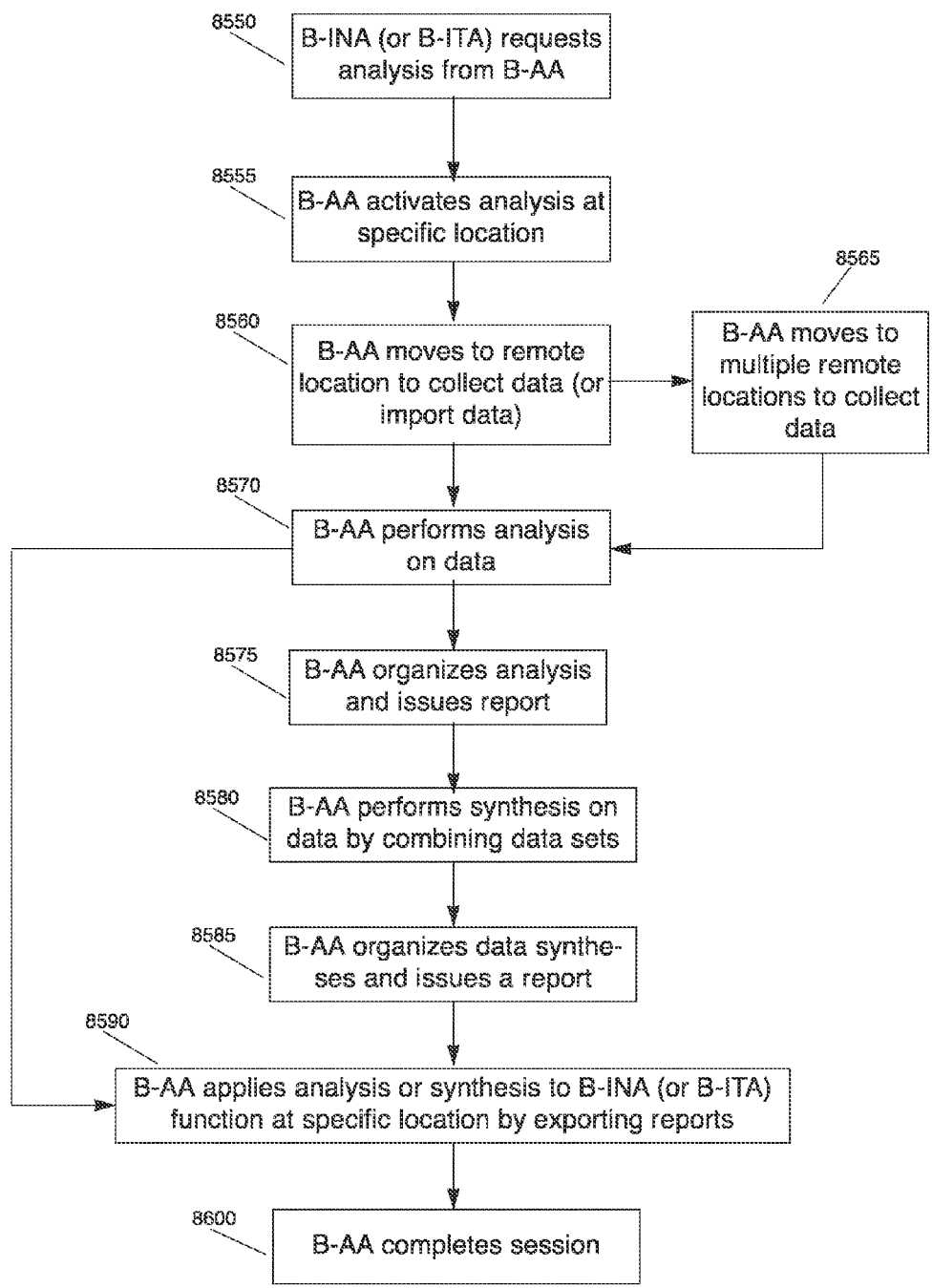

Fig. 87: Super-Score System: Negotiated Variables

1. Object Description – need reference to adaptable tables
2. Seller Description
3. Buyer Information
4. Buyer Credit Data
5. Finance opportunities – credit
6. Seller Promotions
7. Risk Management Options
8. Market Data on Multiple Sellers & Buyers

```
___  ___   ___   ___   ___   ___   ___   ___
 1    2     3     4     5     6     7     8
```

9. Industry Code
10. Unit Quantity
11. Unit Quality
12. Time to deliver
13. Bundling code – discounts
14. After Sales rating code
15. Quantity Code – each # signifies group category 1-100, 100-1000 etc.
16. Location of Negotiations

```
___   ___   ___   ___   ___   ___   ___   ___
 9    10    11    12    13    14    15    16
```

Fig. 88: Economic/Market Analysis Variables

1. Industry Code
2. Industry Analysis
3. Product Analysis
4. Need Index of average prices for each main sector – trends, changes
5. Prices relative to market averages
6. Intra-company analysis of products/services – scope, growth rate change, etc. analysis of data
7. Probability scenarios of industry company
8. Broad Market Analysis (as service)
9. Economic indicators

| 1 | 2 | 3 | 4 | 5 | 6 | 7 | 8 | 9 |

Fig. 89: Accountability Index System Variables

1. Bidding History
    a. % bid
    b. # of bids
    c. % of bids won
    d. # of bids won
2. Follow Up History
    a. # & re-negs
    b. # & returns
3. Credit History
    a. credit limit
    b. credit growth
4. Risk Factors
    a. fast changes outside
5. Flexibility ratio
    a. customer/seller as less rigid to accept deal
6. Tracking Pattern of Negotiation
    a. figuring into accountability index
7. Transaction Prior Experiences
    a. bidding history
    b. success
    c. problems
8. Follow through ratio
9. Accountability Index
10. Specify factors
11. Credit factors
    a. debt ratio to net worth
    b. paying on time
    c. use up to limits, floating debt
    d. credit limits
    e. # of accounts
    f. risk of default
12. Identify/authenticate agent/entity
13. Responsiveness to requests
    a. In time factor

Fig. 90: Financial Criteria Index System

30+ Digit Code

1. Net Worth
2. Income
3. Cash Flow
4. Level of Debt to net worth
5. Public records
6. Value of assets
7. How much credit limit is used
8. How often up to (or over) limit
9. Financial Criteria factors
10. Length of credit accounts
11. Credit Limit
12. Unsecured vs. Secured debt
13. Derogatory Credit – over limit past due
14. Number of moves
15. Frequency of Place
16. Final Index Number to put in Super Score

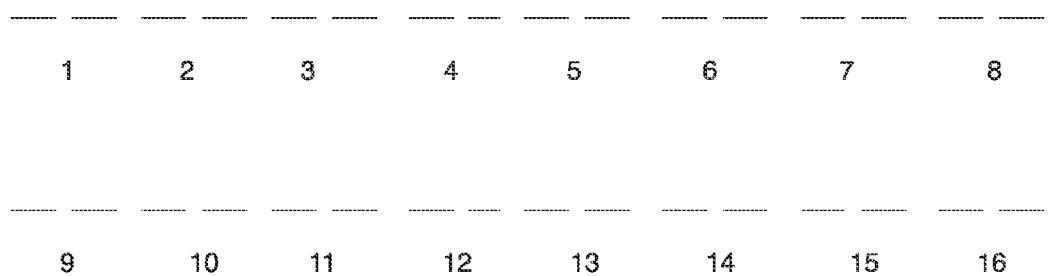

Fig. 91: Insurance Risk Factors

1. Use of Stats to establish rates
2. Kinds of losses specified
3. Claim-Adjustment Procedures
4. Claims Procedures
5. Errors
6. Omissions
7. Fraud
8. Accident
9. Premium Accounts
10. Limits/amounts of insurance
11. Full vs. Partial losses
12. Entity past record of claims
13. Costs of losses
14. Risks of specific events
15. Risk of limited loss
16. Risk of total loss

```
___  ___  ___  ___  ___  ___  ___  ___
 1    2    3    4    5    6    7    8

___  ___  ___  ___  ___  ___  ___  ___
 9   10   11   12   13   14   15   16
```

Fig. 92: List Of Services

1. ITA (Transactions)
    a. Actual banking services
    b. Aggregation (for better deals)
    c. Insurance
    d. Warranties
    e. Payment Processing
    f. Tax Collection & Payments
    g. Escrow
    h. Due Diligence
    i. Legal, tax, customs
    j. Compliance
    k. Accounting
    l. Shipping/delivery
    m. Delivery tracking
    n. Post-sale reporting
2. AA (Analysis)
    a. Economic analysis
    b. Market/industry analysis
    c. Company, product & service analysis
    d. Financial & credit analysis
    e. Accountability Indices
    f. Superscore
3. Risk Management Options
    a. Penalties for sellers not fulfilling by specified time
    b. Risk priorities – order of preferred risks
    c. Arbitrage penalties
    d. Option swaps (exchanging opposing kinds of risks)
    e. Dynamic pricing of risks based on peak/low risks environment
    f. MTO Penalties
    g. JIT Penalties
    h. Risk Sharing
4. Promotions (CSA)
    a. Discounts
    b. Aggregation (group discounts)
    c. Promotional guarantees
    d. Promise to provide item by specific time
    e. Quality increase offer
    f. Bundling products & services
5. Insurance Risk Management
    a. Liability (product/service, business, individual)
    b. Dynamic pricing based on peak risks
    c. E&O Fraud risks
    d. Risk of event loss
    e. Re-insurance – Insurance risk sharing
    f. Accident risks
    g. Degrees of losses
6. Financial Risk Management
    a. Credit analysis /buyer, seller
    b. Secured debt – kinds of assets
    c. Unsecured debt
    d. Structured fin.-by asset category (securitization of assets/debt)
    e. Packaging debt
    f. Packaging Ins. & Fin. Opportunities
7. Additional Services
    a. Bundling products &/or services
    b. Customized orders
    c. Mass-customization
    d. Just-in-time items
    e. Aggregation of bundles
    f. Arbitrage of items & bundles
    g. Computation resources
    h. Bandwidth resources

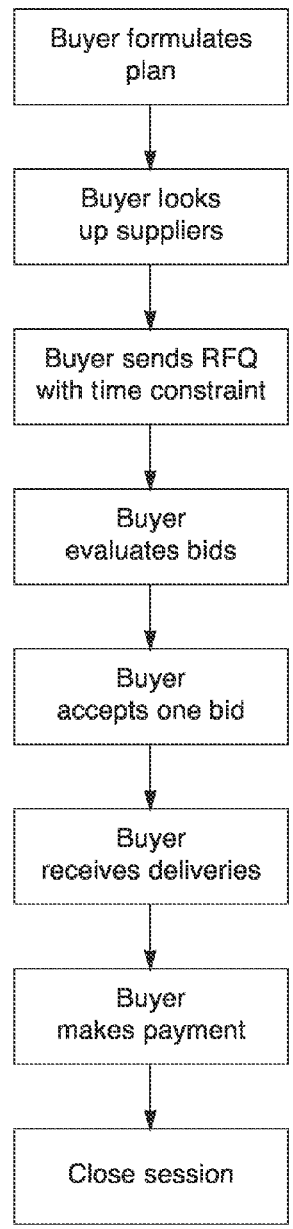
Fig. 93: MAGNET-Automated Contracting System

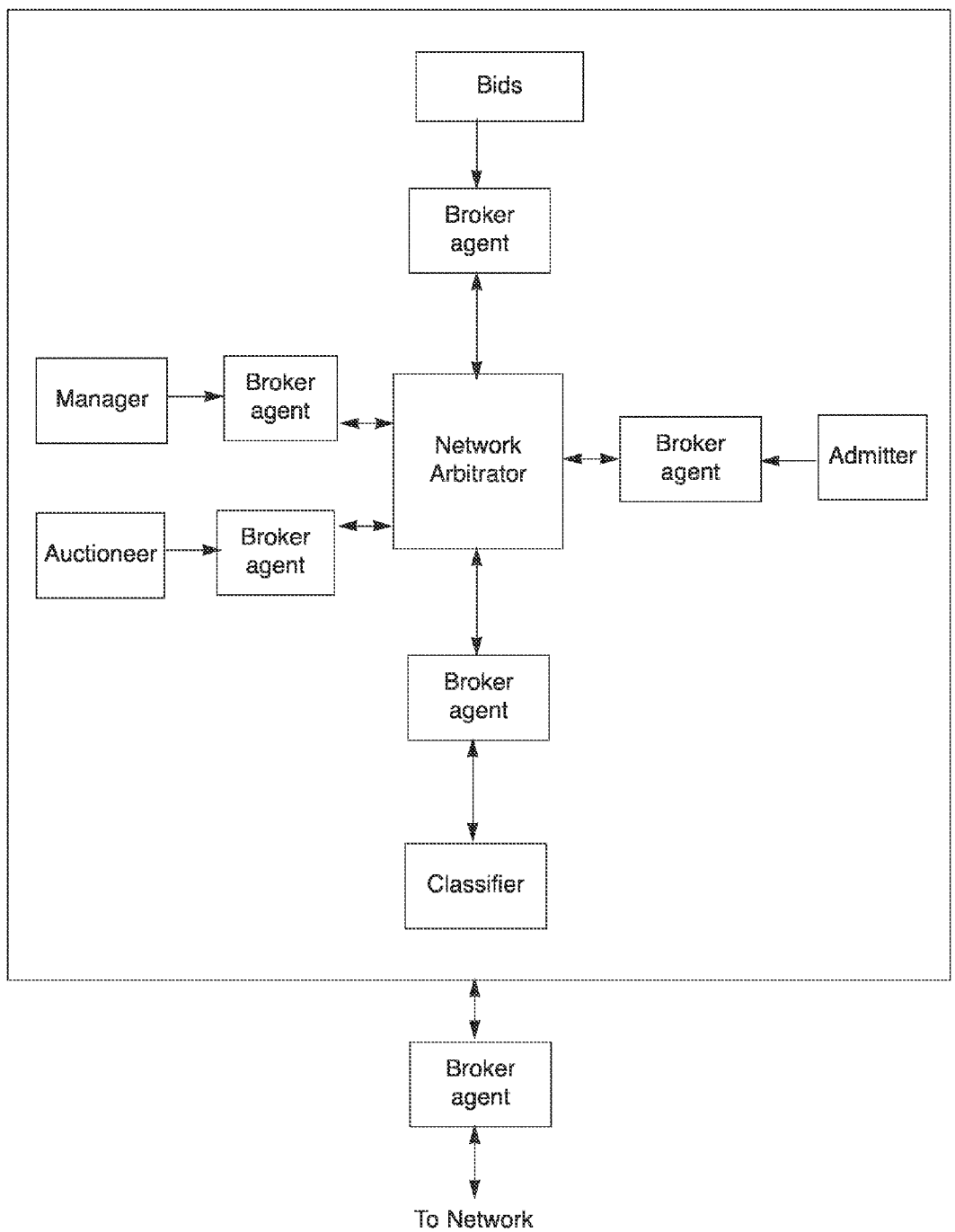
Fig. 94: Fishmarket

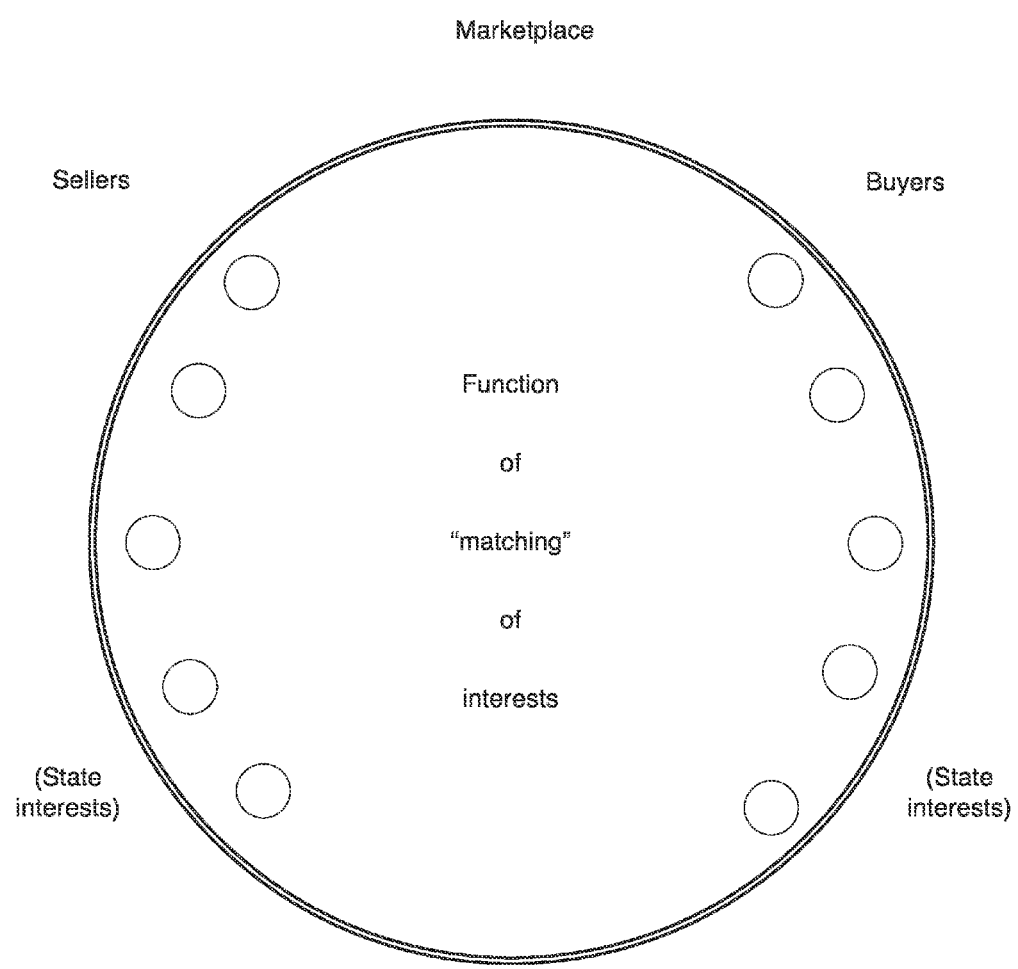
Fig. 95: Kasbah Marketplace

Fig. 96A: Tete-a-tete (I): Integrative Negotiation
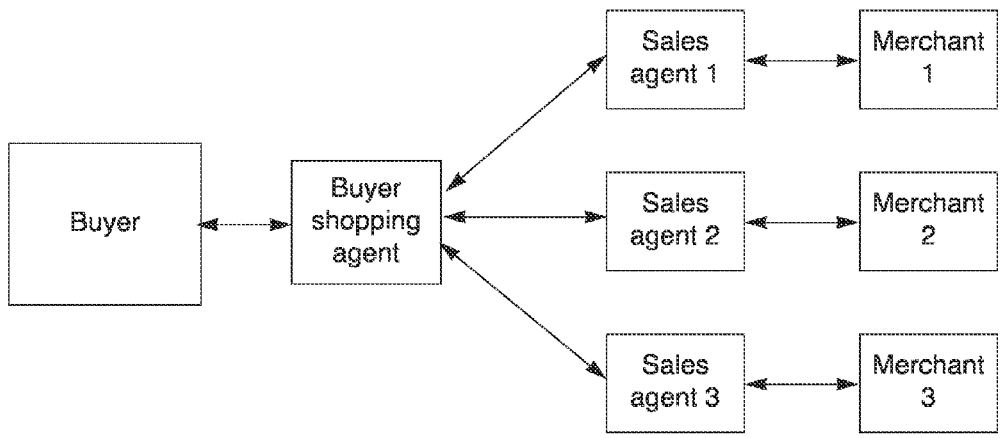
Fig. 96B: : Tete-a-tete (II): Bilateral Negotiation
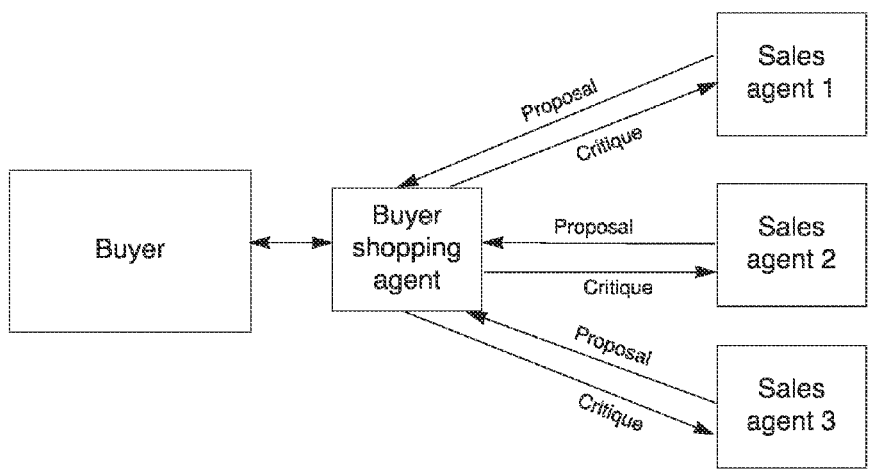

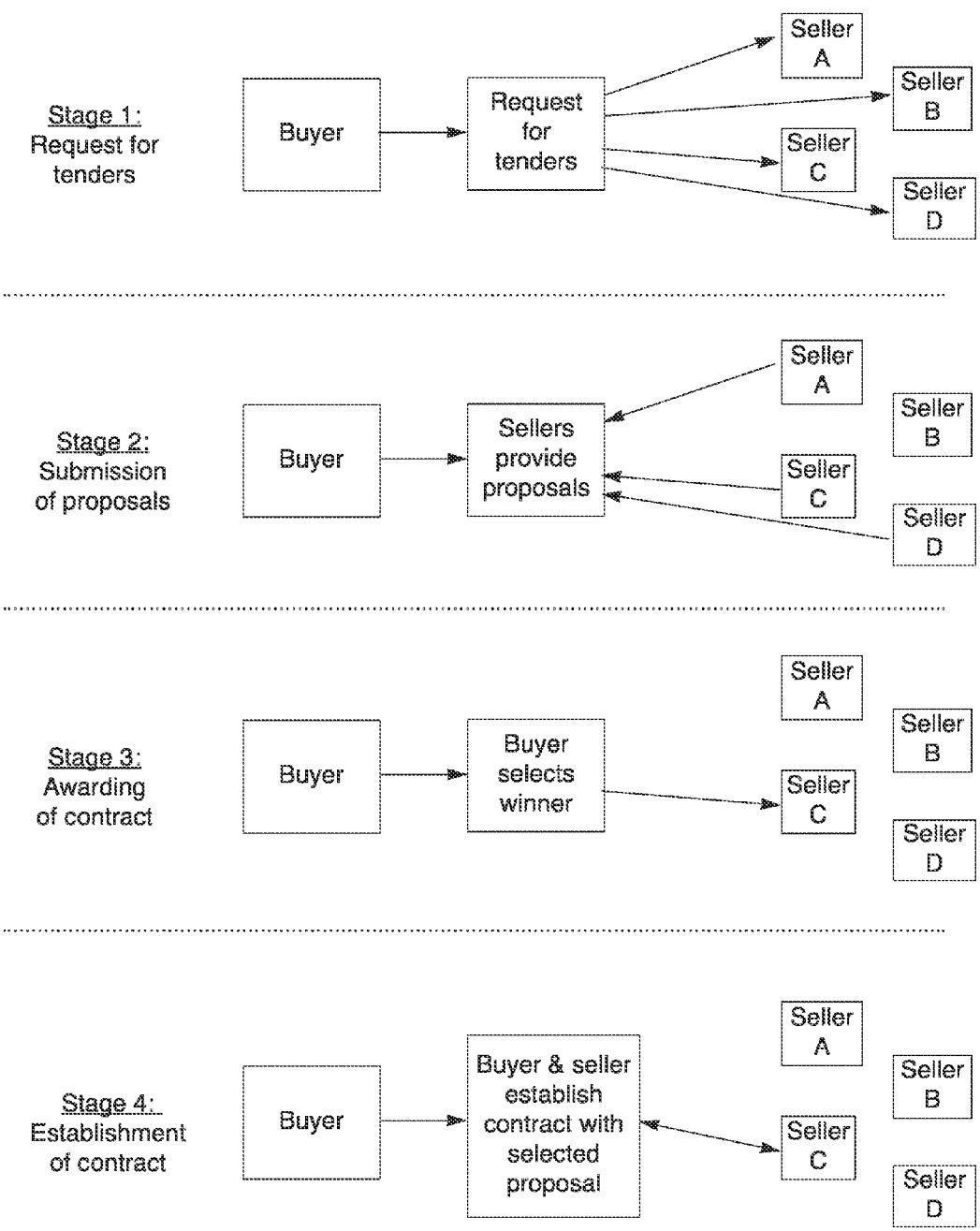
Fig. 97: Contract Net—4 Stages of the Contract Net

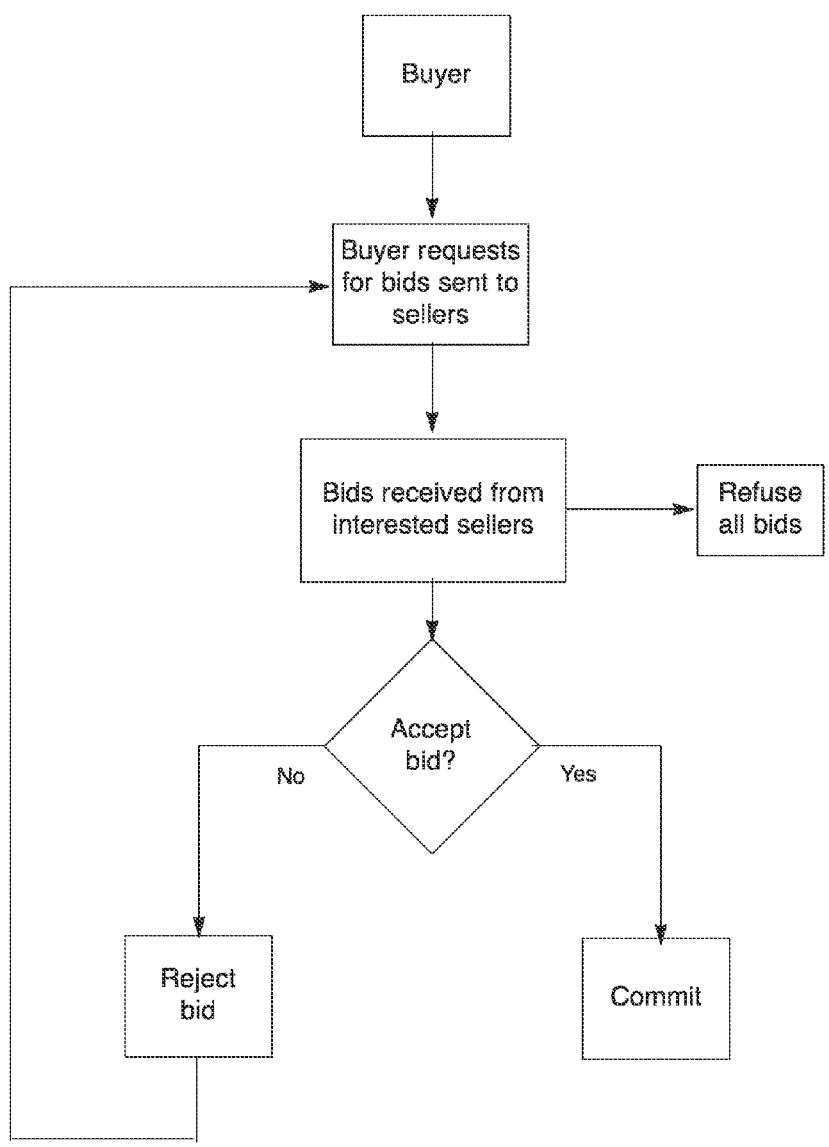
Fig. 98: Flow Chart Of Contract Net Protocol

Fig. 99A: EDI As A Paper Replacement Technique
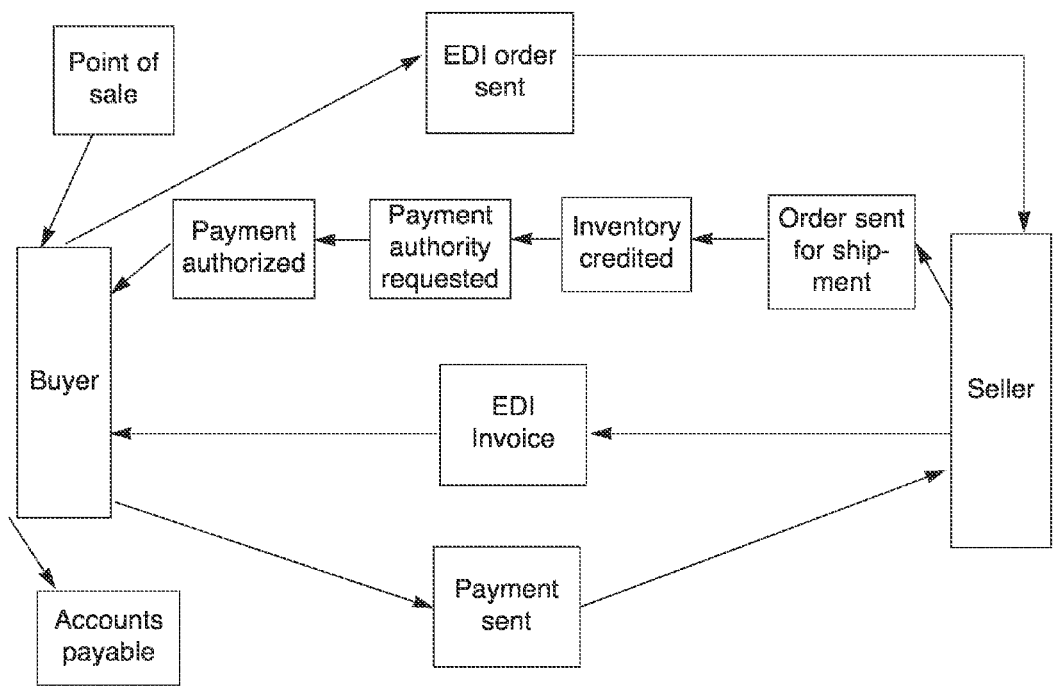
Fig. 99B: EDI As A Process Elimination Technique
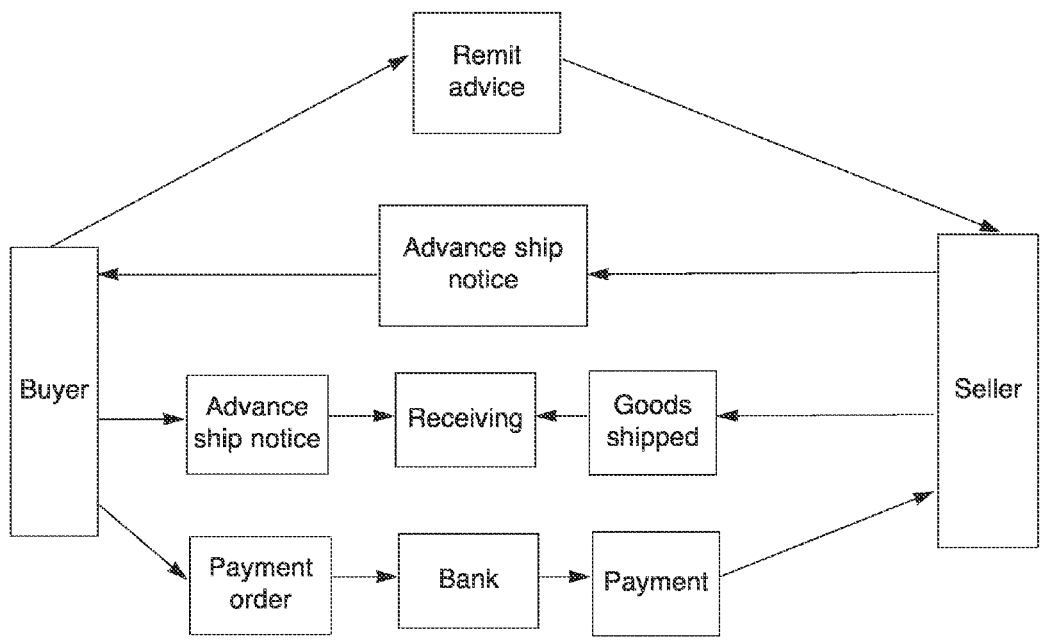

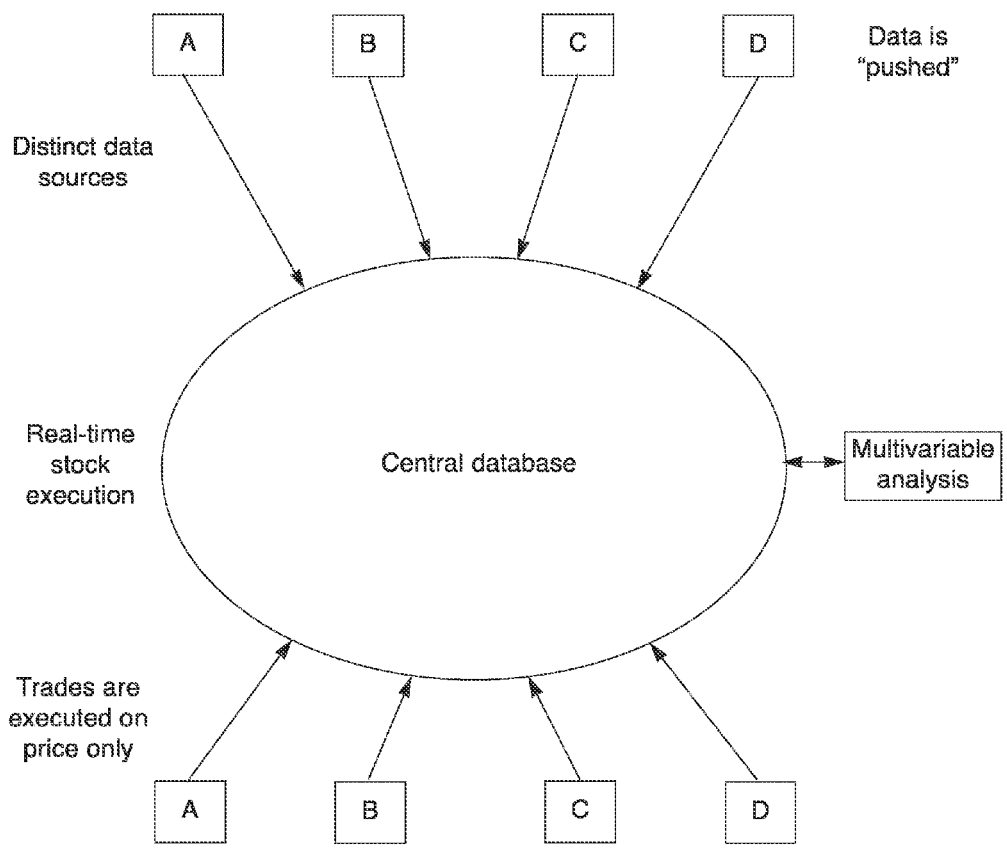
Fig. 100: ECN (Electronic Communications Network)

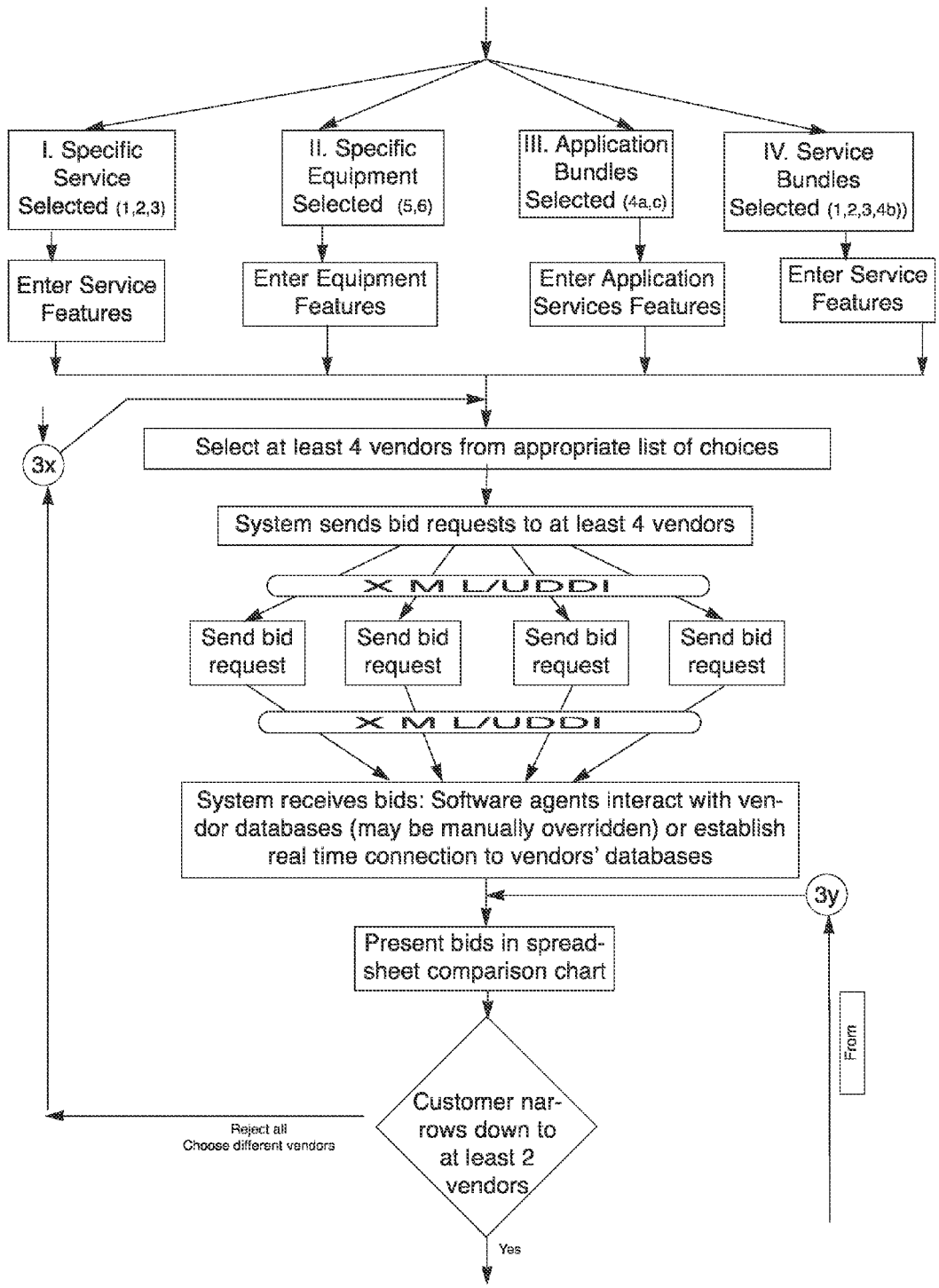

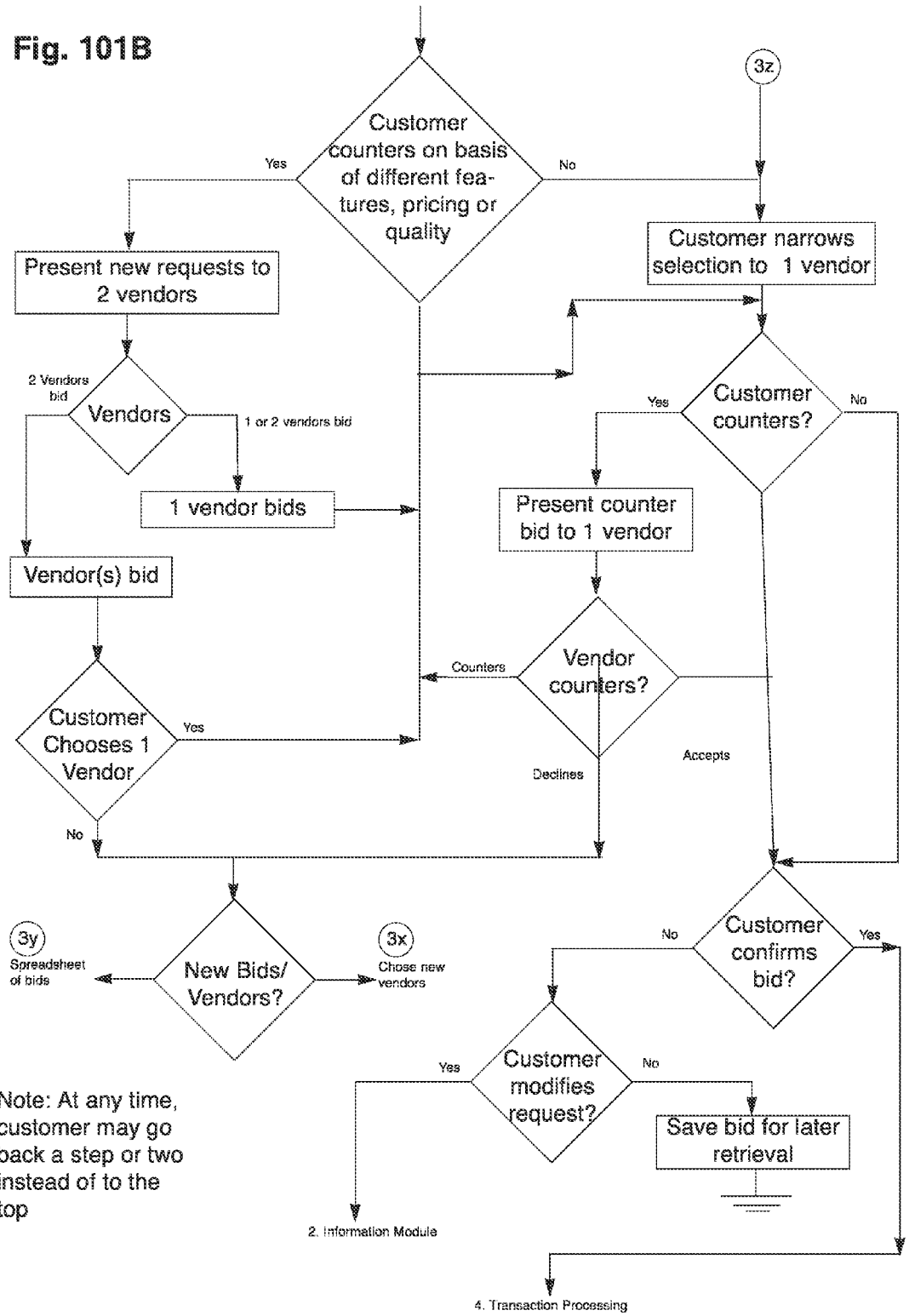

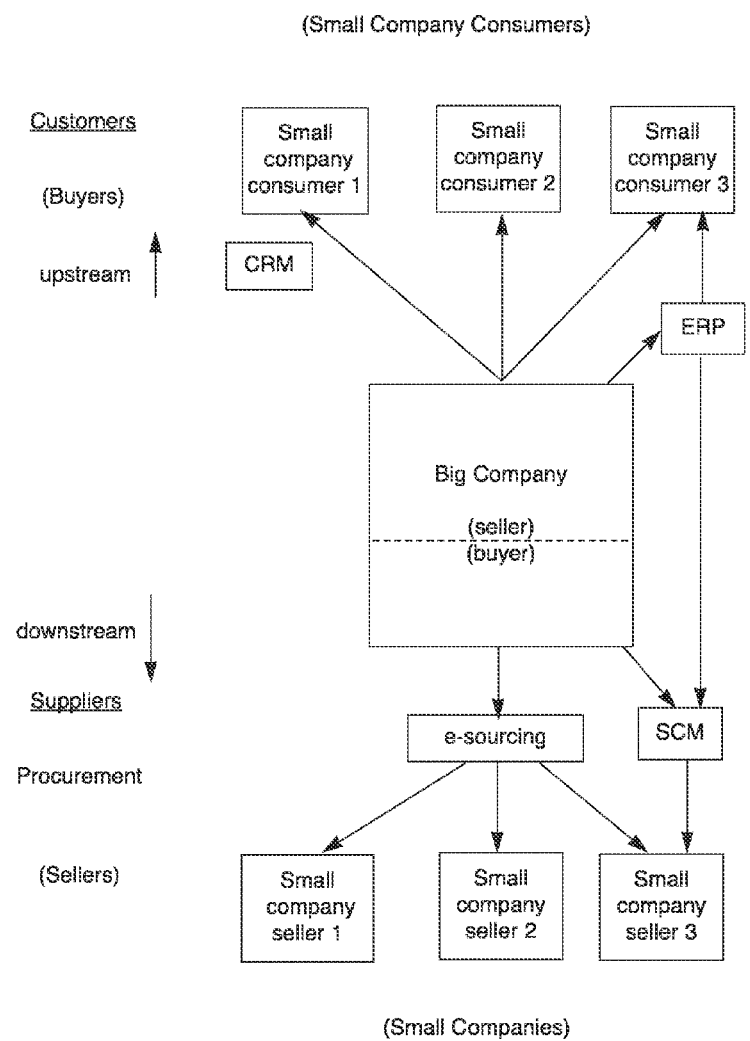
Fig. 102: Traditional Supply Chain & Customer Relationships

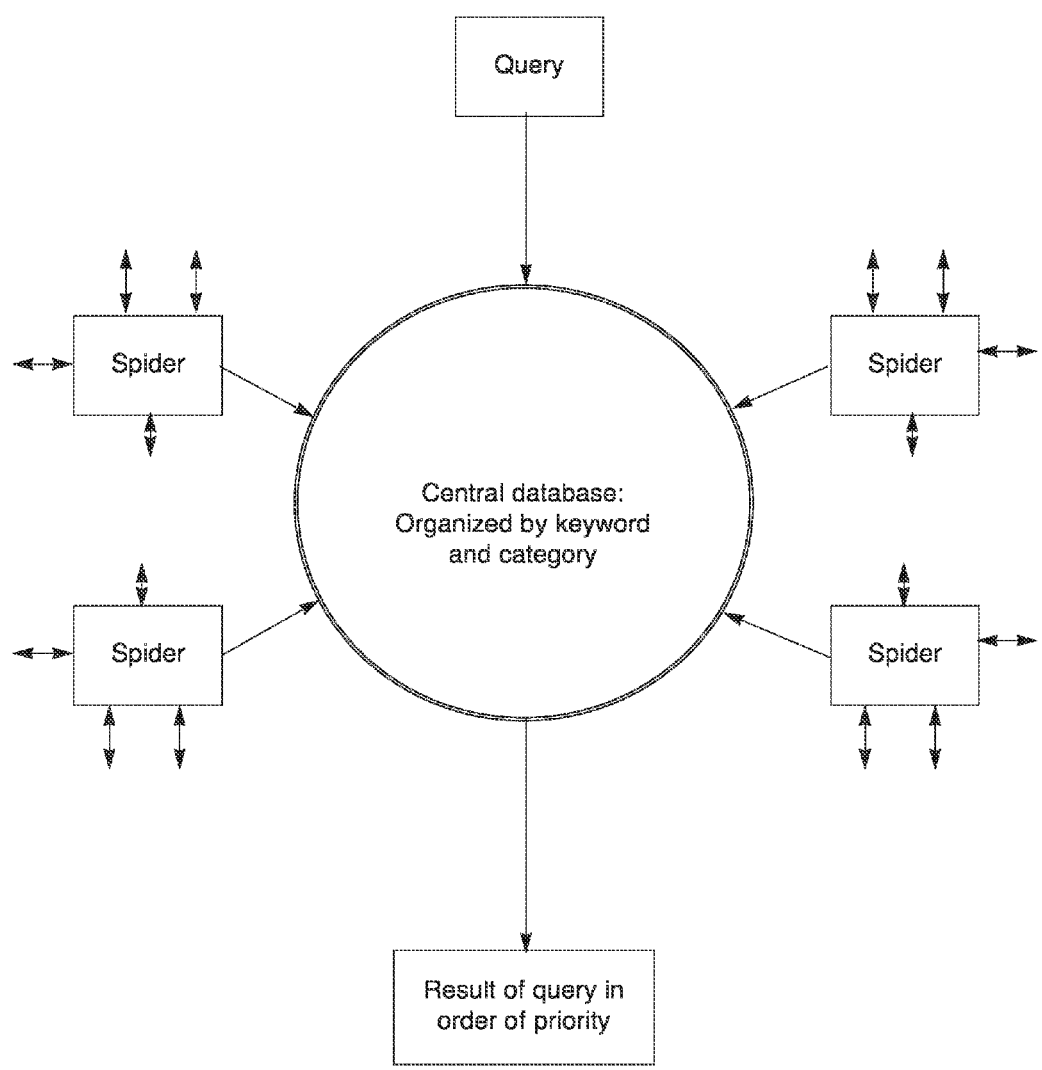
Fig. 103: Traditional Search Technology

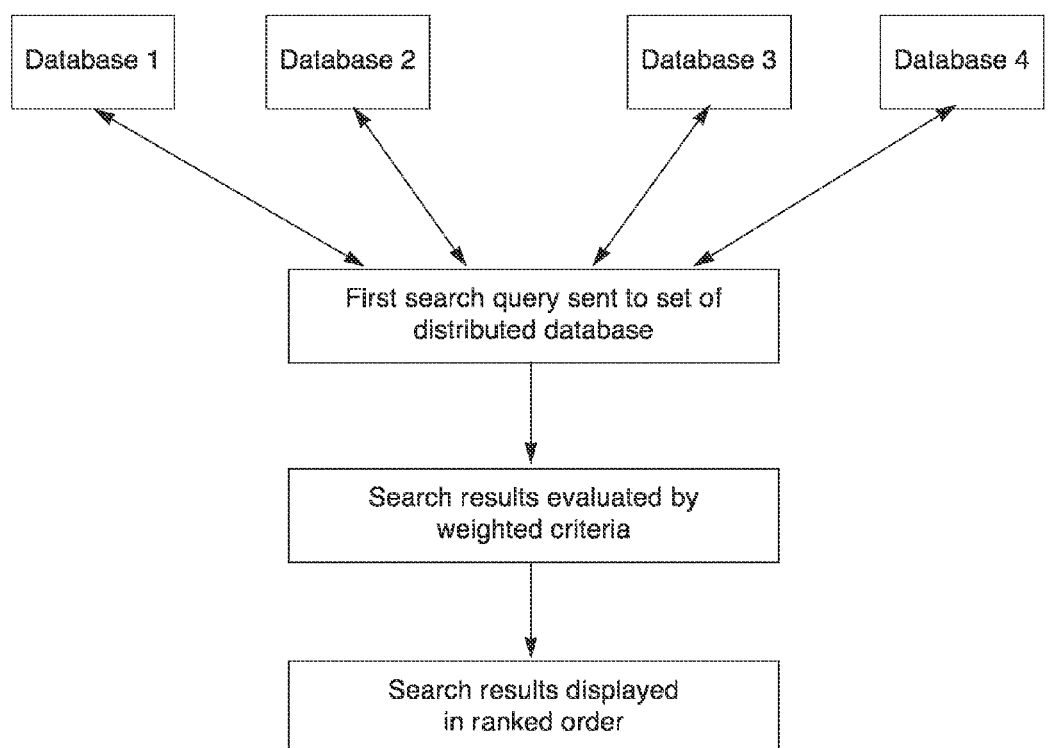
Fig. 104: Distributed Search Approach

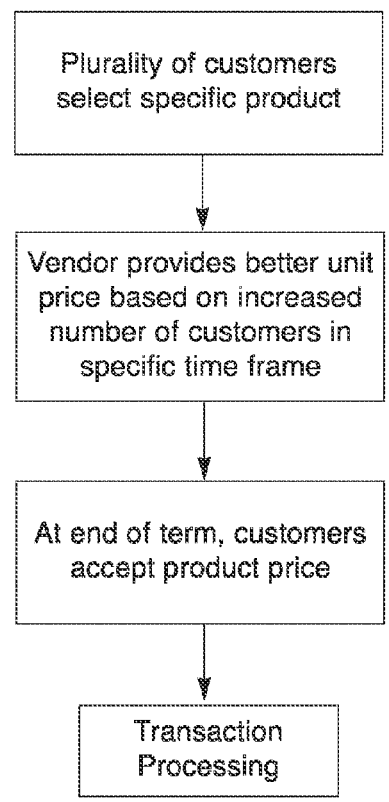
Fig. 105: Traditional Aggregation

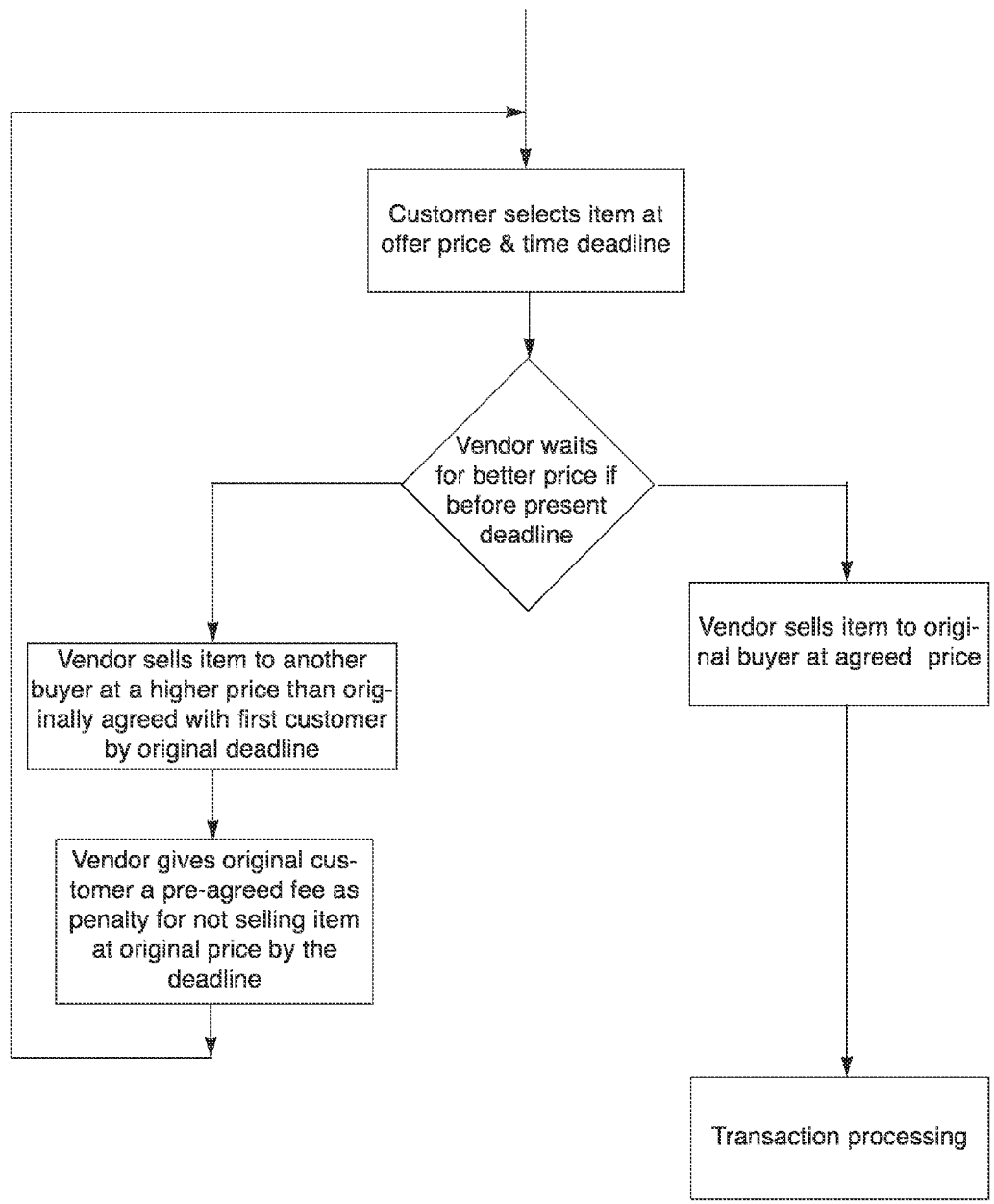

SYSTEM FOR INTELLIGENT SEARCH AGENT TO ACCESS DATA IN A DISTRIBUTED NETWORK

SUMMARY OF THE INVENTION

This application claims the benefit of U.S. Provisional application No. 60/162,932, filed Nov. 1, 1999 and U.S. application Ser. No. 09/705,178, filed on Nov. 1, 2000, the disclosures of which are hereby incorporated by reference in their entirely for all purposes.

FIELD OF THE INVENTION

The invention relates to an integrated automated commercial system and the apparatus and methods thereof. In a distributed computer network environment, novel databases, data search approaches, data mining, data analysis and data synthesis methods are used to provide a system for conducting disintermediated, point-to-point electronic commerce. Rivers of data are continuously automatically analyzed, and data is selected for inclusion in marketing promotion-driven showcase databases. Buyer driven search queries initiate the commercial negotiation process by which multiple sellers simultaneously compete for orders in a multivariate way (beyond price alone). Prospective buyers and sellers may collaborate prior to an initial search petition.

The system uses intelligent mobile software agents to analyze, search, negotiate for and complete commercial transactions. To retain independence, the agents are endowed with complex adaptive artificial intelligence capabilities. In one embodiment, Intelligent Negotiation Agents (INAs) cooperate or modify so as to provide commercial sales aggregation or arbitrage capabilities. Custom search and custom production capabilities are also implemented, thereby allowing increasingly efficient made-to-order services.

The interaction of specific-function agents in the multi-agent system (MAS) operates within the distributed database system, one embodiment of which includes vertical industry cooperatives [cooperative communications networks] (CCNs). The interaction of, among other things, analytical agents (AAs) with INAs and intelligent transaction agents (ITAs) and of INAs with ITAs creates a complex commercial system that emulates self-organizing commercial relationships with enhanced efficiencies.

The cluster of inventions comprising the present system represents the consolidation of solutions to large economic systems integration problems.

BACKGROUND OF THE PRESENT INVENTION

The emergence of the Internet has caused a shift in the methods of commercial activity towards automated purchasing, marketing, sales and distribution of products, services and bundles. The automated aspects of electronic commerce allow a one-to-one relationship between seller and buyer as compared with the traditional mass production and sales approach. However, most electronic commerce sales systems resemble simple catalog sales or intermediated exchange: Neither of these main approaches satisfies the ideal of automated commerce.

What is needed is a purchasing, sales, marketing and production system that emulates the way customers actually buy and manufacturers produce goods and services. By mirroring the economic psychology of buyers, a system can be developed that (1) is demand-based, (2) sets up a seller-side competition for buyers, (3) uses multivariate negotiation processes, (4) uses interactivity, (5) is information rich, (6) exploits systemic adaptivity that learns from data analysis and synthesis, (7) facilitates buyer aggregation and (8) employs customization. Applicant is the inventor of a system (Solomon, PCT WO 01/33464 A1), which performs these functions primarily in a centralized way (i.e., using intermediation processes, such as exchange or auction), but no system does so in a disintermediated way. The challenge of automated commercial operations is to develop such a disintermediated electronic commerce system. The present invention addresses these problems in novel and non-obvious ways.

The present invention derives from the convergence of several technologies involving distributed computing systems and multi-agent systems.

The evolution of the Internet, particularly the World Wide Web (Web), emerged as a distributed computing medium in which independent computers can access information by using browser or e-mail communications software. But the main uses of the Internet in e-commerce have focused on intermediated transactions. For consumers, most transactions resemble an electronic catalogue sales system, while for businesses most electronic transactions occur at a centralized portal or exchange.

However, a new generation of distributed database architectures is emerging with promising commercial applications. One prominent example of a new decentralized database structure that is organized for disintermediated information exchange is the GRID. Originally patterned after the electric power grid, which can move electricity from point to point, the GRID is intended to use distributed database architectures for large bandwidth applications such as supercomputer data flows.

These new distributed database architectures allow new data search and analytical methods. Traditionally, search engines have accessed large central databases that accumulate and structure the collection of data over a period of time. These technologies are limited to relational database structures, and restricted in analytical complexity. The new search technologies overcome these problems by exploiting distributed computing architectures and object-relational data structures.

Traditional data mining techniques have employed pattern recognition and statistical modeling algorithms in order to organize and assess large pools of data. One outcome of the use of data mining has been in the area of collaborative filtering where recommendations are made to customers on the basis of inferences of other customers' similar interests. But a new generation of artificial intelligence technologies provides the ability to produce complex data analyses and syntheses that reveal more accurate predictions because they adapt to changing circumstances. By integrating data analysis and synthesis tools with search and transaction tools, these recommendation and predictive capabilities are more useful.

Businesses have for decades tried to automate their internal computer and communications systems in order to improve efficiency and promote competitive advantages. One of the first attempts at business automation involved the use of "electronic data interchange" (EDI). EDI was a precursor to electronic commerce because it set up a system for businesses to communicate electronically in order to complete and track financial transactions. Most of the transactions used by EDI systems are financial, dealing primarily with payment processing. EDI simply automates paper processing of payment notices, remittances and receipt records, directly between companies.

A technology that is emerging to succeed EDI involves a new programming language—XML—and business registry—UDDI. These new technologies allow a more robust communication between businesses because products, services and bundles are indexed and catalogued for direct access. Though more robust than EDI, XML/UDDI systems are merely passive information-based formats that link businesses, similar to the yellow-pages.

Technologies to connect machines and people have been advanced by the advent of graphic user interface (GUI) technology applied to PCs through advanced operating systems. In addition to simpler GUIs, translation software has been used to bridge the gaps between different software applications. The development of a new generation of inter-agents that interface with human users and computer programs is a key evolution towards simpler, yet more powerful commercial transactions.

Multi-Agent Systems (MASs) are not new in academic circles. The attempt to develop MASs in distributed computing environments has been active for over a decade. With the increased automation of business computing systems, MASs have reshaped the factory floor, securities trading systems and complex communications networks. With the advent of AI technologies, most prominently GP, GA, NN and FL, MASs have emerged as a reborn technology category for computer scientists.

One of the most practical uses for MASs applies to negotiation systems. The development of the "contract net" (k-net) system for distributed problem solving acts as the pioneer idea for mediating distributed computer encounters, particularly for efficiently dividing limited computation resources in a network. Building on the k-net platform, prominent based market models for transaction negotiation include the Fishmarket, the Michigan AuctionBot, Tete-a-tete and SWARM. These systems attempt in different ways to model contracting processes so as to facilitate commercial transactions.

In addition to these transaction models, a subset of the computer science academic literature describes coordination of agents in a MAS. Organizing cooperating intelligent agents is a key challenge of computer science, because it involves calibrating rules that provide neutrality to the coordination (typically of buyers) in complex self-organizing systems.

Though there are automated systems that emulate manual transaction processes, most approaches merely represent evolutionary progress in the field. E-commerce approaches seek to integrate post-sale systems with payment processing and CRM systems. This is necessary to complete and track transactions and to develop and enhance personalized customer relationships in a single centralized system. Even more advanced automated systems can more fully integrate complex marketing and financial processes into the transaction system. Further, the transaction system can be part of a unified system that includes data analysis and synthesis and negotiation processes.

SUMMARY OF THE MAIN EMBODIMENTS OF THE INVENTION

The present invention consists of two interdependent systems: (I) A network operating system for databases, database search, data analysis and synthesis, database inter-agents and data collaboration, and (II) A multi-agent system for negotiation and completion of transactions between parties.

The first system consists of Cooperative Communications Networks (CCNs) that are comprised of (primarily vertical) industry participants. Participants use database showcases to stream data on products, services and bundles, continuously in real time. Showcase databases use showcase inter-agents to automate the item selection process; such inter-agents access analyses of market trends and behavior to make item selections for inclusion into a showcase. In additional embodiments, CCNs may be horizontal or customized: Such configurations can be buyer biased, such as a very large corporation automatically sourcing vendor orders.

Showcases are accessed by commercial search agents (CSAs). Because the showcases of each vertical industry are continuously updated, the search process is both fast and accurate. The CSA uses information obtained from data mining processes to focus the search request. The CSA acts as an initial commercial search query in most cases. Further negotiation processes follow the initial search after ranking search results according to buyer priorities. CSAs can make requests based on numerous variables beyond price alone.

Detailed information on customer and seller accountability in addition to promotions, such as time-sensitive offers, and risk management options (RMOs) are provided at the showcase and CSA levels for more informed and accurate searches and for maximized commercial opportunities.

In order to establish a system to acquire customized items that are not included in showcases, a collaboration process occurs between buyer inter-agents (B-IAs) and seller inter-agents (S-IAs). This process integrates with a made-to-order (MTO) sourcing system in which item specifications are indicated by a B-IA to at least two S-IAs. After being informed by their respective AAs, the IAs provide specific data pertaining to the buyer item specification request. By allowing at least two competing sellers to provide item specifications on substitutable competitive items that satisfy minimum buyer standards, a comparable item competition can occur. An interaction between a B-IA and S-IAs can occur in order to clarify the item specifications prior to the bidding process. Once sellers respond with items that satisfy buyer specifications, the process proceeds to the CSA for the commencement of the initial pricing and bidding processes. The MTO collaboration process effectively bypasses the showcase database system, but integrates with the MAS.

Analytical agents (AAs) are employed at the database system level for data mining, data analysis and data synthesis. AAs get continuous data inputs of general economic and market trends as well as company and product/service information. AAs have several functions, including making recommendations by using advanced collaborative filtering techniques. In addition, AAs synthesize information in the form of producing customized reports. Furthermore, AAs access services such as credit and accountability indices, finance and insurance opportunities, RMOs, promotions and computational resources. Such information breadth makes AAs an integral data computation resource for other agents in the system, most prominently ITAs and INAs.

AAs use Evolutionary Computation (EC) technologies in order to develop economic scenario forecasts. To do this, genetic programming (GP) approaches are used, as well as genetic algorithms (GA) and neural network (NN) methods, that compare the constantly changing market conditions with customer preferences and provide adaptive real time analysis and customized advice.

Because they are organized in vertical industry cooperative communities, cooperative communications networks (CCNs) are maintained by participating sellers. CSAs are free for basic services but can access AA services. AAs have various levels of services that are accessible by users for supplemental fees.

In order to conduct searches and to perform negotiations and transactions, the system uses codes to transfer information. These codes may be processed using languages such as the extensible mark-up language (XML) and registries (UDDI, RDF) as well as proprietary information exchange methods (SOAP). Some of the mobile program codes are written in the Java, Java 2, Java Beans, Jini, C++, C# and other languages.

Inter-agents are used to perform functions between human and machine. For instance, showcase (or seller) inter-agents (S-IAs) automate the continuous updating of showcase databases. Buyer inter-agents (B-IAs) are also used to interface between users and their CSAs and INAs.

The multi-agent system (MAS) is the core system and process for the negotiation and completion of transactions. The MAS consists of intelligent negotiation agents (INAs) and intelligent transaction agents (ITAs). INAs have buyer (b-INA) or seller (s-INA) roles; similarly, ITAs have b-ITA and S-ITA roles.

Once a CSA has initiated a search query for information (and promotions) to CCN showcase databases, at least two s-INAs respond with an initial ask price, as well as alternative prices for different product or service features, quality, quantity, delivery times, etc. The buyer may request bidding information about bundles of products and services as well as individual items. After a pre-negotiation session that sets the terms for the negotiation sessions, the multivariate negotiation process commences once a b-INA is launched to interact with the s-INAs. The multilateral negotiation process occurs when the b-INA negotiates with multiple vendor s-INAs simultaneously. Such INA interactions may occur in parallel at buyer or seller locations. Multiple sellers are eventually limited to two sellers per session until ultimately one is selected by the buyer.

Because b-INAs initially negotiate simultaneously with at least two s-INAs, and because the INAs are mobile (and cannot be in two places simultaneously), in order to overcome latency lags b-INAs launch micro-agents that complete simultaneously interactive negotiations with multiple s-INAs INAs use negotiation, auction and pricing strategy modules to establish, modify, evaluate and respond to bids. Further, specific approaches are used to conceal negotiation strategies, particularly time-based methods. Additionally, INAs can employ various "personalities" on a spectrum of attitudes in order to accelerate or decelerate the negotiations.

INAs are informed by AAs, which provide data analysis and synthesis functions, such as collaborative filtering-based recommendations, scenario forecasts and trend histories, that are crucial for effective negotiations.

INAs themselves employ artificial intelligence (AI) technologies. These autonomous agents use evolutionary computation methods in which computer programs learn and adapt to the changing commercial environment. The main evolutionary computation approaches include GPs, GAs and NNs among others. Because they are evolutionary, they use principles of "natural selection" in which they conduct runs of untested programs against successful known computer programs and criteria for program improvement. Such evolutionary programs constantly adapt within the constraints of time and computation resources. Evolutionary computation can be layered so as to maximize computer resource efficiencies in such a way that simpler tasks require minimum computation resources and maintain maximum mobility, while complex tasks employ increased computation resources.

The use of artificial intelligence by INAs produces autonomous agents and self-organizing commercial systems. To provide an analogy of INA operation with AI, the multi-agent system resembles a road system with various autonomous cars operating simultaneously. The AI uses recognized rules for cars to interact, yet provides enough independence between each autonomous vehicle that all functions are not pre-destined. Each car has its own endowments of power and efficiency as well as starting and destination points in space and time. Each, however, operates both within the limits of varying roadways and road conditions. The overall system operates according to rules that allow an optimized flow of mobile activity. Yet, because agents have complex and changing priorities, they have varying associations. Taken together, the agents create a dynamic system that adapts as conditions and priorities change.

Negotiation agents operate in a computer system by sending program code and data between machines to fulfill a goal of completing a transaction. However, there is an additional layer in which the INAs are mobile. In this embodiment, the negotiation agents themselves move between machines. Negotiations can occur between agents at specific locations, at multiple locations or between alternating locations. INA mobility involves replicating program code, satisfying security protocols, pruning program code for increased mobility, retrieving layers of AI computation resources when needed, integrating essential database functions and accessing updated programming instructions from a home port. Mobility has numerous advantages for participants, including efficiency enhancements and operation in a system with communication constraints.

Cooperative INAs (c-INAs) are comprised of groups of buyer INAs that band together in various ways in order to negotiate optimal deals. There are three types of c-INA applications: (1) neutral brokers used for intermediation, (2) aggregation of buyers and (3) multi-item bundles. There are various complex ways of using C-INAs for buying and selling combinations of items. In one of these functions, C-INAs can be used for the aggregation of buyers for the acquisition of multi-item bundles that can be customized so that specific items in each customer package are individually tailored. C-INAs allow the disintermediation of a wholesale layer in the distribution and production system by streamlining the sales process and by also providing discount buying power.

Like INAs in general, c-INAs are typically either buyer- or seller-biased. B-C-INAs emphasize aggregation operations. On the other hand, S-C-INAs are used as sellers must provisionally cooperate in order to calculate buyer values, particularly for the purpose of selling combination item bundles.

Pre-established multi-item bundles, such as a pre-configured combination of computer hardware and software, can be treated as a single item for the purposes of this system. On the other hand, open bundles consisting of multiple items, require the selection of the buyer to assemble, and involve much more complex negotiations. Historically, multi-item bundle bidding has emphasized the sale of multiple items from one seller to multiple buyers (such as an FCC spectrum auction). Despite the difficulty of complex calculations to select buyer bidders, the present system accommodates both a single buyer bidder with multiple sellers as well as multiple buyers (during and after aggregation) with a single or multiple sellers. By cooperating, multiple sellers (using c-INAs) can behave as a single seller strictly for the purposes of calculating buyer bids, and thus determining the appropriate multi-item bundle buyer winner(s). The present system applies combinatorial auction processes to a unique commercial implementation of a multi-agent system.

Dynamic INAs (d-INAs) are double agents that switch roles from buyer to seller and vice-versa. D-INAs are used for arbitrage functions in which products, services and bundles are bought and sold at different locations for an immediate profit. In these instances, information currency is critical, so AAs are particularly important.

INAs interact with intelligent transaction agents in order to obtain information necessary to complete transactions. ITAs interact with AAs in order to analyze and synthesize both general economic data and specific buyer/seller information. Once ITAs clear a transaction, for example, with a credit check or financing approval, the negotiation can be completed.

The interaction of specific time-sensitive functions occur in sequential order with the use of different appliances until the teams goal is completed; multiple functions may be processed simultaneously, with different orders at different times, so varied orders of completion will occur. In general, while maximum temporary efficiencies do exist, there is not necessarily a single way to prepare all of the projects to satisfy orders via the processing of specific operation sequences.

ADVANTAGES OF THE PRESENT SYSTEM

There are numerous advantages of the present system over earlier technologies. These advantages involve (1) distributed database architectures, (2) database search methods, (3) automated collaboration methods for electronic sourcing, (4) evolutionary computation-based data analysis and synthesis applications, (5) the use of AI in negotiation systems, (6) marketing and financial services network integration, (7) multivariate and multilateral interactive negotiation processes in a distributed network environment, (8) item customization, (9) mobility processes of INAs, (10) complex negotiation and auction approaches, (11) bidding for products, services and bundles using dynamic pricing approaches and, finally, (12) aggregation and arbitrage capabilities in a distributed network. Taken together, these system and method advantages confer sustainable competitive advantages for commercial participants by enhancing efficiencies and productivity and by optimizing costs.

The distinctive use of showcase databases in vertical industries automates processes in which rivers of data are continuously analyzed and selected. The search agent (CSA) is fast and accurate as it assesses the distributed network in each vertical CCN because each showcase is constantly replenished and updated. Consequently, the system adapts rapidly because prices change continuously based on market factors. Such a system is especially well suited for revenue management in which prices are dynamic for high peak and low peak times. In addition, since the distributed system adapts to changing prices, the system architecture has self-organizing aspects similar to trading bazaars. Finally, the system architecture is designed to integrate into supply chain management (SCM), enterprise resource planning (ERP) and customer relationship management (CRM) software systems.

CSAs also integrate with promotions and risk management options (RMOs) to invite customers with incentives such as time-sensitive promotional opportunities. This marketing integration mirrors how commercial systems actually work, but is missing in prior systems. For example, products may be bundled with services (financing, warranties, insurance, etc.), product features may be upgraded, or delivery time accelerated, in order to benefit unique buyer preferences. Further, proximity marketing is integrated with mobility in a MAS by providing time sensitive promotional opportunities to agents at a particular place. This advantage provides a bias to promoters that can use greater computation resources at their preferred location in order to maintain competitive advantages in negotiations.

Analytical agents (AAs) go beyond the typical pattern recognition and data mining tools. By using new generation evolutionary computation (EC) technologies, AAs are powerful AI applications that inform and integrate with CSAs, IAs, INAs and ITAs. AAs process complex data analyses and syntheses to increase system efficiencies. AAs are the eyes of the system, while GP is the brain. Because they use AI and evolutionary computing processes, the system actually "thinks." Consequently, AAs can anticipate market changes based on scenario forecasts. The ability of AAs to adapt their programming to accommodate changing market situations is a critical step forward in research capabilities. This goes far beyond limit-order type securities program trading that previous computer exchange technologies have employed.

Inter-agents intermediate between agents, on the one hand, and, on the other, between human and machine in novel ways. These unique applications provide the advantages of system integration and modularity.

The negotiation-enabled MAS is intended to produce a computational system that mirrors the complex commercial psychology of markets. In essence, the system develops a process that emulates intuitive methods for commercial procurement. Thus, businesses and consumers can conduct commercial activities the way they prefer, namely, by employing direct contact approaches. For example, specific users employ regular patterns of commercial behavior. Hence, project-driven transactions can evolve into long-term business relationships. The automation and efficiency aspects of the commercial negotiation and transaction aspects of the MAS increase value in the supply chain.

INAs provide disintermediated and automated negotiation in a distributed environment that emulates ordinary commercial relationships. Further, the INAs use multivariate negotiation beyond merely price alone leading to a far more robust negotiating environment. INAs promote competition between sellers, thus enhancing market efficiencies for buyers, by using simultaneous multilateral negotiation techniques. INAs go beyond earlier systems not only because of their integration with AAs, CSAs and ITAs but because they use AI applications. By using EC technologies—such as GP, GA and NN as well as integrated negotiation, auction and pricing strategy modules—INAs behave more independently than earlier systems. Negotiation session parameter selection is enhanced by intelligent agents endowed with "judgment" for promoting optimal commercial trading processes. Such autonomy is particularly suited to the dynamism of the distributed database system.

C-INAs further empower customers by allowing both aggregation and complex multi-item sales. Computational systems that use aggregation resemble multiplayer commercial markets because such processes use global information to benefit both buyers and sellers. In addition, d-INAs allow intermediary-free arbitrage that facilitates complex shifting trading role-playing. Such applications represent a dramatic leap beyond current intermediated business-to-business exchanges.

Marketing and financial services are integrated into the system in novel ways. Marketing opportunities are integrated with showcases, AAs, CSAs, INAs and ITAs by accessing constantly updated promotion modules. Marketing services include promotions, proximity and wireless marketing opportunities, RMOs, transaction contingencies and time-sensitive offers. Financial services include accountability and credit reporting, banking offers and insurance, warranty and other risk analysis and risk limiting opportunities. Finally, AI requires robust computation resources, which are provided as layered services. By cross-selling these dozens of specific services continuously in the distributed network environment, the system is flexible, scalable, pragmatic, integrative, self-organizing and effective. These services are sold in layers as needed by customers.

Lastly, agents operate in a distributed MAS with autonomy and mobility because they apply AI methods in a demand-initiated negotiation process. Mobility has several advantages in the present system, including (1) communications failsafe in the event of interruption, (2) less cost because of enhanced efficiency, (3) reducing lags in negotiation by eliminating communication latency and (4) providing the neutrality of a level playing field between buyers and sellers in order to overcome bias.

IMPLICATIONS OF THE PRESENT INVENTION

In general, by providing information and analytical tools, the system provides both buyers and sellers with a shorter learning curve in making and processing transactions, as well as greater diversity of choice. The system thereby promotes increasingly fair and efficient transactions. Since the systems database architecture is a "co-op," it is maximally neutral and transparent to both buyers and sellers.

For sellers, the system provides increased market reach, increased efficiency and, consequently, tighter production cycles that contribute to reduced inventory. In addition, the system streamlines the sellers own acquisitions and thereby reduces supply lags. As a consequence of these efficiencies, transactions are increasingly project-based, and supplier relations are increasingly flexible. The whole supply chain functions more efficiently. These efficiencies not only limit response times, but smooth out supply and demand imbalances, including lags that develop from reduced information which tend to cause increased market friction. The system allows companies to minimize inventory by pre-selling items before making them.

The present system causes little disruption to existing commercial systems because it emulates them in the computational sphere. The system integrates well with current company ERP, CRM and SCM software systems. By automating such information exchange, negotiation, marketing and transaction processes, productivity rates are increased. Taken together, these advantages imply a sustainable competitive advantage for commercial sellers.

For buyers, increased information afforded by the system provides maximum value. The system creates, promotes and enhances competition among sellers, making markets increasingly efficient for buyers. Buyer choices are increased and transactions costs diminished. Multilateral competition for a buyer in a distributed computational environment increases buyer efficiency and productivity while also diminishing transaction costs. Such a global computational sales and trading system allows increased vendor competition. This, in turn, promotes multi-item competition with minimized search costs.

Not only are prices made increasingly efficient by using this system, but flexibility also is maximized since the system allows customization functions as well, for single item sales or for multiple-item packages.

The use of mobility by INAs further enhances efficiency and flexibility by allowing increased automation convenience as well as further opportunities to negotiate and execute transactions. Mobility eliminates negotiation bias that may otherwise limit operations to specific locations. Mobility also allows increased failsafe computation processes because the participants are relying less on (costly) communications systems that are prone to periodic failure.

The integration of marketing and financial services provides additional value to both buyer and seller. These services are fully integrated into the system. The combination of promotions and risk management options offers a push-pull approach to market incentives in a distributed environment.

The use of AAs optimally leads to improved accuracy of information, particularly benefiting the activities of INAs and ITAs. The use of this information—both its analysis and timing—is critical to the development of sustainable competitive advantages.

The use of AI technologies automates the capture, analysis and use of information and agents to be increasingly useful, efficient and mobile.

Finally, because it is endowed with AI, the system is self-organizing. As such, it is flexible, scalable and organic, much like the economic systems it emulates.

DISCUSSION OF THE PRIOR ART

Distributed database architecture methods are disclosed in Dao, U.S. Pat. No. 5,596,744; Baclawski, U.S. Pat. No. 5,694,593; Clawson, U.S. Pat. No. 6,112,304; Singhal, U.S. Pat. No. 6,163,782; Wolff, U.S. Pat. No. 6,067,545; and Sutter PCT/CA 00/55762. None of these approaches include MASs applied to commercial purposes.

Database search technologies are described in several patents that use ranking priority search techniques. These include Nguyen, U.S. Pat. No. 5,444,823 (case-based); Kirsch, U.S. Pat. No. 5,659,732 (relevance score); Woods, U.S. Pat. No. 5,724,571 (relevance passage ranking); Herz, et al., U.S. Pat. No. 5,754,939 (frequency based ranking); Kirsch et al., U.S. Pat. No. 5,845,278 (relevance score); and Krellenstein, U.S. Pat. No. 5,924,090 (relevance priority). Other search approaches include Castelli, U.S. Pat. No. 5,940,825 (adaptive similarity search); Prasad, U.S. Pat. No. 5,960,422 (optimized source selection); Gable, U.S. Pat. No. 6,029,165; Woolston, U.S. Pat. No. 6,085,175 (search agents); and Williams, Jr., U.S. Pat. No. 6,108,686 (agent based information retrieval). Distributed databases are searched using methods described in Spencer, U.S. Pat. No. 5,826,261 (selective sharing) and Hirsch, U.S. Pat. No. 5,978,799 (meta-search system). Object database search approaches are described in Flowers et al., U.S. Pat. No. 5,802,524 (parametric classification of attributes) and Chipman et al., U.S. Pat. No. 6,037,868. Finally, two advanced search approaches that use early generation genetic algorithms are described in Takahashi et al., U.S. Pat. No. 5,706,497 (fuzzy-logic inference pattern matching search generation) and Graefe et al., U.S. Pat. No. 5,822,747 (applies optimal plan to search relational databases). None of these search approaches employ AI to access object-relational distributed databases for adaptive filtered search processing.

Data mining technologies can be classified into pattern matching, collaborative filtering, database mining and data analysis. Pattern matching is described in Taniguchi et al., U.S. Pat. No. 5,764,975; and Agarwal et al., U.S. Pat. No. 5,819,266. Collaborative filtering is described in Hey, U.S. Pat. No. 4,996,642; Heckerman et al., U.S. Pat. No. 5,704,017 (applying Bayesian inference); Robinson (1), U.S. Pat. No. 5,790,426, Robinson (2), U.S. Pat. No. 5,884,282 and Solomon, PCT 01/33464 A1. None of these pattern matching or collaborative filtering approaches use AI in distributed databases or apply these approaches to a commercial MAS.

Database mining approaches are described in Simoudis et al., U.S. Pat. No. 5,692,107 (predictive model application); Agarwal et al., U.S. Pat. No. 5,742,811 (GA applied to test candidate pattern sequences); Chen et al., U.S. Pat. No. 5,758, 147 (parallel data mining); Kleinberg et al., U.S. Pat. No. 5,884,305 (rule-based approach to relational database mining); Pham et al., U.S. Pat. No. 5,970,482 (application of intelligent agents to develop predictive model); Mormoto et al., U.S. Pat. No. 5,983,222 (applying association rule) and Bigus (2), U.S. Pat. No. 6,112,194 (user feedback mechanism). Data analysis techniques are described in Maeda et al., U.S. Pat. No. 5,761,389 (rule based analysis in relational database) and Sheppard, U.S. Pat. No. 6,026,397. None of these database mining or data analysis approaches use AI to access distributed databases for the purpose of preparing or conducting commercial activities in a MAS.

Information collaboration is discussed in Nakao, U.S. Pat. No. 6,061,697 (SGML document management and collaboration); Cornelia et al., U.S. Pat. No. 6,065,026 (multi-user document authoring and sharing system); Brown et al., U.S. Pat. No. 6,067,551 (multi-user document editing system); Falkenhainer et al., U.S. Pat. No. 5,930,801 (shared data system); Aditham et al., U.S. Pat. No. 5,941,945 (interest-based collaborative framework); Fraenkel et al., U.S. Pat. No. 6,151,622 (document view synchronization system); and Lo et al., U.S. Pat. No. 6,212,534 (distributed document collaboration). None of these information collaboration approaches is used for commercial MTO customization in a commercial sales and trade system.

Inter-agents are discussed in several patents, including Klein et al., U.S. Pat. No. 5,499,364 (optimizing inter-agent message flows); Bonnell et al., U.S. Pat. No. 5,655,081 (monitoring and managing computer resources); Lagarde et al., U.S. Pat. No. 5,745,754 (intelligent sub-agent); Bauer, U.S. Pat. No. 5,877,759 (user/agent interaction interface); Kiraly et al., U.S. Pat. No. 6,088,731 (intelligent assistant applications); Huary, U.S. Pat. No. 6,128,647 (applying arbiters to self-configuring messaging system); Lange et al., U.S. Pat. No. 6,163,794 (user interface) and Rothrock, U.S. Pat. No. 5,748,618 (data conferencing arbitration). None of these approaches uses interagents in a systematic automated way in a commercial MAS.

Commercial services involved in a distributed computer system are described in Suarez, U.S. Pat. No. 5,790,789 and Meltzer et al., U.S. Pat. No. 6,125,391. These approaches, however, do not employ autonomous agents in a distributed commercial system.

Genetic programming is applied to search or agent technology in several patents. For example, see Allen, U.S. Pat. No. 5,586,218 (autonomous learning agent); Gabriner et al., U.S. Pat. No. 5,848,403 (genetic algorithm scheduling system); Hunter, PCT U.S., 97/44741 (combining multiple learning agents); Hughes, U.S. Pat. No. 5,930,780 (distributed GP); Koza et al., U.S. Pat. No. 6,058,385 (simultaneous evolution of parallel computing); Mayorga-Lopez, PCT U.S. 99/01262 (fuzzy inference applied to agents for software retrieval); Dutton, PCT U.S. 99/05593 (software system generation); and Liddy, PCT U.S. 00/63837 (evolving intelligent agents to retrieve multimedia information). So far, none of these genetic programming approaches have been applied to a commercial MAS for the purpose of sales and trade.

Intelligent agents are described in Allen, U.S. Pat. No. 5,586,218 (autonomous agents); Schutzer, U.S. Pat. No. 5,920,848 (intelligent agents applied to financial transactions and services); Carter, U.S. Pat. No. 5,926,798 (intelligent agents applied to electronic commerce); Slotznick, U.S. Pat. No. 5,983,200; Frew, U.S. Pat. No. 6,009,456 (intelligent mobile agents used for network-based information exchange); Devarakonda, U.S. Pat. No. 6,055,562 (dynamic mobile agents); Hartnett, U.S. Pat. No. 6,064,971 (adaptive knowledge base); Paciorek, U.S. Pat. No. 6,065,039 (dynamic synchronous collaboration framework for mobile agents); Kohn et al., U.S. Pat. No. 6,088,689 (multi-agent system); Peckover, U.S. Pat. No. 6,119,101 (intelligent agents used for electronic commerce); Luke, U.S. Pat. No. 6,131,087; Hodjat, U.S. Pat. No. 6,144,989 (adaptive agent architecture); Bigus et al. (4), PCT U.S. 98/43146 (intelligent agents applied to negotiation) and Bigus et al. (5), PCT U.S. 98/47059. None of these approaches applies to a sophisticated distributed demand-initiated commercial MAS.

Automated negotiation or sales systems and methods are described in Cragun, U.S. Pat. No. 5,774,868 (sales promotion system); Kennedy, U.S. Pat. No. 6,055,519 (system for negotiation and sales); Hoyt et al., U.S. Pat. No. 6,067,531 (automated contract negotiator/generation system); Rickard et al., U.S. Pat. No. 6,112,189 (apparatus for automating negotiations); Peckover, U.S. Pat. No. 6,119,101 (intelligent agents for electronic commerce); Luke, U.S. Pat. No. 6,131,087 (automatic matching of buyers and sellers in electronic market); Bigus et al. (4), PCT U.S. 98/43146 (intelligent agents applied to negotiation); Ojha et al., PCT U.S. 00/33223 (automated transaction brokering system); Tavor et al., PCT U.S. 00/43853 (automated virtual negotiations) and Solomon, PCT WO 01/33464 A1 (customer demand-initiated system and method for on-line information retrieval, interactive negotiation, procurement and exchange). A reverse auction process is described in Godin, U.S. Pat. No. 5,890,138. A disintermediated auction system is described in Fisher et al., U.S. Pat. No. 5,905,974. None of these approaches employs AI in a (distributed) demand-initiated commercial MAS.

A simple electronic aggregation system is described in Halbert et al., U.S. Pat. No. 6,101,484. A simple combinatorial auction method for determining a winner among multiple buyers for multiple items from a single seller is described in Sandholm, U.S. Pat. No. 6,272,473. A bundled asset trading system is described in Stallaert et al., U.S. Pat. No. 6,035,287. These approaches fail to show multiple seller winner determination methods as well as CA or aggregation methods using AI in a distributed commercial MAS.

The present invention(s) go far beyond the systems, methods or apparati described in the patents listed above. In order to understand precisely how the present system advances the prior art, we will present a description of the related art, including commercial and academic systems, as well as a detailed description of the drawings.

DETAILED DESCRIPTION OF THE PRIOR ART

The first industrial revolution was characterized in the eighteenth century by a shift from the small workshop production of batches of products to the mass production process technologies of assembly line factories. The second industrial revolution in the early twentieth century evolved to the increasingly efficient application of factory methods of production used by Henry Ford. Late in the twentieth century, Toyota had further evolved Fordist process technology by combining it with Just-in-Time (JIT) production processes to create mass batch methods of efficient manufacturing. The increasing use of robotics has allowed the application of these manufacturing technologies far beyond the production of cars.

The third industrial revolution has recently taken hold. For this new phase of flexible production and distribution, information has a fundamental role. Computing and communications systems of the last generation have created major developments in production, distribution and consumption.

One common characteristic of these industrial revolutions is the quest for increasing automation, leading to greater efficiencies, increased productivity, decreased costs and generally more competitive businesses and markets. These automated systems—often driven by complex software architectures—illustrate the organizational constraints of commercial technology.

What is produced must be sold: An overproduction of items creates an imbalance in the system, causing substantial disruption to both consumption and production as represented in the pricing system. Economic cycles are largely caused by these over- or under-production processes. More precise information is needed to identify and anticipate demand and optimize efficiencies, profits and costs, while satisfying consumer needs.

In the early days of the nineteenth century, classical economic theorists viewed economies mainly with an emphasis on production systems (in contrast to consumption-based systems), whereas the late nineteenth century neo-classical economists largely viewed economic systems as driven by consumption. Such a demand-based economic theory fits the model of a information intensive economy.

What is needed is an adaptive, automated, information-rich economic system for sales and trade that drives the production and distribution of resources with maximum efficiency. This has been the holy grail of automated commerce. In order to maintain market efficiencies, competition needs to be maximized within the constraints of a competitive marketplace. An optimal economic system, while being demand-driven, is fair to buyer and sellers. It will smooth out the business cycle when applied to general economic consequences, and will be disintermediated and self-organizing.

So far, no system or combination of methods has fulfilled the ideal of automating business processes promised in the nineteenth and twentieth centuries. However, with the rise of computer mechanisms, several attempts have been made to develop simple systems that represent the early dirt roads in the development of automated economic systems. These early models include MAGNET, Fish Market, Kasbah and the Contract Net protocol. All of these systems seek to automate the contracting component of marketplaces.

FIGS. 93, 94, 95, 97 and 98 outline these early models. The first three systems involve centralized exchange processes. Buyers and sellers meet at a specified time and location to bid for items. When centralized exchanges are not always used, such as in the case of the Fishmarket model, brokers are used to intermediate the exchange of transactions. Only the Contract Net protocol—which employs broker agents—is structured for distributed exchange processes in which the parties to the transactions are in diverse locations. All four main systems award contracts to victorious buyers on the basis of price. All four processes also use an ascending price buyer-side auction market model for competitive bidding and a seller-based approach to winner determination. Automated agents are used in all systems primarily to mimic the behavior of buyers and sellers.

Numerous other systems exist. For example, in tete-a-tete (FIG. 96A) shopping agents and sales agents are proxies for consumers and merchants, respectively, and employ bilateral argumentation techniques of critique and counter-proposal (FIG. 96B). In another example, SWARM, economic relationships are modeled. These main systems represent the early research in automated agent-based commercial systems.

Two methods have been developed to automate existing commercial exchange processes, including electronic data interchange (EDI) (FIGS. 99A and B) and electronic communications network (ECN) (FIG. 100). EDI simply computerizes manual billing systems, while an ECN computerizes securities trading systems.

FIGS. 101A and 101B describe an intermediated demand-initiated procurement system. This system is the first to emphasize buyer-driven (reverse-auction) commercial transactions, but is limited to intermediated exchange processes.

Most commercial relationships in advanced industrial economies involve supply chain management (SCM). As these relationships become increasingly complex and automated, SCM technology involves e-sourcing software to assess and award bids to suppliers on the procurement side as well as customer relationship management (CRM) software on the buyer side. Enterprise resource planning (ERP) software runs the internal business processes, such as finance, accounting, human resources and manufacturing control. FIG. 102 illustrates a traditional approach to the integration of SCM, ERP and CRM software technologies in a supply chain. It uses the example of a big company that produces goods or services intermediating between small company sellers and buyers.

Increasingly, database management systems (dbms) represent the backbone of commercial software systems. In the past twenty years, most dbms have used relational database architectures developed by IBM and others. However, newer dbms involve the ordering of objects such as tables of datasets. Most contemporary dbms involve a fusion of object-relational (o-r) architectures. A traditional o-r dbms is described in FIG. 103. Software agents—specifically, spiders—collect data from various sources into a central depository. Queries are directed to the centralized database, which produces a prioritized list of responses. The limitations of this system include problems with time-sensitive data (because the inputs are necessarily dated) and organizational method dependency (because the results depend on the way the data was input, which may not fit the appropriate solution to the original query).

Distributed search technology, shown in FIG. 104, was developed to respond to the shortcomings in the traditional search approach. Rather than collect data into a central depository, a distributed dbms searches numerous databases in real time. Assuming that the translation between the systems reveals compatibility of inter-communication, an initial query is sent to various databases, and search results are prioritized according to specified criteria for ordered display. Most search technology involving the Internet uses some combination of central and distributed technology approaches.

FIG. 105 refers to a traditional aggregation system in which customers pool together in order to acquire a specific product. The aggregation process allows a vendor to provide wholesale discount pricing, upon which, after a specified time, the buyers and seller ultimately agree. The aggregation process automates a wholesaler intermediary function, in order to clear markets, but it has been increasingly challenged in the Internet age because supply chain layers are more easily eliminated and more information is available in a distributed computer network.

FIG. 106 refers to a simple method of providing intermediated option contracts. This process allows a vendor to hedge a risk by selling an item to a second party even after it has initially agreed to sell it at a specified price to a first party. Although the seller is obliged to pay the first party a pre-agreed penalty if the seller exercises a contingency to sell the item to another party, the seller can make more money—thus maximizing its benefits—by paying the penalty and selling to the second party for a greater profit than the first price plus the penalty. Increasingly, finance and trading firms must utilize these risk management strategies in complex ever-changing markets so as to maximize revenue and optimize profits.

Though these examples of prior art point primarily to academic research, which has a more established history, aspects of these systems are becoming increasingly patentable, whether in agent, database, search, negotiation, auction or sales categories. A discussion of the patent prior art literature involving these important categories can be seen in the Summary of the Invention. A reference to the literature on the prior art can be viewed in the bibliography.

BRIEF DESCRIPTION OF THE LIST OF FIGURES

FIG. 1 is a schematic diagram showing the architecture of a cooperative communications network (CCN).

FIG. 2 is a schematic diagram describing the relationships between the layers of a CCN system.

FIG. 3 is a schematic diagram of a showcase database system.

FIG. 4 illustrates multiple vertical databases.

FIG. 5 is a schematic diagram of a showcase database.

FIG. 6 is a schematic diagram of showcase database operation.

FIG. 7 is a schematic diagram of showcase data flow.

FIG. 8 is a flow diagram of the inter-agent system architecture.

FIG. 9 shows how rivers of data flows in a CCN operate.

FIG. 10 is a schematic diagram of commercial search agent (CSA) system architecture.

FIG. 11 is a flow diagram of a CSA first query.

FIG. 12 is a schematic diagram of CSAs indicating search priorities.

FIG. 13 is a schematic diagram of a CSA method used as an initial commercial search request.

FIG. 14 is a schematic diagram of CSA filtering methods.

FIG. 15 illustrates an apparatus for disseminating promotions in the system.

FIG. 16 is a schematic diagram illustrating proximity marketing for mobile INAs.

FIG. 17 shows the promotional discounting process.

FIG. 18 shows a dynamic pricing model with adaptive peak and off-peak pricing along a product or service cycle.

FIG. 19 shows a method for pricing discount promotions.

FIG. 20 illustrates promotions integrated with the CSA and Showcase database.

FIG. 21 is a schematic diagram illustrating a process of risk management option (RMO) contracts in a distributed network system.

FIG. 22 is a schematic diagram showing processes for transaction contingency logistics in a distributed contracting system.

FIG. 23 is a schematic diagram of information collaboration in a distributed network system architecture for use with made-to-order customization.

FIG. 24 is a schematic diagram illustrating a collaboration process for made-to-order (MTO) customization.

FIG. 25 is a schematic diagram of intelligent negotiation agent (INA) interactions in a multi-agent system with an emphasis on buyer agent (b-INA) and seller agents' (s-INAs) interaction.

FIG. 26 is a flow diagram representation of sequences of INA interactions.

FIG. 27 is a schematic diagram of a method for pre-negotiation in a multi-agent system.

FIG. 28 is a flow diagram representation of a method for time-based concealment of negotiation strategies in a distributed contracting system.

FIG. 29 is a schematic diagram of a system of INA logistics.

FIG. 30 is a flow diagram representation of a method for INA interaction.

FIG. 31 is a schematic diagram of a method for INA interaction.

FIG. 32 is a schematic diagram of an INA architecture emphasizing the initial interactions.

FIG. 33 is a flow diagram representation of an INA system architecture emphasizing negotiation interactions.

FIG. 34 is a schematic diagram of time-base d negotiation sequences.

FIG. 35 is a schematic diagram of a method for initial INA mobile location protocol settlement.

FIG. 36 is a flow diagram representation of a tournament configuration of INA winner determination.

FIG. 37 shows multivariate negotiation methods.

FIG. 38 shows automated negotiation sequences for item attributes with pre-established parameters.

FIGS. 39 A and B is a schematic diagram of a demand-initiated automated negotiation in a distributed system illustrating mobility.

FIG. 40 shows multilateral distributed competition as a competitive double shout negotiation process.

FIG. 41 illustrates an INA negotiation module, including a schema of negotiation methods.

FIG. 42 illustrates an INA auction module, including a listing of several auction types.

FIG. 43 is a schematic diagram revealing the interactions of the INA negotiation module with the INA auction module.

FIG. 44 illustrates the pricing strategy module in the context of interactions with AAs.

FIG. 45 illustrates the interaction dynamics of INA "personalities".

FIG. 46 is a schematic diagram of a system for the interaction of neutral cooperative INAs, including intermediation and aggregation applications.

FIG. 47 is a schematic diagram showing the sources of a C-INA transaction initiation.

FIG. 48 is a flow diagram representation of a method for B-C-INA based aggregation.

FIG. 49 illustrates several main automated aggregation category structures in a distributed network system.

FIG. 50 shows an INA based mass pooling approach to aggregation.

FIG. 51 illustrates a disintermediated aggregation method using C-INAs.

FIG. 52 is a schematic diagram of a disintermediated aggregation method for mass customization.

FIG. 53 is a flow diagram representation of a method for using dynamic INAs as double agents for arbitrage applications.

FIG. 54 illustrates an intermediated method for performing a combinatorial auction (CA) between a single seller and multiple buyers.

FIG. 55 illustrates a method for performing a CA with INAs between multiple buyers and multiple sellers in a single session.

FIG. 56 illustrates a method for winner determination of an interactive multi-lateral auction in a final session.

FIG. 57 is a flow diagram representation of a method for filtering variables for multi-item CAs.

FIG. 58 is a flow diagram of a disintermediated method of multi-item bidding from one seller to multiple buyers.

FIG. 59 is a flow diagram of a disintermediated method of multi-item bidding between multiple sellers and a single buyer.

FIG. 60 is a schematic diagram of a disintermediated method of multi-item aggregation of pre-set bundles between multiple buyers and multiple sellers.

FIG. 61 is a schematic diagram of a disintermediated method of multi-item bidding between multiple buyers and multiple sellers.

FIGS. 62 A and B is a flow diagram representation of a disintermediated method of aggregation whereby multi-item bundles are exchanged between multiple buyers and multiple sellers using c-INAs.

FIG. 63 is a flow diagram of a disintermediated method for conducting arbitrage of multi-item bundles between multiple sellers and multiple buyers using d-INAs.

FIG. 64 illustrates multi-factorial bidding approaches by listing item variables that can be sorted.

FIG. 65 shows a multi-feature example of item-factors that can be sorted in the case of personal computer configurations.

FIG. 66 shows examples of multi-item bundle category applications.

FIG. 67 is a schematic diagram representation of a seller mobile transaction agent (s-ITA) system architecture.

FIG. 68 is a flow diagram of S-ITA operation.

FIG. 69 is a schematic diagram of a S-ITA and b-ITA system process in the final negotiation with one seller.

FIG. 70 shows the ITA service categories, including the buyer and seller roles.

FIG. 71 describes ITA service categories.

FIG. 72 is a flow diagram representation of b-INA micro-agents generated particularly for a negotiation session in a mobile application.

FIG. 73 is a flow diagram representation of a method for genetic algorithms to be applied to multi-agents system.

FIG. 74 is a flow diagram representation of a method for neural networks applied to a multi-agent system.

FIG. 75 is a flow diagram of a genetic programming system process.

FIG. 76 is a schematic diagram representation of methods for a genetic programming learning schemas.

FIG. 77 is a flow diagram representation of a method showing evolutionary computation applications to autonomous agents.

FIG. 78 is a schematic diagram showing AI applied to agency in a distributed system.

FIG. 79 is a flow diagram of an evolutionary computation architecture with AA and INA applications.

FIG. 80 is a flow diagram illustrating layers AI for optimum agent mobility.

FIG. 81 is a schematic diagram showing AA architecture from buyer and seller viewpoints.

FIG. 82 is a schematic diagram showing kinds of data analysis and synthesis.

FIG. 83 is a schematic diagram representation of an AA data flow process.

FIG. 84 is a schematic diagram representation of methods of data mining, with emphasis on interactions between a commercial search agent (CSA) and AA.

FIG. 85 is a flow diagram representation of methods for collaborative filtering for cross-marketing recommendations applications.

FIG. 86 is a schematic diagram of b-M operation with mobility.

FIG. 87 lists the variables of a super-score system in a multi-agent system.

FIG. 88 lists the variables of market and economic analytics in a multi-agent system.

FIG. 89 lists the variables of an accountability index in a multi-agent system.

FIG. 90 lists the variables of a financial criteria index in a multi-agent system.

FIG. 91 lists insurance risk factors for use in a multi-agent system.

FIG. 92 lists service categories in a multi-agent system.

FIG. 93 is a schematic diagram of the operation of a multi-agent system.

FIG. 94 is a schematic diagram of an agent-based contracting system.

FIG. 95 is a schematic diagram of an agent marketplace.

FIG. 96A illustrates a simple system for integrated negotiation.

FIG. 96B shows a method for bilateral argumentation.

FIG. 97 is a schematic diagram of several stages of a contracting system.

FIG. 98 is a flow chart of the Contract Net Protocol.

FIG. 99A is a schematic diagram of EDI as a paper replacement technique.

FIG. 99B is a schematic diagram of EDI as a process elimination technique.

FIG. 100 shows a simple electronic communications network (ECN) system.

FIG. 101A and B are schematic diagrams of an intermediated demand-initiated procurement system.

FIG. 102 is a schematic diagram of a traditional supply chain with customer and supplier relationships.

FIG. 103 illustrates a traditional search method in an intermediated network system.

FIG. 104 illustrates a distributed search process in a disintermediated network system.

FIG. 105 illustrates a traditional aggregation method.

FIG. 106 illustrates a method for intermediated option contracts.

DETAILED DESCRIPTION OF THE MAIN EMBODIMENTS

The system represented by the present invention has numerous distinctive embodiments. The present disclosures illustrate in detail the main ideas of the invention and are not intended to restrict the invention to a single embodiment.

The system and methods incorporated in the present invention are implemented by using software as applied to networks of computers, microprocessors or mobile computers. Software is stored in memory on computer disk drives. The microprocessors in the computer hardware use database software to store data used by software applications such as intelligent software agents. Agents are computer software program code that can be activated to perform specific functions. Once activated, agents can be executed in a node of a computer network, or can move from node to node to manifest mobility.

The present invention, or cluster of methods, aims to solve problems in the area of computation for automating demand-initiated sales processes in a distributed network. Specifically, the present invention uses a distributed database system to automatically store data about goods and services, and access, analyze, and collaborate about the data.

The present invention further discloses a demand-initiated sales application of intelligent software agents in a multi-agent system (MAS). The agents perform an automated, multivariate negotiation for individual items in a multilateral interactive environment between a buyer and at least two sellers. The system further uses intelligent negotiation agents (INAs) to perform aggregation, arbitrage and combinatorial functions in a MAS. Negotiation functions are supplemented by intelligent transaction agents (ITAs) that clear transactions and offer services. One key feature of the software agents in a distributed MAS is the use of mobility. Such a computer system applies the frontiers of artificial intelligence.

CCN and Showcases

The foundation of the present system is the commercial communications network (CCN) architecture illustrated in FIG. 1. A showcase is a database that contains constantly updated information from a corporate database. Corporate databases (1005) receive data inputs in real time as seller inter-agents (S-IAs) (1015), filter information for seller showcases (1045). Analytical agents (AAs) for both seller (1010) and buyer (1013) analyze and filter information: seller AAs (S-AAs) analyze market data inputs for seller inter-agents (S-IAs) while B-AAs analyze market data inputs for B-IAs. Data used can be objects, codes, text, images, multimedia or other formats.

On the seller side, promotions and risk management option (RMO) contracts are provided to the showcase by the S-IAs from promotion and RMO modules (1020).

On the buyer side, buyers use B-IAs by setting the parameters of software preferences at the customer graphic user interface (GUI) (1040). The GUI can be a multimedia intensive model. B-IAs are intermediary software programs that interface with the customer GUI and other agent programs to constantly re-adjust the parameters of automated software agents.

In one embodiment, buyer and sellers can bypass the showcase system and collaborate (1035) B-IA and S-IA interactions in order to mutually identify item specifications prior to negotiation sessions. Once the collaboration process is employed, the CSA can access showcase databases for a first search query and then proceed to a negotiation session.

Once a B-AA has analyzed a product or service category, this information is forwarded to a B-IA, which then initiates a search of showcases by activating a commercial search agent (CSA) (1060). After a first search query, the B-IA can use the search results to interact with S-IAs in a pre-negotiation session (1055), which sets the rules of encounter for negotiation sessions between the buyer and two or more sellers.

After the pre-negotiation session has established initial parameters, the Buyer Intelligent Negotiation Agent (B-INA) (1085 and 1090) enters into interactive multi-lateral negotiations with at least two seller intelligent negotiation agents (S-INAs) (1075 and 1080). S-INAs use pricing, negotiation, and auction modules to automate the negotiation interactions with the B-INA. Once an B-INA is ready to complete a transaction and select a winner, it sends the transaction to a buyer intelligent transaction agent (B-ITA) (which uses data from an S-AA) to check the terms of the transaction. While this is occurring, other negotiations may stop or continue depending on initial negotiating parameters. If a buyer cannot satisfy the conditions of the transaction, the S-INA sends the buyer back to its S-ITA to renegotiate that issue. Similarly, the B-ITA must clear the transaction for the B-INA by double-checking and clearing all terms of the S-INA. Once all terms are mutually agreed upon, the transaction is concluded and all inter-INA activity terminates. ITAs in turn update their respective AAs with data from the transaction.

FIG. 2 describes the CCN system layers and their relationships.

The layers of a CCN can be described as follows: (1) Corporate databases and customer GUI are the front end or top layer; (2) showcase databases are at the second layer; (3) AAs, both buyer and seller, as well as promotions and RMOs, are at the third layer, which represents analytics; (4) Buyer and seller inter-agents and collaboration are in the middle, interagency layer, at layer four; (5) CSAs are at the fifth (search) layer; (6) Several varieties of INAs are at the sixth (negotiation) layer, and; (7) Buyer and seller ITAs are at the seventh (transaction) layer. The configuration of this distributed database infrastructure and this integrative multi-agent system (MAS) differs substantially from prior systems, as does the system architecture described in these figures. The specific methods for actions and interactions also vary from earlier approaches. The MAS is integrated into the database system; the database system configuration provides the forum for the MAS.

FIG. 3 illustrates a showcase database system whereby corporate databases (1155) are using analyses from S-AAs (1180) as well as receiving corporate data inputs. S-IAs (1157) use S-AAs to analyze and filter data in order to continuously place new products and services in each respective company showcase database (1160). Similarly, showcase data is continuously purged to reflect the most current commercial activities. S-IAs also constantly receive data from promotion and RMO modules (1165) (also informed by S-AAs). Showcases thus reflect the most current data on products and services, and are informed by market data; as market data changes, the showcase data constantly updates to respond.

Showcases typically operate in the context of specific industries. See FIG. 4. Showcases are more focused in vertical industries and tend to share common specialized languages (both for items and the codes (e.g., dictionaries) to which they refer). Each vertical showcase system is similar to the yellow pages, but for worldwide access to an industry.

In an additional embodiment, a CCN can overlap in more than one industry. Such horizontal (or trans-vertical) showcases combine multiple categories of items and can be accessed by multiple showcase systems. In another embodiment, a CCN can be customized to a specific business, such as a very large corporation that may use thousands of vendors or customers.

Such a showcase database system has advantages over other systems. First, the original corporate database is protected and inaccessible to outsiders. Second, the system sets up a complex of similarly focused micro-databases that are isolated for remote commercial access. Third, since the system is distributed, access to information in real time is more current. Fourth, the system is overseen by a cooperative of its own members (rather than one member) and so each member company is responsible for its own showcase as well as aspects of the whole system. Fifth, since each showcase is constantly updated, its data is more complete and accurate. Sixth, this CCN architecture is scalable. Seventh, the system is structured to be omni-directional and thus accessible from anywhere. Finally, because promotions (and RMOs) are integrated into the showcase system, marketing (push and pull) is key to its pragmatic operation.

FIG. 5 illustrates how S-AAs feed filtered data to S-IAs (1325) for inclusion into a showcase. S-AAs (1310) filter data from market sources (1300) to a showcase (1345). Though data included in showcases is primarily derived from corporate databases (1320), data is also input from the pricing module (1330), promotion module (1335) and RMO module (1340). Further description of these modules are made in FIGS. 14-22 and 41-44. At any given moment, the showcase database view will be different since it represents snapshots of constantly moving data streams that can be seen over time (1315). Finally, a showcase can be accessed from various locations (1350) by CSAs.

As illustrated in FIG. 6, corporate databases (1340) provide raw data to S-IAs (1344). In addition, S-IAs receive data from S-AAs (1346) that filter raw market data from various sources (1342) as well as promotion and RMOs (1350). The S-IA continuously filters the data in real time to the showcase database (1348).

The showcase has two main components: (1) a database for specific items and (pre-set) bundles and (2) a database for customizable items in the collaboration process. Since data in the showcase is time sensitive, such data is constantly renewed and old data is purged. The CSA (1352) can access the showcase for the initial query in order to initiate the negotiation process.

FIG. 7 shows the flow of data from the corporate database and S-AA (1355) to the S-IA (1357), the importation of data into the showcase (1360) and the continual updating and purging of showcase data (1362) that leaves the showcase with current data sets (1365).

Inter-agents (IAs) are used as mobile intermediaries between various agents and databases (or GUIs). IAs are categorized as either buyer-side or seller-side. IAs also interact with each other.

FIG. 8 describes inter-agent system architecture. On the seller side, a seller (1370) interfaces with a corporate database (1374) via a GUI (1376). The seller inter-agent (S-IA) (1382) intermediates between the corporate database and the showcase(s) (1390) as well as the S-AA (1386).

The buyer inter-agent (B-IA) (1384) intermediates between the customer-side GUI (1378) and the CSA (1388) and between the GUI and the B-M (1386).

In one embodiment, IAs can be used more expansively to include interaction with INAs, ITAs and market data.

Because they are intermediaries, IAs may be mobile. Their locations change in sequence or they may alternate.

FIG. 9 illustrates the rivers of data flows in a CCN system. This figure shows the seller and buyer sides as well as the top (database and inter-agent) layers and the bottom (negotiation and transaction processing) layers. Note that most actions in this view of the CCN system involve interactive (i.e., not unidirectional) functions. This view also downplays the primary negotiation functions to emphasize the supporting structure.

CSAs

Showcase databases are accessed by a commercial search agent (CSA) as illustrated in FIG. 10. The CSA (1535) is informed by a B-AA (1540) in order to focus the search. In addition, promotions (1530) target, and invite, CSA searches. The CSA accesses the showcase databases as continuously looped queries (1550). Since the showcases are continuously updated, each search is accurate and fast.

FIG. 11 shows the sequence of CSA actions in the first query. (1) Market data (1552) is input into B-AAs (1620). (2) Various promotions (1585, 1590, etc.) are input into showcases via S-IAs. (3) A CSA (1625) accesses a B-AA and, with data from the AA, the CSA accesses the showcases, which have been informed by promotions, in an orderly sequence. The showcases are constantly updated by the promotional modules. The CSA filters the best promotions and then accesses selected showcases, which respond by providing specific data. FIG. 84 shows CSA and AA interactions with an emphasis on data mining approaches.

The CSA asks a specific question in order to receive specific commercial data from a showcase. Key words of the first CSA query are ordered and ranked so as to provide a feedback in a particular sequence.

Once several showcases respond with commercial data, and the data is ranked according to user specified priorities, the data is provided to B-IAs (1630) in preparation for negotiation sessions (1635).

FIG. 12 shows the flow of sequences involving the CSAs search method. Once a CSA is activated (1700) and makes a first search query (1710), it uses filters (illustrated in FIG. 14) to determine search priority factors (1720). The user can configure these factors by selecting search parameter preferences. The search process proceeds by sorting the preferred attribute (1730).

The CSA then accesses (1740) various showcases in a CCN (or in more CCNs) according to registry code sequences. The showcases are accessed according to a time-sequence synchronization that provides code-priority to specific showcases based on factors upon which CCN co-op members can agree. An efficiency optimization process calibrates the synchronization access system. Such priorities that can be conferred on a CSA include popularity, specialty, price, quality, etc.

The CSA sends out a code seeking a match to a request for specific attributes to the showcases in a CCN (1750). Upon receipt of the code request, the showcase database(s) respond (1760) by sending back matching relevant query attributes. The CSA then orders and ranks responses according to configured preferences (1762). The CSA then registers the search results to the buyer GUI (1764) or to B-IAs or B-INAs.

In FIG. 13, the CSA (1805), while being informed by a B-AA (1800), requests information for initial item data from each of several showcases. In this example (preferred embodiment), showcase 3 (1815) allows the customers to buy the item at an initial price. However, the buyer can negotiate with at least two (1820 and 1825) sellers by proceeding to a pre-negotiation session (1830), which sets the terms of the negotiation process. Direct interactive bilateral negotiation proceeds between a B-INA (1845) and at least two S-INAs (1840 and 1850). As illustrated in the example in FIG. 10, in the case of S-INA2, the negotiation session proceeds, but in the case of S-INA1, the buyer may choose to buy the item at an initial price (1860) and proceed to closing the transaction with an ITA (1880). In any event, the CSA represents the first request for information, including item features, terms and price.

The CSA can filter information about commercial items according to various categories including price, location, item niche, availability, bundles, accountability, and past experiences. FIG. 14 illustrates these CSA filters (1910). The accuracy and quality of data are also filtered and purified (1965). These filters are manually configurable so as to track the specific categories, either individually or in combination.

Just as buyers can configure CSA filters, sellers can invite specific buyers to special promotions by micro-casting unique discount or incentive opportunities (1920). Taken as a whole, these seller-driven inducements create a "demand-shaping" of distinct buyer needs (1930). By influencing buyer activity, the seller can control its own suppliers more smoothly and even out buyer demand. Such demand shaping occurs at the CSA and promotional level. Once data is purified and analyzed for buyer preferences, the promotional (& RMO) data is used by buyers to generate choices (1970) for negotiation sessions.

Promotions and RMOs

Promotions can be pushed to customers from sellers through customized and broadcasting processes. FIG. 15 shows that a customer can detail preferences (2015) at the CSA after obtaining general item data from a broadcast promotion (2010). The customer then accesses the CSA (2025), which, in turn, accesses the showcases (2030) in a specific industry. Showcases can receive targeted ads (2035) based on pre-specified preferences, which are accessed by a next data stream of the CSA. Finally, the CSA makes a buyer request for sellers' information (2020).

Because the system contains a layer of mobility and because mobility is location-dependent, proximity marketing—in which a promotion is contingent on a specific point in a space-time matrix—is used as illustrated in FIG. 16.

After moving from an initial negotiation (2040) at a specific location, a B-INA moves to another location (2042). An S-INA accesses a database via an S-AA to determine whether the B-INA qualifies for a specific promotion (2046) at that time. If the B-INA does not qualify, no promotion is provided (2048). On the other hand, if the B-INA does qualify, the S-INA offers it a specific, time-sensitive promotion at a specific location (2050) by accessing the promotion module (2044). These promotions can be in the form of "exploding" offers that diminish over time until a deadline is realized and they expire.

Proximity marketing allows sellers to shape demand by influencing buyer behavior with incentives. These incentives may be induced by the seller because it receives unexpected reductions from its suppliers. The changed circumstances induces the seller to offer improved terms by shifting opportunity to other, more available, supplies to buyers. Proximity marketing also allows sellers to exploit opportunities by immediately offering promotions for qualified buyers in the context of a demand-initiated sales system. Such a process may confer an advantage on a particular seller. One of the advantages of proximity marketing is that sellers can offer an incentive to a B-INA at a specific place in order to induce the B-INA to conduct negotiations at the home of an S-INA. The location priority would confer an advantage on the S-INA by providing easy access to computation resources. Such proximity marketing with mobility in a distributed MAS not only enhances revenue management but also profit maximization through increased efficiencies.

There are different main types of promotions as outlined in FIG. 17. In general, products that use decaying technology (2060) and services that use off-peak capacity (2070) are discounted. See also FIG. 18. In addition, items that are bundled, possess fewer features or lower quality, have multiple units or are less time-sensitive (2080), are discounted. Information about these discounts is broadcasted in the form of promotions outlining these sales opportunities.

A Dynamic pricing curve is illustrated in FIG. 18. This figure shows the decline of prices related to off-peak services or to trailing edge technology.

FIG. 19 shows a list of promotional categories to which item prices tend to fall. These categories are thus used in marketing promotions by the promotion module.

Promotions are typically included at the front end of the system, at the CSA or showcase level. As FIG. 20 illustrates, promotions can come in the form of ads or inducements. Ads are pushed as broadcasts or targeted as customized. Inducements, on the other hand, are invited and driven by the seller, or intentionally requested by a buyer. Discounts are again specified according to the product decay curve (or by supply and demand curves) or services yield management curve. It is important to note the multivariate nature of discounting beyond the price factor alone, because quantity, quality, features, bundles, and time-sensitivity are each important criteria that affect customer demand. In fact, these multi-faceted item criteria allow promotional cross-marketing for sellers to provide marketing opportunities before or during an initial search.

Risk management option (RMO) contracts represent a seller-induced opportunity to control risks by offering buyers contract clauses that penalize sellers. While promotions are pushed to buyers from sellers, RMOs are "pulled" by buyers from sellers. These contingencies allow sellers to hedge their bets on items that may not be fully in their control. On the other side, buyers can exploit these risks as opportunities, either to get good value, or to receive a penalty from the seller in the event that they must withdraw from a contract by exercising a contingency clause. Because the terms of RMOs must be agreed to early in the transaction, they are on the level of a promotion. Further, like promotions, since the underlying circumstances for sellers constantly change, RMOs conditions and contingencies constantly change. Therefore, as a CSA accesses a showcase, the most recent promotional and RMO data is constantly updated. Since showcases are structured in a distributed system, RMOs are similarly distributed.

FIG. 21 outlines the operation of RMO contracts in a distributed system. At (2210) a seller (S1) agrees to sell item(s) at specified terms to a customer (C1), while S1 agrees to pay a specified penalty to C1 if it cannot comply with the terms of the transaction. Seller AAs (2235) are constantly receiving market data inputs (2215) and dynamic pricing data inputs while assessing risk priorities and preferences (2245). Being an opportunist and rational agent, S1 constantly seeks a better deal than he arrived at with C1. At (2230), S1 finds C2 and enters into a new arrangement with different terms. S1 then commits to buying the item from S2 in order to re-sell to C2, according to optimal terms.

S1 sells the item(s) to C2 (2240) at a higher price than original terms arranged with C1; thereby, at (2265), C1 receives a penalty from S1; either the item is merely delayed, which may warrant a mild penalty (2295) or cancelled, which will typically justify a more significant penalty (2300).

In the meantime, because the risks of getting squeezed between a buyer obligation and seller obligation can cause problems if a catastrophe occurs in the supply chain, sellers swap risks with other sellers to diversify or concentrate risk outcomes. Risks are either re-packaged (2260) or time shifted (2290). If they are re-packaged, the risks can be either concentrated (2255) (for maximum return on the upside) or diluted (2310) for risk diversification (minimum loss on the downside). By time shifting various risk contingencies, risks can be diluted over time so as to overcome a temporary supply imbalance. Risk penalties can come in the form of cash or future discounts (coupons).

Once a buyer is terminated from a contract at the time of seller initiation, the buyer is free to begin the process again. However, since circumstances constantly change and data is constantly updated, an identical transaction is unlikely to be repeated without modification. RMOs allow sellers flexibility, especially from unforeseen supplier circumstances, but also provide buyers with distinct market opportunities. RMOs function as a sort of risk arbitrage by shifting risk in unforeseen circumstances. The mobility aspect of the present system allows unique advantages in a distributed network because sellers are able to more accurately and immediately respond to complex market circumstances up and down the supply chain. Finally RMOs, when combined with promotions, provide a powerful marketing integration component to a transaction system.

A reverse RMO may be used as a form of performance bonus to reward a seller for an excellent job such as accelerated contract terms favorable to a buyer. A compounded RMO may also be used by D-INAs for arbitrage applications. Such complex RMOs are used by the original seller to the D-INA in its initial role as buyer and then by the D-INA (in its secondary role as seller) to a buyer. As an intermediary, the D-INA effectively spreads the risk from first buyer to final seller.

Agents do not only have the power to negotiate and contract, but also to use contingencies, by both buyers and sellers and with penalties and without penalties (depending on the nature of the contingencies). In FIG. 22, the logistics of transaction contingencies are shown. In order to focus negotiations with one seller, a buyer may delay a seller negotiation for a time (2319). One way to do this is for a buyer and seller to express an interest in a transaction (2320). Before closing the transaction, a B-ITA seeks to close the transaction (2323). The buyer can end the transaction by withdrawing (2335) and seek to negotiate for other items (2337) given buyer priorities. Alternatively, if a buyer is not qualified (2331) according to an S-ITA, the seller may withdraw without penalty (2333).

The buyer and seller then agree to enter into a transaction (2321 and 2324). If the seller withdraws from the transaction, the seller activates an RMO contingency (2326) and the seller pays a penalty (2327). If the buyer contingency is not performed (2325), the buyer may withdraw with a penalty (2329). In this case, the buyer may return to the negotiation session and seek his second best choice (2337). These choices and contingencies can be performed at various locations in the distributed network by the various agents. In addition, each phase in the process can be performed with mobility at alternating locations in a further embodiment.

Collaboration

Increasingly, beyond promotional and RMO marketing schemata, interacting businesses need to collaborate on the specificity of complex items prior to an initial search. Particularly for unique or custom items, collaboration between a buyer and at least two seller competitors is key to describing the item so that all parties are clear on the specifications before beginning the negotiation process. In fact, the negotiation process itself may involve the give-and-take not only of pricing, but also detailed description. In an era of lean and Just-in-time (JIT) manufacturing, made-to-order (MTO) processes require collaboration with buyers and sellers. Since collaboration can be initiated early in the sales process, and since collaboration is fundamentally informational, the information collaboration for MTO items, illustrated in FIG. 23, is integrated with the CSA during an initial search, as well as before and after a search. Collaboration can occur before the CSA's first query (by a B-IA and S-IAs), and after the CSA query at the pre-negotiation stage.

FIG. 23 shows the initial collaboration between a B-IA and at least two S-IAs. AAs inform both buyer (2365) and seller inter-agents (2370 and 2385). Once initial collaboration has occurred and comparable item specifications identified and input into a showcase, the buyer, via the inter-agent, accesses the CSA (2400) in order to get pricing and transaction term data from sellers. The initial collaboration process bypasses a pre-set item showcase database input, and precedes a search query. During a CSA search (2400), on the other hand, collaboration occurs by the CSA interacting with S-IAs (2420 and 2430) and a B-IA (2433); S-IAs interact with both showcases (2410 and 2445) and S-AAs (2415 and 2445). The collaboration session then returns to the CSA in order to display results. After a collaboration sessions initial feedback, the buyer can proceed to the pre-negotiation session.

Finally, after an initial search but before a negotiation, at the pre-negotiation (2450) level, collaboration can occur between a B-IA (2455) and at least two sellers (2465 and 2480) in order to specify comparable item parameters. Once an item specification has been clarified via collaboration at the pre-negotiation level, the INAs proceed to the negotiation sessions (2470). Data is preserved for all collaboration sessions and saved by AAs (2475 and 2500) for future access.

FIG. 24 shows the collaboration process for made-to-order (MTO) customization. A B-IA (2509), after being informed by a B-M (2499), interacts with at least two S-IAs. The S-IAs (2503, 2504 and 2505), after being informed by S-AAs (2495, 2496 and 2497) (which interact directly with corporate databases (2490, 2491 and 2492)), interact with the B-IA (2501. Following an agreement over item specifications, the S-IAs download the specific information about comparable items into a specific part of the showcases (2515, 2516 and 2517). The CSA (2511) then accesses the showcases in order to get initial data on item price, attributes and terms before proceeding to negotiation sessions. Data that is exchanged between a B-IA and S-IAs is typically time-sensitive. That is, the agreement reached between buyer and each seller regarding item specification usually only holds for a limited time. This is because the sellers circumstances involving a customized order may change and thus the details of agreement on the item cannot hold for more than a reasonable amount of time.

In an additional embodiment, collaboration can occur during a search. In another embodiment, collaboration can occur after a search but before a pre-negotiation session.

INAs

Intelligent negotiation agents (INAs) are complex autonomous software agents programmed to conduct interactive negotiations with specific rules or goals. Because INAs are intelligent—they use artificial intelligence technologies—they evolve their operations beyond initial pre-programmed parameters so as to adapt to changing market conditions. In order to develop adaptive programming, the agents operate within a multi-agent system (MAS) according to second-order system rules that govern the primary rules of the immediate negotiation functions. Such MAS meta-rules allow the agents to evolve operational negotiation rules in a complex distributed computer system.

INAs operate in the context of buyer and seller interactions. INAs have several main types, including seller-INA (S-INA), buyer-INA (B-INA), dynamic-INA (D-INA) that switches roles from buyer to seller and vice-versa, and cooperative INA (C-INA) [buyer C-INA (B-C-INA), seller C-INA (S-C-INA), lead B-C-INA and neutral C-INA] involved with aggregation and combinatorial auctions.

The present invention uses INAs in a distinctive demand-initiated system in which a B-INA, after performing an initial query with a CSA and receiving a report of initial bids from at least two sellers for a comparable item (or items in a bundle), bids simultaneously with the S-INAs.

In order to conduct automated negotiation between the B-INA and at least two S-INAs the interactive negotiation process operates by the INAs using complex program code that (1) performs specific negotiation functions using game theoretic processes, negotiation strategies and dynamic pricing information and (2) evolves beyond the initial negotiation parameters in order to conduct multivariate multilateral anticipatory real-time interactive negotiations with mobility in a distributed computation system by employing AI technologies.

The demand-initiated buyer driven negotiation process operates by each agent (a) receiving, (b) reviewing and (c) evaluating the input bids and (d) deciding the best options to respond. While an expert system pre-programmed with negotiation parameters can perform these operations, much like a sophisticated chess game, the present system applies AI technologies to adapt the negotiation operations beyond the initial parameters (within second-order MAS meta-rules).

Such AI-applied adaptation beyond initial negotiation parameters allows a B-INA to assess incoming bids, evaluate the bids and chose an optimal response. The evaluation process consists of comparing each respective bid to various scenarios within programmed parameters. In order to review, assess and evaluate prospective bids, INAs access AAs (to receive analytical and synthetic reports) and select an optimal choice of a bid response among several options. Evaluating two or more S-INA complex bids is distinctive from interaction with only one S-INA because competition provides a more complex negotiating configuration. In addition, such a process anticipates opponents' negotiation strategies and seeks a prediction scenario that factors into its counter-bidding programming.

In reference to FIG. 25, interactions between a B-INA and at least two S-INAs are illustrated. After an initial search request (2570) and search response (2580), a session is initiated in which a B-INA interacts with at least two S-INAs in order to agree to multi-lateral rules of negotiation (at 2585). Once pre-negotiation rules are set, the agents proceed to negotiation sessions (2590) between the B-INA and S-INA1 and between the B-INA and S-INA2. The locations of the interactive negotiations may be at the buyers, the seller(s)', or alternate between the two types of locations. At some point, the buyer selects a winner (2595) and awards a contract. Interactions between the B-INA and non-selected S-MNAs automatically terminate after winner determination. The winning S-INA then passes the transaction terms to the winning sellers S-ITA (2605) and the B-INA passes the deal terms to its B-ITA (2600). If terms are not verified or certified (i.e. by credit checks), the transaction is then sent back to negotiation sessions for re-negotiation of those terms and then returned to the ITAs for clearance. Once the ITAs clear the transaction, the negotiation ceases (2610) and the session ends.

In the preferred embodiment, at least four sellers will be ranked at the first search response. See FIG. 36. The (at least) four S-INAs will interact in the pre-negotiation session with the B-INA. The negotiation session allows the B-INA to select two S-INAs on which to focus further negotiations (suspending, or stopping the others). FIG. 25 emphasizes the negotiation process during the phases of negotiation once two finalist S-INAs have been selected for negotiation by the B-INA. Consequently, the winner is determined as referenced in the paragraph above. However, in the preferred embodiment, illustrated in FIG. 29, a tournament configuration is present in which "contestants" are inevitably eliminated until a single winner is determined. In another embodiment, more than one seller can be selected for a transaction.

Because, logistically, if B-INAs negotiate simultaneously with at least two S-INAs, and if the locations are different between the S-INAs, the B-INA may be in at least two different places at the same time. There are two solutions to this problem that are both employed. First, the B-INA may alternate functions by rapidly moving from location to location, though this solution leaves the necessary problem of time-delay lags in activity. The other solution involves the launch of B-INA micro-agents that simultaneously interact in different locations and constantly update each other. FIG. 72 shows micro-agents.

The negotiation process between a B-INA and S-INAs may include counter-bidding processes directly between the B-INA and specific interactive S-INAs. FIG. 26 illustrates a final stage of negotiation between at least two S-INAs and a B-INA. Without showing the pre-negotiation phase, or inter-agent activity, this figure describes the counter-offer process, at 2685 and 2695 between the B-INA and S-INA1 and at 2705 and 2710 between the B-INA and S-INA2.

In the preferred embodiment, the interactive counter bidding process may continue between buyer and seller INAs for multiple sessions. Since counter-bidding is based on factors beyond price alone, the potential criteria are compounded in complexity. Consequently, the process of negotiation with each seller may be protracted. In addition, since there are at least two sellers, a competition between the two bidders creates a sustained process of bidding not duplicated in single bidder type negotiation sessions. For instance, the competitive frontier of a negotiation is more likely to be extended and optimized with two or more seller bidders. The buyer has the option of disclosing all or part of the negotiation sessions with other S-INAs and such disclosures can act to increase competitive bidding.

Though, in FIG. 26, only two sellers are specified, several sellers can be negotiated with (simultaneously) by a B-INA, thereby increasing the complexity of negotiations. If several sellers are negotiated with, a B-INA may elect to either negotiate simultaneously with several S-INAs, or may prefer to narrow the field, as illustrated in FIG. 26, to two competitors, before selecting a final winner. After a winner is determined, sending messages to the remaining negotiators terminates negotiations with other S-INAs.

Referring to FIG. 27, the pre-negotiation process is described. After a customer requests negotiation terms (2755) through a B-IA (2760), the customer proceeds to a B-INA (2765). Several sellers, shown here at 2770, 2775, and 2780, are selected and meet the B-INA at a pre-negotiation session (2785) to determine interactive negotiation parameters. These parameter factors include locations, protocols, auction methods, etc. If agreement cannot be reached with a seller, the B-INA may proceed to negotiate with another seller. If at least two sellers can agree with the B-INA about preliminary protocols, communication aspects and other meta-issues, the B-INA and S-INAs proceed to establish (at 2790) rules regarding negotiation sessions, the range of the number of sessions and other parameters. Only when a B-INA can agree separately with at least two S-INAs can the agents proceed to the negotiation sessions for multi-lateral one to one interaction. The locations of pre-negotiation may be the buyer, the various sellers, or alternating between buyer and sellers.

One of the ways to conceal agent negotiation strategies, as illustrated in FIG. 28, is to use time based modulation to disguise agent interest. Negotiation responses can be quick or slow depending on the intentions of the agents. Specifically, providing contradictory actions can conceal agent intentions. Such disguised actions provide signals that are difficult for opposing parties to read. One way to accomplish this is for INAs to employ a randomizer that can alter the composition of the content of a bid so as to deceive an opponents anticipation of moves.

In reference to FIG. 29, INA logistics are described. After initiating the session (2690), agents are generated and identified by codes (2695). The initial agent interaction protocols are generated (2970) in order for the agents to establish a common communication methodology. Such communication processes involves translation (2975) and synchronization (2980). Failure to synchronize communication leads to a termination at 2995. Once fully synchronized, INAs may construct unique negotiation strategies using AI (2990) through an AAs information (2985). At this point, agents signal the intention (at 3000) to negotiate with other agents.

After signaling to other agents, INAs send out communication streams (3005) to their home base, thereby constantly revealing to the home base their locations, status and plans as well as receiving periodic parameter modification updates from home.

At 3010, a B-INA and S-INAs enter pre-negotiation sessions to set rules for further negotiations. Information about these pre-negotiation sessions is sent home (back to 3005). After pre-negotiation, a B-INA launches micro-agents (3015) in order to negotiate simultaneously with S-INAs at different locations. At 3020, INAs enter the negotiation sessions, which can lead to agreement between a B-INA and a S-INA (at 3024) and a provisional transaction completion (3025). It can also lead to INAs' ceasing negotiation (at 3023) in which case INA settings are saved (3030) for later re-launch. Once a transaction is provisionally completed by the acceptance of an S-INA by a B-INA, the S-ITA (3035) and B-ITA (3040) activate. Either ITA may return the transaction back to negotiations, or if both approve it, the transaction may close (3050) and agents self-terminate (3045) by saving INA settings for later re-launch (3030), and the session closes.

In FIGS. 30 and 31, INA interaction sequences are described. In FIG. 30, after initiating an initial commercial search request (3075) by a CSA, agents pre-negotiate at 3080. Those that do not successfully complete pre-negotiation return to 3075. Upon pre-negotiation completion, agents initiate negotiation sessions at 3082. Upon initiation of negotiation sequences, agents activate specific negotiation strategy and tactical modules (3085). While negotiating at different locations, buyers and sellers involved in the negotiations track mobile agents (3090) and continuously register the interaction activity with their home bases. Once a winner is determined (3095) by a buyer selecting a seller, negotiations between a buyer and seller lead to an initial commitment (3100). A buyer or seller can withdraw from the initial agreement (3105) by exercising a contingency and return to an initial CSA request. The successful INAs can push the transaction to the ITAs (3110); if the transaction is not completed by either a B-ITA or S-ITA, it is returned to negotiation sessions (3082). After the deal is finally closed, the settings are saved (3115), the agents self-disable, and the session closes.

In FIG. 31, INAs access AAs (3125 and 3130), which are both endowed by AI (3122), and then enter pre-negotiations (3135). S-INAs access the pricing module (3145), negotiation strategy and tactical modules (3155), and the auction module (3160) before proceeding to the negotiation session(s) (3165). B-INAs access the negotiation module (3155) and auction modules (3160) before proceeding to negotiation session(s) (3165). After negotiation is completed, the transaction continues to the ITAs (3170) and then either back to negotiations, or to close (3175). In order to get more access to the pricing, negotiation and auction modules, the transaction can return from the negotiation session(s) to the pre-negotiation session(s) stimulated by either the buyer, or the seller agents.

Both referring to INA system architecture, FIG. 32 describes the early interactions and FIG. 33 emphasizes the sequencing of INA negotiation sessions.

Referring to FIG. 32, three showcases are highlighted. Each showcase receives inputs from S-IAs, S-AAs and corporate databases. Promotions and RMOs also interact with showcases (and B-INAs). After the CSA (3270) accesses the showcases with an initial search request (3280) and results displays results (3282), a B-INA (3285) reviews the data with the help of a B-AA (3290).

Note that the B-INA proceeds at 3300 to the pre-negotiation sessions(s) with only two of the S-INAs (3295 and 3305).

In the embodiment illustrated here, the field has narrowed from three to two. In the preferred embodiment, four or more showcases can be accessed and at least four S-INAs can be involved in pre-negotiations and in negotiations, with a narrowing of the field from at least four to at least two until a winner S-INA is selected (at 3315) by a B-INA.

In FIG. 33, negotiation sessions are illustrated. In session one (3440) at least the three sellers are specified, but in session two (3443) negotiation occurs only between the B-INA and S-INA 1, on the one hand, and the B-INA and S-INA 3, on the other. In negotiation session three (3445), the B-INA focuses only on S-INA 3. After terms are negotiated and agreed to, the B-INA selects a winner and either proceeds to ITAs for completion or returns to 3440 for negotiation with several S-INAs. These negotiations may occur at various, or even alternating, locations. Each negotiating session can continue for numerous interaction sequences and may include criteria beyond price alone. The negotiation sessions may occur in sequences that narrow the field, as described in FIGS. 32 and 33, or may occur simultaneously until a B-INA selects a winner.

FIG. 34 shows the time-based sequences of negotiation session(s). At 3505, a first search request leads to a first seller ask (3510) (or the first request information display) and to the first buyer offer (3515). The first seller counter offer occurs at 3520 followed by a second buyer counter offer (3525) and second seller counter offer (3530). In this illustration, the buyer may accept the second seller counter offer at 3535.

Referring to FIG. 35, pre-negotiation session(s) (3570) determine the buyer (3575) and seller (3580) locations at which to conduct negotiation activities. The B-INA can negotiate at its home or the sellers' home(s) or can alternate between locations at various times during the negotiation process.

FIG. 36 shows the narrowing process of INA winner determination in a tournament configuration. In this figure, four S-INAs are accessed at 3625, during the first phase, by the B-INA. Two S-INAs (3630 and 3635) are then selected at the second phase by the B-INA (3640). In the third session, at 3645, an S-INA is determined by the B-INA to be the winner.

One of the key innovations of the present system is the ability of agents to negotiate on factors beyond price alone. These negotiable variables include item quality, item features, item quantities, terms of item finance and delivery, and other terms.

Referring to FIG. 37, multivariate negotiation is described. After an initial CSA search request (3705), two S-INAs provide first "ask" information (3710 and 3715). This first ask can be in the form of a price or, additionally, of a range of information about item features and qualities. The existence of item information beyond price alone suggests that the initial search request is substantially more than a mere RFQ, which focuses only on price. Such broader search request and response is also more conducive to custom orders. At 3730 the buyer provides a first counter-bid to each S-INA initial ask; each counter-bid can reference item features, quality, etc. as well as price.

At 3735 and 3740, the S-INAs provide their respective counter offers to the buyer first counter bid. Each S-INA has access to customer and market data, supplied by S-AAs at 3720 and 3725, respectively. However, each S-AA may supply or emphasize different kinds of data, which may influence the S-INAs first counter bid. This information input may involve collaboration so as to narrow the focus of customer data in order to facilitate customization. Given different information emphasis and the various item factors, each S-INA may provide quite different counter offer responses.

The B-INA (and its micro-agents) may provide second counter bids (3745 and 3750) to the S-INA counter offers. Again, the S-INAs respond with second counter offers (3755 and 3765). This process of counter-bidding and counter-offering may continue for numerous sessions, either with multiple sellers, two sellers or only one seller. The S-INAs may terminate the bidding/offering process at any time.

In the present example, the B-INA continues to focus on the negotiation process with S-INA 2 by accepting the offer at 3775. The contact is then sent to ITAs (3770 and 3780) for re-negotiation of some points or to final closure of the transaction, thus ending the negotiation session.

Various factors—such as item quality and features or transaction terms-beyond price alone can be negotiated in these sequences. A buyer or seller may accept transaction terms before proceeding to two or more counter-offers or the participants may negotiate for thousands of interactions until agreement is reached on all aspects of the transaction. Finally, the sequences can occur interactively between only one B-INA and one S-INA or between on B-INA and multiple S-INAs. This complex, multi-lateral, interactive negotiation process creates very dynamic scenarios, like occurring in one or multiple sessions.

Automated negotiation is illustrated in FIG. 38 in a demand-initiated sales system. The sequences specified alternate between buyer and seller in a compromise process within pre-established parameters between one buyer (B-INA) and one seller (S-INA). In the illustrated example, there are two main parts of the process. The first part of the process negotiates a first variable, while the second part negotiates a second variable. In the current example, the seller provides a first price (3770), which is countered by a buyer (3772). The negotiation proceeds to a final compromise price (3786).

The second set of variables is similarly negotiation by pre-established parameters until a final compromise is reached (3806). The outcome of the second variable(s) negotiation may influence the first variables negotiation outcome, and thus the first variable may require negotiation. Once equilibrium is achieved in the numerous variables, the negotiation process is completed.

In an additional embodiment, the negotiation between a B-INA and at least two S-INAs shows the complex dynamics of automated negotiation dynamics over multiple variables. In another embodiment, this multi-lateral multivariate automated negotiation process occurs with mobility in alternating locations with INAs moving program code as illustrated in FIGS. 39A and 39B.

FIGS. 39A and 39B illustrate the negotiation process in a distributed system with mobility between a buyer and seller. The present example focuses on a one-to-one negotiation between a B-INA and a S-INA. After a buyer (B-INA) initiates a negotiation session with a seller (S-INA) (3820), the INAs identify possible locations (3822) and specify agreed locations (3825) at which to negotiate. In the illustrated example, the B-INA moves to the S-INA location with program code (3827). The S-INA identifies incoming B-INA entry after activation and security protocol approval (3830) at the S-INA location.

The agents engage in (3832) and complete (3835) negotiation tasks, after which the B-INA "phones home" by notifying the buyer "home" computer of remote location activities by sending a message (3840). After reviewing more tasks at the remote S-INA location, the B-INA (3845) either terminates (or returns home) (3850) or assesses additional tasks using internal database and analysis (3855), assess (3857) and identifies (3860) the next location for task execution and moves to another locations (3865).

After moving its program code (3870), the B-INA identifies a need for AI computation (3875), requests AI computation resources at a specified location (3880), identifies available AI computation resources (3885) and messages a request for AI computation resources to be sent to a specific location (3890). The B-INA receives (3895) and tests (3900) the AI computation resources at a specific negotiation site (3895). The negotiations are completed at the remote location (3905) and the B-INA returns home (3910).

In an additional embodiment, the B-INA sends its "children" or micro-agents (cf. FIG. 72) to remote locations because it must be split into at least two parts in order to negotiate simultaneously with two S-INAs.

In FIGS. 39A and 39B, though a one-to-one interactive negotiation is shown between one B-INA and one S-INA, a B-INA (or its micro-agents) may negotiate simultaneously with at least two S-INAs at two or more S-INA locations (as well as buyer or intermediary locations) in an additional embodiment. The B-INA and S-INAs may also alternate between the various locations according to the agreed negotiation requirements of the INAs.

Not only are negotiations multivariate and interactive, but they are also multi-lateral. FIG. 40 illustrates how a B-INA can simultaneously negotiate with several S-INAs. A double shout auction embodies an interactive process between buyer and seller. In our example, a double shout auction can occur between a buyer and multiple sellers. Each negotiation process is two-way and allows multiple sessions. Ultimately, the multi-lateral approach will narrow the field as specific seller competitors drop out of the negotiation process after the selection of the winning seller.

FIG. 41 refers to the INA negotiation module and a negotiation method schema. The list of negotiation strategies and methods refers to specific approaches and techniques that INAs may employ to automate negotiations in specific situations.

In one-to-one interactive negotiations, negotiations between a B-INA and an S-INA may be cooperative or competitive. If cooperative, the negotiation sessions can use either an exchange based approach or a problem-solving approach, as described. If competitive, the negotiation sessions are dialectical or oppositional, or deterrence based. Unlike other approaches, a deterrence negotiation approach uses a non-zero-sum game. Negotiations may also be buyer-initiated or seller-initiated.

In multi-lateral negotiations, either one buyer can negotiate with multiple sellers, or several buyers can negotiate with multiple sellers. Whether one-to-one or multi-lateral, negotiations can cover different terms and goals of each party, as well as multiple item packages.

Automated negotiation can occur by establishing pre-set expert-system strategies in a game theoretic environment with specified constraints (i.e., time, information or choice). However, by applying AI technologies, automated negotiations can be adaptive to constantly changing conditions. Such adaptation involves the anticipation of opponent potential activities, as well as of changing situations.

The addition of mobility creates another layer of complication for automated negotiation because location changes add logistical and sequential issues in the mechanics of negotiation operations. The use of AI and mobility make demand-initiated automated negotiation processes increasingly dynamic.

FIG. 42 refers to the INA auction module, which specifies auction types. These auction categories may be employed by INAs in negotiation sessions. The auction types, either alone, or in combination (or alternating sequence), can be mutually selected by buyer and seller(s) during the pre-negotiation stage of the negotiation process. Though they appear to be generally biased towards the seller side, these main auction types are all interactive, and may be used in conjunction with complementary auction types. For instance, an ascending auction when combined with a descending auction in an interactive environment, leads to a double shout auction. A Vickrey auction merely modifies an English auction. A Vickrey auction may alternate with an English auction as part of the overall "discount" method proposed by a seller to give it an advantage.

The negotiation module relies on information and analysis from the auction module and, in the case of S-INAs, the pricing module. FIG. 43 illustrates these interactive relations between the modules. The negotiation module also accesses AI when necessary. Once negotiation methods, strategies and tactics are selected by INAs, the INAs proceed to INA sessions (4112, 4117 and 4125). via the Ms. Both B-AAs and S-AAs interact with the negotiation module.

Referring to FIG. 44, the pricing strategies module is shown in relation to M interactions. Market data (4155) informs competitor prices (4160) and the pricing strategies module (4175). Both B-AAs (4163) and S-AAs (4165) have data entered from the pricing module as well as by AI (4170). The process continues to the INA sessions (4180).

INAs, whether seller or buyer, do not need to have purely neutral stances from which to act. In fact, INAs may have personalities or attitudes. FIG. 45 refers to examples of personality traits that INAs may have as well as the dynamics of INA interaction. Depending on supply and demand imbalances, INAs may be optimistic, opportunistic, and aggressive if sellers have shortages, or if buyers have surpluses.

In order to disguise INA activities, INA personalities or attitudes may vary and alternate between the optimistic and the pessimistic, or between the opportunistic and the un-aggressive.

In an additional embodiment, ITA functions can be included in an INA for concurrent program execution. In another embodiment, M functions may be included in an INA. These embodiments may include abbreviated versions of agents for enhanced efficiency of program code operation. Finally, because they are autonomous, INAs use intelligence. The use and implications of applying AI to INAs provides an important layer of mobility which represents an additional embodiment.

C-INAs and Aggregation Methods

Referring to FIG. 46, cooperative INA (C-INA) (4530) intermediation allows a neutral agency capacity by brokering negotiations between B-C-INAs and S-INAs. A C-INA (4530), after accessing a CSA (4520) (which accesses various showcases and presents a report of an initial query), acts as a broker between S-INAs (4525) and multiple buyer C-INAs (4535). Because the B-C-INAs congregate for the pooling process and because they cooperate for the purposes of aggregating for better discounts, specific items from S-INAs may fill specific (multi-item) baskets of B-C-INAs at specified intervals by using ITAs (4540).

Since B-C-INAs can be essentially B-INAs that aggregate or work together in order to cooperate for discounts and more substantial buying power than individual B-INAs, there are several sources that initiate B-C-INA transactions. FIG. 47 describes these B-C-INA transaction initiation sources. In all cases, promotions from sellers are provided to, or invited by, sellers. However, in one embodiment, a B-C-INA may identify an opportunity that may require group buying power and inform other B-C-INAs so as to pool a cooperative group for this opportunity.

FIG. 48 illustrates B-C-INA aggregation. After accessing showcases and promotions, a CSA (4625) makes search requests for a specific item or multiple items (packages). The lead B-C-INA (4635) interacts with other B-C-INAs so as to coordinate and prioritize their preferences. At least two S-INAs (4850 and 4655) interact with B-C-INAs. The lead B-C-INA may act as a sort of consolidator in this context, in effect providing initiation and clearinghouse agency functions. Buyer IAs and pre-negotiation stages are used here in the preferred embodiment similar to ordinary B-INA and S-INA interaction early stage negotiation processes.

As demonstrated in FIG. 48, B-C-INAs can initiate coordination when they realize common interests and communicate with each other. In general, from the seller viewpoint, this form of simple aggregation is merely a method to sell a quantity of items to multiple buyers. Upon realization of common interests, B-C-INAs may be simultaneously coordinated for group buying opportunities. Any B-B-INA can broadcast opportunities to other B-C-INAs with similar interests. These broadcasts are sent to B-C-INAs through registries that identify and inform similarly interested parties. The B-C-INA that broadcasts a buying opportunity then leads the aggregation process for its follower B-C-INAs. For the purposes of the aggregation process, B-C-INAs use tags to track their movements in the congregation process that precedes aggregation. In the current system, a competition between at least two S-INAs over comparable items ensures a competitive environment which provides greater value to B-C-INAs.

A seller may trigger buyer cooperation by initiating a promotion on items or packages focused on groups of buyers. B-C-INAs may, in the course of negotiation with S-INAs, compromise in order to agree to the simplest items on their agenda, eventually filtering out the less common, mutually interested items. In this way, agreement between multiple buyers may be more easily and quickly reached.

In addition, as illustrated in FIG. 52, customization can occur with this general aggregation method because specific items may vary in feature choices for maximum item differentiation and customer satisfaction: Made-to-order (MTO) B-C-INA congregation is facilitated in this way After the buyers and sellers complete the negotiations, they proceed to S-ITAs (4660 and 4665) and B-ITAs (4630), where upon winner S-INAs are determined and items are allocated. ITAs—whether buyer or seller—may require the completion of more tasks, in order to close the transaction (4675).

Aggregation, in general, is a method to sell items, or bundles of items, to multiple buyers. Automated aggregation, in the context of the present system, may have several forms, including those shown in FIG. 49. The bundles can be multiple quantities of identical (or near identical) items as well as pre-set and open bundles. Pre-set bundles are specified combinations, while open bundles are any combination of items. The distinctive distribution patterns of the various types of aggregation—listed in 4740 thru 4765—each refers to a unique approach.

FIG. 50 refers to the mass pooling method of automated aggregation using INAs with multiple buyers and multiple sellers. B-C-INAs (4805, 4810, 4815, and 4820) pool their common interests by working together to procure specific items or bundles of items within pre-determined time constraints (4825). As time deadlines pass, specific item sets are distributed from sellers to interested buyers (4830); such common bids and negotiations between buyers for seller items are distributed by sellers at various locations (4835). B-ITAs and S-ITAs process the orders or require further negotiation (4840 and 4865). Once approved by both sets of ITAs, final orders are distributed to buyers (4870) and the session(s) are closed after a quorum of items bought has been satisfied. In this way, multiple sellers sell to multiple buyers once specific constraints have been satisfied over time.

FIG. 51 illustrates the disintermediated method of aggregation employed by the present system prior to the negotiation phases. In this example, several seller INAs (5005, 5010, and 5015) sell specific items (1-6) and preset bundles (i.e., specific combinations of items) (1-3). The S-INAs use S-AAs (5017) that use forecasting analysis of item combinations (5016) and demand shaping of time-sensitive promotional invitations (5020) (e.g., if a surplus of items creates an incentive by sellers to shift buyer demand from scarce items). S-AAs inform promotions (5025) which are provided to the lead B-C-INA (5030). The lead B-C-INA then selects items (5035) that follower B-C-INAs (5045) may be interested in. The B-C-INAs then enter into negotiations with the S-INAs for specific items and bundles (5055).

Observe that aggregation distribution occurs in this model with overlapping item demand. Similar item categories can be custom configured with specific features for particular customer needs while also providing aggregation capabilities. An example of this might be customers ordering ten thousand pairs of blue jeans, but with varying exact sizes. This aggregation method allows various buyers to share a much larger order that may be tailored to its needs.

FIG. 52 refers to the aggregation process that provides disintermediated mass customization. Various S-INAs (5105, 5110, 5115, and 5120) have items 1-8 and pre-set bundles 1-4. The specific items are ultimately distributed, according to the example shown in this figure, in such a way that: (1) B-C-INA 1 receives only item 1, but with features 2 & 3; (2) B-C-INA 2 receives item 1 with features 1 & 4 as well as item 4 with features 2 & 3; (3) B-C-INA 3 receives item 1 with features 1 & 4, item 4 with features 2 & 3 and bundle 3, and; (4) B-C-INA 4 with bundle 3.

Because this aggregation process is not performed by employing intermediated techniques, this automated process, precisely by using INAs, is disintermediated. Though FIG. 52 shows the outcome, the INA negotiation process is employed as well as the main aggregation process using B-C-INAs.

It is primarily in the context of aggregation employing C-INAs that the demand-initiated sales process can be reversed. In particular, for unique items, a single seller may sell to two or more buyers. This seller demand-initiated sales process represents an additional embodiment of the present system.

D-INAs

Referring to FIG. 53, dynamic INA (D-INA) double agents are described with an emphasis on their arbitrage application. D-INAs shift roles alternating between buyer and seller. Such a role change in a sales system can effectively replace the wholesale intermediary layer. After a CSA (5230) accesses showcases 1-4 and proceeds to pre-negotiation (5235), a D-INA, in a buyer mode, enters a negotiation session (5250) with at least two S-INAs. ITAs close the transaction after the negotiation session with the D-INA receiving (rights to) the item(s) (5270).

In the second phase of this illustrated embodiment, the D-INA switches roles (5265) and shifts to its seller mode (5275) moving to negotiate with a B-INA along with at least one other S-INA. After the buyer INA selects an item from a D-INA (now a seller) and after the ITAs resolve the closing of the transaction, in this illustration, the item can be provided to a buyer directly from the original seller (5295) thereby decreasing supply chain friction and duplication. The transaction is then closed (5300).

The use of arbitrage involves the exploitation of limited buyer information from D-INA intermediaries. One advantage of arbitrage approaches is the use of information at one location to exploit at a different location. The present system—which uses mobile D-INAs in one embodiment—is particularly well suited to arbitrage approaches in geographically transcendent environments using D-INAs in their buyer and seller modes.

In an additional embodiment, D-INAs use RMOs so as to limit risk. Precisely because there are enhanced risks in arbitrage situations between a seller and buyer function, RMOs in this context are compounded.

FIG. 63 refers to a method for disintermediated arbitrage of multi-item bundles from multiple sellers to multiple buyers using D-INAs. Several S-C-INAs (6605, 6610, 6615, and 6620) provide multiple items for sale and cooperate in order to calculate multiple buyer bundle bids. In this illustration, at least two D-INAs (6630 and 6635), after interacting with B-AAs (6625 and 6640), respectively request an initial search for multiple items via CSAs (6642 and 6414), and then enter into negotiations with the S-C-INAs (6630 and 6650). Bids are evaluated at 6655 using either relationship management (6660) or revenue maximization (6665) strategies, after which the D-INAs select sellers' specific bundles (6670).

Once a seller bundle or combination of seller items are selected by D-INAs (as buyers), the D-INAs change their mode to that of a seller (6675 and 6680). Using the methods discussed earlier, the D-INAs then negotiates (as a seller) with multiple B-INAs for multiple items. In this example, several B-INAs are winnowed in succeeding phases until the final B-INAs are selected. The application of D-INAs for multi-items in the seller mode reveals a dis-aggregation function by selling to several buyers.

Disintermediated Multi-Item Combinatorial Auctions Using INAs

In reference to FIG. 54, a traditional, intermediated, combinatorial auction is illustrated with an application to a single seller providing items to multiple sellers. In a single-bid phase auction process, a seller (5505) provides multiple items, 1-5 (5510-5530), via an intermediary (5535), to various B-INAs. The items are distributed in this example, according to specific combinations of items, to specific B-INAs. In this example B-INA 1 receives items 2 & 4, B-INA 2 receives items 1, 2 & 3, etc.

Referring to FIG. 55, the intermediary is removed from the transaction in which a seller provides four items to four separate B-INAs in specific configurations. Buyer A receives items 1 & 3, buyer B items 1 & 2, buyer C items 2 & 4, and buyer D items 2, 3, and 4. Because no intermediary is involved, a double opposing shout auction—in which the package price descends for seller(s) while it simultaneously rises for the buyer—is used between a single seller and several buyers simultaneously.

FIG. 56 illustrates a multilateral opposing shout auction in which items are sold between a buyer and at least two sellers, either with or without an intermediary. From the viewpoint of a seller, prices decline, while from the viewpoint of the buyer, prices increase.

Factor filters are methods by which to prioritize multi-item bundles by composition and structure. By distinguishing between kinds of bundles, negotiation for multiple items between buyer(s) and seller(s) can be more organized and efficient. Such factor filtering processes can be applied to combinatorial auctions employing INAs.

In reference to FIG. 57, factor filters operate as pruning techniques (5815) in the process of evaluating multiple bidders (5810) by either S-INAs or B-INAs (5805). After establishing a priority preference (5820), several main kinds of bundles—preset (5825), specific (5830), progressive (5835), quantity (5840), quality (5845), and temporal adaptive (5850)—are categorized. Several bundle categories are further sub-categorized as (1) threshold factor specific (5855), i.e., an item that is critical to a bundle; (2) need specific (5900), in which complementary item(s) are necessary in order to make the whole bundle desirable; (3) item preference (5890), in which a preferred item in a bundle is sought [A D-INA may buy a bundle for a specific item in order to split the bundle and resell the various valuable and common parts.]; (4) successor contingent bundles (5860) in which a first priority item is sought and only if not acquired then a second priority item is sought and so on; (5) priority contingent bundles (5865), in which a first item is sought and, only if the first item is acquired, will a second item be acquired and so on; (6) quantity bundles (5895) in which multiple substitutable items are acquired, for example by more than one buyer as an aggregate; (7) quality bundles, in which the best items are sought (5867) and for the best value (5883); (8) dynamic pricing contingent bundles, in which multiple items depend on time or price priorities across the product or service cycle (5870) in such a way that value fluctuations determine item priorities.

Referring to FIG. 58, disintermediated multi-item bidding from only one seller to multiple sellers is described. After several B-INAs receive data analysis from B-AAs, the B-INAs enter into mutually agreed rules of negotiation (5995) similar to a pre-negotiation. A seller INA negotiates with the B-INAs for multiple items (6000) by proceeding to apply factor filters (6005) in order to establish buyers' specific priorities. Buyers (6007) select unique sets of specific items in order for the seller to evaluate the initial bids (6015) for optimal seller benefit.

In order to evaluate buyer bids, the seller uses two main approaches. On the one hand, it can use a strategy of short-term revenue maximization (6020) in which it accepts the overall two highest bids (6040) for a specific package. On the other hand, it can use a strategy of long-term relationship management (6010) in which two winners are selected by using factors beyond price alone. In an additional embodiment, it can select two winners by alternating between the two methods.

Once the two winning buyers are determined (6030 and 6035) for multiple items, the process enters a new phase. A second phase of bids are evaluated (6045) and the highest overall bid on multiple items (6050) by a buyer is evaluated by the seller. A winner is determined by the S-INA (6055) and the ITAs close the transaction (6057).

In an additional embodiment, once the highest overall bids are determined (6050), and the winner is determined (6055), the second highest bidder can capture remaining seller items not included in the first winner package and hence constitute another package of items. The second highest bidder then becomes the winner of a second priority bundle of items remaining from the first bundle of buyers.

FIG. 59 describes a method for transactions involving multi-item bidding with multiple sellers to a single buyer using S-INAs. After receiving inputs from a B-AA (6105), a B-INA (6110) requests bids from sellers for specific bundles of items. Several S-INAs work together (i.e., cooperate to mutually agree on negotiation rules (6115) similar to a pre-negotiation session.). At 6140, bidding occurs by the S-C-INAs to supply packages of items from various sellers. Pre-set bundles (6150) are bid on and a winner determined by the buyer (6160).

However, specific open bundles are bid for at 6140. Pruning techniques (6155) that eliminate less preferred items and factor filters (6170) are applied in order to limit bundle composition so as to increase efficiency. At 6175 seller bids are evaluated by the buyer. The buyer can use a short-term revenue maximization (6180) strategy or a long-term relationship management (6165) strategy of preliminary winner determination. In this example, the former strategy leads to S-INA 4 being selected and the latter strategy leads to S-INA 2 being selected. In a second phase of winner determination, at 6195, a final winner—S-INA 2 (6210)—is selected. A B-ITA resolves any transaction clearing issues (6205) and either renegotiates or closes the transaction (6200).

FIG. 60 shows a process for disintermediated aggregation of pre-set bundles with multiple sellers and multiple buyers. Various B-C-INAs (6265, 6280, 6295, and 6300) congregate in order to share bidding for specific pre-set bundles. Pre-set bundle 1 (6260) is provided by seller 1 (6255), pre-set bundle 2 (6275) is provided by seller 2 (6270) and pre-set bundle 3 (6290) is provided by seller 3 (6285). Pre-set bundle one consists of products 1 & 2 and service 1, pre-set bundle two consists of products 3 & 4 and service 2 and pre-set bundle three consists of products 5 & 6 and service three.

In this illustration, buyer one (B-C-INA 1) and buyer two (B-C-INA 2) select pre-set bundle one from seller one. Buyers one, two, and three also select pre-set bundle two from seller two. All buyers select pre-set bundle three.

FIG. 61 shows a disintermediated bidding approach for multiple items between multiple sellers and multiple buyers. In this example, sets of combinations of items are matched between sellers and buyers. Each horizontal row represents the distinct items offered from one seller. Therefore, row one represents items 1-4 from seller one and so on.

In this unique configuration, five buyers bid for separate specific packages (bundles of items) from among the twelve items offered from the three sellers. Accordingly:
Buyer Bidder A seeks items 1, 5, & 9
Buyer Bidder B seeks items 2, 3, 4, 6, 7, & 8
Buyer Bidder C seeks items 3, 4, 7, 8, & 12
Buyer Bidder D seeks items 5, 6, 7, 9, 10, & 11
Buyer Bidder E seeks items 9, 10, 11, & 12

Note that there is overlap between the items that buyers seek. This overlap implies that the buyers are competing for these items. Consequently, bids must be evaluated in multiple item packages for overlapping items. Combinatorial auctions can evaluate the competitive bids, but information must be shared between multiple sellers in order to do so because otherwise, only incomplete information is available on multi-item packages that include items not offered by some sellers. This problem of the need for sellers to share information between themselves in order to adequately calculate multi-item bundles between multiple buyers leads to the development of S-C-INAs.

FIG. 62A illustrates C-INAs used on both the buyer side and the seller side. In this figure, a disintermediated method of aggregation is described involving multiple item bidding from multiple sellers and multiple buyers using C-INAs. In phase one, various sellers (6415, 6435, 6455, and 6470) offer multiple items for sale (6420, 6440, 6460, and 6475).

B-C-INA 1 (6430) is the lead C-INA in this example. B-C-INAs congregate at various locations at the request of the lead B-C-INA. Once a quorum of B-C-INAs is established, a pre-negotiation phase will set initial rules. Each B-C-INA seeks different sets of items from various sellers. In order to bid on a variety of items requested from multiple buyers offered by multiple sellers, the sellers must work together. At 6445, the sellers cooperate by providing pricing information in order to calculate B-C-INA bid values. Without this cooperation, incomplete information on items in bid sets not involving only a specific seller will be indeterminable. Though complex, the goal of sharing pricing information between sellers regarding buyer bidding is to manage auction pricing (and other item factor) data in a limited time frame so as to establish a competitive real-time market.

If items between sellers are substitutable, then real competition between sellers can occur even on multiple items within packages offered by multiple sellers. Winning bids (6480) are selected by seller calculations of high bids on multiple items. Alternatively, long-term relationship management criteria may develop a strategy of different results than strictly revenue maximization. Because multiple items are selected by multiple buyers, there is at best a hierarchy of choices for sellers to maximize the bidding; such choices produce trade-offs of results between buyers in which only marginal benefits may separate winners (6490).

In a further discussion of this process in FIG. 62B, several sellers (S-C-INA 1-4) are narrowed in several phases into a final winner (S-C-INA 2). Though sellers share necessary information in order to calculate bids, they also compete. In the embodiment illustrated in FIG. 62B, a unique package of items is selected from S-C-INA 2 (the winner, at 6550) by B-C-INAs that pool their interests (6510) into multiple item bundles.

Bids are made and evaluated (6530) by buyers either cooperatively or competitively; if cooperatively, buyers may divide items between themselves after sellers have determined the buyer winners. The group of buyers may also assemble specific subsets of items comprising specific packages (6455). In this case the buyers may bid for a specific subsets of items (6575) for distribution from among participants after the general sale from a seller. This distribution process is a form of dis-aggregation.

In an additional embodiment, the selection of successful B-C-INAs may occur over time by instituting overlapping time frames for the filling of buyer baskets.

FIG. 64 refers to various factors that may be negotiated in multi-item negotiations.

FIG. 65 refers to a list of alternative multiple feature factors involving personal computer configurations. A change in a single feature changes the composition of the package. Each completed computer represents a multi-item package. If different sellers provide the pieces of each computer, then a buyer using the present system can assemble a multi-item bundle.

FIG. 66 illustrates examples of multi-item bundle categories.

ITAs

Intelligent transaction agents (ITAs) are used to close transactions. ITAs are either seller-side or buyer-side. ITAs (6815) interact with AAs (6810) and with INAs (6805) as illustrated in FIG. 67 in the context of the seller role. The ITA closes the transaction (6830) after it clears the negotiation. The ITA uses a compliance function, in these cases.

FIG. 68 shows an S-ITA operation. After an S-INA provisionally completes negotiation (6850), it requests the S-ITA to clear the transaction (6855). The S-ITA initiates a review of transaction terms and item terms (6850), and accesses a financial database to check the buyers credit (6865). The S-ITA proceeds to clear the buyers credit (6870 and 6875) or reject it (6885). If rejected, the transaction is sent back to negotiation (6890). If approved, the transaction is closed (6880).

In an additional embodiment, the INA and ITA work together symbiotically to clear each variable in a sequence of transaction steps. As the INA requires an ITA function, it will pass this part of the transaction for clearance while the INA continues to process the negotiation functions contingent on ITA clearance. The ITA represents an autonomous sequential clearing mechanism in a close relationship with the INA operation.

ITAs provide an important function similar to an accountant or lending officer. Without clarifying item and transaction terms, for instance, an agreement is not complete. Once clarified by using a checklist of operations that pertain to important functions, the deal can be closed.

FIG. 69 describes an S-ITA (6940) and a B-ITA (6945) interacting in a system process in the final negotiation between one seller and one buyer. As illustrated, the ITAs interact with their respective AAs (6920 and 6950) and INAs (6925 and 6930) and with each other. If the respective INA does not satisfy ITA transaction clause constraints, the transaction is returned to the INA for renegotiation of its specific parts during a specific phase of buyer-seller interaction. Once all constraints are satisfied, the transaction is closed (6955).

In an additional embodiment, ITAs may perform their functions at multiple locations, in sequence or alternating at various locations. This mobility aspect is achieved by using AI technologies. ITAs also supply services as listed in FIGS. 70 and 71. At each stage of a sequence of INA interactions, the ITA may offer these services to buyers and sellers.

By working closely with AAs, ITAs can analyze data crucial for transaction completion. Consequently, ITAs can involve services referenced in FIGS. 88-92.

In one embodiment, ITA functions may be included in INAs for optimized efficiency and may be executed concurrently.

Micro-Agents

A B-INA negotiates with at least two S-INAs to conduct multiple parallel (or sequential) negotiations. One method to do this, as described in FIG. 72 (and earlier), is for a B-INA to spin off various "children" or B-INA micro-agents (7110, 7115, and 7120). Each B-INA micro-agent can complete a negotiation session with one of a series of S-INAs at various locations (7125, 7130 and 7135). Micro-agents can communicate with each other in order to conduct parallel simultaneous negotiations with multiple S-INAs. Once each specific negotiation session between a B-INA micro-agent and a winner S-MNA (7150) is complete because of mutual agreement (7155), and the transaction completed (7165), the sessions with unsuccessful S-INAs are closed (7160) and a B-INA micro-agent terminates. Micro-agents may use applets or aglets in order to launch, replicate and activate their program code.

In an additional embodiment, D-INAs, particularly in a buyer mode, may use micro-agents to conduct its functions.

In another embodiment, S-INAs may use micro-agents to conduct its functions. In particular, in aggregation or multi-item bundle bidding contexts in which sellers may negotiate transactions with two or more buyers, micro-agents may be applied in a similar way.

Micro-agents are particularly appropriate in complex multi-lateral negotiation activities in which mobility of agents between multiple locations in a distributed network are involved. FIGS. 39A and 39B illustrate a mobile negotiation method in a distributed system that can be applied to micro-agents.

Artificial Intelligence

Artificial intelligence (AI) applies in several main ways to the present multi-agent system, including the use of genetic algorithms, neural networks (and fuzzy logic), genetic programming and evolutionary computation. These AI functions are applied to the operations of AAs, INAs, ITAs, and CSAs.

FIGS. 73-80 describe the unique operations of AI and their distinctive applications to agents in the present system. By providing learning and intelligence functions to agents, specific agent actions can be autonomous. Such autonomous agency provides unique interactions among agent operators that emulates the complexity of markets. The present system advances considerably the use of AI in multi-agent computer program commercial systems.

Referring to FIG. 73, genetic algorithms are applied to the present multi-agent system. In a quest to identify an optimal algorithm for a specific computation action or problem, a search for the best algorithmic solution commences (7215). Based on available information, a set of candidate solutions is generated (7225).

In a distributed communications system, market data inputs (7210) are filtered (7220). Candidate solutions (7225) are created from available information and then new generations of candidate solutions based on multi-factorial mutations (7235) that are generated by a randomized mutation engine (7228). Mutated candidate variants are produced using survivor candidate operators that sort by variables (7240). These maximized and expanded sets of candidate solutions are evaluated according to efficiency criteria (7245), which can be used to select the most optimized candidate solutions. The best algorithmic candidates are matched with market data (7230) [via pattern matching (7220)] and then new generations of candidate solutions are created in a loop from 7230 to 7245.

The best candidate solutions are kept after testing which are most successful (7255) while the rest are discarded (7250). New generations of candidate solutions are bred for regeneration, filtering and selection. The winning algorithm solution is determined using the most updated criterion (7260). The solution results are displayed (7270) and ranked (7280). Sub-optimal solutions (within specified constraints) are returned to generate additional candidate variants for future comparison, selection and use. The optimal solution, relative to all available candidates (7275), is applied to agent analysis or activity (7285) and the program run is ended (7290).

Referring to FIG. 74, neural networks are applied to the present multi-agent system. Initial solutions (7315) to computation problems are developed based on available information, typically market data inputs (7305). NNs are generated (7325), in part based on available market data and in part based on a comparison of optimal statistical scenarios (7330). Statistical scenario comparisons may involve fuzzy logic inputs (7320).

Neural networks are trained (7335) for fitness using training patterns that run through a process of trial and error until a specific set of candidate NNs is identified that optimize computation solutions. These patterns are compared to market data inputs. NNs are matched for optimal fitness patterns (7340). During this process of pattern matching, mutations may occur using a mutation engine (7345) that employs random (7355) and alternating sequences (7360). Such mutated NNs are retrained using efficient parallel computation resources. The most fit NNs (7340) are pruned (7350), tested (7365) and ranked. After ranking each NN generation for fitness (7370), a stage equilibrium point is reached (7372). The less fit NNs are retrained and replaced with expanded retrained NNs. (7375). Finally, a select NN is applied to an agent analysis or activity (7380) and the computer program run ends.

In FIG. 75, a genetic programming system process is described. Data inputs (7505) are applied to rule based learning (7510), regression analysis (7515) and induction decision trees (7520). Rule based learning uses a pattern matching pruning approach (7525) that leads to the development of heuristic operational rules (7535) that relearn (7545). The heuristic operational rules, the regression analysis, and the induction decision trees are applied to organizing models (7530). The organizing models are measured by scope, accuracy, and errors (and exceptions and missing values). These operating models present output scenarios (7550) as statistical positive (7560), or negative (7565) recommendations or as forecasts (7555). These recommendations are applied to agent analysis or activity (7570) and the computer program run is ended (7575).

GP learning schemas are described in FIG. 76 as a table of various main learning types.

FIG. 77 describes evolutionary computation applications to agents in a multi-agent system. After testing GA approaches for success, the system proceeds to test GP, and NN approaches. This filtering approach of testing EC techniques operates like a switch. The evolutionary computation approaches (7605) of genetic algorithms (7610), genetic programming (7615) and neural networks (7620) are applied to the CSA (7625), the M (7630), the INA (7635), and the ITA (7637). Each agent uses differentiated reasoning schemas that are specified. Each agent type also specifies the advantages of each application (7640, 7645, 7650, and 7655).

FIG. 78 describes AI applied to agents in a distributed system. An agent requests (7675) and accesses (7680) AI application to solve a problem at a particular location. The agent then identifies optimal AI application by using a filtering process (illustrated in FIG. 77) that test GA, GP and NN processes for a specific use (7685). The agent then applies AI efficiently for a specific use (7695). If an agent requires more AI (7690), it returns to 7675. If it has sufficient AI to complete a task, the agent completes the session (7700).

Referring to FIG. 79, an evolutionary computation architecture is described with reference to M and INA applications. GA (7715), NN (7725), and GP (7720) modules breed optimal programs (7730) using the efficiency module (7735). These programs and other evolutionary computation methods (7740), as well as multiple simultaneous evolutionary computation approaches (7745), and an expert system (7755) driven inference engine (7760), create, test and optimize various evolutionary programs (7750).

These evolutionary programs are applied to B-AAs and S-AAs (7765) as intelligent analytics for use in specific forecasting (7780), analysis (7785), synthesis (7805) and collaborative filtering (7800) functions. The evolutionary programs are also applied to INAs either through optimal negotiation approaches (7775) and non-intentional disguised negotiation strategies (7770). Negotiation approaches use auction typologies (7795) that are then applied to various INAs (7790).

AI is applied in distinctive ways to the present system. Techniques empower agents to be autonomous and, hence, mobile. EC endowed autonomous intelligent software agency is applicable to negotiation agents using several specific methods. In the present demand-initiated system, AI is applied to: (1) the B-INA process of narrowing from several S-INAs to two S-INAs; (2) the process of a B-INA automatically negotiating with two S-INAs, (3) the process of interactive multivariate B-INA and S-INA negotiation and (4) the process of using mobility in automated demand-initiated negotiations in a distributed environment. Because the demand-initiated negotiation contexts of negotiation have a buyer bias, the notion of AI-driven autonomy is unique. In all cases, the application of AI to the present system is crucial in order to allow INAs to adapt to changing circumstances, to anticipate the changing scenarios and to accommodate decision processes that emulate human behavior.

Furthermore, the specified AI approaches are applied to INAs in the aggregation, arbitrage and combinatorial contexts of a demand-initiated system precisely because of the immense complexity of automating these complicated functions. AI-induced INAs can solve complex negotiation problems within specific rules that pre-programmed systems cannot. Since the present invention involves several dimensions of complexity, including multivariate, multilateral, combinatorial and mobile aspects in a demand-initiated system—which are exponentially more complex in combination—AI approaches are increasingly pivotal.

Mobility

The problem of mobility with intelligent agents is solved by applying layered AI. FIG. 80 refers to layered AI for optimal agent mobility. By keeping initial demands for computation to an efficient minimum, the system resembles a RISC (reduced instruction set computing) software architecture approach that strongly benefits the need to keep mobile agent program code as efficient as possible. At the same time, huge computer resources are accessible when necessary—either from the users "home" computer or an outside service provider—in order to provide powerful computation to meet peak agent needs, especially in time-sensitive or complex transactions. This approach may resemble a biological immune system which, when it detects an anomaly, brings to bear a larger arsenal. In the case of mobile computer devices, which tend to posses minimal computation resource capacity, the application of layered AI promotes the use of mobile program code so as to efficiently enhance scarce resources.

Though mobile, intelligent agents have a "home" base (7860), or a computer source location from which it is launched (7870). After launching, the agent(s) make an initial determination of minimum expected computer resources required for a specific activity based on initial (pre-negotiation) interaction (7885). After the initial determination of efficient computer resources, the agent(s) enter into interactions (or analysis) using specified AI function levels at various mobile locations (7895) specified in the transaction(s). Either the agent(s) completes their function(s) and terminates (7897), or they discover a need for increased AI to perform increased functions (7900).

Once an agent discovers a need for increased AI to perform increased functions, the agent(s) seek "reserve" layers of AI (7880). These reserve layer requests are analyzed for minimum actions necessary (7865) to perform a specific function efficiently (thereby accommodating mobility requirements), parallel use (7875) or alternating use (7890) of various AI simultaneously for faster and effective computation resource capacity utilization. These added resource capacities are input at the agent interaction level (7895).

Once AI requirements are discovered by agents, AI filters (7910) are employed in which the agent(s) select optimal methods of AI to employ (7905). For example, an INA may use GP and NN computing preferences to complete negotiations, while an M or ITA may prefer to employ GA to enhance an analytical function. In any event, the optimal AI method request moves to an agent requesting reserve AI layers (7880).

Ultimately, the agent(s) seek out the most effective use of AI functions (7915). In order to maximize mobility, an agent needs to determine a (constantly shifting) balance; either (7920) between less AI program code in order to maintain high speed and light travel, or increased AI sophistication for intensive analysis or negotiation activities. In the case of increased mobility with lighter load (7935), the agent disables unnecessary code (7930).

In the case of a need for more program code, increased calculations are needed for an increased number or complexity of agent activities (7940). Increasingly complex interactions, e.g., with a long negotiation process, may require a different computation resource type or quantity than an analytical function that may be more intensely time constrained. In any event, when it is determined that substantially greater computer resources are required, the agent(s) may return to the home base in order to facilitate the request (7945 and 7860).

Analytical Agents

Analytical agent mobility—from both buyer and seller viewpoints—is described in FIG. 81. From a seller perspective, the seller (8000) accesses an S-AA (8030), which receives market data inputs (8020). The S-AA interacts with S-INAs (8075), S-ITAs (8055) and, via an S-IA (8045), showcases (8050).

On the buyer side, the buyer (8005) interacts with a B-AA (8035) and a CSA (8060) directly, and via a B-IA (8015). Informed by market data (8025), the B-M interacts with the CSA (8060), B-INAs (8070) and B-ITAs (8065).

Because the system involves autonomous agency with AI, AAs may be mobile. Both S-AAs and B-AAs use AI, which may involve a need to return to home base (customer or seller) for increased computation resources.

In reference to FIG. 82, kinds of data analysis and syntheses are described. Whether buyer or seller AAs, various market data sources (8105) are input. Buyer AAs (8110) perform a full range of analytical tasks including collaborative filtering (8120), editorial retailing (8125), expert systems (8130), and multi-attribute regression analysis (8135). Seller AAs (8115) use expert systems (8130) and multi-attribute regression analysis (8135).

Collaborative filtering uses statistical scenarios (8145), forecasting (8185) and syntheses (8150) methods, which result in issuing a recommendation report (8200). Editorial retailing involves ascertaining third party opinions (8155) and then initial filtering and synthesis of buyer data (8170), the combination of the data (8190) and production of a final report (8205). The reports—typically customized—are made available to B-MNAs and B-C-MNAs.

The expert system involves applying pre-programmed parameters to the mass personalization of data (8160), the use of targeted information (8175) and the creation of a custom report (8195).

Multi-attribute regression analysis typically isolates variables according to an established relevance scale by using a process of "factor testing" that measures the accuracy of specific attributes. At a stable equilibrium point in the analysis, a synthesis of attributes (8165) can be made that combines key variables for maximum utility, after which a systematic report is generated (8180).

FIG. 83 refers to the analytical agent data flow process. Market data (8255), from various sources in a distributed computer system, is translated into codes. AAs (8260) access the market data and provide a range of services (8265) specified at 8270 and 8275 as well as FIG. 92.

In FIG. 84, data mining approaches are described with particular reference to CSA and AA interactions. Market data (8305) is fed into the system from different sources, while various methods of data discovery are employed (8310). For the CSA, these methods include: search (8315)—including both local (8340) and global (8375) databases—specific (8320) query (by item (8345) and by company (8350) accessible from showcases (8380)), general (8325) query (by category (8355) and industry (8360)), time sensitive query (8330) and targeted information collection (8335) (that may involve specific customer requirements (8370)). In addition to these methods, AAs use data syntheses (8385) that create specific customer profiles (8400), and data analysis (8390) that features predictions (8395) and creates scenarios (8410). Whether using analysis or syntheses, a report is created for AA use.

A process for advanced collaborative filtering for cross-marketing recommendations is described in FIG. 85. The customer requests information on item(s) of interest (8470). The collaborative filtering process (8490) sorts categories according to item type, popularity, region, quality, services, bundles, quantity, price range, and combinations of these categories.

The customer request for information is analyzed (8500) and new items of customer interest are statistically ranked in relation to the initial item request. Other items are recommended that are associated with information on the current item (8510). A list of recommended items is presented to the customer (8515) who subsequently acquires them (8525).

After the transaction, customer-purchasing habits are analyzed (8475), in conjunction with interaction with an S-AA (8460), and the information is fed to the filtration analysis (8490). Promotions are "pushed" to customers as recommended items (8505) related to future requested items. This data is input to a B-AA (8495) and, via a B-IA (8485), to a CSA (8480). In this way, promotions can be optimally guided after a CSA requests showcase data (8455) when informed by B-M (8465).

This collaboration filtering process is both automated and mobile because AAs perform these functions interactively at various locations.

FIG. 86 shows B-AA operations with mobility. After a B-INA (or B-ITA) requests analysis from a B-AA (8550), the B-AA activates analysis functions at a specific location (8555). The B-M then moves to a remote or multiple remote locations to collect data (or it may import data at its home location) (8560).

The B-AA performs analysis on data (8570), organizes the analysis and issues a report (8575). In addition, the B-AA also performs synthesis on the data by combining data sets (8580) and organizing the data synthesis into a report (8585). The data analysis and synthesis functions are then applied by the B-AA to a B-INA (or BITA) function at a specific remote location by exporting reports (8590) and then closes the session (8600).

In an additional embodiment, AA functions may be consolidated with or included in INAs or ITAs and may execute concurrently.

FIGS. 87 through 91 describe a system involving services and service variables that utilize a distinctive code process. Most agent interaction involves the exchange of information using these codes.

FIG. 92 lists services provided in the present system.

The system represented by the present invention has numerous distinctive embodiments. The present disclosures illustrate in detail the main ideas of the invention and are not intended to restrict the invention to a single embodiment.

I claim:

1. A system for searching data in a distributed computing network of sellers' commercial databases, the system comprising:
    a distributed computing network comprising a set of computers using integrated circuits and memories configured to manage a plurality of sellers' commercial databases, at least one buyer's computer configured to communicate a buyer's query, at least one of a plurality of commercial search agents (CSAs) and at least one of a plurality of buyer and seller intelligent negotiation agents (INAs);
    wherein the sellers' commercial databases store and provide access to data on at least one of a plurality of selected items;
    wherein the network of sellers' commercial databases is periodically updated to include additions and/or deletions of items;
    wherein at least one CSA is configured to communicate with the plurality of sellers' commercial databases;
    wherein the CSA is configured to receive the buyer's first query regarding at least one of a plurality of selected items, including products or services;
    wherein the CSA is configured to search the plurality of sellers' commercial databases for information related to selected items; and
    wherein at least one of a plurality of buyer INAs is configured to communicate with the CSA and to receive information related to at least one of a plurality of selected items.

2. The system of claim 1:
    wherein at least one of a plurality of CSAs for searching data from the plurality of sellers' databases generates a report showing data that most closely meets a buyer specified goal.

3. The system of claim 1:
    wherein at least one of a plurality of sellers' databases includes at least one promotion module whereby a discount of offers is provided to least one buyer on a product or service at a particular time.

4. The system of claim 1:
    wherein at least one of the plurality of sellers' databases includes at least one risk management option module whereby the seller activates an option to pay a penalty to a buyer if it uses a right not to accept a previously agreed price for the sale of a product or service.

5. The system of claim 1:
    wherein the INA for at least one buyer initiates a negotiation process for procurement of at least one of a plurality of selected items with at least one seller INA.

6. A method for organizing information about products and services that communicates over a distributed network, where the method is executed on a computer hardware system, using computer circuits, one or more memories configured to store data from a distributed computer system, a database management system (DBMS) configured to store and access data on the memories, a set of data stored in the DBMS referring to individual product items and individual service items, at least one of a plurality of intelligent commercial agents (CSAs) configured to interact with the DBMS, one or more seller showcase databases configured to communicate with at least one CSA in a cooperative communications network (CCN) and at least one buyer and/or seller intelligent analytical agents configured to mine data in at least one database and where the method comprises;
    storing and providing access to data in the sellers' commercial databases in a CCN on at least one of a plurality of selected items;
    updating the network of seller's commercial databases periodically to include additions and/or deletions of items;

submitting a bid to at least one CSA from a seller showcase database when one or more of the seller showcase databases receives from at least one CSA a request to receive bids to sell a selected item;

mining data with at least one of a plurality of buyer intelligent analytical agents related to a selected item from a list from a seller showcase database in the DBMS;

configuring the buyer intelligent analytical agent to generate data that most closely conforms to a set of preprogrammed item parameters; and providing a buyer with the data by using the buyer intelligent analytical agent to communicate with the at least one CSA.

7. The method of claim 6, further comprising:
at least one of a plurality of buyer's intelligent analytical agents interacting with at least one database registered with a CCN to receive an automated bid to sell a selected item responsive to the request; and requesting bids that include a set of item parameters, including quality, quantity, financial terms and/or delivery times.

8. The method of claim 6, further comprising:
requesting bids that include a set of item parameters including price.

9. The method of claim 6, further comprising:
requesting bids that include a set of item parameters including item features.

10. The method of claim 6, further comprising:
using the CSA to communicate with at least one of a plurality of buyer analytical agents in order to request bids conforming to a set of preprogrammed item parameters.

11. A system for organizing information about products and services via a network of computers, the system comprising:

a distributed computer network comprising a set of computers using integrated circuits and memories to process data involving a plurality of sellers' commercial databases registered with a cooperative communications network (CCN), a plurality of showcase databases configured to receive data on product and service items from a plurality of seller databases, at least one of a plurality of buyer and/or seller analytical agents for mining data related to at least one of a selected item from at least one of a plurality of industry databases, at least one of a plurality of intelligent negotiation agents (INAs) for buyers and sellers and at least one of a plurality of sellers' inter-agents;

wherein the sellers' commercial databases store and provide access to data on at least one of a plurality of selected items;

wherein the network of sellers' commercial databases is periodically updated to include additions and/or deletions of items;

wherein each showcase database is registered with a CCN;

wherein at least one of a plurality of buyer analytical agents generates a subset of data that most closely meets a preprogrammed goal;

wherein at least one of a seller's inter-agents is in communication with the buyer analytical agent for receiving the data;

wherein the seller's inter-agent for generating data from at least one of a plurality of showcase databases is configured to organize the data responsive to the sellers' sales objectives;

wherein a user interface for displaying information from the buyer analytical agent is configured to display data from the at least one seller showcase database; and wherein at least one buyer INA and at least one seller INA are configured to interact.

12. The system of claim 11:
wherein at least one buyer INA is activated after the buyer analytical agent identifies a product or service in a showcase database.

13. The system of claim 11:
wherein at least one buyer's INA communicates with at least one intelligent seller's INA; and wherein when at least one buyer's INA requests a bid for sale of a selected item, at least two of said seller's INAs submit a bid to the at least one buyer's INA.

14. The system of claim 11:
wherein the analytical agent periodically monitors the market data and generates updated data for any change in market data; and wherein the seller's inter-agent generates data for the showcase database responsive to any change in the market data.

15. The system of claim 11:
wherein an item comprising one of a product or service is selected by at least one buyer;

wherein mining data related to the selected item is retrieved from at least one of a plurality of industry databases;

wherein each of said market databases is registered with a CCN related to the selected item;

wherein an intelligent analytical agent analyzes said data against a preprogrammed goal to generate data that most closely meets said goal;

wherein a showcase database responsive to a set of seller's sales objectives is generated to satisfy the request; and wherein the requested information is displayed in ranked order on a user interface that is derived from the showcase database.

16. The system of claim 11:
wherein market data related to a selected item from a market are obtained;

wherein market data are analyzed by an analytical agent for conformity to a set of seller's sales objectives; and wherein the market data are filtered by the analytical agent to create a seller showcase database reflecting the most favorable terms for sale of the selected item by the selected seller.

17. The system of claim 11:
wherein at least one seller analytical agent is configured to communicate with at least one buyer analytical agent communicate;

wherein the buyer analytical agent transmits to the seller analytical agent a request by a buyer for information on a selected item from a list in a seller database in a CCN;

wherein the seller analytical agent mines data related to the selected item from at least one of a plurality of industry databases;

wherein the seller inter-agent filters the data against a profile of the at least one buyer to prepare a list of at least one of a plurality of recommended items; and wherein the seller inter-agent transmits the list of recommended items to the buyer interface.

18. The system of claim 11:
wherein a buyer's analytical agent is configured to receive information regarding at least one of a plurality of items in a CCN from sellers' inter-agents;

wherein at least one sellers' inter-agent is configured to send information regarding at least one of a plurality of items in a CCN to at least one buyer analytical agent;

wherein information about an item is supplied to a buyer by accessing a buyer's analytical agent;

wherein information about an item is communicated by the sellers' inter-agents to the buyer's analytical agent; and wherein when a list of sellers is received by a buyer's analytical agent, the buyer's analytical agent and the sellers' inter-agents engage in an exchange of information regarding the selected items.

19. The system of claim 11:

wherein data on new products and services are pushed from at least one seller database to at least one of a plurality of showcase databases at periodic time intervals; and wherein data on products and services that have been sold after the period of the last update of at least one of a plurality of showcase databases are removed from the showcase databases.

\* \* \* \* \*